United States Patent [19]
Törnqvist et al.

[11] Patent Number: 6,055,424
[45] Date of Patent: Apr. 25, 2000

[54] INTELLIGENT TERMINAL APPLICATION PROTOCOL

[75] Inventors: Krister Törnqvist, Sköndal; Claes Nilsson, Lund; Anders Isberg, Åkarp, all of Sweden

[73] Assignee: Telefonaktiebolaget LM Ericsson, Stockholm, Sweden

[21] Appl. No.: 08/825,177

[22] Filed: Mar. 27, 1997

Related U.S. Application Data

[60] Provisional application No. 60/036,170, Jan. 29, 1997.

[51] Int. Cl.[7] ...................................................... H04B 1/00
[52] U.S. Cl. ............................................ 455/414; 455/418
[58] Field of Search .................................. 455/69, 70, 71, 455/517, 414, 419, 557, 418, 433, 415, 90; 379/201, 112, 93.17

[56] References Cited

U.S. PATENT DOCUMENTS

| | | | |
|---|---|---|---|
| 4,611,096 | 9/1986 | Asmuth et al. | 379/112 |
| 5,297,146 | 3/1994 | Ogawa | 379/93.17 |
| 5,606,594 | 2/1997 | Register et al. | 455/90 |
| 5,610,972 | 3/1997 | Emery et al. | 455/414 |
| 5,703,940 | 12/1997 | Sattar et al. | 379/201 |
| 5,742,668 | 4/1998 | Pepe et al. | 455/415 |
| 5,752,188 | 5/1998 | Astrom et al. | 455/433 |

FOREIGN PATENT DOCUMENTS

| | | |
|---|---|---|
| 0 717 570 A2 | 6/1996 | European Pat. Off. . |
| 195 20 632 A1 | 12/1996 | Germany . |
| WO 96/20572 | 7/1996 | WIPO . |

OTHER PUBLICATIONS

Jan Hellaker et al., "Real–Time Traveller Information in Everyone's Pocket?! A Pilot Test Using Hand–Portable GSM Terminals", IEEE—IEE Vehicle Navigation & Information systems Conference, Ottawa—VNIS '93, pp. 49–52.

Markku Kylanpaa et al., "Nomadic Access to Information Services by a GSM Phone", Comput. & Graphics, vol. 20, No. 5, pp. 651–658, 1996.

Andy Reinhardt, "The Network with Smarts—New Agent–based WANs Presage the Future of Connected Computing", 4465 Byte, Oct. 19, 1994, No. 10, Peterborough, NH, US, pp. 51–64.

*Primary Examiner*—Salvatore Cangialosi
*Attorney, Agent, or Firm*—Burns, Doane, Swecker & Mathis, L.L.P.

[57] ABSTRACT

In a communications system that includes a service node connected to an intelligent terminal by means of a limited bandwidth communications means, techniques in a service node and an intelligent terminal provide one or more services to a user of the intelligent terminal. A protocol between the intelligent terminal and the service node allow each application to be variously distributed between these two units. In one aspect of the invention, the protocol may itself by carried on a lower layer protocol that is a limited bandwidth communication channel. The protocol may include the communication of primitives and/or image descriptions between the service node and the intelligent terminal.

73 Claims, 62 Drawing Sheets

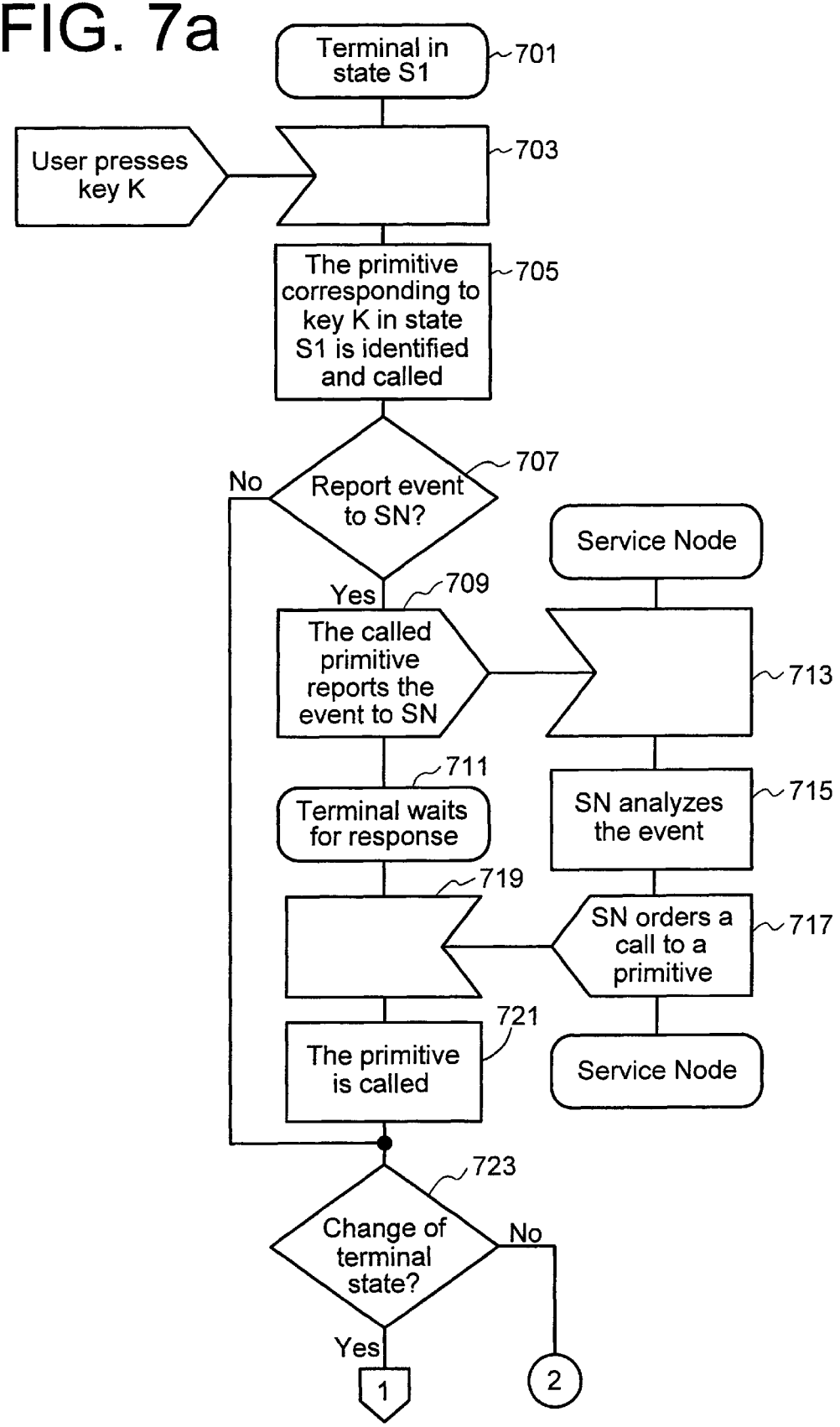

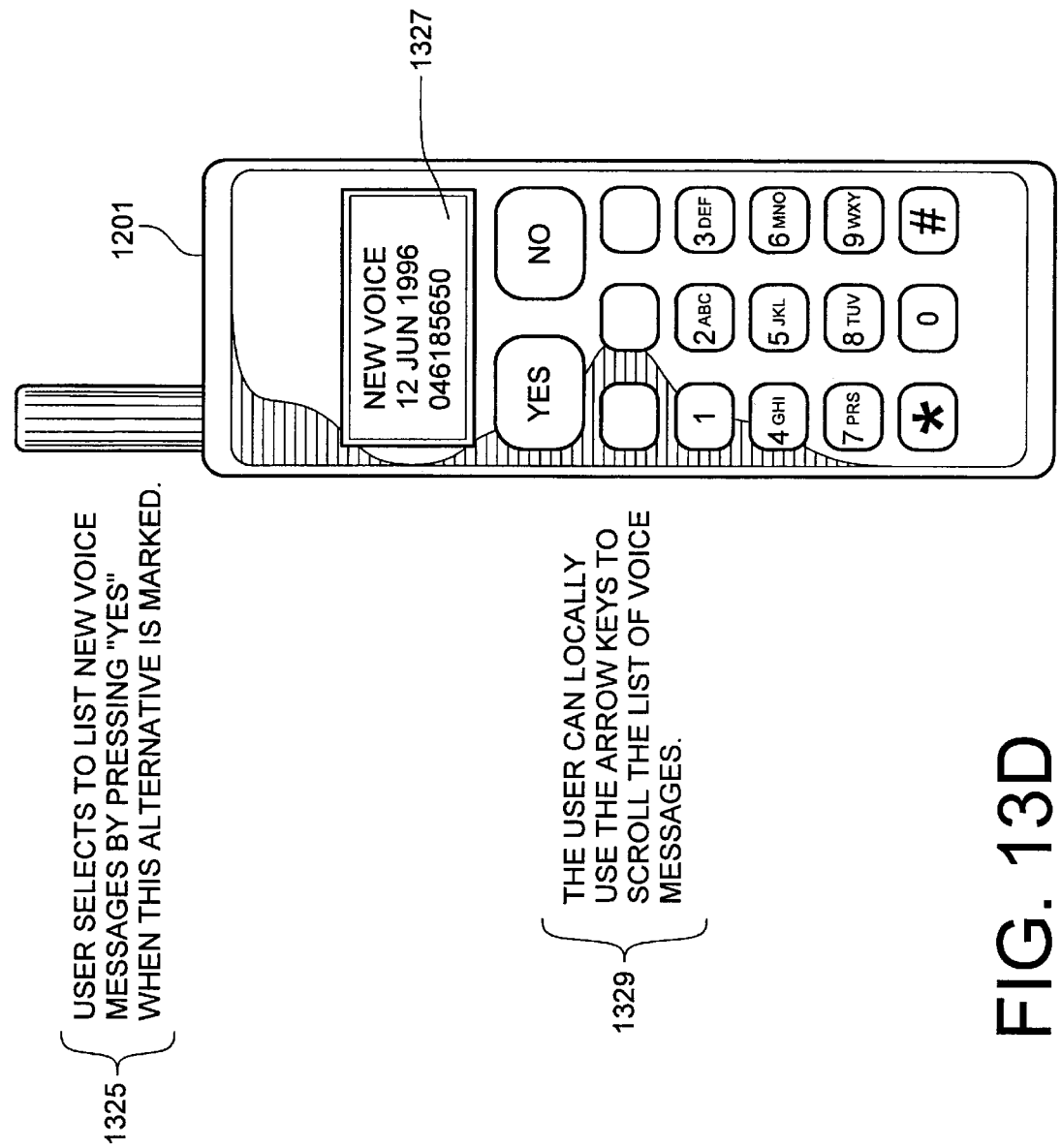
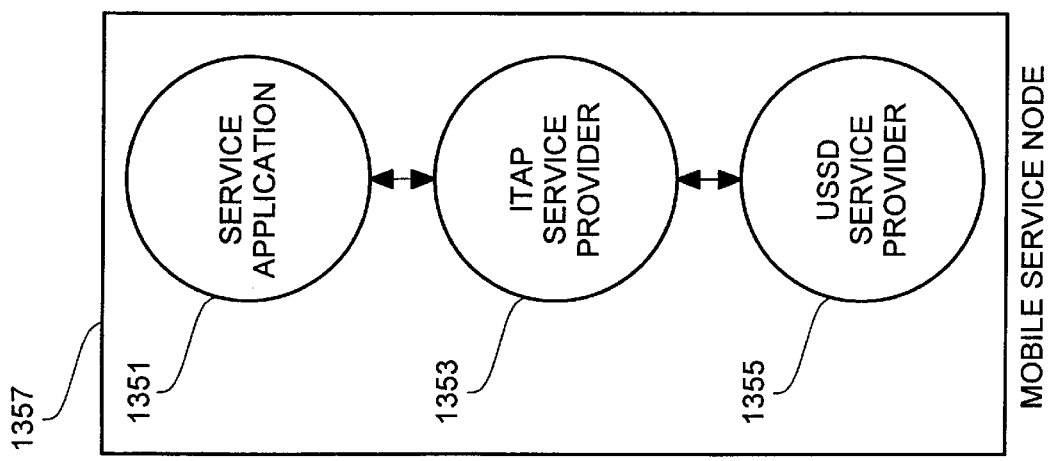
FIG. 13D

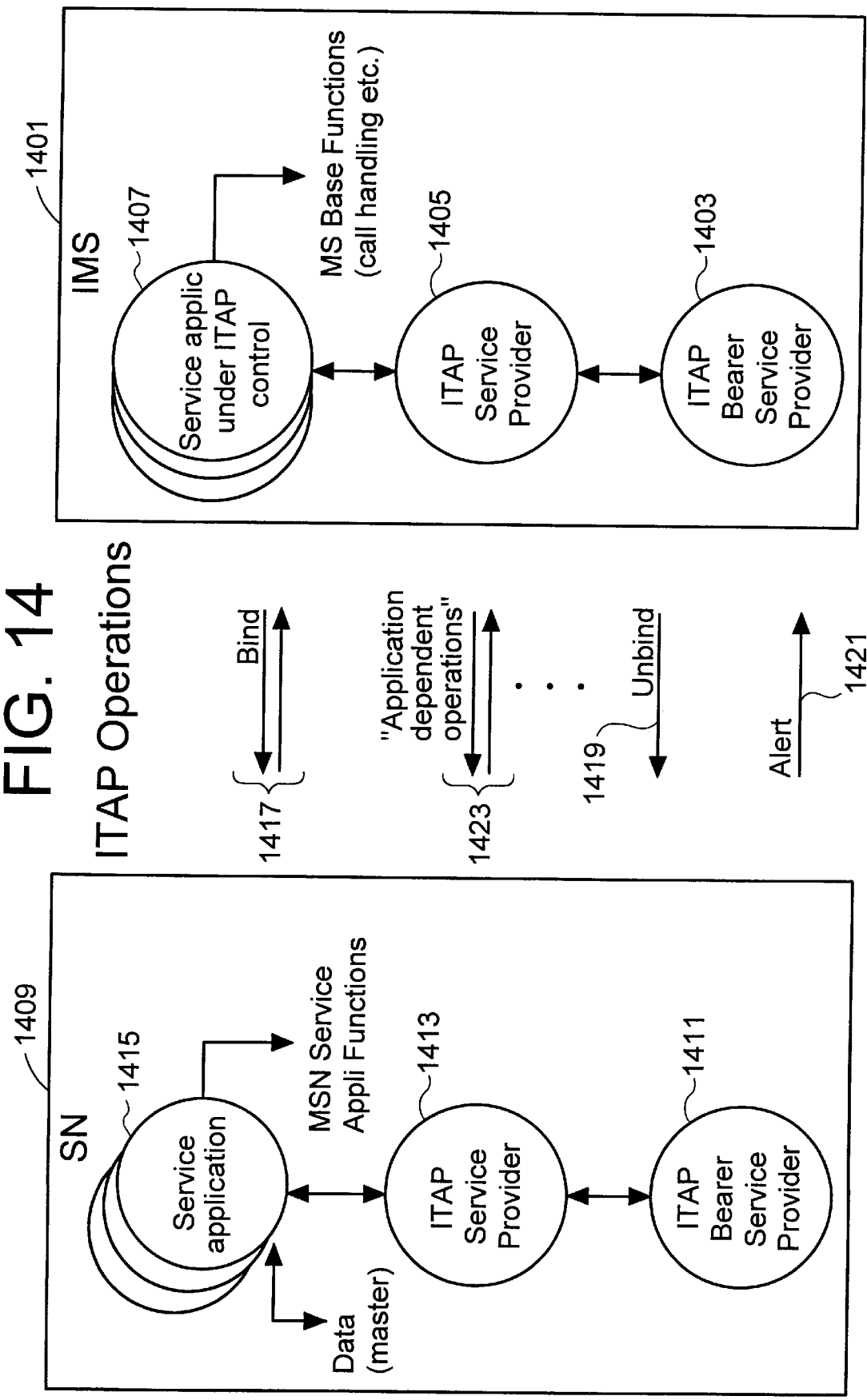

INTELLIGENT TERMINAL APPLICATION PROTOCOL

CROSS-REFERENCE TO RELATED APPLICATION

This application claims the benefit of U.S. Provisional Application No. 60/036,170, filed Jan. 29, 1997.

BACKGROUND

The invention relates to communications systems, and more particularly to techniques, including a protocol, for effecting supplementary services in a communications system.

It is known to provide a wide variety of services to users of various types of telephone equipment. To access this type of service, the user can establish a connection with a service node (SN), which can be a switch or computer with or without switching capability. In many systems, an application program running in the SN uses the voice channel for sending voice prompts and tones to the telephone. The voice channel is also utilized in the reverse direction for sending dual-tone multi-frequency (DTMF) digits from the telephone to the SN. In such a system, it is not required that the telephone include any intelligence; the dialogue is entirely between the user and the SN, whereby the user listens to voice prompts and tones, and responds by pressing keys on the telephone. Consequently, the telephone is transparent to the communication and cannot support the user in any way.

More advanced services are known as well. Such services include provision of an 800 Services Database, a Credit Card Verification Database, Geographic Call Routing, Incoming Call Routing, Multilocation Extension Dialing, Network Automatic Call Distribution, Flexible Call Routing, Flexible Carrier Selection, and others. In wireline telephone systems, such enhanced subscriber services may be provided through an Intelligent Network (IN) (e.g., Bellcore Advanced Intelligent Network (AIN) or its CCITT/ITU equivalent: ITU's CS-1, Q.1200, etc.).

In wireless communications systems, enhanced subscriber services may be provided by an intelligent mobile station (also called "intelligent terminal"), such as that which is described in U.S. patent application Ser. No. 08/617,139, entitled INTELLIGENT MOBILE STATION FOR A CELLULAR TELECOMMUNICATIONS NETWORK, filed on Mar. 18, 1996 (Attorney Docket No. 1000-0022), now U.S. Pat. No. 5,905,458 which is hereby incorporated by reference herein. Some enhanced services may alternatively be provided by an intelligent mobile station working in cooperation with a SN. To accomodate different services, the computer in the SN may include a wide variety of resources, such as various interface and switching units, facsmile units, voice processing units, an e-mail interface, computer network interfaces, modem resources and data storage. These resources are controlled by software that interacts with software in the intelligent terminal. The SN may be a single user solution or a multi-user solution with one or a number of interacting SNs.

The interaction between the SN and the intelligent terminal takes place via a communications link which is herein referred to as a control channel. The control channel can be established as a modem connection on the voice channel, or may alternatively be established on a separate communication link. FIGS. 1a–1d illustrate possible arrangements for a SN to facilitate the provision of services to a user of a cellular or ordinary fixed telephone.

FIG. 1a illustrates a case where a cellular telephone 101 includes a modem 103 and software 105 for providing one or more services. A SN 107 that includes software 109 and a modem 111 is also provided in the system. It is possible to establish a communications link between the cellular telephone 101 and the SN 107 by means of a cellular network 113 and any other network 115 (e.g., a public or private network). The SN 107 may be part of the other network 115 as shown, or may be part of the cellular network 113, or can even be added to one of these networks as an overlay solution (i.e., in the same way that a private access branch exchange (PABX) is connected to a public network). The two modems 103, 111 provide a mechanism for the physical transmission of information between the service node 107 and the cellular telephone 101 to take place. The information flows between the SN's software 107 and the cellular telephone's software 105.

FIG. 1b shows an alternative arrangement that is substantially the same as that depicted in FIG. 1a except for the fact that the cellular telephone no longer includes its own modem 103. Instead, this facility is provided inside the radio base station 117. From the point of view of the software 105 inside the cellular telephone, however, there is no difference in the sense that service-related information still flows between the SN's software 107 and the cellular telephone's software 105.

FIG. 1c shows an arrangement for providing service to an ordinary fixed analog telephone 119. Here, the fixed telephone 119 is connected to a modem resource 121 that also includes software 123 for providing one or more services. Another difference from the previously described arrangements is the substitution of a fixed network 125 for the cellular network 113. In all other respects, this arrangement functions like the arrangements of FIGS. 1a and 1b, with the SN's software 111 exchanging information with the software 123 as required for providing the various services.

Yet another arrangement is shown in FIG. 1d. Here, a fixed digital telephone 127 is tied directly to a fixed digital network 129 without the need for any modem. The SN 107, which includes the software 109, is also tied directly to the fixed digital network 129. The SN's software 111 exchanges information with the software 123 as required for providing the various types of service.

It can be seen from the above that the SN 107 and the "service telephone" (e.g., any of the celular or fixed telephones 101, 119, 127) must have interacting software and the same modem capability. This is most efficiently supported by two different communication protocols: one higher level protocol (henceforth referred to as an "application protocol") for supporting the interacting software (or service software) communications and a lower level protocol for supporting the communication between the modems. This layering of protocols is depicted in FIGS. 2a and 2b. The layering of protocols is generally known in the art, and is not described here in greater detail.

FIG. 3 shows the possibility of supplying a single SN 107 with interfaces to different telephones 301, 303, 305, 307 even if the user is one person and the calling party only calls one telephone number to the SN 107. The software 309 in the SN 107 can page the user on different telephone numbers (unknown to the calling party).

The nature of the new services that will use the control channel requires that the application protocol be open to supporting new functions and/or services. However, some implementations of the control channel provide only a limited bandwidth for conveying the information associated with these new functions and/or services. Consequently, an effective application protocol is highly desirable.

In the ETSI recommendatesions for the pan-European GSM system, phase 2, there are specified a number of supplementary services which can complement and modify both teleservices and bearer services. For example, there are services for barring or forwarding calls and services for toggling between two connected calls. In addition to the standardized GSM supplementary services, mobile network operators are experiencing an increasing demand for operator-specific service.

For an operator to be able to implement operator-specific services, it is necessary to have a generic mechanism for user interaction between a service application in the network and a mobile station.

In GSM today, there is a generic mechanism for providing userinteractin between a service application in the netowrk and a mobile station. This mechanism is called "Unstructured Supplementary Services Data" (USSD). What is described about USSD in the following text is valid for USSD according to GSM, phase 2. USSD also exists in GSM, phase 1, but the dialogue handling is more limited.

Referring to FIG. 4, in the GSM switching system, USSD is a part of the well-known "Mobile Application Part" (MAP) protocol 401. In the air interface, the USSD operations are carried by the layer 3 "Register", "Facility" and "Release Complete" messages 403.

The USSD service application can reside in the Mobile services Switching Center/Visitor Location Register (MSC/VLR) 405, in the Home Location Register (HLR) 407, or in an external Mobile Service Node (MSN) 409. If a USSD service application is implemented in an MSN, an extension of the MAP-protocol, "USSD to external node" should be used.

The USSD operations are generic and send text transparently through the network. Text received from a service application in the network is displayed by the MS 411. Correspondingly, the user keyboard input from the MS 411 is transparently sent to the service application in the network.

USSD has a dialogue structure. A dialogue could be initiated by the service application in the network, or alternatively by the MS 411. A USSD dialogue can exist independently of whether there is a parallel speech connection or not.

If the network service application initiates a USSD dialogue, it invokes a Request or Notify operation. When the MS 411 has received, from the network service application (e.g., the USSD appl 1 in the MSCIVLR 405), a USSD Request operation containing a text string to be displayed, the MS 411 displays this text. The input string from the user is returned n the result operation to the network service application. It is also possible for the network service application to invoke a USSD Notification operation, containing text to be displayed. The difference between Request and Notification is that no response from the user is required in the case of Notification. Only an acknowledge operation is returned to the network service application.

The user of the MS 411 is also able to initiate a USSD dialogue by performing a specified Man Machine Interface (MMI) input. When this input has been performed, the MS 411 invokes, to the network, a "Process Unstructured USSD Request" operation containing the input from the user. This MMI input should contain a unique service code which identifies the application to the network and makes it possible to route the operati to the correct network node. Then, the network service application can reply with a result operation, containing text to be displayed. The network service application can then terminate the dialogue. It is also possible for the network service application to continue the dialogue by invoking a USSD Request or Notify operation. After the reply has been received from the MS 411, the network service application may continue the dialogue by invoking more USSD Request or Notify operations.

A USSD service example will now be described with reference to FIG. 5. At step 501, a user enters the service code for information services into his MS 411. In response, the MS 411 issues a Proc USSD request invoke (user input=USSD serv code) to the HLR, MSC/VLR or External node 551 in which both the USSD service provider 553 and the service application 555 are located (step 503). The USSD service provider 553 receives the Proc USSD request invoke, and passes the pertinent command and parameter information up to the service application 555. For the remainder of this description, the service application 555 will be referenced as the recipient and source of messages received from and sent to the MS 411. However, it will be recognized that these messages pass through the lower layer USSD service provider 553.

The service application 555 passes a response back to the USSD service provider 553, which in turn transmits a USSD request invoke ("INFO SERV <LF>1Weather <LF>2 TeleNum . . . ") back to the MS 411 (step 505). This causes the MS 411 to display the received text to the user.

In this example, the user selects "Weather" by entering 1 and pressing the YES key on the MS 411 (step 507). This causes the MS 411 to transmit a USSD request result (user input=1) to the service application 555 (step 509).

In response, the service application 555 causes a USSD request invoke ("WEATHER <LF>Enter area:") message to be sent to the MS 411 (step 511).

After this new text is displayed to the user, the user enters (in this example) 046 and presses the YES key on the MS 411 (step 513). This causes a USSD reuest result (user input=046) to be transmitted to the service application 555 (step 515). The interaction between the service application 555 and the user of the MS 411 continues in this fashion until the service has been provided and the connection is broken.

It can be seen from the above that USSD works as a user interaction mechanism for simple operator-specific services, but that it has some drawbacks, especially when more advanced services need to be implemented. These drawbacks include:

1. Long response times due to low bandwidth (300–600 bits/sec), inefficient coding (short message service (SMS) 7-bit alphabet) and the fact that all service logic must reside in the service application in the network because the MS 411 is an unintelligent terminal. For example, an MS menu must be sent to the MS each time it needs to be displayed to the user. Also, the user selection must be sent to the network service application where a logical decision is made. Thus, communication speed between the application service provider and the MS is critical to a good response time. However, as stated above, USSD has a low bandwidth in the range 300–600 bits/sec. Generally, a limited bandwidth communications means is one that cannot operate at rates higher than about 1000 bits/sec.

2. The MS user interface for services using USSD is primitive and the normal MS MMI paradigm can not be used. For example, if the service contans menu handling, each menu-option must be identified by a digit (or other alphanumeric character). The user returns the digit (or other alphanumeric character) that corresponds to the selected option. This way of handling menus is not user-friendly and gives a menu-paradigm that differs from other menus in the MS 411.

Also note that this user interface cannot be utiliszed if the MS 411 supports a graphical user interface.

3. Local MS functions can not be utilized by USSD services. For example, no intelligent call handling can be performed and access to the local telephone book (number to name translation) is not possible.

4. Timers in the network limit the length of life for USSD services.

5. Limited length of the text strings sent between the MS 411 and the service application 555 in the network.

6. In the MS 411, only one USSD dialogue at a time can be active.

Other strategies for user interaction are known. These include:

Analog Display Services Interface (ADSI): This is a communication protocol for bidirectional transmission of data betseen a "Stored Program Controlled Switching system (SPCS, "service node") and an Analog Display Services Customer Premises Equipment (CPE, "terminal"). The data transmission can be performed over the voice path using FFSK and DTMF.

The design of ADSI is based on having loadable service logic in the terminal. However, ADSI has the limitatino in that it specifies the whole protocol stack in the fixed network, that is, it is not bearer independent and it can not be used as an application protocol above USSD.

The WWW-HTTP/HTML concept used by Internet WWW-servers and clients: The main problem with the WWW-concept is the reuired bandwidth. WWW requires at least a 9.6 Kbits/s data channel, while the average throughput for a USSD connection is in the range of 300–600 bits/s. If a data channel is used as the bearer instead of USSD, then no parallel speech connection could exist. Also, WWW s based on a strictly client server concept. There is no way for the server to start the interaction between the client and the server.

SUMMARY

It is therefore an object of the present invention to provide a mechanism for effecting supplementary services in a communications system.

It is a further object of the present invention to provide a protocol for effecting supplementary services in a communications system.

It is still a further object of the present invention to provide a protocol for effecting supplementary services in a communication system having a band-limited channel between a service node and the recipient of the supplementary services.

In accordance with one aspect of the present invention, the foregoing and other objects are achieved in a communications system that includes a service node connected to an intelligent terminal by means of a limited-bandwidth communications means. In accordance with one aspect of the invention, a service is provided to a user of the intelligent terminal by, in the service node, analyzing an event to determine a primitive; using the limited bandwidth communications means to send a message to the intelligent terminal, wherein the message instructs the intelligent terminal to execute a routine corresponding to the primitive; and in the intelligent terminal, responding to the message by executing the routine corresponding to the primitive.

In another aspect of the invention, the message further includes parameters; and the step of executing the routine corresponding to the primitive includes using the received parameters.

In still another aspect of the invention, the step of executing the routine includes the step of presenting information to the user of the intelligent terminal.

In yet another aspect of the invention, the step of executing the routine includes the step of changing a state of the intelligent terminal.

In still another aspect of the invention, the event is receipt of a message from the intelligent terminal, wherein the message indicates that the user pressed a particular key on the intelligent terminal.

In another aspect of the invention, the event is detection by the service node of an occurrence of something that affects the intelligent terminal. The occurrence may be, for example, an incoming call directed at the intelligent terminal.

In still another aspect of the invention, the step of, in the intelligent terminal, responding to the message by executing the routine corresponding to the primitive comprises the steps of, in the intelligent terminal, determining that execution of the routine requires the presence of a state table that is not presently stored in the intelligent terminal; using the limited bandwidth communications means to send a message from the intelligent terminal to the service node, wherein the message requests the state table; using the limited bandwidth communications means to send the requested state table from the service node to the intelligent terminal; and in the intelligent terminal, using the received state table to execute the routine.

In yet another aspect of the invention, the intelligent terminal additionally performs menu-handling input and output functions between the intelligent terminal and the user without communicating with the service node.

In another aspect of the invention, intelligent terminal user input and output functions are controlled in accordance with a man-machine interface paradigm that is independent of the service being provided.

In another aspect of the invention, a service is provided to a user of the intelligent terminal by performing the steps of, in the intelligent terminal, analyzing an event to determine an action to be taken; using the limited bandwidth communications means to send an operation to the service node, wherein the operation corresponds to the action to be taken and instructs the service node to execute a routine corresponding to the operation; and in the service node, performing the action corresponding to the operation, and returning a result of the operation to the intelligent terminal via the limited bandwidth communications means.

In still another aspect of the invention, providing the service further comprises, in the intelligent terminal, initiating a first session with the service node via the limited bandwidth communications means in response to detection of an incoming call at the intelligent terminal.

In another aspect of the invention, the step of initiating the first session with the service node comprises the step of negotiating between the intelligent terminal and the service node to ensure that resources that are to be used by the intelligent terminal and the service node are consistent with respect to one another.

In yet another aspect of the invention, the step of initiating the first session with the service node includes the step of indicating a type of coding that is to be used in communications between the intelligent terminal and the service node. In one embodiment, the type of coding is Basic Encoding Rules (BER). In another embodiment, the type of coding is Packed Encoding Rules (PER).

In still another aspect of the invention, a second session is initiated between the intelligent terminal and the service node while maintaining the first session.

In another aspect of the invention, providing the service further comprises the step of sending an image description from the service node to the intelligent terminal, wherein the image description defines operations that are to be performed by the intelligent terminal.

In yet another aspect of the invention, the step of using the limited bandwidth communications means to send an operation to the service node comprises mapping the operation onto an "Unstructured Supplementary Services Data" protocol data unit. In an alternative embodiment, the step of using the limited bandwidth communications means to send an operation to the service node comprises mapping the operation onto a Short Message Service protocol data unit.

In another aspect of the invention, the step of using the limited bandwidth communications means to send an operation to the service node comprises mapping the operation onto a protocol data unit of a lower layer protocol.

In yet another aspect of the invention, providing the service further comprises the steps of performing a local service function in the intelligent terminal without requesting assistance from the service node.

BRIEF DESCRIPTION OF THE DRAWINGS

The objects and advantages of the invention will be understood by reading the following detailed description in conjunction with the drawings in which:

FIGS. 7a, 7b and 7c depict a flow chart that illustrates exemplary interactions between a user, an intelligent terminal and a SN;

FIGS. 13a through 13e illustrate an example of an ITAP service;

FIG. 14 depicts the use of a limited number and size of operations sent between the SN and the IMS in order to obtain reasonable response times, in accordance with one aspect of the invention;

DETAILED DESCRIPTION

Figure 1A:
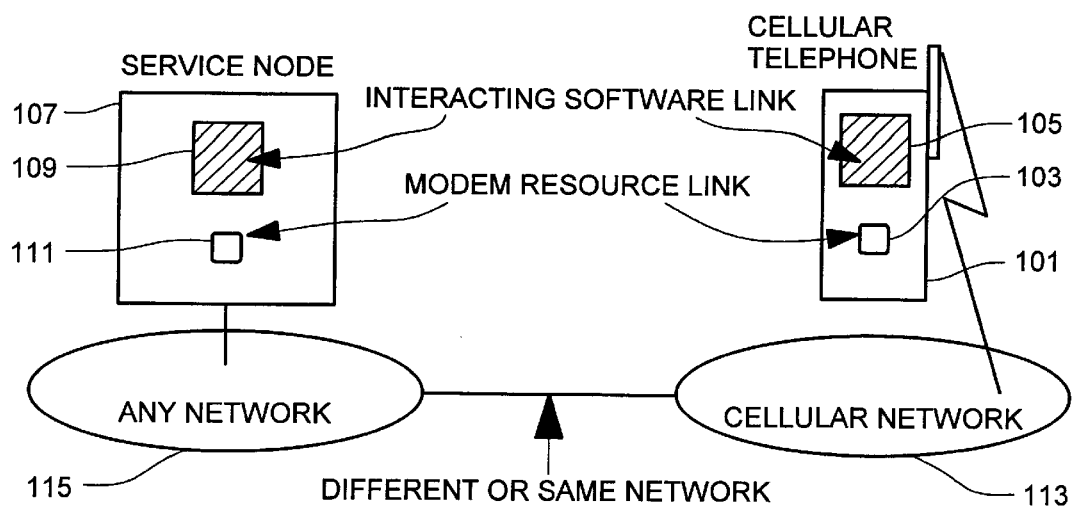
FIGS. 1a–1d illustrate possible arrangements for a service node to facilitate the provision of services to a user of a cellular or ordinary fixed telephone.
Figure 1B:
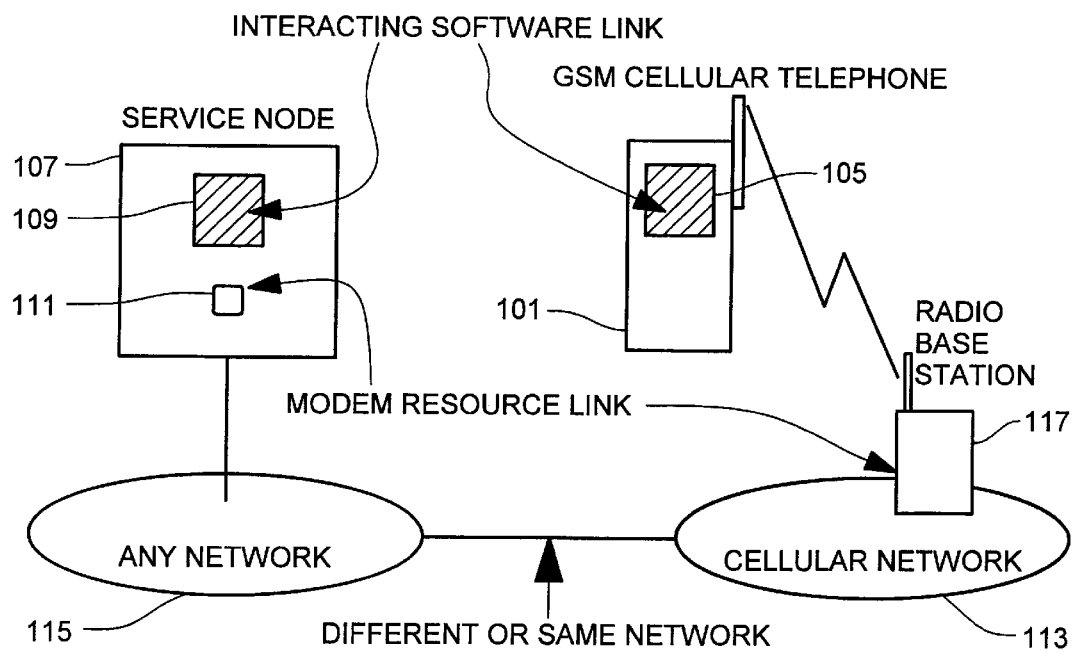
Figure 1C:
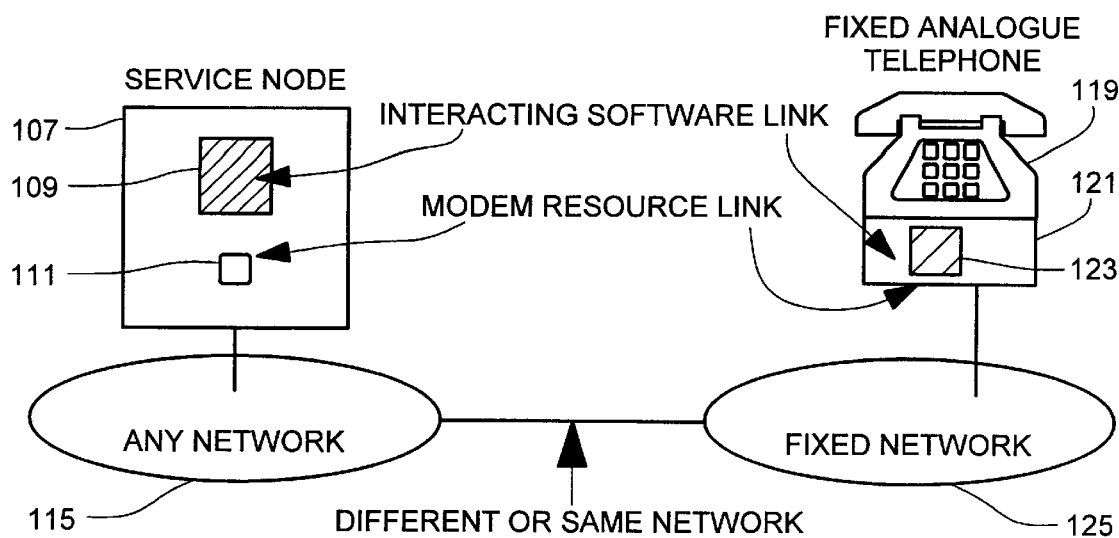
Figure 1D:
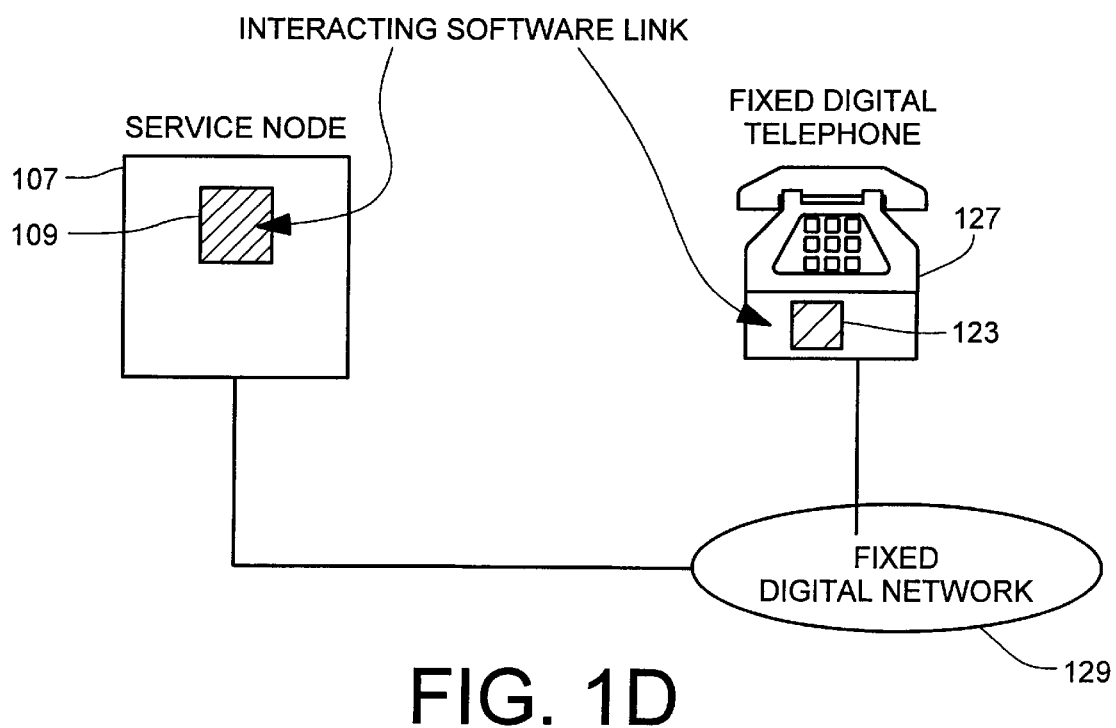
Figure 2A:
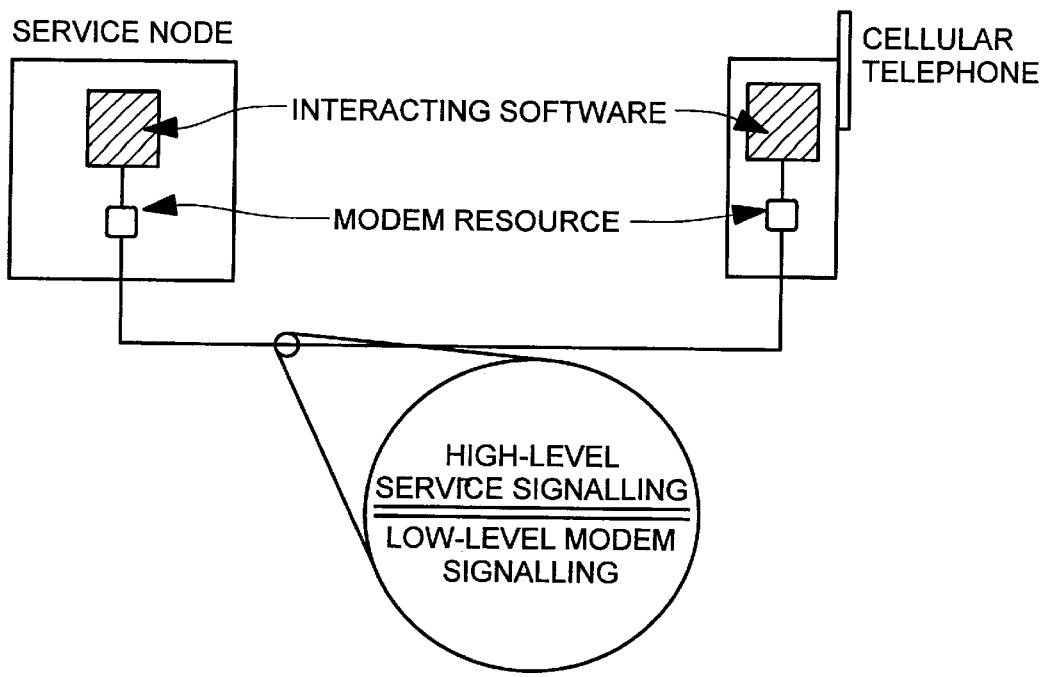
FIGS. 2a and 2b illustrate a layering of protocols in a communication system.
Figure 2B:
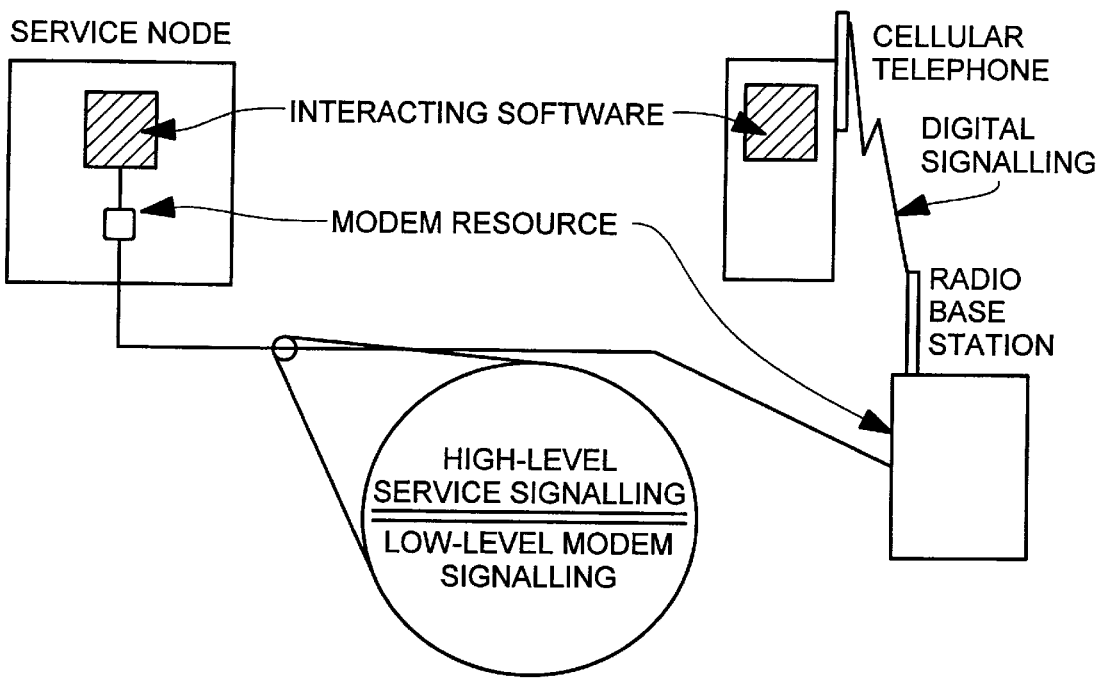
Figure 3:
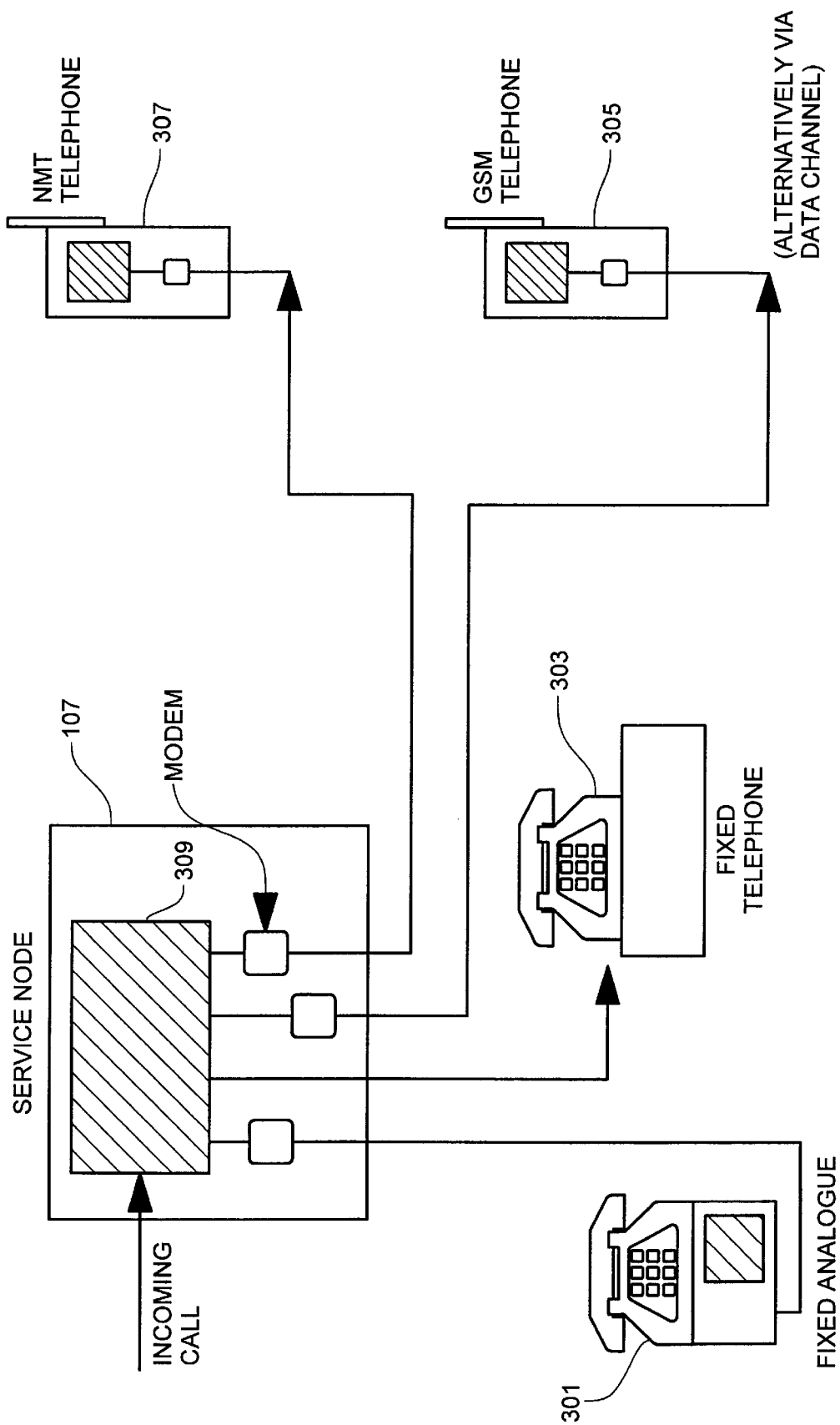
FIG. 3 depicts the possibility of supplying a single SN with interfaces to different telephones even if the user is one person and the calling party only calls one telephone number to the SN.
Figure 4:
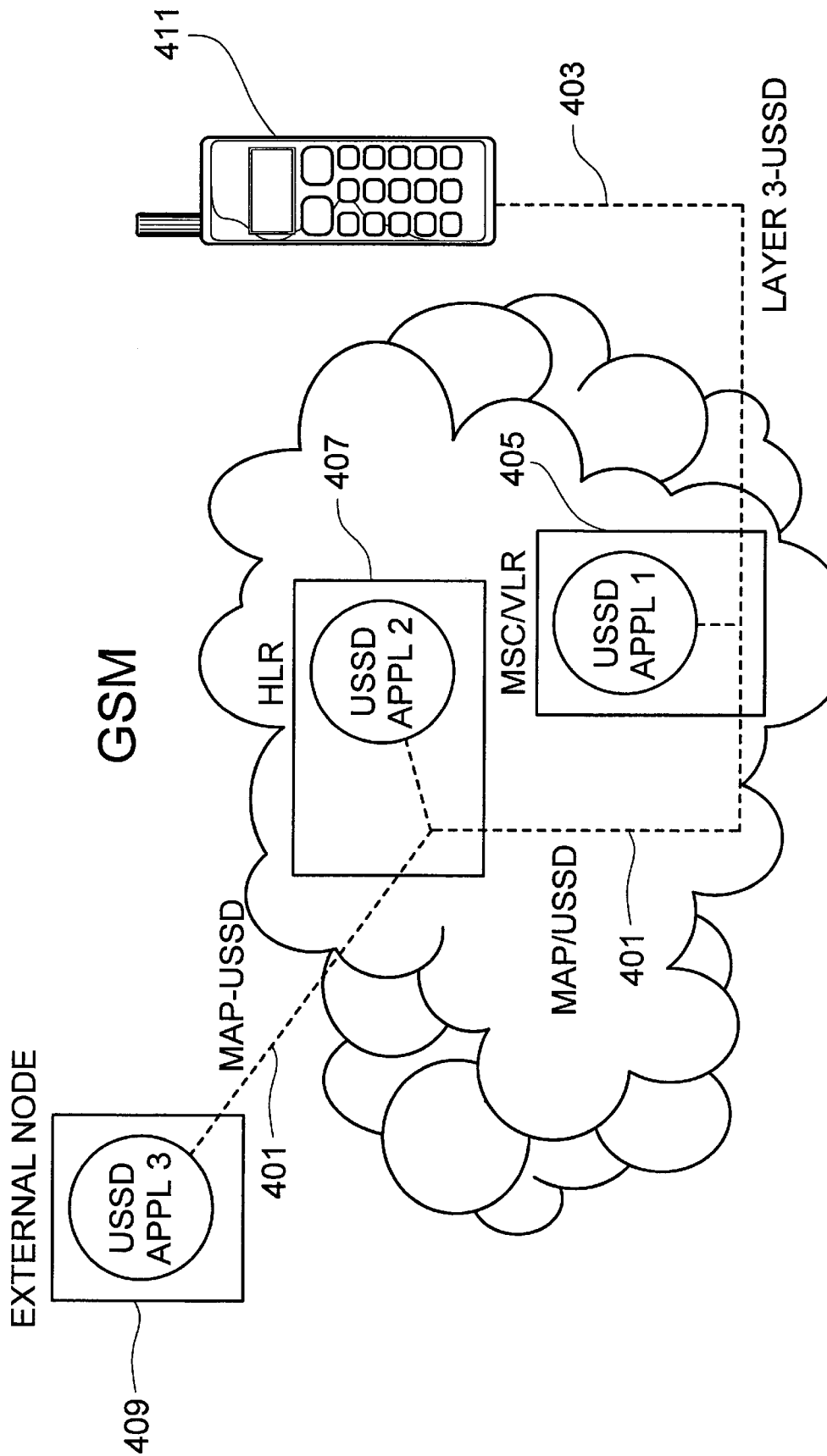
FIG. 4 illustrates a GSM switching system in which USSD is included as a part of the well-known "Mobile Application Part" (MAP) protocol.
Figure 5:
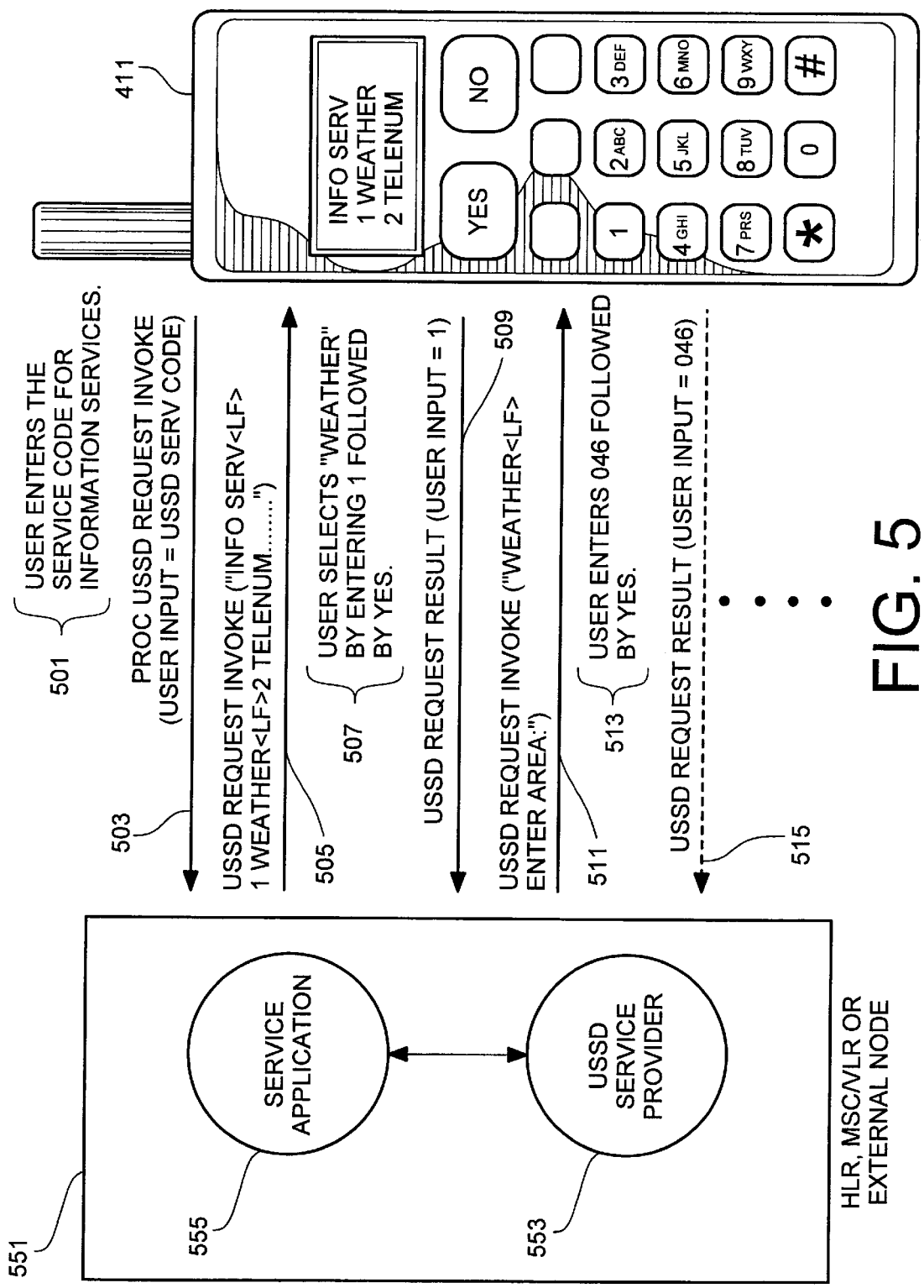
FIG. 5 illustrates a USSD service.

The various features of the invention will now be described with respect to the figures, 'in which like parts are identified with the same reference characters.

Figure 6:
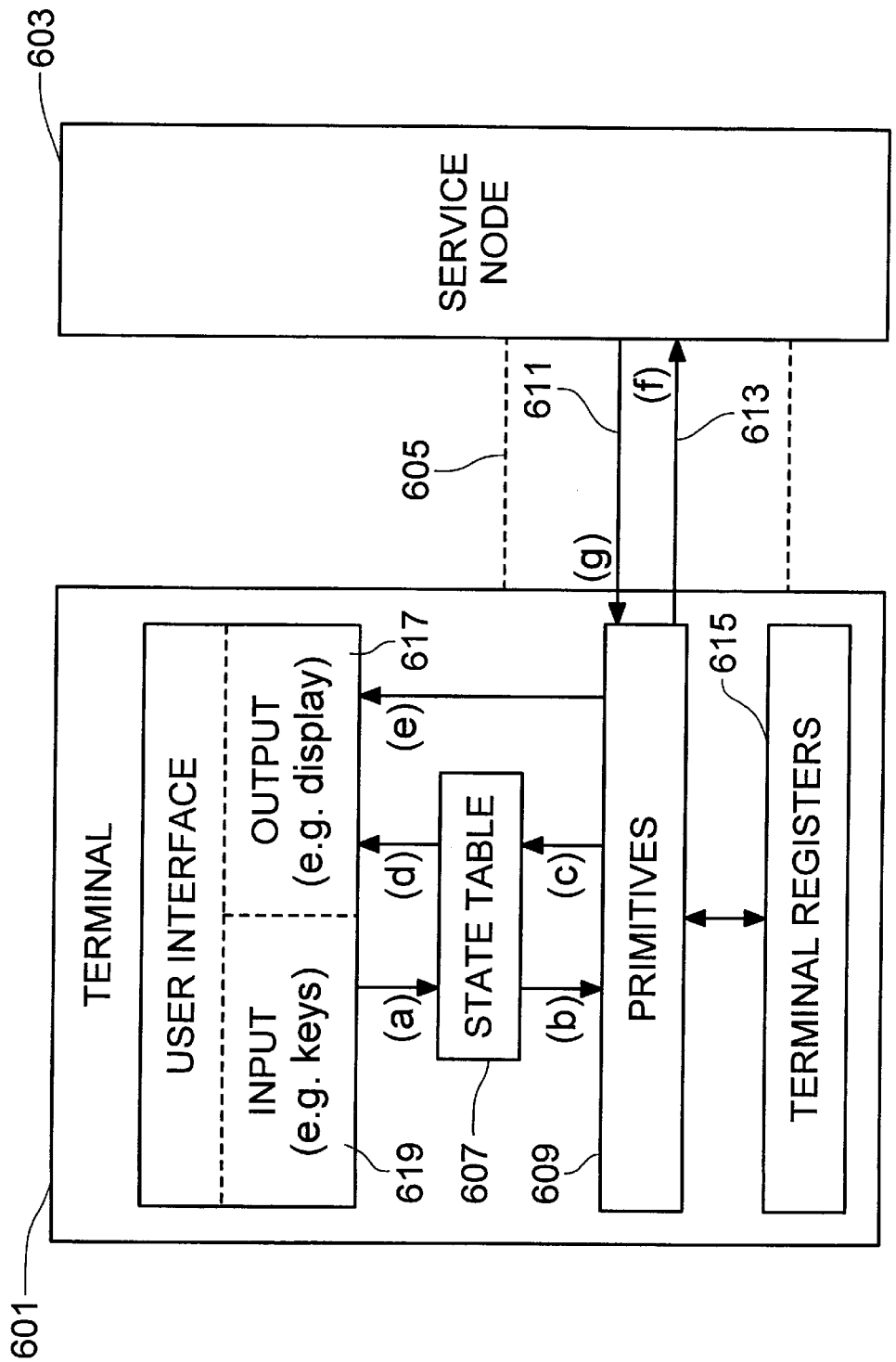
FIG. 6 is a block diagram depicting the relationship between a SN and an intelligent terminal, as well as a number of components thereof, in accordance with one embodiment of the invention.

A first embodiment of the invention will now be described with respect to FIG. 6, which is a block diagram depicting the relationship between a SN 603 and an intelligent terminal 601, as well as a number of components thereof. Implementation of an application (e.g., an advanced service) is divided into two parts, one residing in the intelligent terminal 601 and the other residing in the SN 603. In one aspect of the invention, the two parts of the application utilize an application protocol to communicate over a control channel 605.

The application part that resides in the intelligent terminal 601 is defined and implemented with the following application building components: State and State Tables 607; Primitives 609; Control Messages to the Terminal 611; Messages from the Terminal 613; and Terminal Registers 615. These components will now be described in greater detail.

State and State Table 607

The terminal will alwaus be in a defined state when running the application. A state is defined by a state table 607, specifying information displayed to the user 617, any time supervision of the state, and action to take as a result of a stimulus from the user 619.

In one aspect of the invention, the transition from one state to another may be handled by a primitive 609. A state table 607 defines the state concerning:

The information that will be presented to the user 617 (e.g., shown on a display of the terminal).

Any menu that will be presented to the user, including a definition of the options that are available to the user.

For every relevant user action (e.g., pressing a key 601 on the intelligent terminal 601), a primitive 609 that is to be called.

Time supervisions of the state and the primitive to call when the time expires.

Primitives 609

There is an Application Programming Interace (API) in the intelligent terminal 610, wherein the API is associated with a set of primitives 609. These primitives 609 may be called directly from the code (e.g., in the startup sequence, through a state table 607 or remotely from the SN 603).

A primitive may have none, one or several parameters.

Control Messages to the Terminal 611

A set of control messages are defined for transmission from the SN 603 to the intelligent terminal 601. The control messages 611 may cause data to be stored in a terminal register 615, or may alternatively call a primitive 609. A control message 611 that orders a change of state is a call to a primitive.

Messages From the Terminal 613

The intelligent terminal 601 may send one or more messages to the SN 603 from a called primitive 609.

There may be some specialized messages, each having a unique meaning. There may also be a generic message that reports an event to the SN 603. The event reporting message may include parameters indicating the current state and the event (e.g., an indication that key "x" was pressed, or that the state supervision time has expired). The intelligent terminal 601 should leave the decisino of appropriate measure to the SN 603 when sending such a message.

Terminal Registers 615

The terminal registers 615 should contain data that is specific to the intelligent terminal 601, such as terminal identity, or data that is personal to the user or temporary. The user or the SN 603 should be responsible for updating terminal registers 615.

Exemplary interactions between a user, an intelligent terminal 601 and a SN 603 will now be described with reference to the flow chart depicted in FIGS. 7a, 7b and 7c. It is assumed, in this example, that the intelligent terminal 601 is presently in state S1 (step 701). At step 703, the intelligent terminal 601 detects that the user has pressed an input key, designated key k. In response, the primitive 609 corresponding to key k in state S1 is identified and called (step 705).

The event (i.e., the user's pressing key k while the terminal is in state S1) may or may not be an event that should be reported to the SN 603. If it is not ("no" path out of decision block 707), then processing continues at decision block 723. If it is a reportable event, ("yes" path out of decision block 707), then the called primitive reports the event to the SN 603 (step 709), and the intelligent terminal 601 waits for a response (step 711).

The SN 603 detects receipt of the event report (step 713) and responds by analyzing the event (step 715). The analysis determines which primitive the intelligent terminal 601 should next execute, and the SN 603 orders a call to this primitive (step 717), by means of the application protocol that is used on the control channel 605.

The intelligent terminal 601 receives the communication from the SN 603 (step 719), and calls the primitive (i.e., the intelligent terminal 601 executes a stored routine designated by the primitive) (step 721). Execution continues to decision block 723.

Either as a result of execution of the primitive corresponding to key K in state S1 ("no" path out of decision block 707) or alternatively as a result of execution of the primitive ordered by the SN 603 (step 721), the intelligent terminal may or may not be required to change state (decision block 723). If no change of state is required ("no" path out of decision block 723), then a determination is made regarding whether new information needs to be presented to the user (decision block 725). If so, then the new information is presented to the user (step 727), and the terminal remains in state S1 (step 729). Otherwise ("no" path out of decision block 725), no new information is presented to the user, and the terminal simply remains in state S1 (step 729).

Returning now to decision block 723, if it is determined that the terminal needs to change its state ("yes" path out of decision block 723), then it is determined whether the state table 607 for state S2 is presently stored in the intelligent terminal 601 (decision block 731). In general, when an intelligent terminal 601 is programmed for an application, the relevant state tables 607 are downloaded into the intelligent terminal 601, either by connecting a data base directly to the intelligent terminal 601, or alternatively through the network from the SN 603. If the application is changed, one or more state tables 607 can be downloaded from the SN 603.

If the application needs more state tables 607 than can be stored in the intelligent terminal 601, a missing state table can be downloaded immediately from the SN 603 on demand when the intelligent terminal is going to enter that state. This can be done both when the intelligent terminal 601 is connected to the SN 603 and when the intelligent terminal 601 is "off-line".

Storage of the missing state table 607 within the intelligent terminal 601 can be temporary (i.e., for only so long as the intelligent terminal remains in the corresponding state). Alternatively, the missing state table 607 can be put on a stack with a number of other state tables 607. To make room for the new state 607 table in the stack, a replacement strategy can be utilized in which the state table 607 that has been unused for the longest time will be replaced.

It is also possible to initiate or change the application by downloading new primitives, either as object code or as calls to other primitives.

Figure 7B:
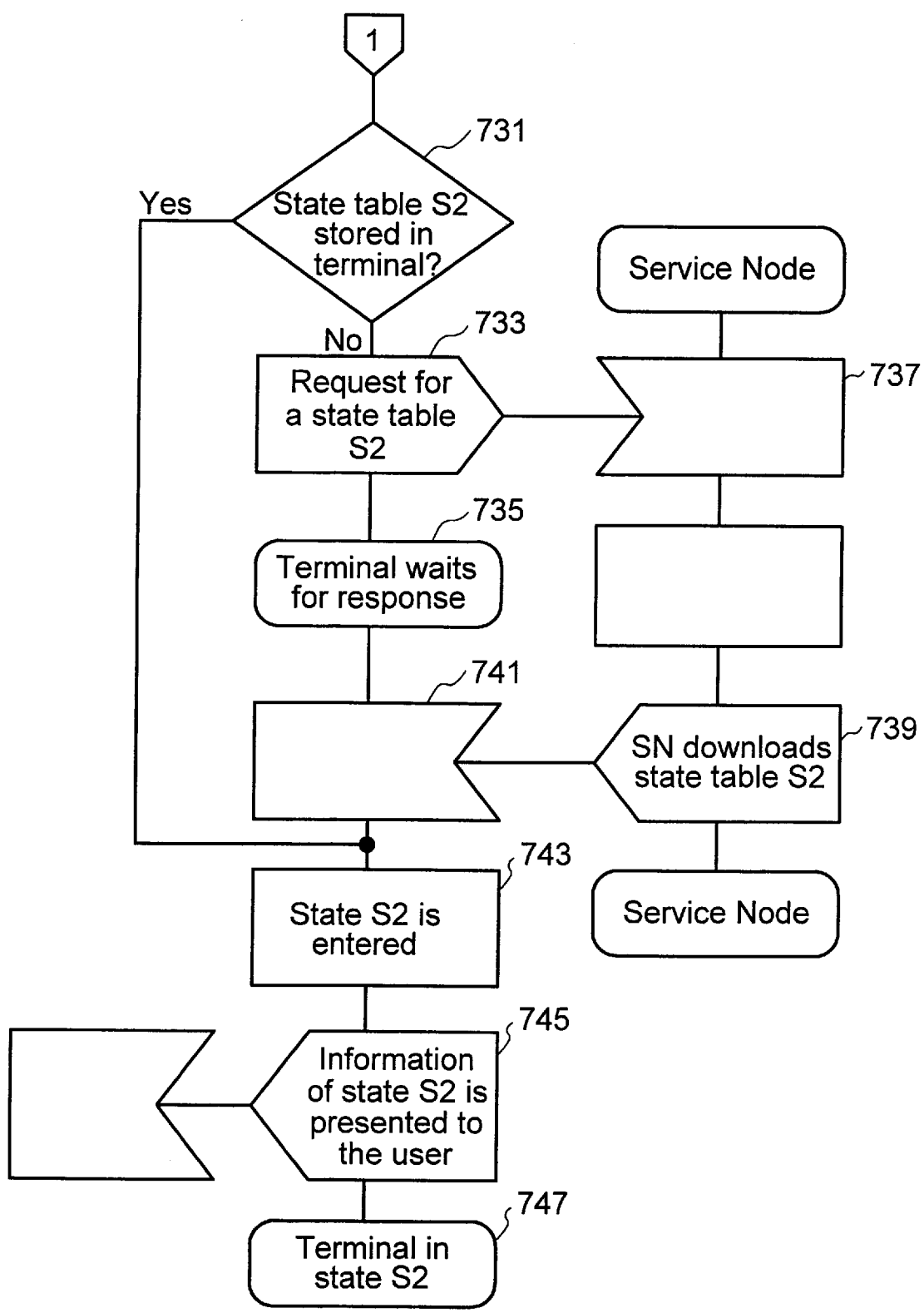
Figure 7C:
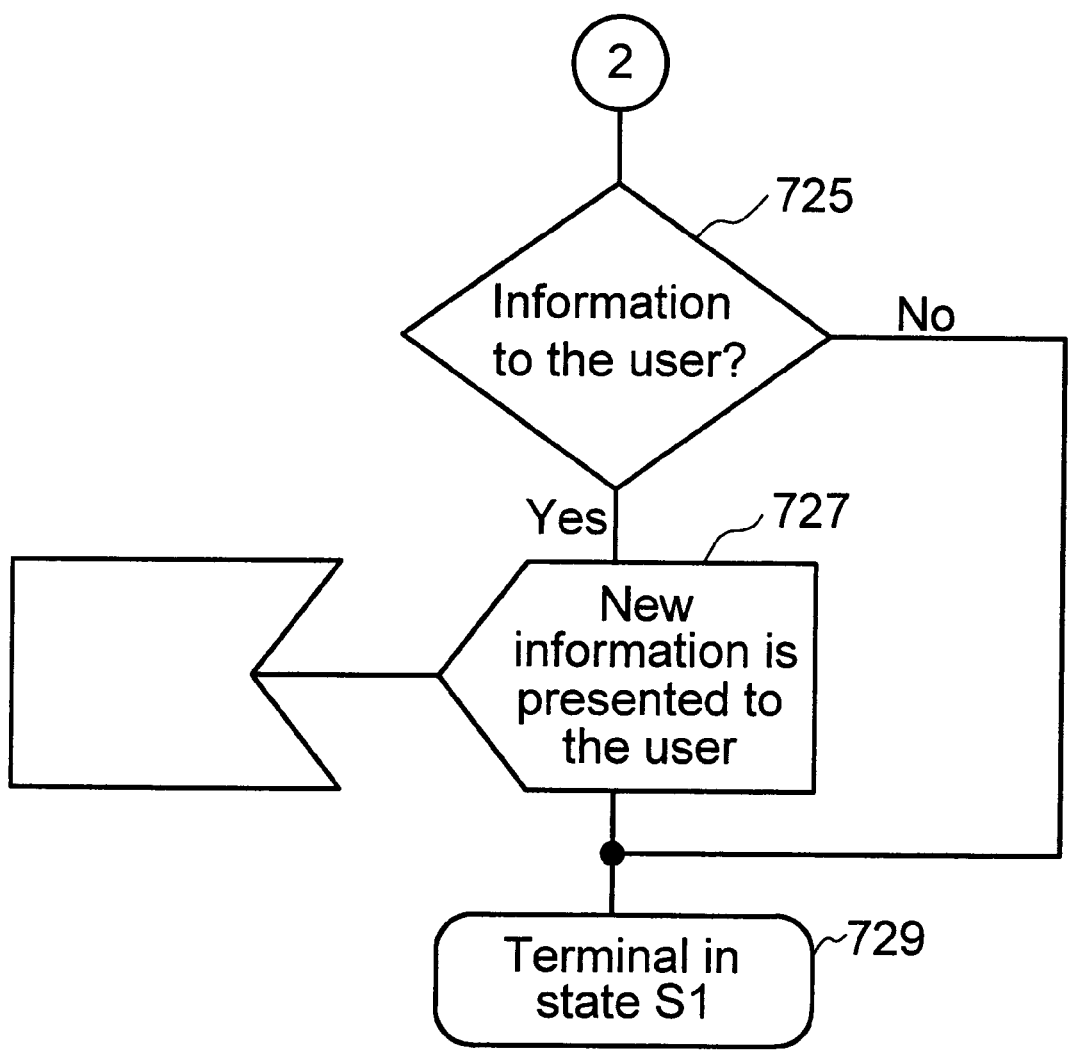

Returning now to the flow chart of FIG. 7b, if the state table 607 for state S2 is stored in the intelligent terminal 601 ("yes" path out of decision block 731), then state S2 is entered (step 743), and information regarding state S2 is presented to the user (step 745). The intelligent terminal 601 is now in state S2 (step 747).

If, however, the state table 607 for state S2 is not already stored in the intelligent terminal 601 ("no" path out of decision block 731), then a request for a state table 607 corresponding to state S2 is sent from the intelligent terminal 601 to the SN 603 (step 733). The application protocol is used on the control channel 605 in order to convey this request.

The SN 603 detects receipt of the request for the state table 607 (step 737), locates the requested state table 607, and downloads the state table 607 to the intelligent terminal 601 (step 739). Again, the downloading of the state table 607 utilizes the application protocol on the control channel 605.

The intelligent terminal 601 receives the state table 607 for state S2 (step 741), and continues its processing at step 743, in which state S2 is entered. Information regarding state S2 is then presented to the user (step 745). The intelligent terminal 601 is now in state S2 (step 747).

In the above examples, all of the activity was initiated in response to a user action (e.g., the user pressing key K). It is also possible for activity to be initiated by the SN 603, as illustrated in the flow charts of FIGS. 8 and 9.

Figure 8:
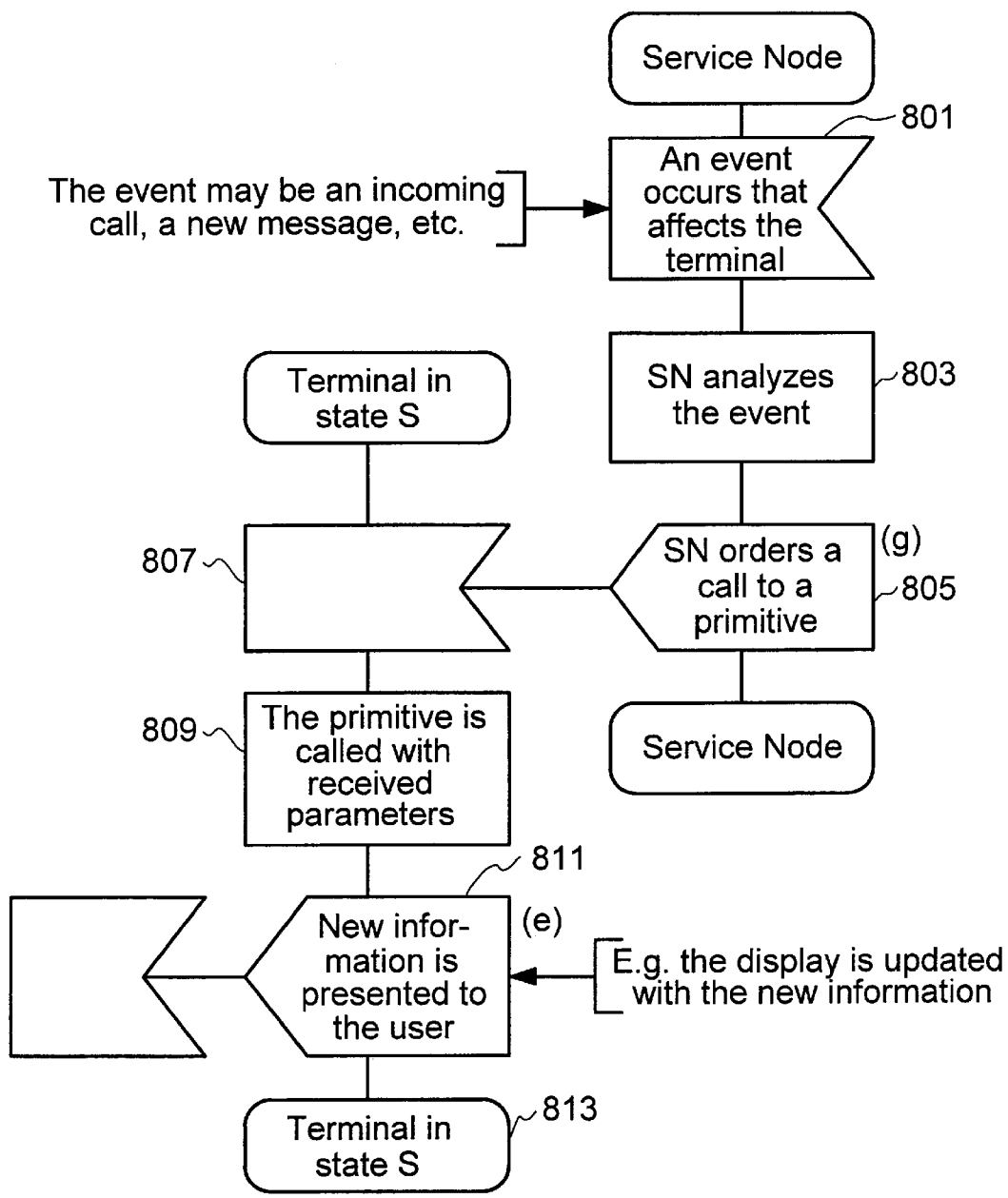
FIGS. 8 and 9 are flow charts depicting the possibility for activity to be initiated by the SN.

Referring first to FIG. 8, it is assumed that the intelligent terminal is initially in state S. The SN 603 detects the occurrence of an event that affects the intelligent terminal 601 (step 801). The event may be, for example, an incoming call or a new message. In response, the SN 603 analyzes the event (step 803). The analysis determines which primitive the intelligent terminal 601 should next execute, and the SN 603 orders a call to this primitive (step 805), by means of the application protocol that is used on the control channel 605.

The intelligent terminal 601 receives the communication from the SN 603 (step 807), and calls the primitive with any received parameters (i.e., the intelligent terminal 601 executes a stored routine designated by the primitive) (step 809).

In this example, it is assumed that the intelligent terminal 601 is not required to change its state. Consequently, new information is presented to the user (step 811). For example the display portion of the intelligent terminal 601 may be updated with new information. The terminal then remains in state S (step 813).

Figure 9:
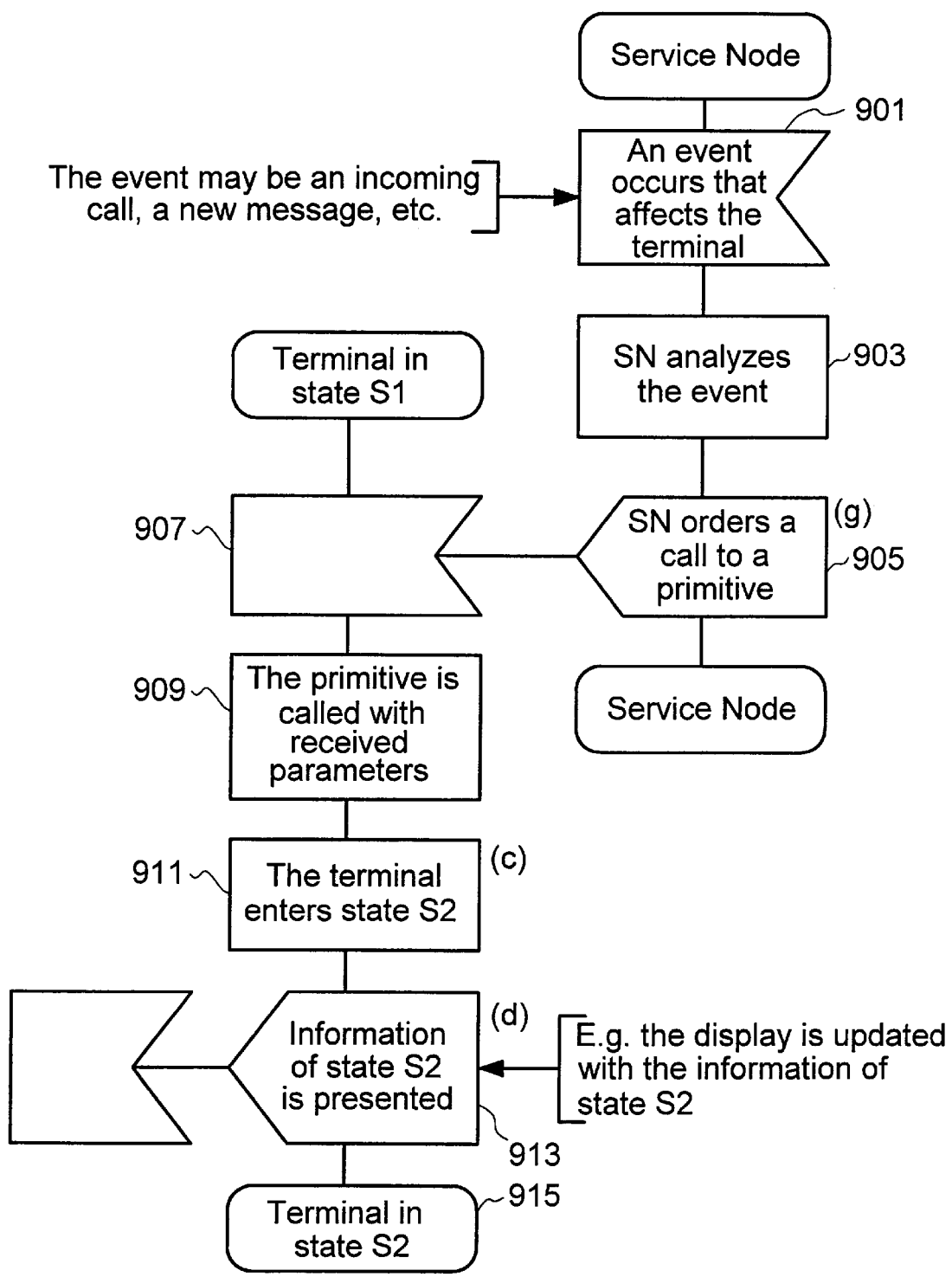

An event that is first detected by the SN 603 may also result in a change of state of the intelligent terminal 601. Referring now to FIG. 9, it is assumed that the intelligent terminal is initially in state S1. The SN 603 detects the occurrence of an event that affects the intelligent terminal 601 (step 901). The event may be, for example, an incoming call or a new message. In response, the SN 603 analyzes the event (step 903). The analysis determines which primitive the intelligent terminal 601 should next execute, and the SN 603 orders a call to this primitive (step 905), by means of the application protocol that is used on the control channel 605.

The intelligent terminal 601 receives the communication from the SN 603 (step 907), and calls the primitive with any received parameters (i.e., the intelligent terminal 601 executes a stored routine designated by the primitive) (step 909).

In this example, it is assumed that the intelligent terminal 601 change its state by enterring state S2 (step 911). Consequently, information of state S2 is presented to the user (step 913). For example the display portion of the intelligent terminal 601 may be updated with new the information of stte S2. The terminal then remains in the new state, state S2 (step 915).

The examples presented above in FIGS. 7a–c, 8 and 9 illustrate the possibilities of letting the intelligent terminal 601 work in various levels of autonomy with respect to the SN 603. The autonomy of the intelligent terminal 601 can range between the following extremes:

Operation of the intelligent terminal 601 is completely autonomous: the intelligent terminal 601 engages in an interactive dialogue with the user without any established control channel to the SN 603 being utilized.

It is also possible to let the SN 603 take over the control completely and provide theinformation that will be presented to the user. In this case, every state in the state table 607 indicates that every event detected by the intelligent terminal 601 must be reported to the SN 603.

Since the application is defined in the intelligent terminal 601 by means of state tables 607 and terminal registers 615, it is easy to download a complete application in the terminal through the network. The new application may be downloaded into an intelligent terminal 601 that ony has a bootstrap program loaded. Alternatively, the new application may be downloaded into an intelligent terminal 601 to replace another application.

Figure 10A:
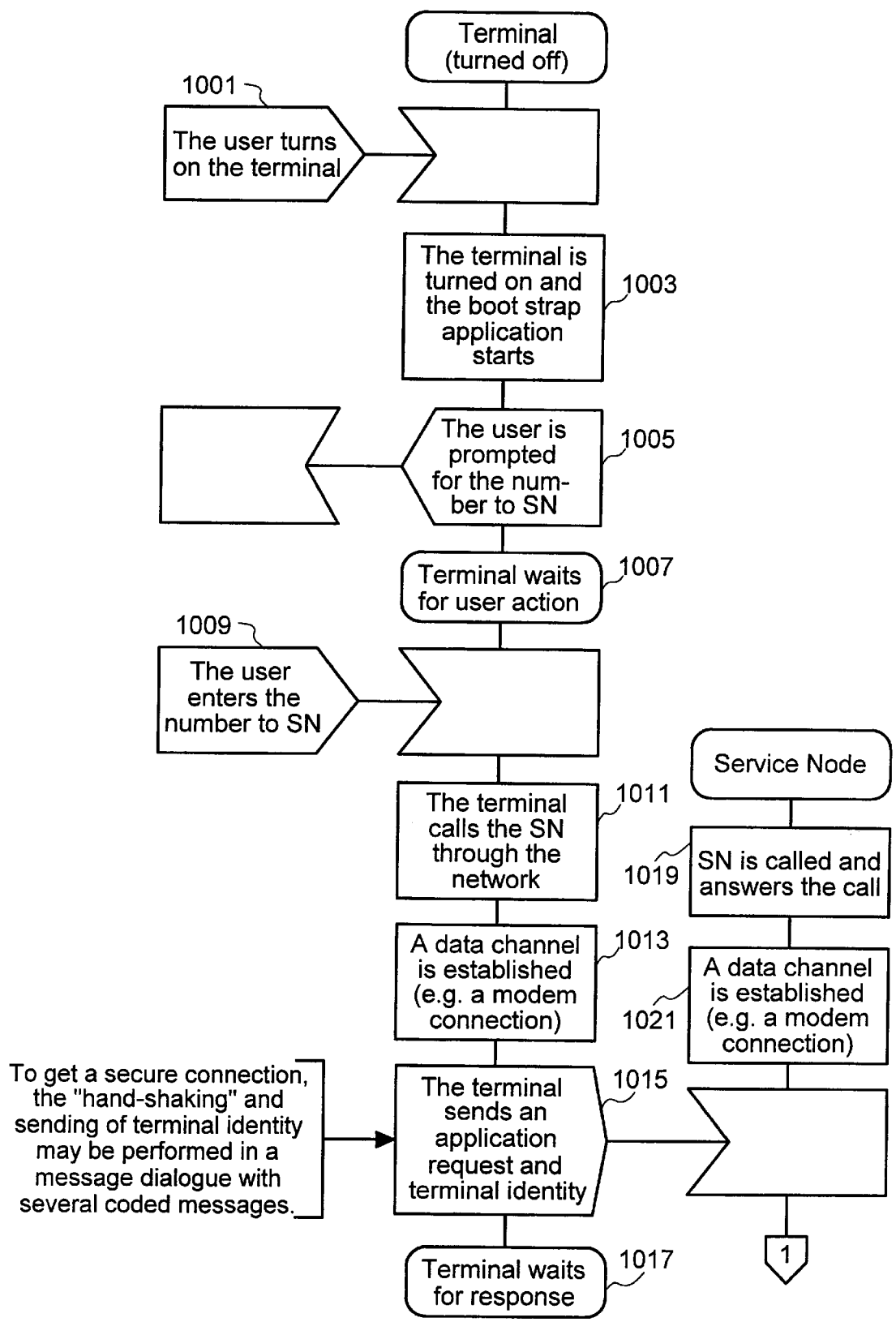
FIGS. 10a, 10b and 10c are flow charts depicting the downloading of an application into an "empty" intelligent terminal.
Figure 10B:
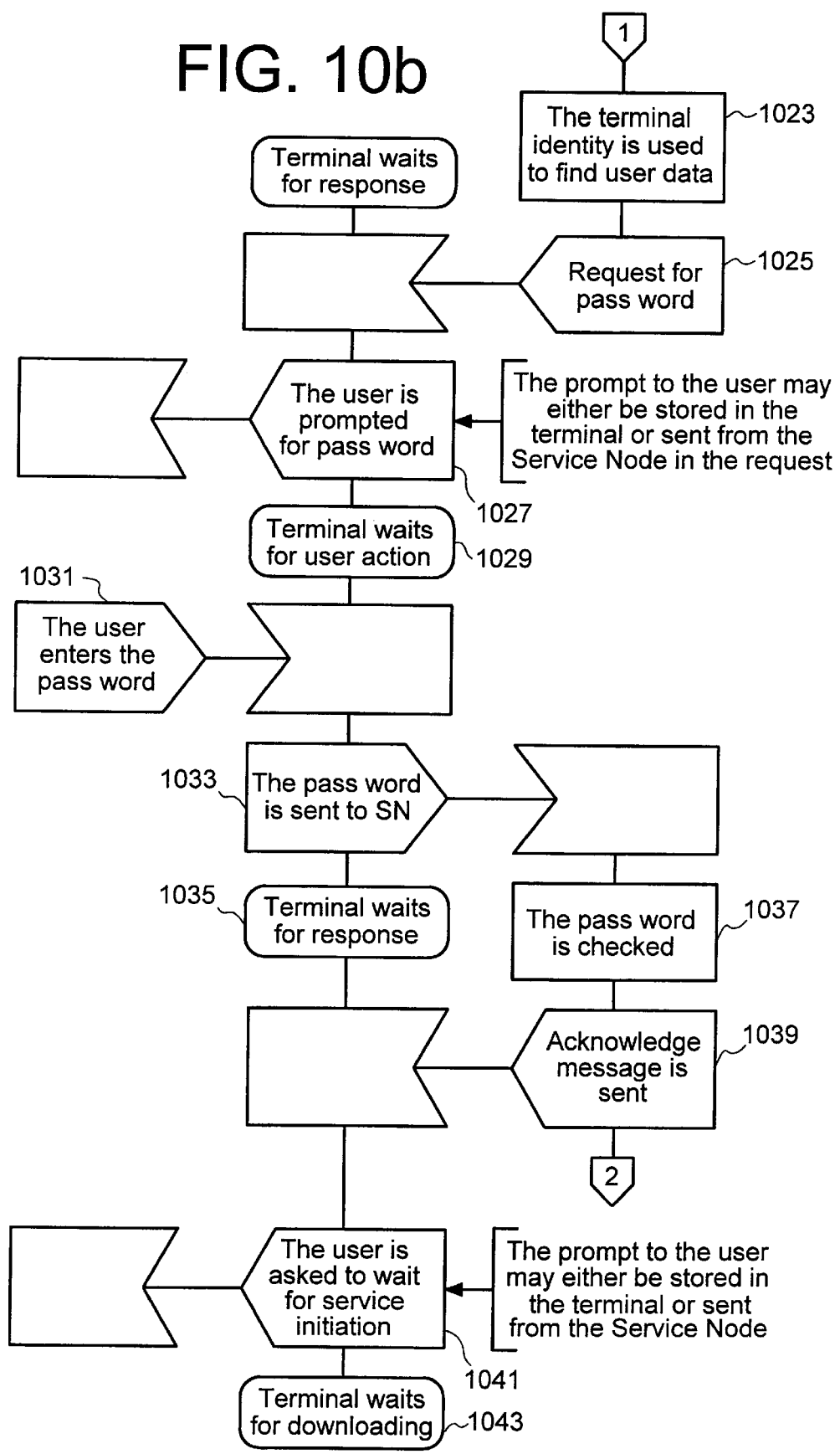
Figure 10C:
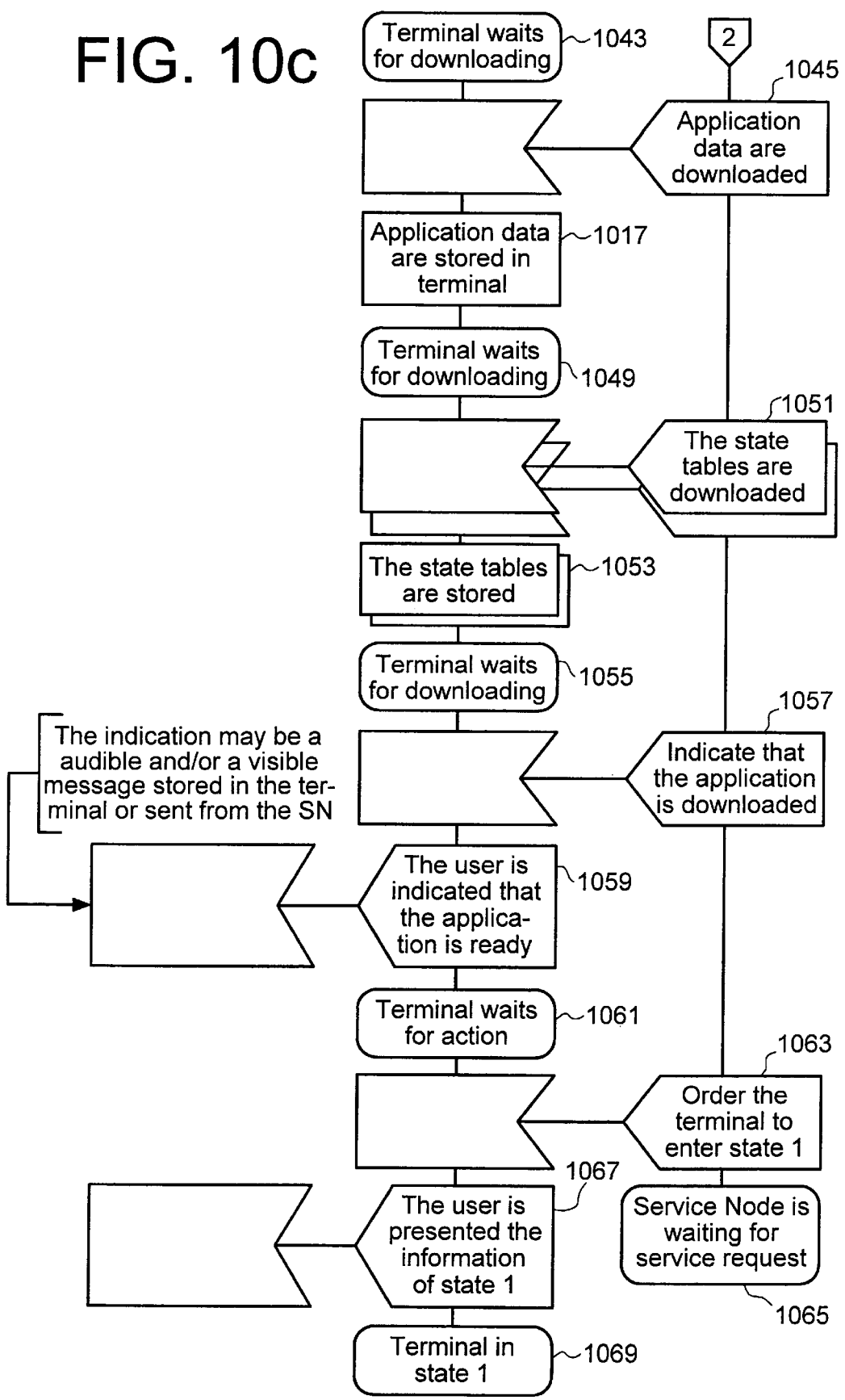

The downloading of an application into an "empty" intelligent terminal 601 will now be described with reference to the flow chart depicted in FIGS. 10a, 10b and 10c. It is assumed that the user has a predefined password and the telephone number for contacting the SN 603. The SN 603 has the application of the user, the terminal identity, and an expected password of the user.

The intelligent terminal 601 is initially turned off. In response to the user turning on the terminal (step 1001), the intelligent terminal 601 begins running a boot strap application program (step 1003), which should preferably be loaded in a nonvolatile memory. The boot strap program causes the following steps to take place:

The intelligent terminal 601 uses an output device on the intelligent terminal 601 (e.g., a display screen) to prompt the user for information about how to access the SN 603 (step 1005). The information may be, for example, a telephone number for establishing a connection to the SN 603. The intelligent terminal then waits for a response from the user (step 1007).

In response to the user enterring the requested information (step 1009), the intelligent terminal 601 calls the SN 601 through the network (step 1011). A data channel (e.g., a modem connection) is then established (step 1013). The intelligent terminal then uses the established data channel to send an application request, accompanied by the terminal identity of this intelligent terminal 601 (step 1015). In order to get a secure connection, the "hand-shaking" and sending of terminal identity may be performed in a message dialogue with several coded messages. After sending the application request, the intelligent terminal 601 waits for a response.

On the SN 603 side of this process, the SS 603 receives and answers the incoming call from the intelligent terminal 601 (step 1019), and establishes its side of the data channel (e.g., modem connection) (step 1021). The SN 603 then uses the received terminal identity to find the corresponding user data (step 1023). Next, the SN 603 sends a request for password to the intelligent terminal 601 (step 1025).

In reponse to receipt of the request for password, the intelligent terminal 601 prompts the user for the password (step 1027) and waits for user action (step 1029). The prompt to the user may either be stored in the intelligent terminal 601 or sent from the SN 603 in the request.

In response to the user entering the password (step 1031), the intelligent terminal 601 sends the password to the SN 603 (step 1033) and waits for a response (step 1035).

In response to receipt of the password, the SN 603 compares the received password with one that it has stored for this user (step 1037). Assuming that the received password is the correct one, the SN 603 sends an acknowledge message to the intelligent terminal 601 (step 1039).

In response to receipt of the acknowledge message, the intelligent terminal 601 prompts the user to wait for service initiation (step 1041), and then waits for downloading to begin (step 1043). The prompt to the user may either be stored in the intelligent terminal 601 or alternatively sent from the SN 603.

The SN 601 then downloads the application data to the intelligent terminal 601 (step 1045). The intelligent terminal 601 stores the received application data (step 1047), and then waits for further downloading (step 1049).

The SN 601 then downloads the state tables to the intelligent terminal 601 (step 1051). The intelligent terminal 601 stores the received state tables (1053), and then waits for further downloading (step 1055).

The SN 601 then sends the intelligent terminal 601 an indication that the application has been downloaded (step 1057). In response to the received indication, the intelligent terminal 601 prompts the user that the application is ready (step 1059) and then waits for action (step 1061). The user prompt may be an audible and/or visible message stored in the intelligent terminal 601 or sent from the SN 603.

The SN 603 then orders the intelligent terminal 601 to enter state 1 (step 1063), and waits for a service request (step 1065). In response to receipt of the order, the intelligent terminal 601 presents the information of state 1 to the user (step 1067), and then remains in state 1 (step 1069).

The downloading of new state tables 607 and the generic service independent event-reporting message from the intelligent terminal 601 makes it easy to introduce new applications without having to change the application protocol or reprogramming the intelligent terminal 601.

The arrangement described above is advantageous in that the location of the functionality is not fixed. It can be easily moved between the SN 603 and the intelligent terminal 601. When a new function is introduced, it can initially be located in the SN 603, and then later be stored in the intelligent terminal 601 as one or more new states 607.

The location of functionality can be optmized based on the following considerations:

Processor and storage capacity in the SN 603 and in the intelligent terminal 601.

Transmission capacity of the control channel 605.

Amount of information that will be presented to the user.

Any requirement for performing parts of, or an entire, function in the intelligent terminal 601 in a stand-alone mode without an established control channel 605 to the SN 603.

The frequency with which the function is used.

The above-described arrangement is also advantageous in that it is easy to change the functionality of a system consisting of a SN 603 and an intelligent terminal 601. This may be done because:

The system is used in another application.

The application has been developed further and new functions have been added.

Several users use the same intelligent terminal 601 and have personal user interfaces of the same application.

A user wants to change the functionality of his/her application.

Another embodiment of the invention will now be described. In this alternative embodiment, an application protocol above the USSD protocol is provided which makes it possible for an operator to implement more advanced services. To facilitate understanding of the invention, this embodiment will be described in the context of a mobile communications system environment. However, it will be understood by those having ordinary skill in the art that the techniques described here are not restricted only to mobile communications sytems, but instead are equally applicable to other types of communications systems. Thus, references to mobile terminals, cellular communications system components such as MSC/VLR, HLR, and the like should not be construed as limitations on the scope of the invention, but merely as examples in which the inventive techniques are embodied.

In this embodiment, the service application logic resides in both a network node (e.g, a SN) and in an intelligent terminal such as the intelligent mobile station (IMS) which is described in U.S. patent application Ser. No. 08/617,139, entitled INTELLIGENT MOBILE STATION FOR A CELLULAR TELECOMMUNICATIONS NETWORK, filed on Mar. 18, 1996 (Attorney Docket No. 1000-0022), which was incorporated by reference above. The protocol by which the application logic and the intelligent terminal communcate with one another is refered to herein as the "Intelligent Terminal Protocol" (ITAP). As mentioned above, communications between the SN and the intelligent terminal utilize a layered protocol, in which ITAP is a bearer-independent layer that is conveyed by means of a lower layer protocol, such as the USSD protocol according to GSM phase 2, or short message service (SMS). The IMS user communicates with a service node that contains the requested services. The ITAP connection is independent of whether or not there is a parallel speech connection.

ITAP features include the following:

Service independence. ITAP is a generic protocol. It is possible to use an IMS, supporting ITAP, for any type of personal communication service.

No changes in the IMS software are required for service modifications and service additions. This means that all software modifications needed when a service is modified or a new service is introduced are only performed in the network service node. No changes of the IMS software is necessary.

Bearer independence. This includes the fact that ITAP communications do not rely on the existence of a speech connection in the bearer.

ITAP is optimized for a slow speed bearer. Because the available bearers include USSD and SMS (which are slow bearers), the ITAP protocol is optimized so that reasonable response times for the user are achieved.

Both graphical and text based intelligent mobile stations are supported.

The ITAP concept is applicable for standardization.

The service node is the data master.

Operator service management is uncomplex. It is easy for operators to manage the introduction of new services and to update existing services.

Figure 11:
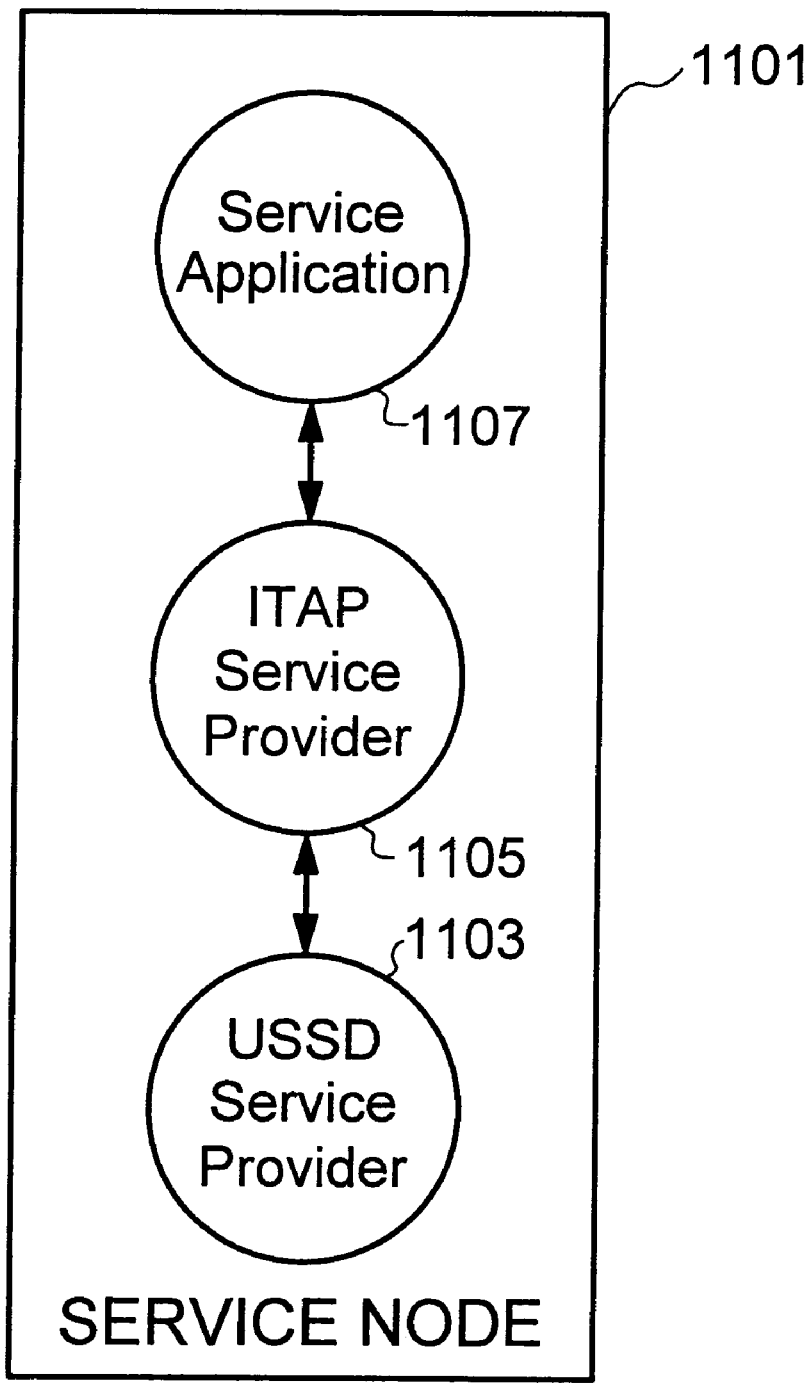
FIG. 11 is a block diagram of a SN in accordance with one aspect of the invention.

FIG. 11 is a block diagram of a SN 1101 in accordance with one aspect of this embodiment of the invention. The SN 1101 may comprise computer equipment that is executing one or more software programs which are organized in a hierarchy: At a bottom layer is a USSD service provider 1103, which is known in the art. Above the USSD service provider 1103 is the ITAP service provider 1105, which serves as an interface between the USSD service provider 1103 below and a service application 1107 above. As a protocol stack, the ITAP service provider 1105 is responsible for:

Encoding and decoding ITAP operations.

Checking semantics of the communications. For example, checking to make sure that the first received operation is the ITAP Bind operation.

Mapping ITAP onto the bearer being used in the particular implementation (e.g., USSD). Mapping may include segmenting an ITAP operation for transmission in two or more bearer protocol data units.

The ITAP service provider 1105 may also be solely responsible for an ITAP operation called getImageDescription (described below).

Figure 12:
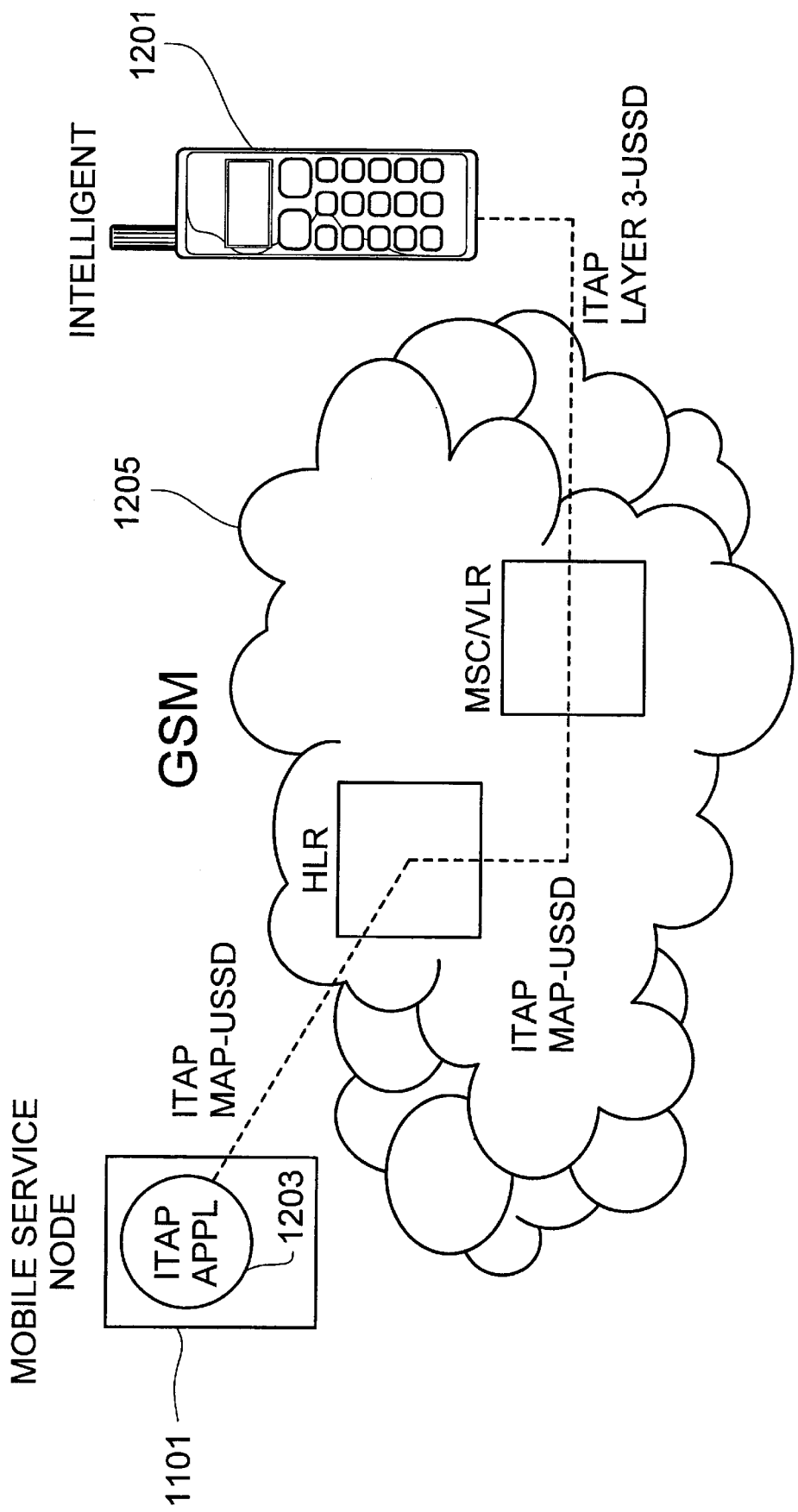
FIG. 12 illustrates a GSM network in which the inventive intelligent terminal application protocol (ITAP) is used for providing a service to an IMS.
Figure 13A:
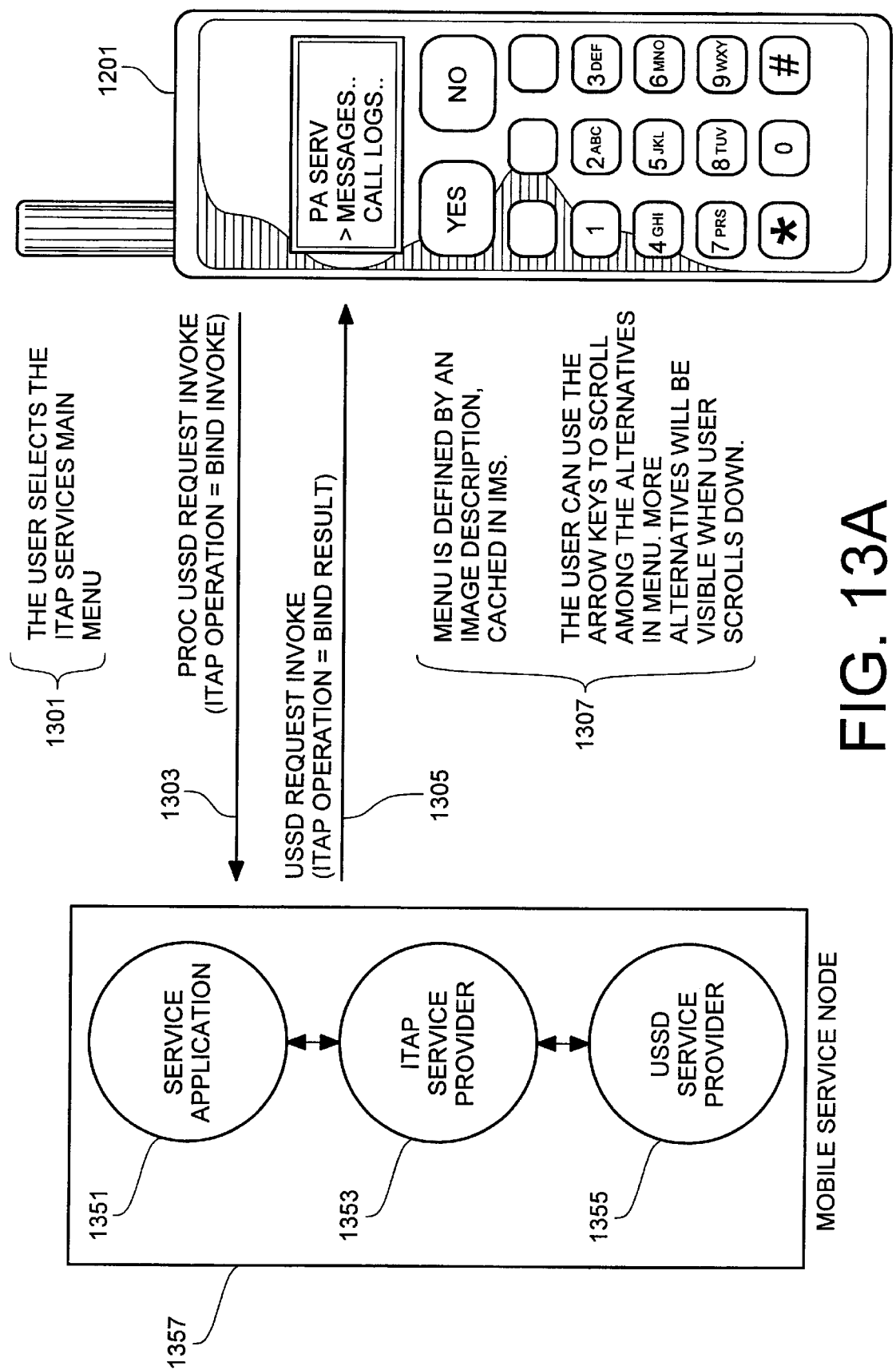
Figure 13B:
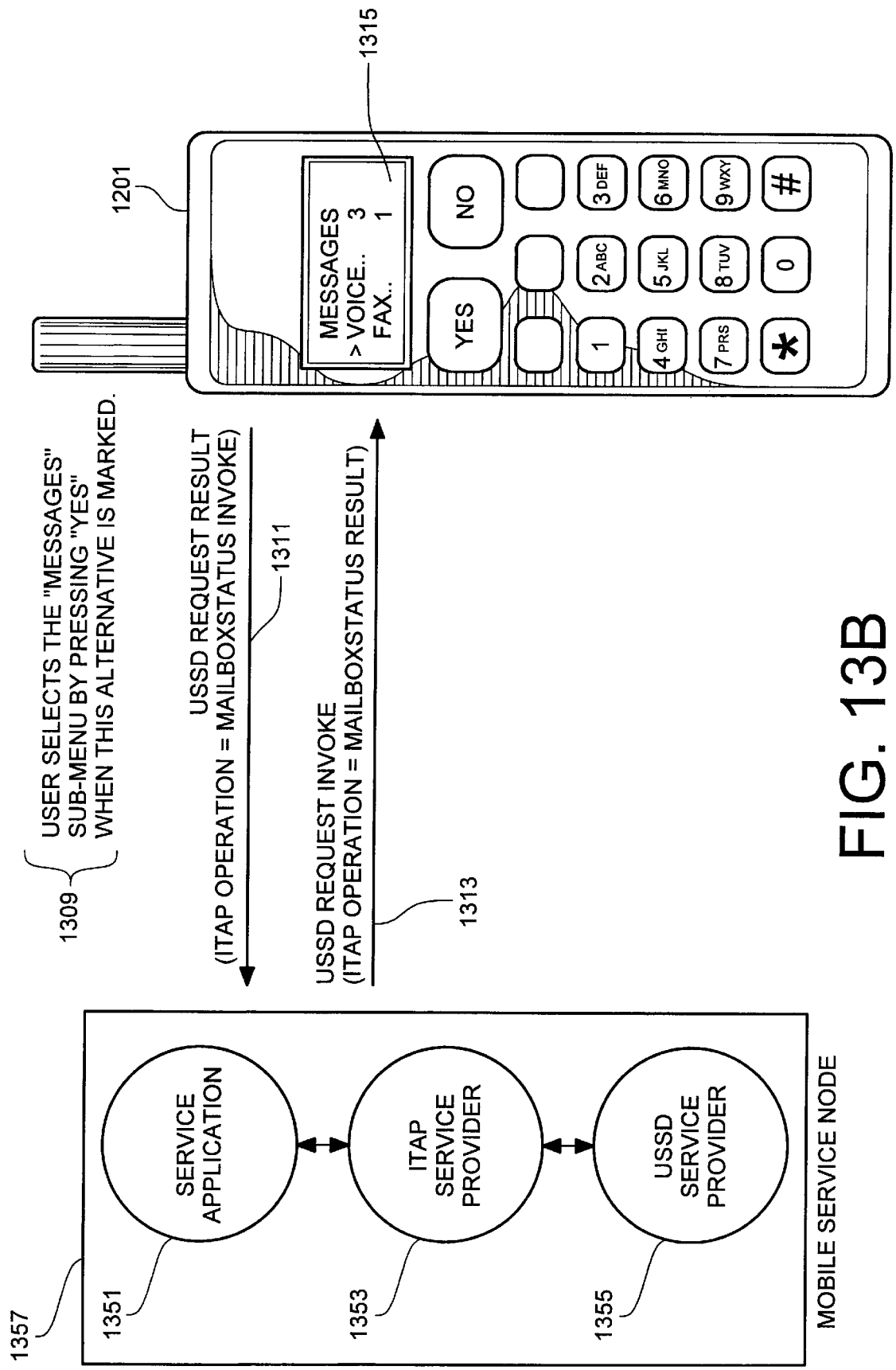
Figure 13C:
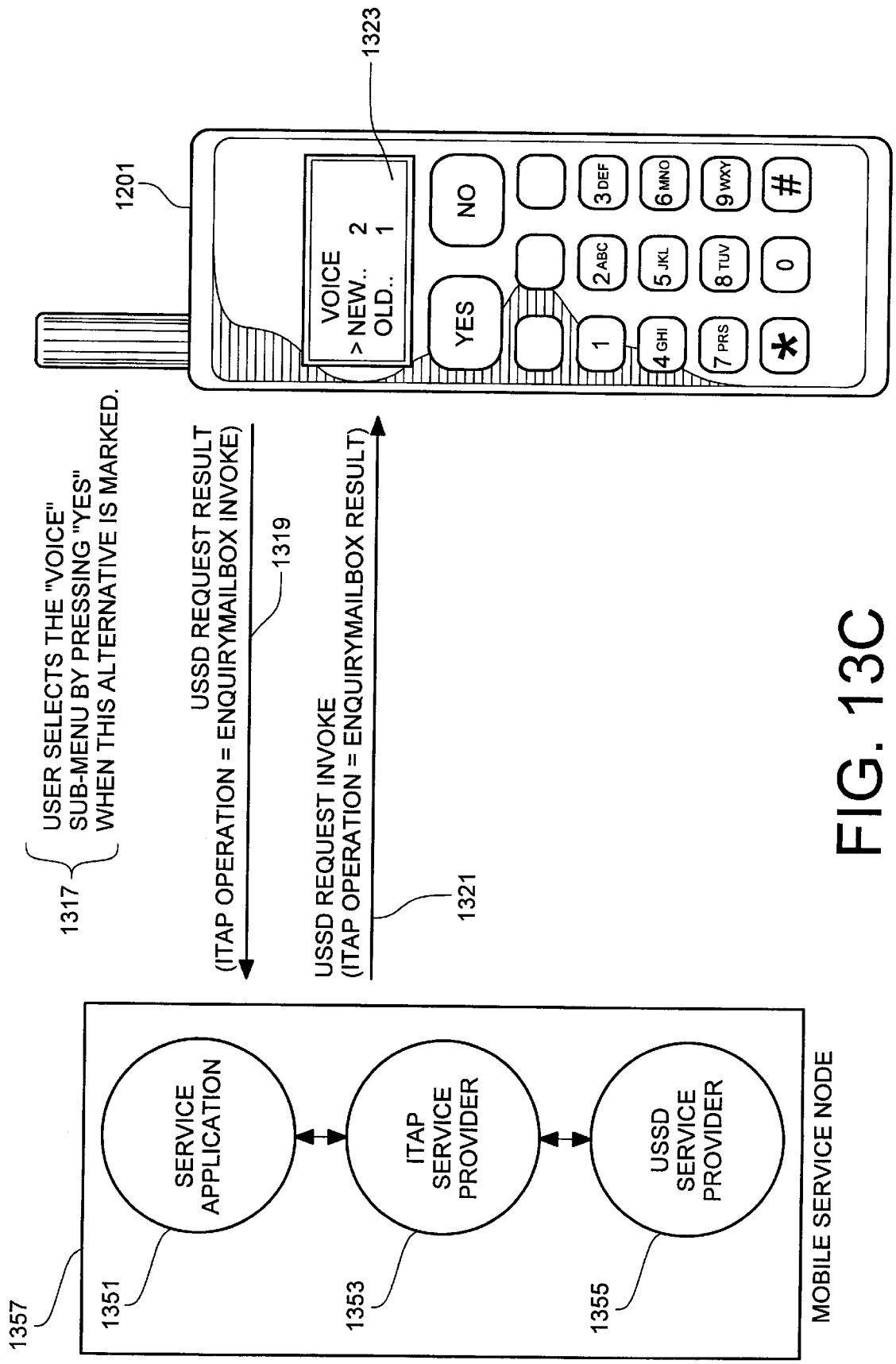
Figure 13E:
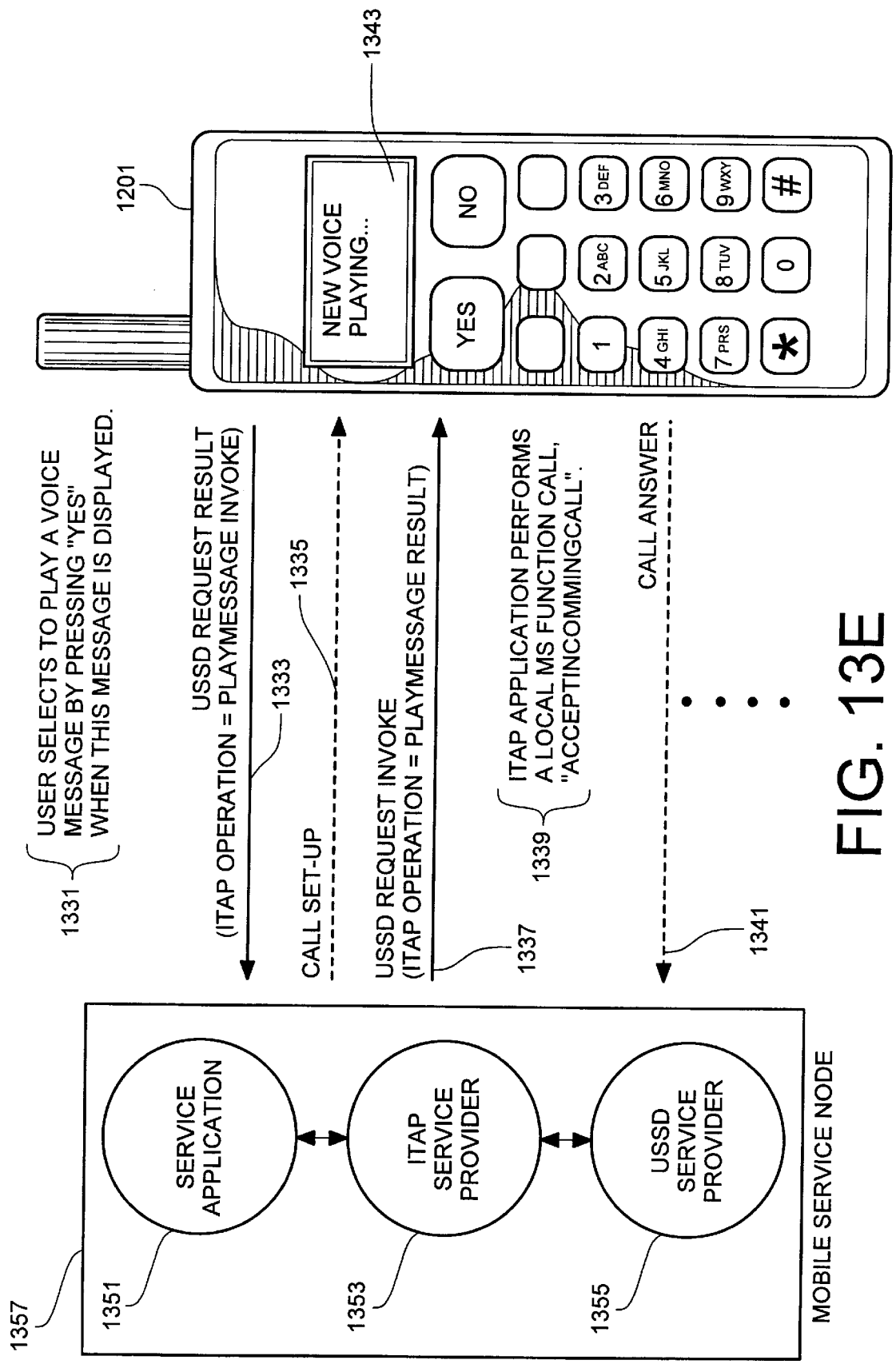

FIG. 12 illustrates a GSM network in which ITAP is used for providing a service to an IMS 1201. In this respect, a number of concepts and requirements described in GSM specifications and CCITT recommendations are useful for understanding the environment in which this illustrated embodiment is applied, and in particular, the teachings of GSM 02.90; GSM 09.02; GSM 03.38, Version 4.0.0; CCITT Recommendation X.208: Abstract Syntax Notation (ASN. 1); CCITT Recommendation X.229; and CCITT Recommendation X.219 are particularly pertinent. Each of these GSM and CCITT documents is hereby incorporated by reference herein in its entirety.

The ITAP application 1203 resides in a mobile service node 1101 that includes an ITAP service provider 1105 and a USSD service provider 1103 as shown in FIG. 11. ITAP messages are carried through the GSM network 1205 by MAP-USSD messages, and through the air interface on Layer 3-USSD messages.

An example of an ITAP service will now be described with respect to FIGS. 13a through 13e. The service illustrated here is one in which a user wants to retrieve messages that are being stored by a service application 1301. At step 1301, a 5user selects the ITAP services main menu on the IMS 1201. In response, the IMS 1201 issues a Proc USSD request invoke (ITAP operation=Bind invoke) to the SN 1357 in which reside the USSD service provider 1355 at a bottom layer, an ITAP service provider 1353 at an intermediate layer, and the service application 1351 at a highest layer (step 1303). The USSD service provider 1355 receives the Proc USSD request invoke, and passes the pertinent ITAP operation information up to the ITAP service provider 1353, which in turn passes the pertinent information for this service up to the service application 1351. For the remainder of this description, the service application 1351 will be referenced as the recipient and source of messages received from and sent to the IMS 1201. However, it will be recognized that these messages pass through both the USSD service provider 1355 and the ITAP Service Provider 1353.

The service application 1351 passes a response back by which the ITAP service provider 1353 and the USSD service provider 1355 convert into a USSD request invoke (ITAP operation=Bind result) message, which is transmitted back to the IMS 1201 (step 1305). In response to receipt of this message, the IMS 1201 displays a menu on its screen (step 1307). The menu is defined by an image description that is cached in the IMS 1201. The IMS 1201 includes intelligence that permits the user to use the arrow keys on the IMS 1201 to scroll among the alternatives in the displayed menu. As the user continues to scroll down, more alternatives become visible to the user.

In this example, the user selects a "Messages" sub-menu by pressing the "YES" key on the IMS 1201 when this alternative is marked (step 1309). This causes the IMS 1201 to transmit a USSD request result (ITAP operation= MailboxStatus invoke) message to the service application 1351 (step 1311).

In response, the service application 1351 causes a USSD request invoke (ITAP operation=MailboxStatus result) message to be sent to the IMS 1201 (step 1313). This causes the IMS 1201 to display a new menu 1315 indicating, in this example, that there are three voice messages and one fax message that can be retrieved. In this example, the user scrolls through these alternatives and selects the "Voice" sub-menu by pressing "YES" when this alternative is marked (step 1317). This selection causes the IMS 1201 to send a USSD request result (ITAP operation= EnquiryMailbox invoke) message to the service application 1351 (step 1319). The response from the SN 1357 is a USSD request invoke (ITAP operation=EnquiryMailbox result) message (step 1321). This message includes a voice message list that will be stored within the IMS 1201. The voice message list includes information regarding how many new and how many old voice messages are in the list. The IMS 1201 uses this information to display, in this example, a menu 1323 listing two new voice messages and one old voice message.

The user can scroll through these alternatives and, in this example, selects to list new voice messages by pressing the "YES" key on the IMS 1201 when this alternative is marked (step 1325). Because the voice message list has already been received and stored within the IMS 1201, the user's selection does not cause any transaction to take place between the IMS 1201 and the service node 1357. Instead, information 1327 about the various new voice messages is displayed on the screen of the IMS 1201. The user may locally use the arrow keys to scroll through the list of new voice messages (step 1329).

The user selects to play a voice message by pressing the "YES" key on the IMS 1201 when information about the requested message is displayed (step 1331). This selection causes the IMS 1201 to send a USSD request result (ITAP operation=PlayMessage invoke) to the SN 1357 (step 1333). The service application 1351 in the SN 1357 causes a call to be set up between the SN 1357 and the IMS 1201 (step 1335). The SN 1351 also sends a USSD request invoke (ITAP operation=PlayMessage result) to the IMS 1201 (step 1337).

The ITAP application running in the IMS 1201 responds by performing a local function called "AcceptIncomming Call" (step 1339). This causes the IMS 1201 to accept the call that was set up by the SN 1357 (step 1341). The user can now listen to the selected voice message. The screen may also present information 1343 to confirm that the IMS is playing an audio message.

It will be recognized that the sequence of events in the above example are application-dependent, and may therfore vary accordingly. However, it is useful to recognize that by implementing part of the service in the SN 1101 and another part in the IMS 1201, much of the communication between the SN 1101 and the IMS 1201 can be reduced to a kind of "short-hand", which makes more efficient use of the band-limited control channel 605. In particular, this solution provides the following advantages:

1. Better response times are achieved because there is service logic not only in the service application 1107, but also in the IMS 1201. Local logical decisions can be mad in the IMS 1201. Local menu-handling is also performed in the IMS 1201. Communication with the network service application 1107 is only performed when network service data needs to be fetched or stored or when a network service function needs to be called.

Furthermore, ITAP operations may be encoded with Basic Encoding Rules (BER) or Packed Encoding Rules (PER), which gives a more compact coding than the short message service (SMS) 7-bit alphabet.

2. Because there is service application logic in the IMS 1201, a much better user interface can be used for the operator specific services, and the same MMI-paradigm as for all other services in the IMS 1201 can be used. For example, for operator specific services, munu-handling may be performed with the same MMI-paradigm as for all other functions in the IMS 1201. Also, if the IMS has a graphical user interface, this can be utilized.

3. It is possible ot call local IMS functions through the local IMS service application logic. Such local functions might include translating a number into a corresponding name, activating a ring sinal, or making an automatic "off-hook".

4. The ITAP semantic prevents the network timers from expiring. This means that the length of life for ITAP services is not limited by the network USSD timers.

5. An ITAP operation can be segmented onto several USSD operations.

6. There can be more than one ITAP session, carried by one USSD dialogue. This makes it possible to temporarily interrupt a service, execute another service, and then resume the first service.

Other features of ITAP are:

a) The IMS local service application logic and the MMI can be controlled by "cacheable" service application scripts, referred to herein as "Image Descriptions". These Image Descriptions are loaded from the network into the IMS 1201 by means of ITAP operations. The Image Descriptions define the service logic and the MMI in the IMS 1201. The definition of the MMI is at a logical level, that is, the current MMI-paradigm of the IMS 1201 is utilized when the services are executed.

The use of Image Descriptions means that, when the service application in the network is updated, a new set of Image Descriptions is loaded into the IMS 1201. No IMS software updating is necessary.

b) The Image Descriptions are preferably cached in the IMS 1201, that is, they stay in the IMS 1201 when the power is switched off.

c) When an ITAP session is initiated, either by the IMS 1201 or by the network service application 1107, a negotiation is performed between the IMS 1201 and the network service application 1107. This guarantees that the service applications in the IMS 1201 and in the network are consistent if the service is updated in the network. If Image Descriptions are supported, then a new set of Image Descritions can be loaded.

d) An ITAP session can be initiated when an incoming call at the IMS 1201 is detected. This makes it possible to implement extended incoming call services, such as number to name translation with a network-based address database.

e) In indication of which type of coding (PER or BER) is being used is indicated in the initiating ITAP operation.

f) The ITAP service application 1107 in the network should always be the data master. This makes it possible for the operator to dynamically manage the service data. Also, it makes it possible for the user to manage service data from a type of terminal other than an IMS 1207, such as a normal desk telephone or a PC via internet WWW.

g) ITAP is bearer independent. For example, it is possible to map ITAP onto other available bearers, such as SMS. It is even possible to use ITAP in other telephone networks, where a bearer exists. It is possible to use ITAP in:
  fixed telephone networks;
  analogue/digital mobile networks; and
  satellite networks.

h) Even though ITAP is bearer independent, ITAP is optimized for a slow bearer, such as USSD.

i) If the bearer supports parallel dialogues, then true parallel ITAP sessions can be executed.

j) ITAP can be implemented in:
  The mobile equipment part of an IMS;
  At the Subscription Identification Module (SIM) if the SIM application toolkit is supported; and
  A PC, a laptop, a communicator, an organizer or any computer device connected to a mobile station when there is an interface between the mobile station and the computer device that supports USSD and control of call handling and other mobile station-specific functions.

As mentioned earlier, one aspect of the invention is the fact that it may be optimized for a slow bearer (such as USSD or SMS). In order to obtain reasonable response times for the IMS user, the number and size of the operations sent between the SN and the IMS is limited. This is achieved by having as much as possible of the service application logic in the IMS 1201. This is depicted in FIG. 14. An IMS 1401 includes functions that are partitioned into three layers. From bottom to top, these are: an ITAP bearer service provider 1403, an ITAP service provider 1405, and service application under ITAP control.

A SN 1409 also includes functions that are partitioned into three layers. From top to bottom, these are: an ITAP bearer service provider 1411, an ITAP service provider 1413, and one or more service applications 1415.

In the SN 149 and in the IMS 1401, service application processes 1407, 1415 are running. Each of these service application processes 1407, 1415 has its own state machine, that is, it is not aware of the state in the other unit (IMS 1401 or SN 1409).

The service application processes in the SN 1409 and the IMS 1401 communicate through a set of ITAP operations. Basic ITAP operations include Bind 1417, Unbind 1419 and Alert 1421. In addition there are, for each service application using ITAP, a set of application dependent operations 1423. Each one of these operations calls a certain SN service application function 1415.

Note that multiple ITAP sessions could be in progress simultaneously. However, whether multiple sessions could be executed in parallel or not depends on the bearer capability. For example, as the current version of USSD does not support parallel USSD dialogues, a new ITAP session temporarily interrupts an ITAP session that is already in progress.

Figure 15:
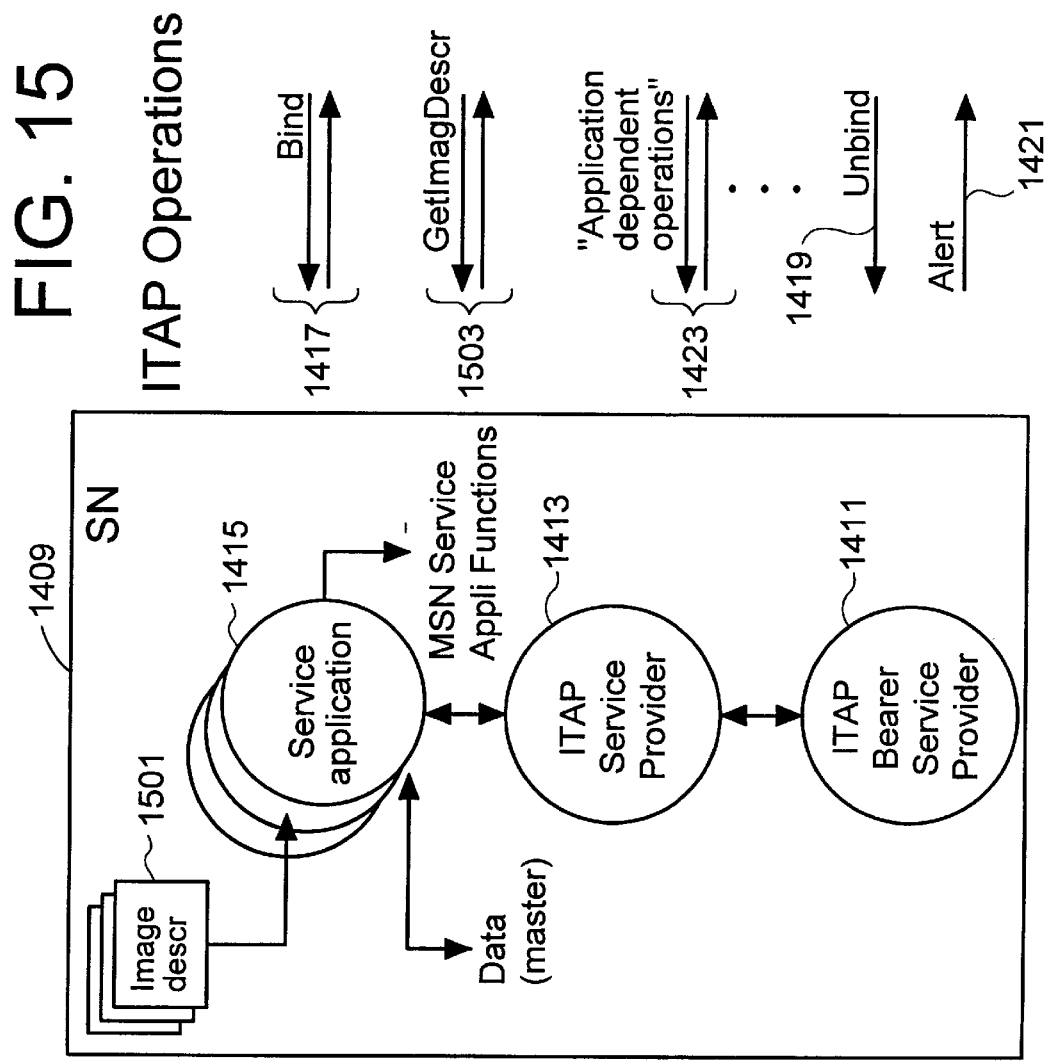
FIG. 15 illustrates the use of loadable ITAP image descriptions in accordance with one aspect of the invention.

Referring now to FIG. 15, another feature with ITAP is that it is possible to change and add services without re-programming the IMS 1401. This is achieved by controlling the service application 1407 in the IMS 1401 by means of loadable ITAP image descriptions 1501. These image descriptions 1501 define the MMI, MMI state transitions, local functions to call and SN functions to call. If an image description 1501 is missing or not up to date, it may be fetched from the SN 1409 by means of an ITAP operation called GetImageDescr 1503.

Any particular embodiment of ITAP may or may not support image descriptions 1501. The following table compares an ITAP architecture with and without support for image descriptions 1501:

|  | No support for image descriptions | Support for image descriptions |
| --- | --- | --- |
| Application in IMS | Hard coded; can not be changed without reprogramming the IMS. | Dynamically updated through loading of image descriptions from SN. |
| IMS functions | Only those functions necessary for the actual application needed. | Standardized set of functions, accessible through the image descriptions |
| SN functions | Application dependant | Application dependant |

A preferred set of ITAP operations will now be described in greater detail. The ITAP operations are preferably divided into two main groups:
  Basic ITAP operations: All of these operations are basic, service independent, operations and are common for all applications using ITAP.
  Application-dependent ITAP operations: These operations are invoked by the IMS in order to remotely call a service application function in the SN.

The structure of the operations follow the Remote Operation Service Element (ROSE) standard, according to the CCITT Recommendations X.229 and X.219, which have been incorporated herein by reference.

A preferred set of Basic ITAP operations will now be described in greater detail.

Bind

The Bind operation is invoked by the IMS 1401. It is a ROSE class 1 operation, that is, it is a synchronous operation and reports success (result) or failure (error). Bind is used in either of two situations: 1) to initiate an ITAP service application; and 2) to initiate an ITAP session. These situations are described in greater detail below.

Unbind

The Unbind operation is invoked by the IMS 1401. It is a ROSE class 5 operation, that is, the outcome of this operation is not reported. The purpose of Unbind is to terminate an ITAP session.

GetImage Descr

The GetImageDescr operation is invoked by the IMS 1401. It is a ROSE class 1 operation,that is, it is a synchronous operation and reports success (result) or failure (error). The GetImageDescr operation requests an image description from the SN 1409. This operation is invoked by the IMS 1401 when it needs to display an image and the corresponding image description does not exist in the cache. This operatino is only used if the IMS 1401 and the SN 1409 support image descriptions.

Alert

The Alert operation is invoked by the SN 1409. It is a ROSE class 3 operation, that is, it reports failure (error) only. The purpose of the Alert operation is to alert the IMS 1401 about the existence of an event, such as a new messge notification. This operation has o response on the ITAP level, but the IMS 1401 continues the dialogue by invoking Bind, GetImageDescr, Unbind or an application dependent ITAP operation. The Bind operation is invoked if the IMS 1401 has an application version that differs from that indicated in the Alert operation.

Regarding application-dependent ITAP operations, these should all be ROSE class 1 operations, that is, synchronous and reporting success (result) or failure (error). These operations are used when the IMS 1401 requests that a service application function be executed in the SN 1409. The response from the requested function is received as a result of the invoked operation. For each service application 1415 that has to use ITAP, a set of application dependent ITAP operations have to be specified. There are restrictions on how these operations may be specified. These restrictions are described below.

If image descriptions are supported, then operation codes, invoke arguments and result arguments for each application dependent operation are specified in the image descriptions.

Initiation of an ITAP Service Application

Before a subscriber can access the services of a specific ITAP application, the ITAP application has to be initiated in the IMS 1409. The procedure for this is:

1. The user enters a menu for initiating an ITAP application at the IMS 1401. Then the service code for this application is entered by the user.
2. A Bind operation 1417 is sent from the IMS 1401 to the SN 1409. In this operation "Bind reason" is set to "init subscription".
3. The SN 1409 returns "Bind result" which contains the name of application and information regarding whether Bind should be invoked at an incoming call/call waiting indication or not.
4. The IMS 1401 stores the application parameters. Preferably, the name of the application should be used in the IMS MMI as the name for the main menu for this service application.
5. The IMS terminates the ITAP session.

Initiation of ITAP Session

An ITAP session starts with:

Bind operation 1417, initiated by the IMS 1401. or

Alert operation 1421, initiated by the SN 1409.

Events that initiate an ITAP session are:

A user initiates an ITAP service application at the IMS 1401. Bind will be sent.

An event in the SN 1409. Alert will be sent.

An incoming call or call waiting indication in the IMS 1401. Bind will be sent.

Because it is necessary to inform the SN 1409 about the reason for Bind, this operation contains a "Bind reason" parameter. The "Bind reason" has the following values:

User initiated.

Call related indications, that is, incoming call and call waiting.

Incorrect application version. This is used when the SN 1409 initiates an ITAP session with Alert and the IMS 1401 discovers that the application version is different from the version in the SN 1409.

Initiate subscription, as described above with respect to Initiation of an ITAP service application.

When the SN 1409 receives the Bind operation, it compares the application version in the IMS 1401 with the application version in the SN 1409. If the SN 1409 has an application version that differs from that which is currently supported by the IMS 1401, then:

If image descriptions are not supported, the SN 1409 changes to the application version that is supported by the IMS 1401. If the SN 1409 does not support that application version, Bind error is returned and the ITAP session is terminated.

If image descriptions are supported, then the Bind response contains a list of image descriptions to clear from the cache.

The Bind result operation also includes a parameter which specifies which sub-services this subscriber may use. The IMS 1401 checks this parameter when a menu should be presented. If a menu contains an option for a service that is not included in the subscription, this option will not be displayed. This makes it possible for an operator to split a service application into a number of sub-services. A subscriber can then decide which subservices he/she wants to use.

Termination of an ITAP Session

An ITAP session is normally terminated by an Unbind operation, initiated by the IMS 1401. However, in error cases the ITAP session could be aborted by an abort at bearer level both by the IMS 1401 and the SN 1409.

ITAP Timeout Handling

Timeouts are handled by both the SN 1409 and by the IMS 1401.

Regarding timeout handling by the SN 1409, there should be an "idle" timer in the SN 1409. This timer is always started when an operation (Alert or ROSE class 1 operation Result, Error or Reject) has been sent to the IMS 1401. The initial value of the SN "idle" timer is constant.

Time-out is detected when no new operation (Bind, GetImageDescr, Unbind or an application dependent ITAP operation) is invoked by the IMS 1401 within the specified time period. When time-out is detected, the SN 1409 should locally abort the ITAP session and, if the bearer has a dialogue structure, abort the dialogue on the bearer level.

Regarding timeout handling by the IMS 1401, the IMS 1401 should have a timer which supervises the response to a ROSE class 1 operation invoked by the IMS 1401 (Bind, GetImageDescr or an application-dependent ITAP operation). A timer value should be specified for each operation sent. For application-dependent ITAP operations the timer value depends on the operation invoked. If image descriptions are supported, the timer value, for application-dependent ITAP operations, is specified in the image description.

Time-out is detected when no response (Result, Error or Reject) is received from the SN 1409 within the specified time period. When time-out is detected, the IMS 1401 should locally abort the ITAP session and, if the bearer has a dialogue structure, abort the dialogue on bearer level.

In addition, the IMS 1401 should have an "idle" timer which monitors whether the user performs an action within a specified time period. This timer is always started when an operation (Alert or ROSE class 1 operation Result, Error or Reject) has been received from the SN 1409. The initial value of the "idle" timer is constant, except for the situation when Alert has been received. In this case the timer value is specified with a parameter in the Alert operation.

When the IMS 1401 detects "idle time-out", the IMS 1401 should make a normal ITAP termination by sending an Unbind to the SN 1409.

ITAP Error Handling

Error handling at the ITAP level is performed according to ROSE. If an error or time-out occurs at the bearer level, all ITAP sessions carried by this bearer dialogue should be aborted.

Coding of ITAP Operations

Operations are coded according to Basic Encoding Rules (BER) or Packed Encoding Rules (PER). However, PER is preferred because this coding standard gives shorter operations and better performance for the IMS user.

Maximum Size of ITAP Operations

In a preferred embodiment, the maximum size of an ITAP operations should be limited to 1024 octets. This limitation will also define the maximum size of an ITAP image description. The size of an ITAP image description together with the ROSE header should not exceed 1024 octets.

The discussion will now focus on ITAP image descriptions. ITAP image descriptions are resources that define:

The MMI at the IMS 1401 when the service is executed. In the image descriptions, the MMI definition is made on a rather high logical level. The actual image formatting and presentation is decided by the IMS 1401.

Call of functions in the IMS 1401 and the SN 1409 when the service is executed.

An image description specifies objects from the following list:

Lists of action items that consist of local IMS function calls, invocation of application-dependent ITAP operations ("SN function calls"), conditional statements and label statements.

Fixed text.

Actions related to IMS standard keys.

Menus with an action for each menu option.

Lists of dynamic data.

Different types of input/output fields.

Terminal registers for temporary storage of dynamic data.

Figure 16:
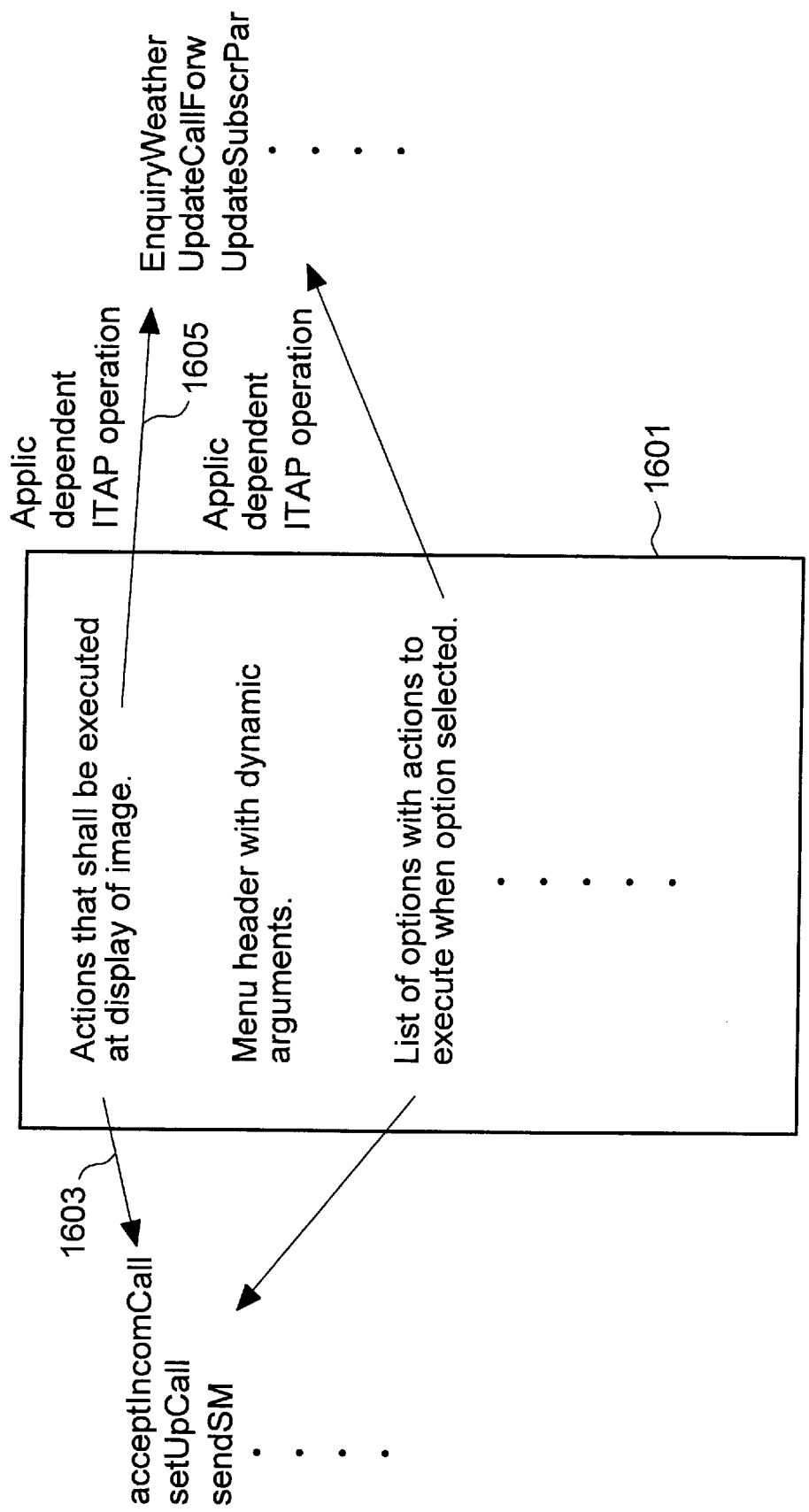
FIG. 16 depicts an exemplary image description for a menu of options.

An exemplary image description 1601 for a menu of options is depicted in FIG. 16. From the image description 1601, it is possible to call local IMS functions 1603 and remote SN functions 1605. When a function is called, the input and output parameters are stored in temporary registers. These registers are referred to in input/output fields, lists, and the like. The remote SN functions are called through the set of application dependent ITAP operations 1605 that is available for the current application.

For local IMS functions, ITAP specifies a set of functions to be supported by the IMS. The IMS functions are divided into the following groups:

Functions for manipulating image description objects, such as image descriptions, registers and parameter lists.

Call related functions, such as "Accept incoming call" and "Set up call".

Functions for handling DTMF signals.

Functions for accessing local IMS software objects, such as the telephone book.

Functions for accessing local IMS hardware objects, such as the tone generator.

Functions for handling SMS.

A list of local IMS functions, with input and output parameters, is described later in this description.

In order to support ITAP, the SN 1409 and the IMS 1401 should each satisfy a number of requirements, as follows:

REQUIREMENTS ON THE SN 1409

The SN 1409 should support the bearer protocol that has been selected for ITAP.

The SN 1409 should support the basic operations of the ITAP protocol and be able to code/decode the ITAP-data types according to PER or BER.

The SN 1409 should, for each ITAP application implemented, support a set of application dependent ITAP operations.

The SN 1409 should, for each subscriber, remember the selected language, in order to produce correct text strings in operation arguments.

Additionally, the following SN requirements should be satisfied when image descriptions are supported:

The SN 1409 should be able to store image descriptions and, on request from the IMS 1401, load them into the IMS 1401.

The SN 1409 should keep track of which image descriptions have to be replaced in the IMS 1401 when a new version of an ITAP application is introduced.

Requirements on the IMS 1401

The IMS 1401 should support the bearer protocol that has been selected for ITAP.

The IMS 1401 should support the basic operations of ITAP protocol and be able to code/decode the ITAP-data types according to PER or BER.

The IMS 1401 should, for each ITAP application implemented, support a set of application dependent ITAP operations.

The IMS 1401 should be able to leave the normal mode of operation and transition to a mode where the user application mainly is controlled by an ITAP application part. The ITAP mode is initiated by a user command, by a call indication or via a received ITAP alert.

A set of basic IMS functions for call control, MMI-control, SMS control and the like should be accessible from the ITAP part of the IMS 1401.

The ITAP software should be able to use existing software objects in the IMS, such as the telephone book.

Additionally, the following IMS requirements should be satisfied when image descriptions are supported:

Memory for dynamic storing of image descriptions and temporary data should be available in the IMS 1401.

Image descriptions should stay resident in memory when the power has been switched off. The memory size required for storing image descriptions depends on the number of images used for the services and the complexity of the services. It is estimated that in most cases, an image description will not be bigger than 200 bytes. So, if a complex ITAP application needs 60 image descriptions, then 12 Kbytes must be allocated in the IMS 1401 for image descriptions.

The IMS 1401 should be able to interpret image descriptions and control the ITAP application and the set of application dependent ITAP operations through the image descriptions.

System Operator management should also support ITAP. One feature with the ITAP concept is that dynamic loading of image descriptions is possible. The scenario when an operator updates a service is:

1. The new service application version is installed in the SN 1409.
2. When contact is established the first time after the version has been updated in the SN 1409, the SN 1409 detects that the IMS 1401 has an old version.
3. The SN 1409 orders the IMS 1401 to clear the image description cache or a part of the cache.
4. When the services are executed, the IMS 1401 uses the "GetImageDescr" operation to request the missing image descriptions when they are needed during the execution of the services.

If image descriptions are supported, then the ITAP concept places the following requirements on the operator:

SN service application logic modifications and image description updates must be coordinated.

A management tool for creating and managing image descriptions has to be created.

Figure 17:
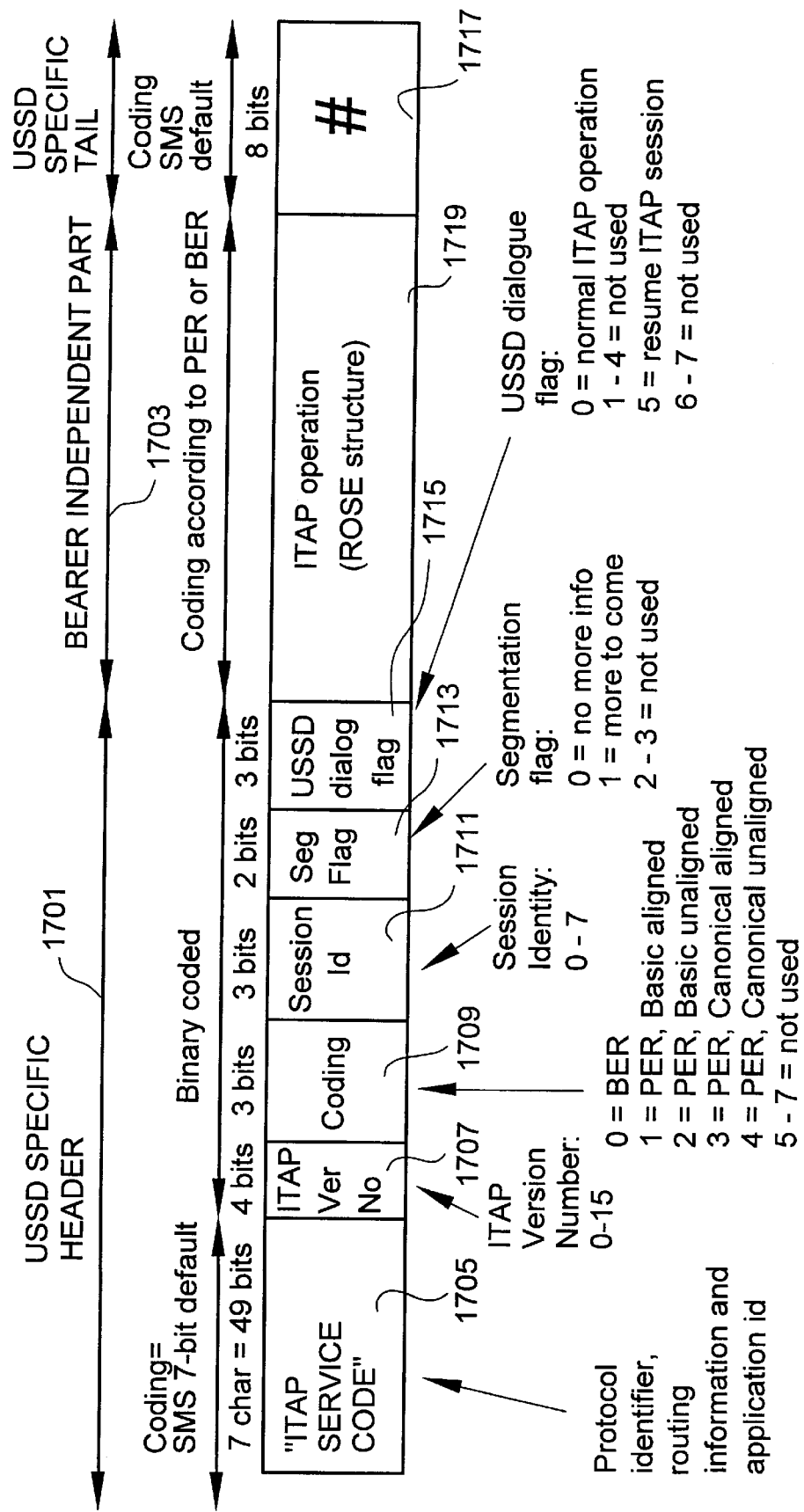
FIGS. 17 and 18 depict an exemplary technique for mapping ITAP operations on the parameter "USSD string" in the USSD operations according to GSM phase 2, in accordance with one embodiment of the invention.
Figure 18:
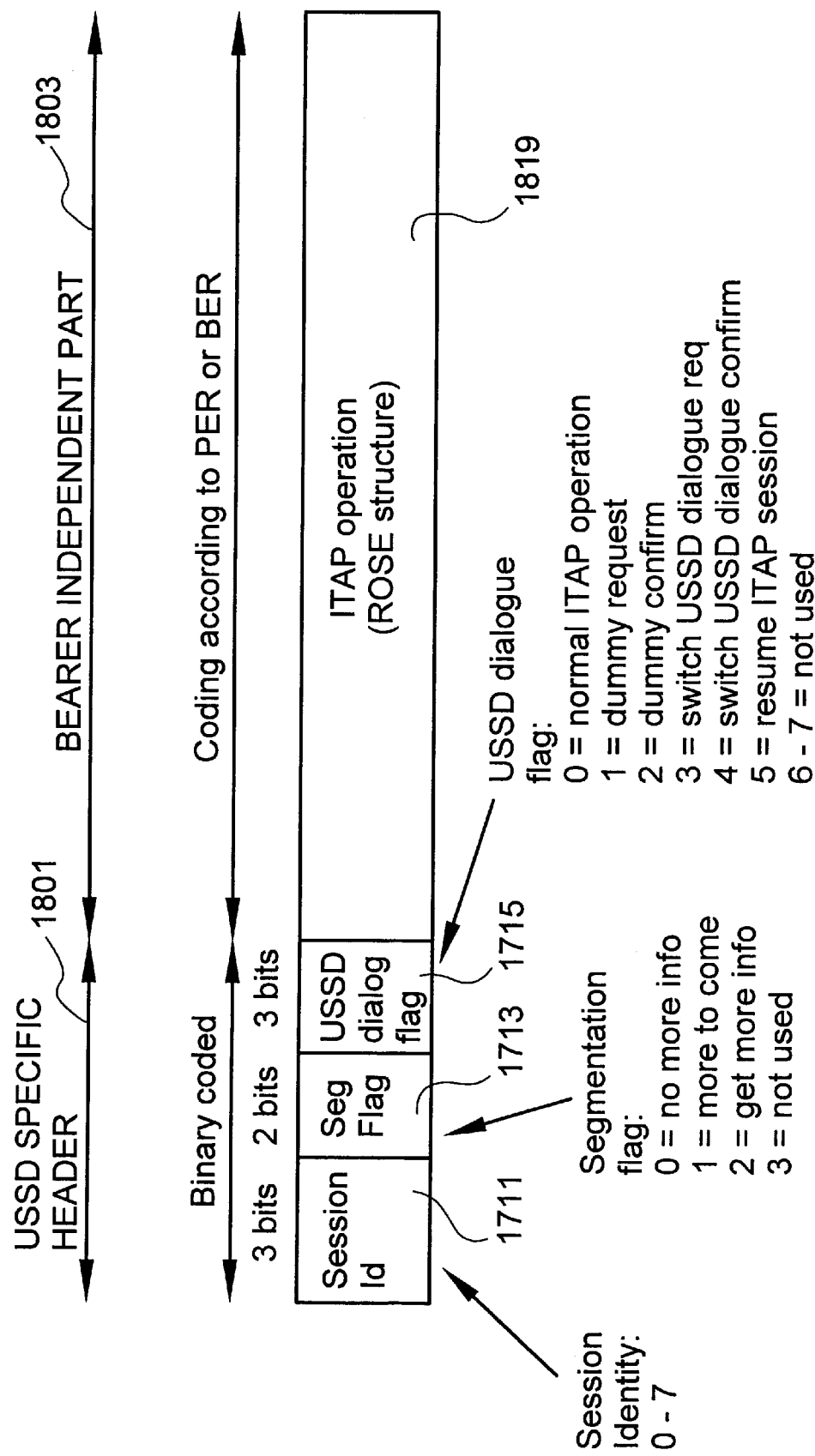

A technique for mapping ITAP operations on the parameter "USSD string" in the USSD operations according to GSM phase 2 will now be described with respect to FIGS. 17 and 18. FIG. 17 illustrates a mapping that would be used for a USSD operation that initiates a USSD dialogue. FIG. 18 illustrates a mapping that would be used for all other operations. Each string has a USSD specific header 1701, 1801 and a bearer independent part 1703, 1803. The following text explains the different fields of the USSD strings:

ITAP Service Code 1705

This field is necessary only in operations that initiate a USSD dialogue. The purpose of this field is:

Routing information for MS initiated USSD dialogue: Informs the serving network that the USSD operation should be routed to the HLR of the HPLMN of the subscriber. The specification for GSM 02.90, section 4.1.2, case a), states the required format for an MS initiated USSD operation when it is to be routed to the HLR of the HPLMN.

The service code also informs the HLR that the USSD operation should be routed to the correct external node (SN).

Protocol identifier for network initiated USSD dialogue: Identifies, for the IMS 1401, that a received initiating USSD operation contains an ITAP operation instead of a standard USSD string.

Application identity: Specifies the identity of the application, using ITAP, that is started.

ITAP Version Number 1707

This field, which specifies the ITAP version number, is found only in initiating USSD operations.

Coding 1709 (Only Initiating USSD Operations)

This field, which is found only in initiating USSD operations, specifies the coding rules used for encoding the ITAP operations. An exemplary encoding is as follows:

0=Basic Encoding Rules

1=Packed Encoding Rules, basic aligned.

2=Packed Encoding Rules, basic unaligned.

3=Packed Encoding Rules, canonical aligned.

4=Packed Encoding Rules, canonical unaligned.

Session Id 1711 (All Operations)

This field, which designates the ITAP session identity, is found in all operations.

Seg Flag 1713 (All Operations)

This field, which designates segmentation information, is found in all operations. It is used for long ITAP operations that do not fit into the USSD string of one USSD operation. The values of this flag are:

0="no more info". This USSD operation contains the complete ITAP operation or this USSD operation contains the last part of the ITAP operation that is being sent.

1="more to come". This USSD operation does not contain the complete ITAP operation or this is not the last part of the ITAP operation that is being sent.

2="get more info". When an entity (IMS 1401 or SN 1409) receives a USSD operation with seg flag 1713 set to "more to come", it replies with a USSD operation having seg flag 1713 set to "get more info". In this case, the field "ITAP operation" 1719, 1819 is empty, and only the USSD specific header 1701, 1801 is included in the USSD string.

It is preferred that PER or BER encoding of an ITAP operation be performed before a possible segmentation is performed. Decoding of a received ITAP operation should not be performed until the complete operation has been received.

Operation scenario diagrams are presented later which describe the segmentation.

USSD Dialogue Flag 1715 (All Operations)

The purpose of this flag is to solve problems with USSD timeouts in the network. If this flag is set to 0, then the USSD string contains a normal ITAP operation. In all other cases the field "ITAP operation" 1719, 1819 is empty.

Values 1 and 2 are used in dummy USSD operations that are sent in order to prevent the USSDRequest invoke timer in the network from expiring. Each time control is returned to the IMS 1401, that is, an ITAP result or ITAP Alert invoke carried by a USSDRequest invoke is received, a timer in the IMS 1401 is started. The value of this IMS timer should be less than the value of the USSDRequest invoke timer in the network. When an ITAP operation, carried by the USSDRequest result, is sent, the IMS timer is cancelled. If the IMS timer expires, a "dummy request" (USSD dialogue flag=1), carried by USSDRequest result, is sent. The SN 1409 replies with "dummy confirm" (USSD dialogue flag=2), carried by USSDRequest invoke.

Values 3–5 are used in USSD operations that are sent in order to avoid, for the case of IMS initiated USSD dialogues, expiration of the ProcessUSSDRequest invoke timer in the network. These USSD operations are used to terminate the IMS-initiated USSD dialogue and initiate a new, network initiated, USSD dialogue. The ITAP session in progress continues, carried by this new USSD dialogue. The procedure for this is as follows:

Always when the IMS 1401 initiates a USSD dialogue with ProcessUSSDRequest invoke, the IMS 1401 starts a timer. The value of this IMS timer must be less than the value of the ProcessUSSDRequest invoke timer in the network. As the "switch USSD dialogue" procedure could only be initiated by the IMS 1401, the maximum time control which could be in the SN 1409 must also be considered when this IMS timer is specified. If this IMS timer expires, a "switch USSD dialogue request" (USSD dialogue flag=3), carried by USSDRequest result, is sent. The SN 1409 replies with "switch USSD dialogue confirm" (USSD dialogue flag=4), carried by ProcessUSSDRequest result in a TCAP-END message. This mobile initiated USSD dialogue has now been terminated and a new, network initiated USSD dialogue should be set up by the SN 1409. The initiating USSDRequest invoke contains a "resume ITAP session" command (USSD dialogue flag=5). Now the ITAP session continues, carried by this new, network initiated, USSD dialogue.

ITAP operation scenarios are presented below for Handling in order to avoid USSD timeout in the network.

An explanation of the problems with the USSD operation and idle timers in the network is presented below.

The value 5, "resume ITAP session", of the USSD dialogue flag 1715 is also used when a previously interrupted ITAP session is to be resumed on the same USSD dialogue. An example of this scenario is presented below.

USSD Specific Tail 1717

This specific tail 1717, which is included only in initiating USSD operations, has to be added according to GSM 02.90, section 4.1.2, case a. The "#" character requires 7 bits in the SMS default alphabet. The eighth bit should be set to 0.

Turning now to the bearer independent part, the USSD string would include:

ITAP Operation 1719, 1819

This filed is used in all operations, except when seg flag="get more info" or when USSD dialogue flag <> "normal ITAP operation"). The ITAP operation follows the ROSE structure, as described in CCITT Recommendations X.229 and X.219, and is coded according to the rules of PER or BER.

The maximum length of the ITAP operation is at this stage rather unclear, as the max length of an USSD string is not very clearly specified in the GSM specifications:

For a USSD Request Invoke or Process USSD Request Invoke

GSM 09.02 states a maximum length of 160 octets. However, there are also limitations in the TCAP-layer. Different USSD experts have given different information about how these limitations impact the length of an USSD string. Figures between 100 and 150 octets have been mentioned. In addition, it has also been mentioned that if the USSD string is longer than 128 octets it will be segmented on the A-interface, which will increase response times.

For an USSD Request Result or Process USSD Request Result

GSM 02.90 states that result USSD strings are limited to a maximum of 80 characters, coded according to the 7-bit default alphabet. This means that the limitation is 70 octets. However, it has been suggested in SMG to remove this limitation in GSM 02.90.

Because the maximum length of a USSD string is so unclear, and also a matter of change proposals, it is preferable to have the USSD string max lengths for the different USSD operations as configuration parameters in the SN 1409 and possibly also in the IMS 1401.

The following table shows how the ITAP operations are mapped on the USSD operations:

| ITAP OPERATION | MAPPED ON USED OPERATION |
| --- | --- |
| Invoke (Bind) | Invoke (Process USSD Request) when an ITAP session is initiated by the IMS 1401 and no earlier ITAP session is in progress. Result (USSD request) when the SN 1409 has initiated an ITAP session with "Alert" or when another ITAP session already is in progress. |
| Result, Error or Reject (Bind) | Invoke (USSD Request) |
| Invoke (Unbind) | Result (USSD Request) |
| Reject (Unbind) | Invoke (USSD Request) |
| Invoke ("application dependent ITAP operation") | Result (USSD Request) |
| Result, Error or Reject ("application dependent ITAP operation") | Invoke (USSD Request) |
| Invoke (GetImageDescr) | Result (USSD Request) |
| Result, Error or Reject (GetImageDescr) | Invoke (USSD Request) |
| Invoke (Alert) | Invoke (USSD Request) |
| Error or Reject (Alert) | Result (USSD Request) |

The DCS (Data Coding Scheme) is a parameter in the USSD operation that contains language, alphabet and message class information. GSM 02.90 specifies how the alphabet indicator and the language indicator should be set:

For Mobile Initiated USSD Operation

Alphabet indicator="SMS default alphabet", Language indicator="Language unspecified". The response is not specified.

For Network Initiated USSD Operation

Request not specified but response DCS should be set to "SMS default alphabet" and "Language unspecified".

According to GSM 02.90, it seems that operations sent from the IMS 1401 should have the alphabet indicator= "SMS default alphabet" and the language indicator= "Language unspecified". Operations sent from the SN 1409 could, according to GSM 02.90, use other values for these indicators. However, at the current stage it is uncertain whether HLR and MSC/VLR in CME20, R6.1 (equipment supplied by Telefonaktiebolaget LM Ericsson, the assignee of the present invention), will accept an alphabet indicator other than "SMS default alphabet."

As a conclusion, the main alternative, due to possible CME20 limitations, is to set the alphabet indicator to "SMS default alphabet" and the language indicator to "Language unspecified" for all operations. According to GSM 03.38, this means that the DCS should have the binary value "00001111".

The following sections describe problems and solutions associated with USSD operations and idle timers in the network:

General

When a service which uses ITAP for communication between a SN 1409 and an IMS 1401 is executed it is necessary to have an ITAP session active during the execution of the service.

There are timers in the network nodes, HLR and MSC, which abort the USSD dialogue if an invoked USSD operation is not replied to within a certain time period or if the USSD dialogue is idle for a certain time period. The timer values are in the range of 30 sec to 10 minutes. As a consequence of this, the length of services using ITAP is limited. This is a problem because it is desirable to be able to keep the ITAP session for a long time for advanced services. It is likely that there will be situations when the user keeps an ITAP session for more than 10 minutes.

Problem with the ProcessUSSDRequest Timer
Description

This timer has a value of 1–10 minutes and is started when ProcessUSSDRequest invoke is received in the SN 1409. The timer runs during the whole USSD dialogue until ProcessUSSDRequest result is received from the SN 1409.

Consequences for ITAP

This timer limits the total length of all mobile-initiated USSD dialogues and as a consequence, the length of all ITAP sessions initiated by the user of the IMS 1401 is limited.

Solution

The IMS 1401 has a timer which is started when an IMS-initiated ITAP session is initiated with "Bind invoke" mapped on ProcessUSSDRequest invoke. This timer value must be shorter than the ProcessUSSDRequest invoke timeout value in the network. When the IMS timer expires, a switch to a network initiated USSD dialogue is performed. The ITAP session continues and is mapped on this new USSD dialogue.

Problem with the USSDRequest Timer
Description

This timer has a value of 1–10 minutes and is started when USSDRequest invoke is sent. The timer runs until USSDRequest result is received from the IMS 1401.

Consequences for ITAP

This timer limits the ITAP idle time in the IMS 1401, that is, the length of time the IMS 1401 can wait until the next ITAP operation is sent.

Solution

If the IMS 1401 has not invoked an ITAP operation within a certain time (slightly shorter than the USSDRequest invoke timer), then a dummy USSDRequest result is sent. The SN 1409 replies with a dummy USSDRequest invoke.

Problem with the USSD Idle Timer in HLR
Description

This HLR timer has a value of 30 seconds to 5 minutes and supervises the time between invocations of USSD operations. The timer is started when USSDRequest result has been sent to the SN 1409 and runs until the next USSDRequest invoke is received from the SN 1409 or until the USSD dialogue is closed.

Consequences for ITAP

This timer limits the time an ITAP operation invoke can be outstanding in the SN 1409 before a reply is sent.

Solution

The SN 1409 must always reply to an invoked ITAP operation before the USSD idle timer expires.

The use of USSD as a bearer imposes some limitations on ITAP functionality. The following limitations are valid for USSD according to the GSM phase 2 specifications:

Only one ITAP session at a time can be active because multiple USSD dialogues with an IMS 1401 are not possible. If a new ITAP session is started when there already is a session active, the first session is temporarily interrupted. When the second ITAP session is terminated, the first session is resumed.

If there is an ITAP session in progress and a new session has to be started, the new session can only be initiated by the IMS 1401, with the Bind operation. It is in this case not possible to start a new session from the SN 1409 with Alert. The reason is that ITAP operations are invoked by the IMS 1401, except for Alert, and the SN 1409 replies with result. The result operation from the SN 1409 is mapped onto "Invoke (USSD request)". If an Alert were sent, then a parallel "Invoke (USSD request)" would have to be sent. However, multiple invocations are not allowed in USSD.

If an ITAP session is initiated by the SN 1409 with an Alert and no reply is received from the IMS 1401 within a specified time-period, then the initiated session is aborted in the SN 1409. However, it is not possible to abort the USSD dialogue in the network and IMS 1401, because this is the first USSD operation in this dialogue. If the application timeout in the SN 1409 is shorter than the MSC/VLR USSD timeout, the USSD channel towards the IMS 1401 will be blocked until the MSC/VLR timeout expires (because MSC/VLR allows only one USSD dialogue at a time).

It should be noted that if the timeout is caused by "no input from user", then this problem is solved by the "idle" timer in the IMS 1401 as described above, and illustrated below.

FIGS. 19–51 illustrate ITAP operation scenarios utilizing USSD (according to GSM phase 2) as a bearer.

Figure 19:
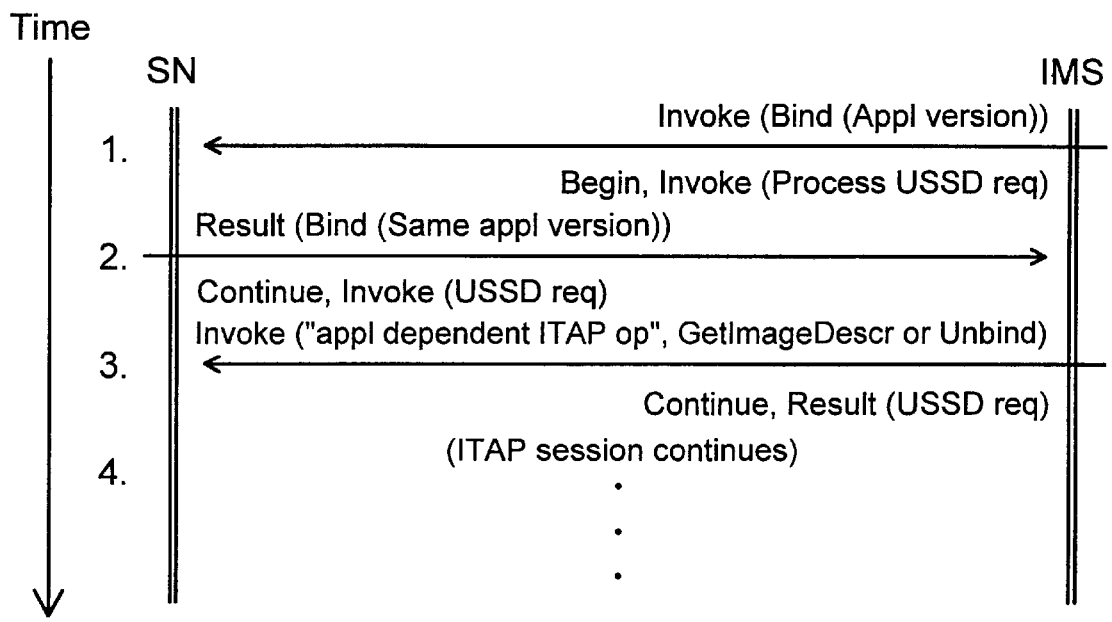
FIGS. 19–51 illustrate ITAP operation scenarios utilizing USSD (according to GSM phase 2) as a bearer.

FIG. 19 illustrates a Bind operation when no existing ITAP session is in progress. Here, the IMS 1401 initiates the ITAP session, with the IMS application version being up to date (i.e., the version level in the terminal matches the version level in the service node).

Figure 20:
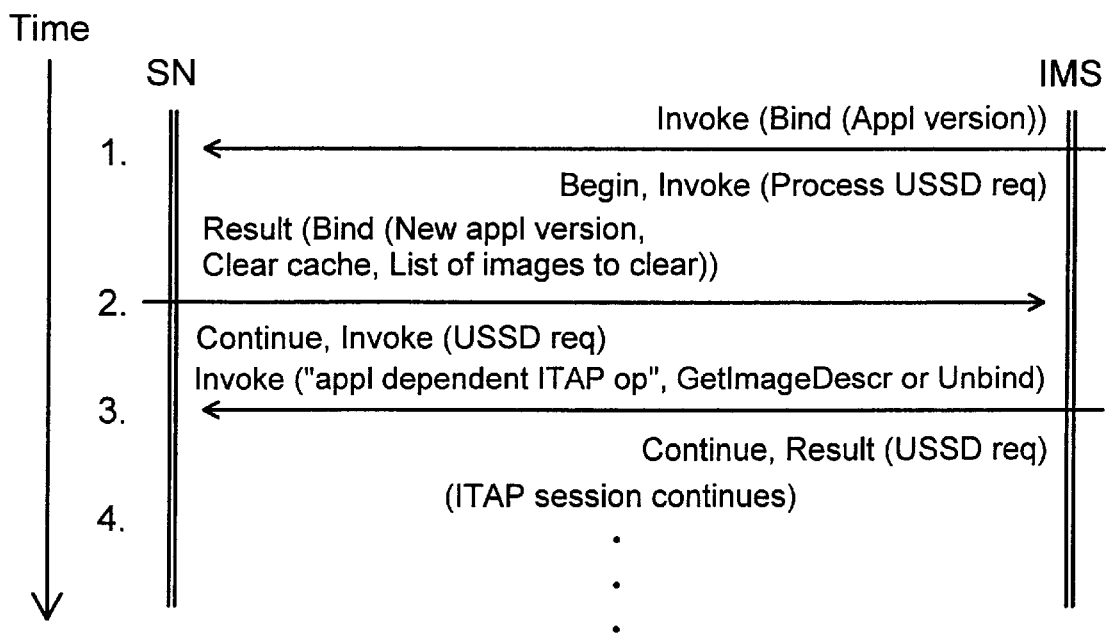

FIG. 20 illustrates another Bind operation when no existing ITAP session is in progress. Here, however, the IMS 1401 initiates the ITAP session, with the IMS application needing to be updated. It is assumed that image descriptions are supported. It can be seen that at time=2, the SN 1409 sends a Result that includes a new application version, instructions to clear the cache in the IMS 1401, and a list of images to clear.

Figure 21:
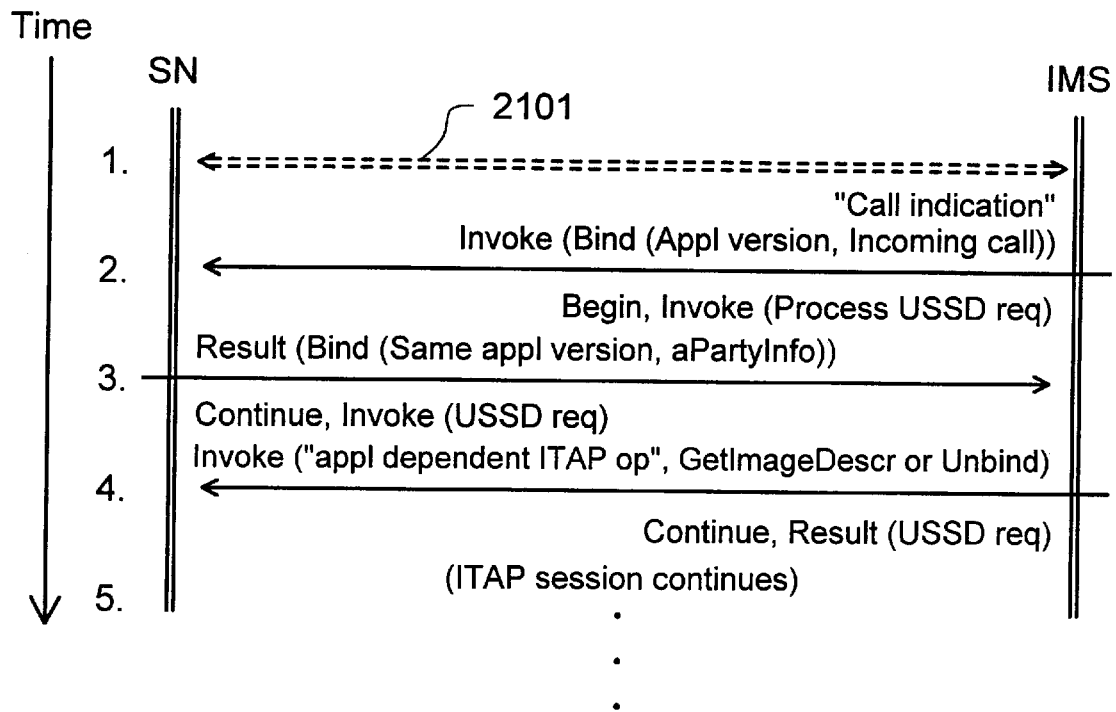

FIG. 21 illustrates an ITAP scenario in which the IMS 1401 initiates an ITAP session by means of a call-related indication 2101 at a time when no ITAP session is in progress.

Figure 22:
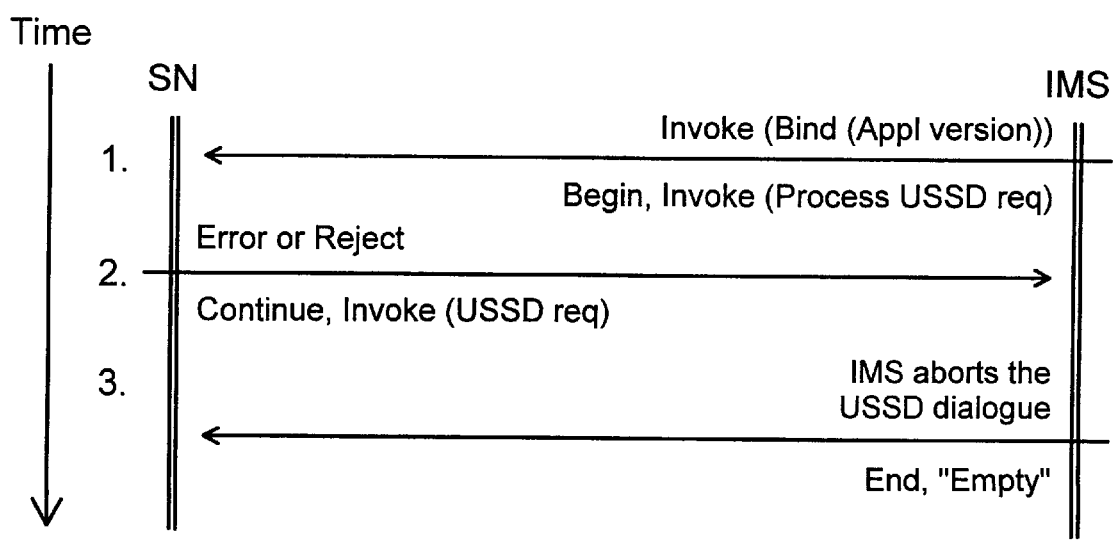

FIG. 22 illustrates an ITAP scenario in which the IMS 1401 initiates an ITAP session using the Bind operation, and in which the SN detects an error or rejects the Bind operation. Note that at time=3, it is also possible that the IMS 1401 retries the Bind operation with a "Continue, Result (USSD req)".

Figure 23:
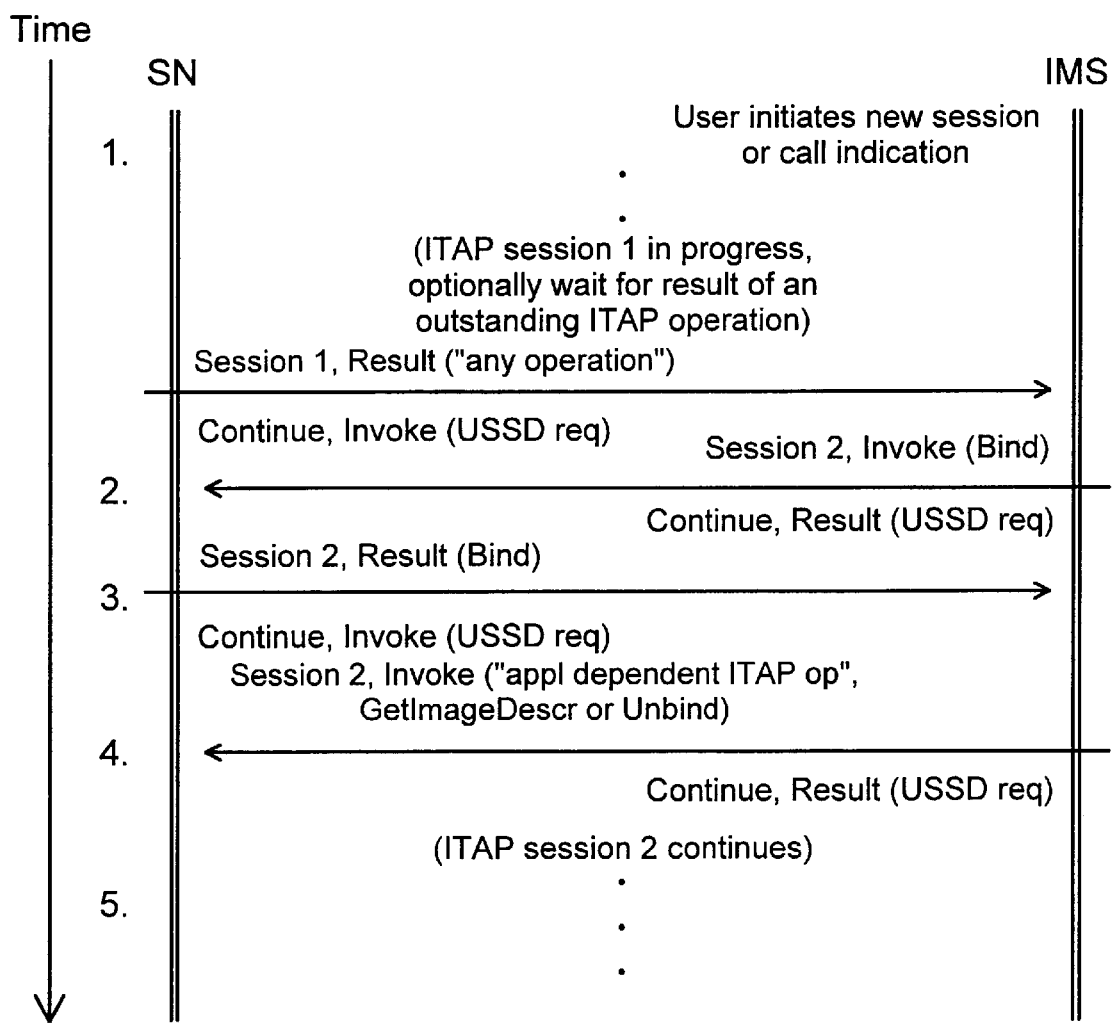

FIG. 23 illustrates an ITAP scenario in which the IMS 1401 initiates an ITAP session at a time when an existing IMS session is already in progress. Note that if an event (e.g., a call indication), which triggers a new session, is detected and the session in progress has an outstanding invoke operation, then the operation reult must be received before a Bind for the new session can be invoked.

Figure 24:
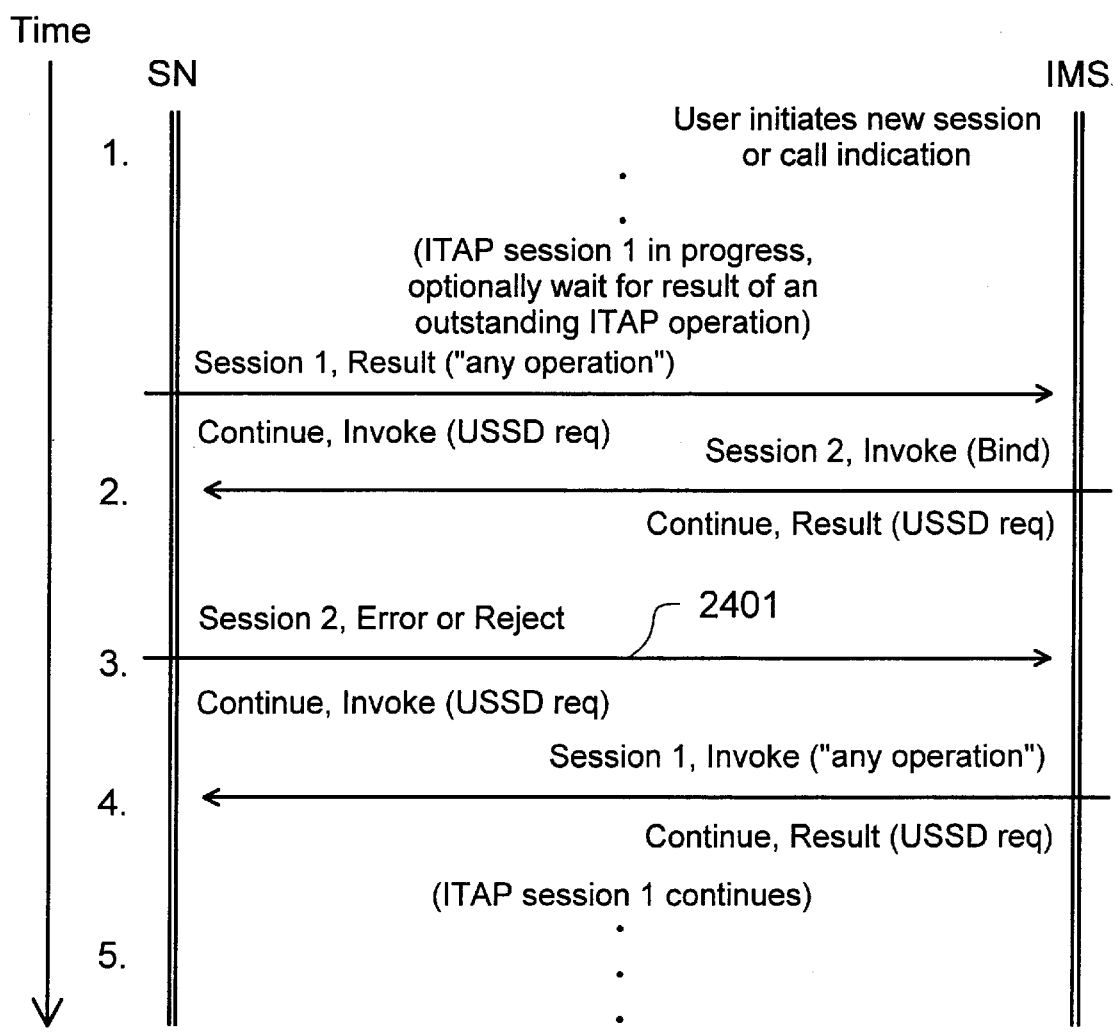

FIG. 24 illustrates an ITAP scenario in which the IMS 1401 initiates an ITAP session at a time when an existing IMS session is already in progress, and in which the SN 1409 detects an error or rejects the Bind operation (step 2401). Note that at time=4, it is also possible for the IMS 1401 to retry sending the Bind operation for session 2.

Figure 25:
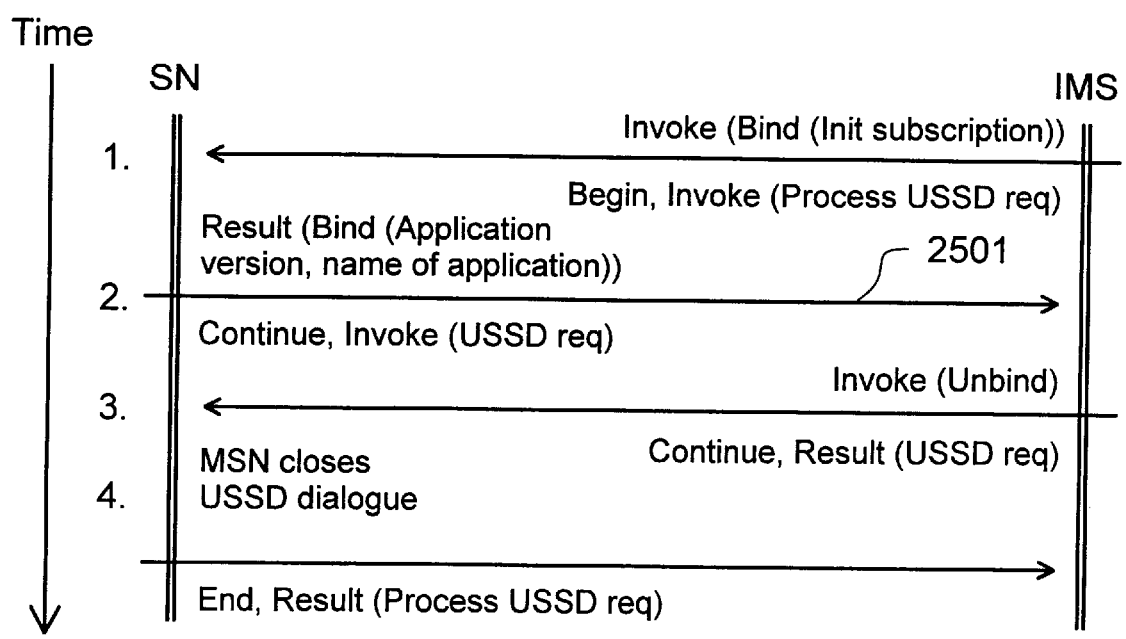

FIG. 25 illustrates the initiation of an ITAP service at a time when no application data is available in the IMS 1409. Note that when the IMS 1401 receives the bind result (step 2501), the application parameters are stored in the IMS 1401. The ITAP session is always terminated after the ITAP service is initiated.

Figure 26:
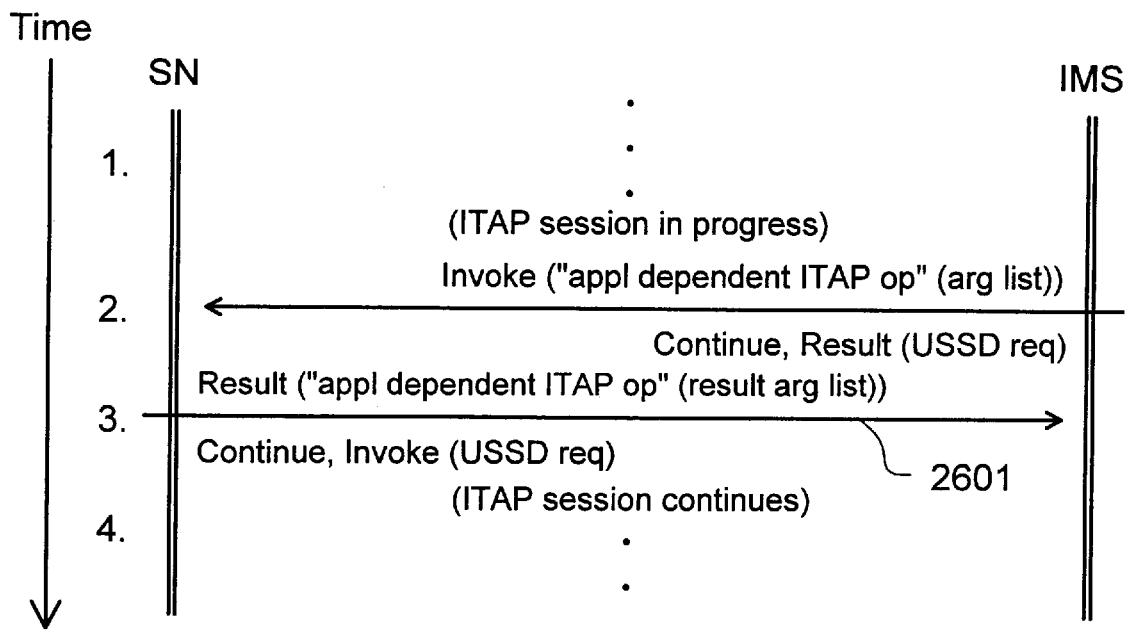
Figure 27:
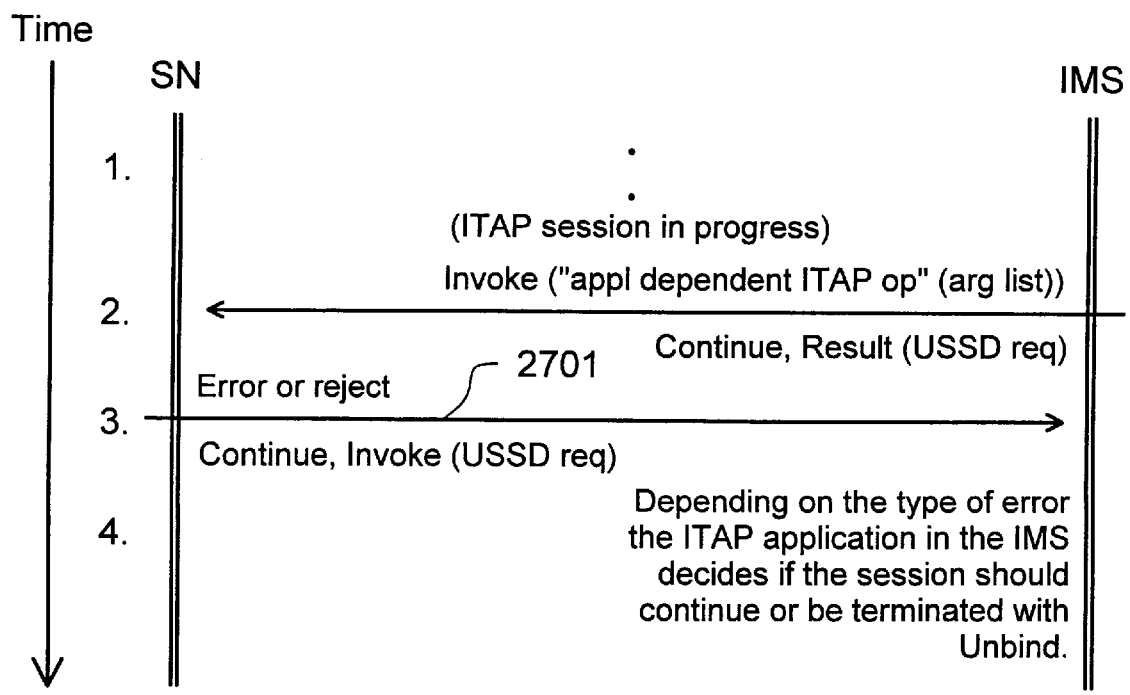

FIGS. 26 and 27 illustrate application-dependent ITAP operations. In FIG. 26, a successful response is received from the SN 1409 (step 2601). In FIG. 27, the SN 1409 detects an error or rejects the operation 2701.

Figure 28:
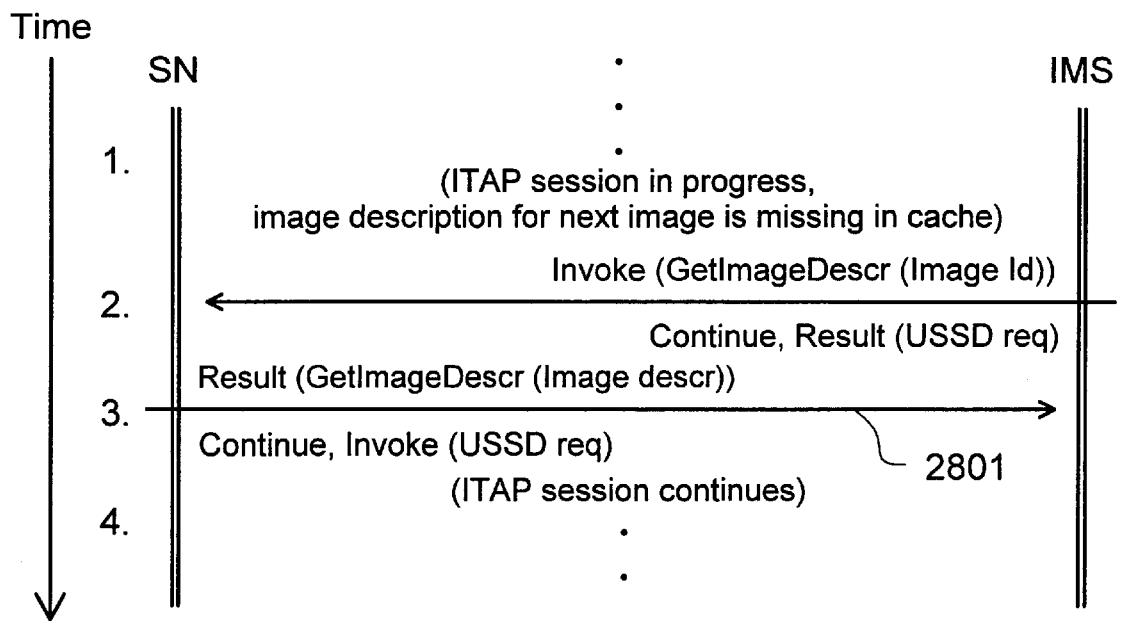
Figure 29:
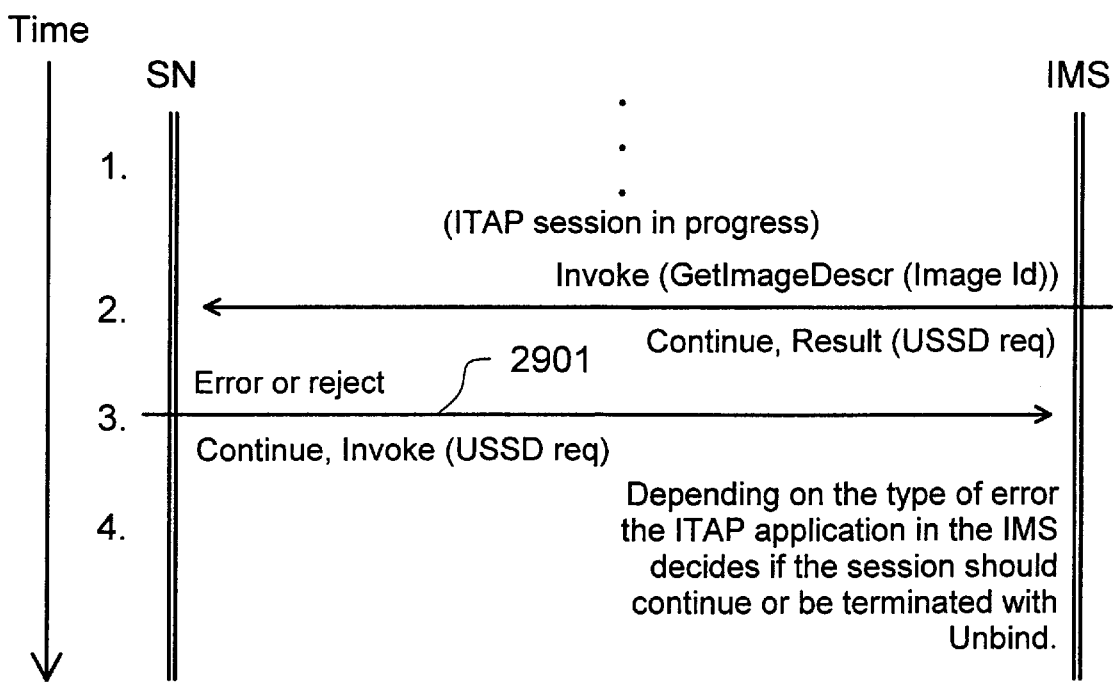

FIGS. 28 and 29 illustrate the GetImageDescr operation. In FIG. 28, a successful response is generated by the SN 1409 (step 2801). In FIG. 29, the SN 1409 detects an error or rejects the oepration (step 2901).

Figure 30:
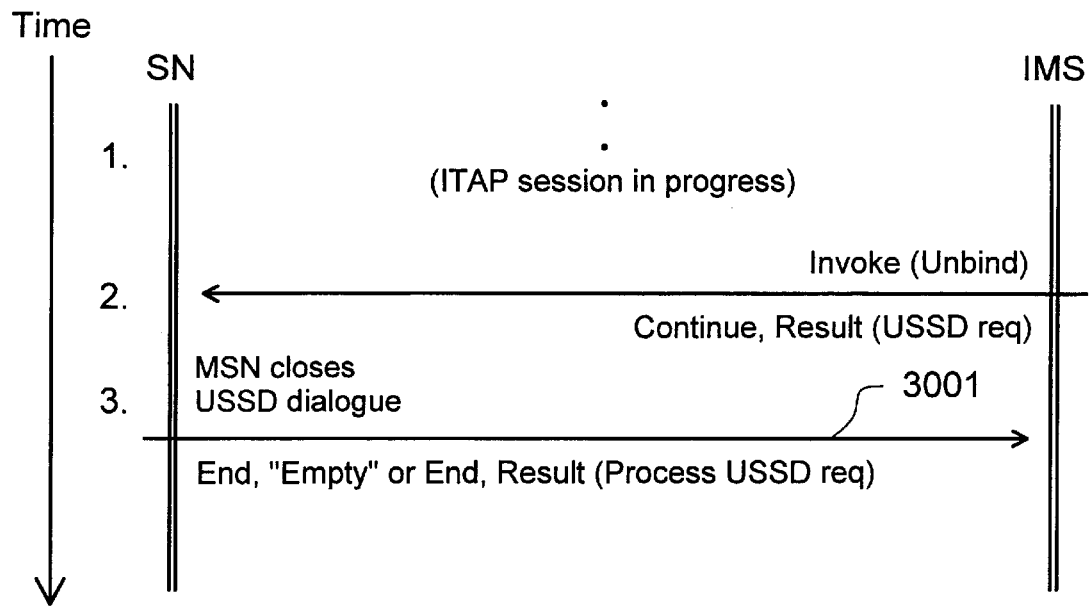
Figure 31:
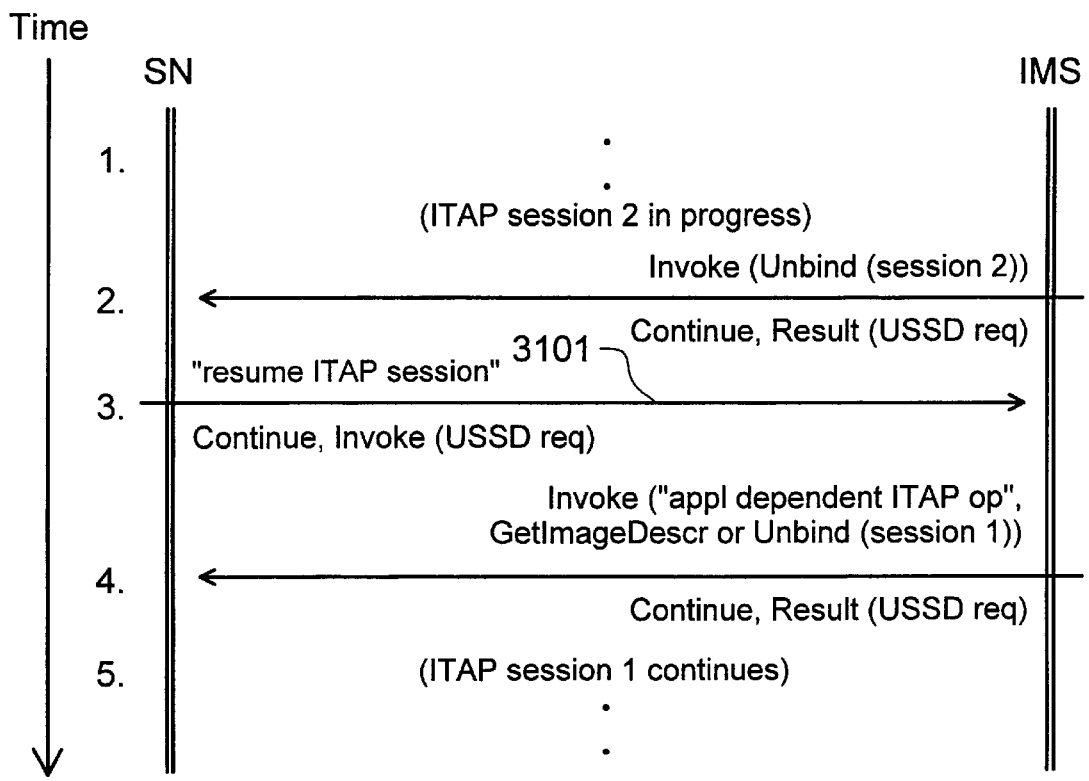
Figure 32:
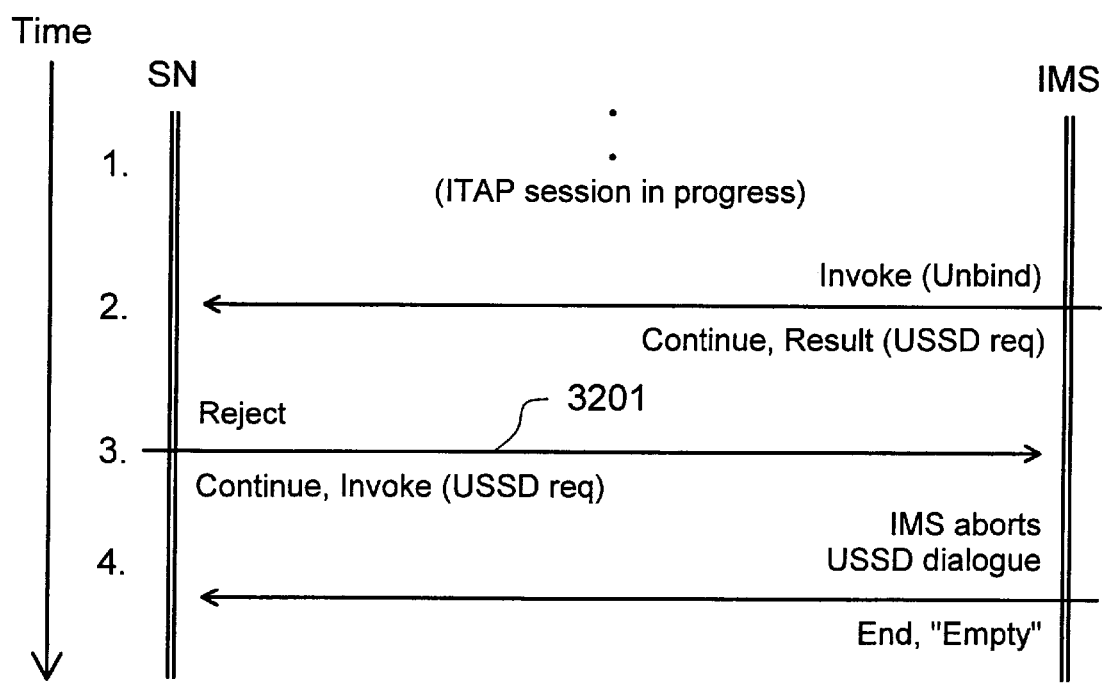

FIGS. 30, 31 and 32 illustrate a number of ITAP scenarios involving the Unbind operation. In FIG. 30, only one session is in progress, and a successful response is generated by the SN 1409 (step 3001). Note that at time-3, the USSD dialogue is closed with an empty TCAP-End if the USSD dialogue was initiated by the SN 1409. If the USSD dialogue was initiated by the IMS 1401, then the USSD dialogue is closed with Result (Process USSD req).

In FIG. 31, a prevously interrupted session is to be resumed, and a successful response is generated by the SN 1409 (step 3101).

FIG. 32 illustrates a scenario in which one or several sessions are in progress, and in which the SN 1409 rejects the Unbind (step 3201). Note that all ITAP sessinos will be aborted in this situation. This is necessary because the attempt to erminate a session on the ITAP level failed and a deadlock situation needs to be avoided.

Figure 33:
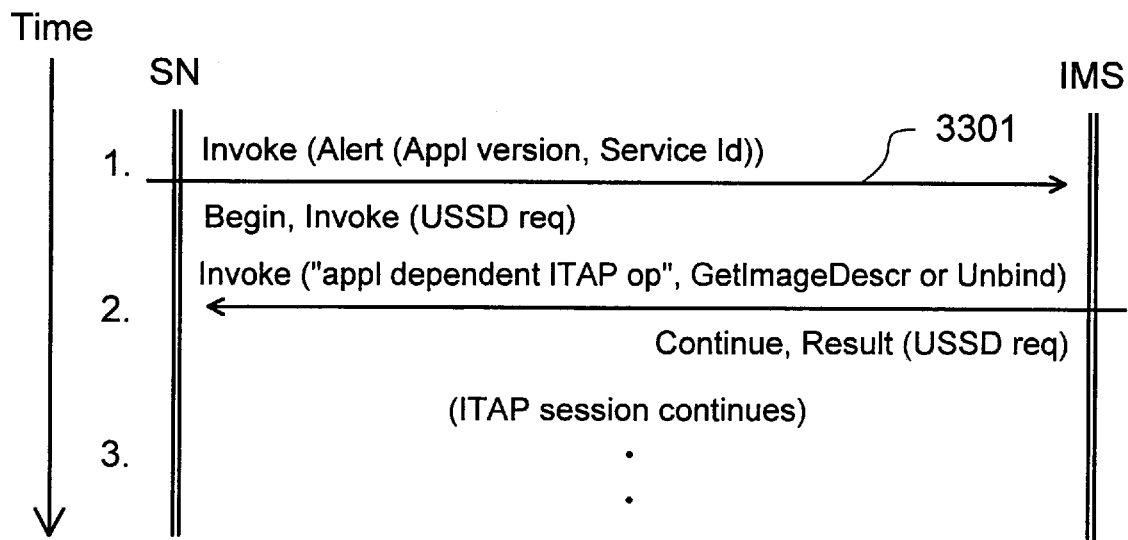

FIGS. 33 through 39 illustrate a number of scenarios involving the Alert operation. FIG. 33 shows a situation in which the SN 1409 alerts the IMS 1401 about an event (step 3301) and the IMS application version is up to date.

Figure 34:
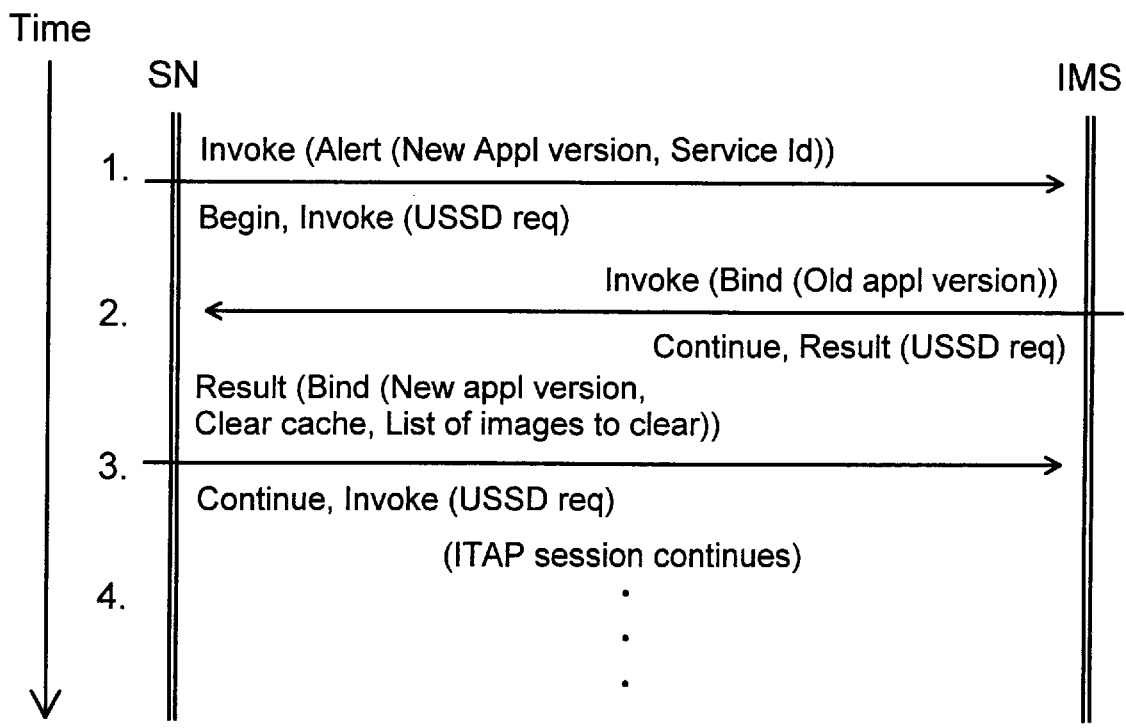

In FIG. 34, the SN 1409 alerts the IMS 1401 about an event when the IMS application version is not equal to the one in the SN 1409. The illustrated scenario is for the case in which image descriptions are supported.

Figure 35:
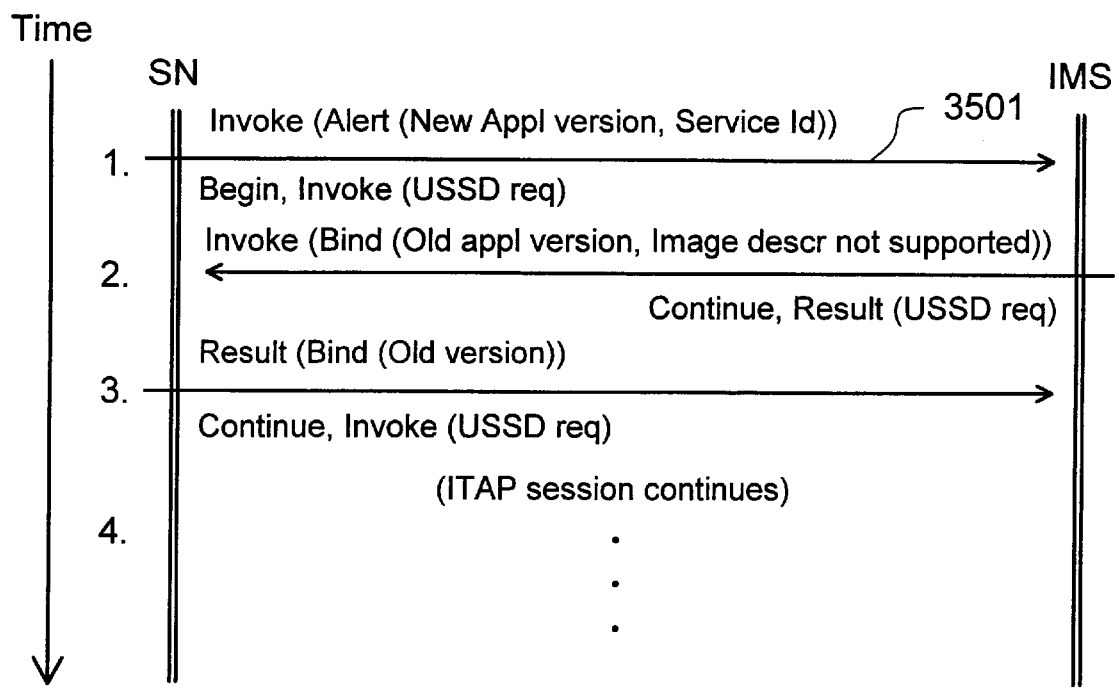

FIG. 35 illustrates a scenario in which the SN 1409 alerts the IMS 1401 about an event (step 3501) at a time when the IMS application version is not equal to the version in the SN 1409. In this case, the IMS 1401 does not support image descriptions, and the SN 1409 is backward compatible.

Figure 36:
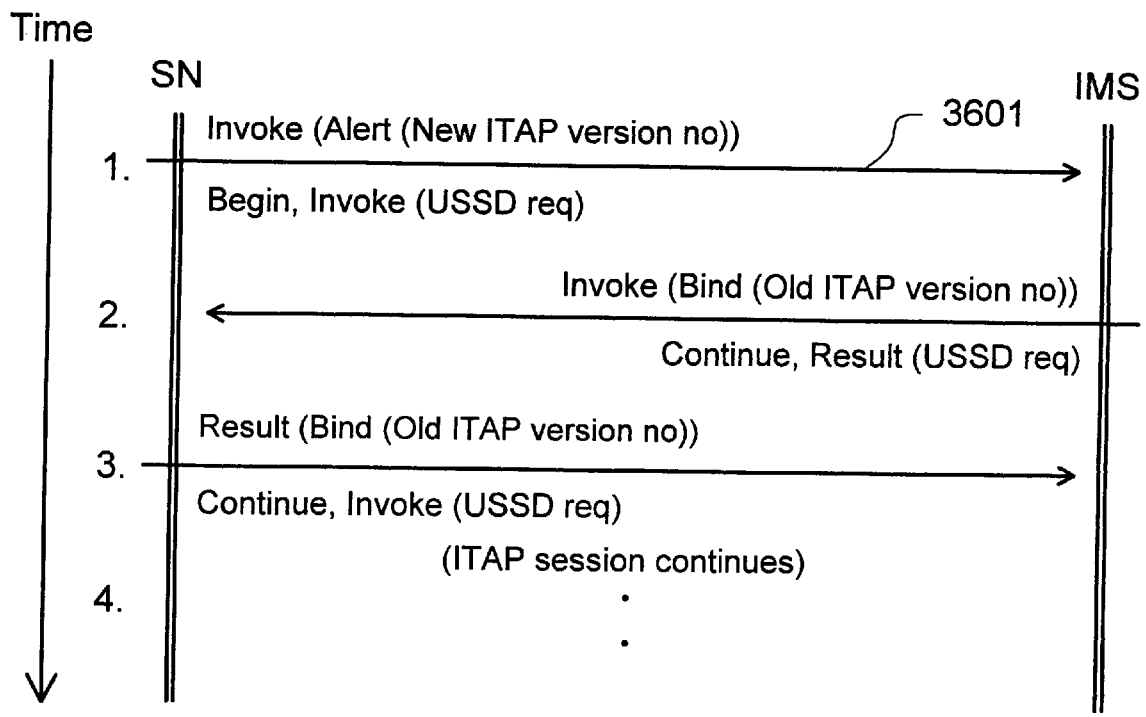

FIG. 36 depicts a scenario in which the SN 1409 alerts the IMS 1401 about an event (step 3601). In this case,the IMS 1401 supports an older version of ITAP, and the SN 1409 is backward compatible.

Figure 37:
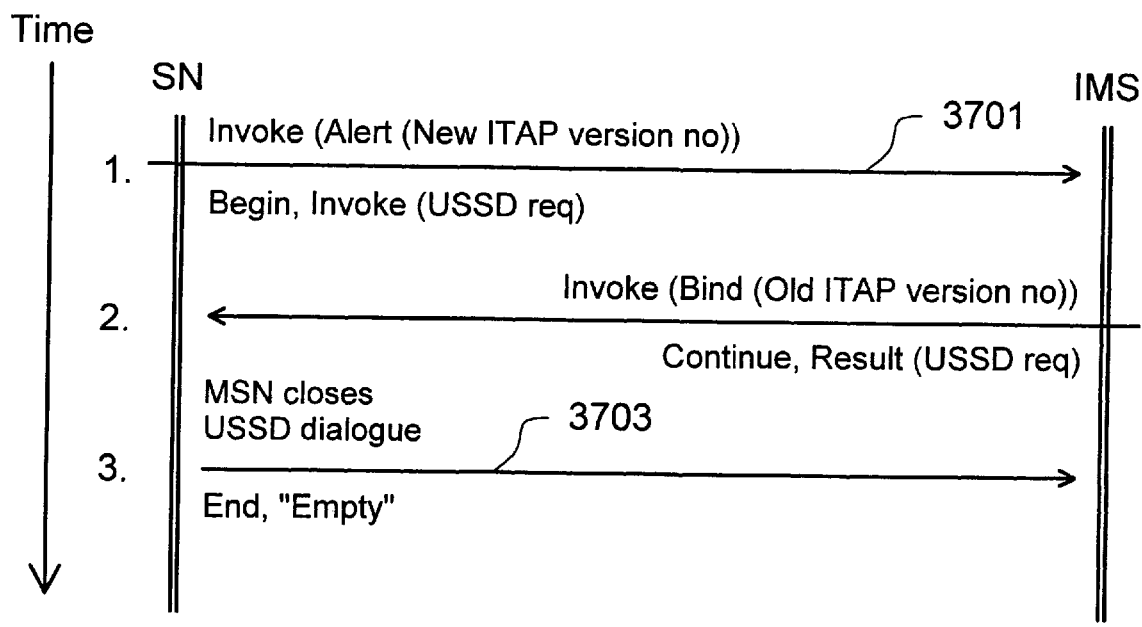

In FIG. 37, the SN 1409 alerts the IMS 1401 about an event (step 3701). Here, the IMS 1401 supports an older version of ITAP, but the SN 1409 is not backward compatible. As a result, the SN 1409 closes the USSD dialogue (step 3703).

Figure 38:
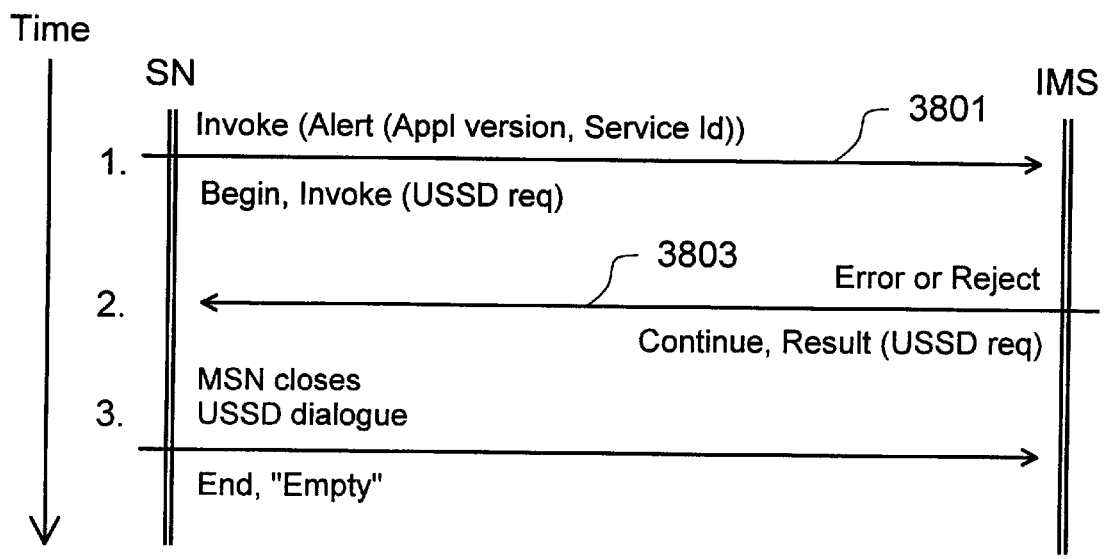

In FIG. 38, the SN 1409 generates an Alert operation (step 3801), but the IMS 1401 detects an error or rejects the Alert operation (step 3803).

Figure 39:
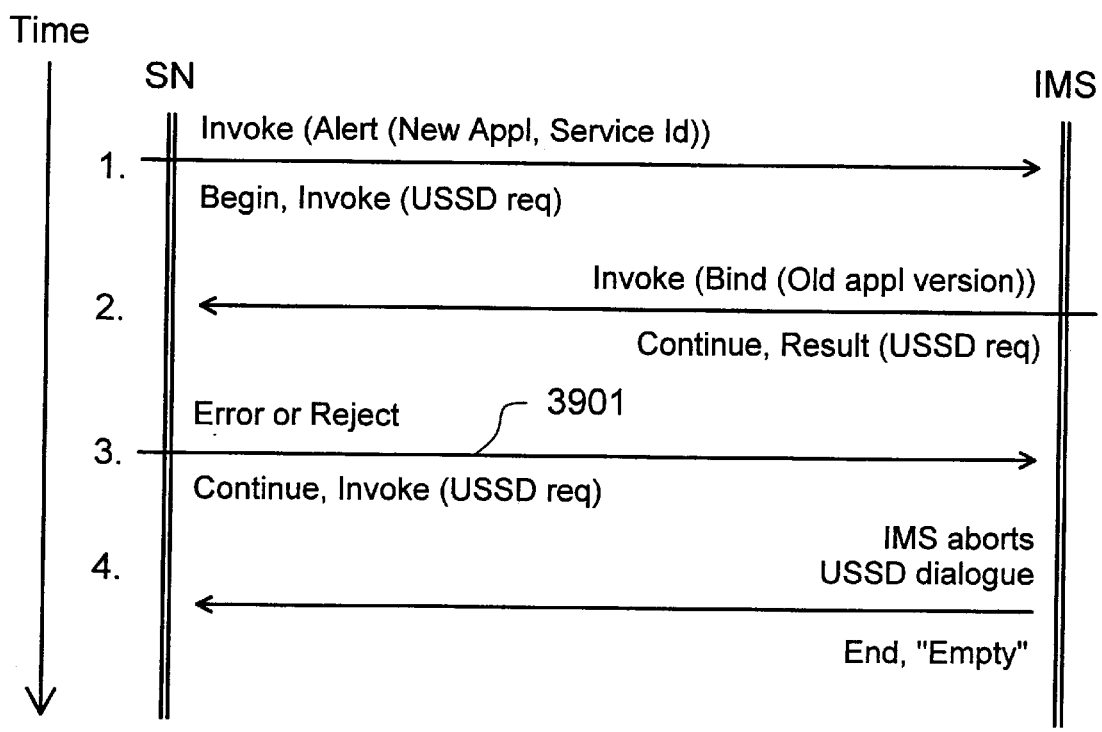

In FIG. 39, the SN 1409 detects an error or rejects the Bind operation that follows an Alert (step 3901).

Figure 40:
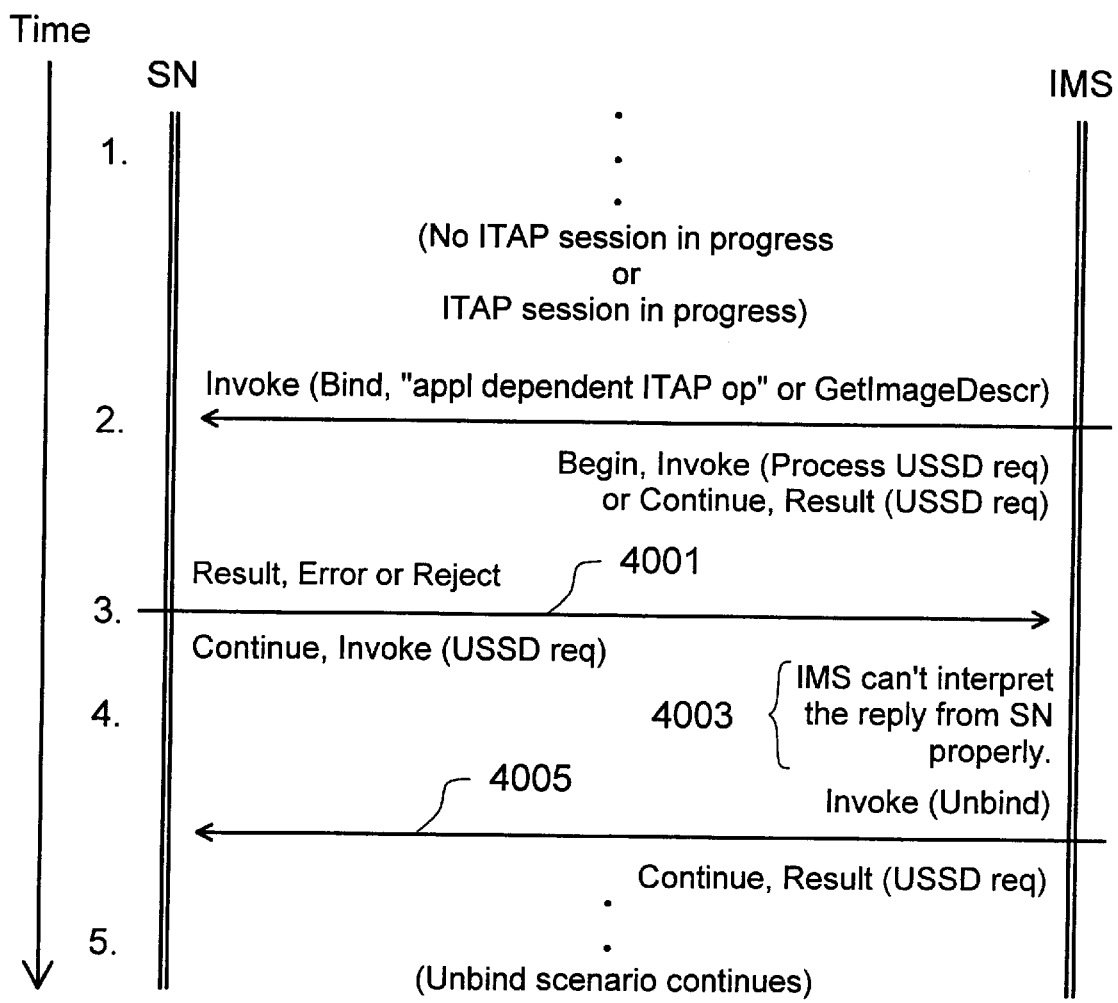

FIG. 40 depicts an ITAP scenario in which the IMS 1401 rejects a response from the SN 1409. That is, at step 4001, the SN 1409 sends a Result, Error or Reject to the IMS 1401. At step 4003, the IMS 1401 is unable to properly interpret the reply from the SN 1409, so at step 4005 the IMS 1401 sends an Unbind operation to the SN 1409. Note that according to CCITT Recommendation X.219, section 10.4, it is optional whether a ROSE-user implements rejection of a reply (Result or Error Application Protocol Data Unit (APDU) by sending a Reject APDU. For the illustrated embodiment of ITAP, it has been selected, for the IMS 1401, not to send a Reject APDU in the case of an erroneous Result or Error APDU from the SN 1409. Instead, the ITAP session is terminated by an Unbind in this situation.

It has been described, with respect to FIGS. 17 and 18, how ITAP may be mapped onto a USSD string. In the following scenarios, depicted in FIGS. 41 through 43, the segmentation flag 1713 in the USSD specific header 1701, 1801 is used for segmentation information. If the PER or BER coded ITAP operation does not fit into the USSD string of a USSD operation, it has to be split into two or more USSD operations. When the IMS 1401 or the SN 1409 has received an operation with the segmentation flag set to "more to come", then a USSD operation with just the header, where the segmentation flag is set to "get more info", should be sent to the other entity. When the complete ITAP operation has been received, it should be decoded by the receiving entity.

Figure 41:
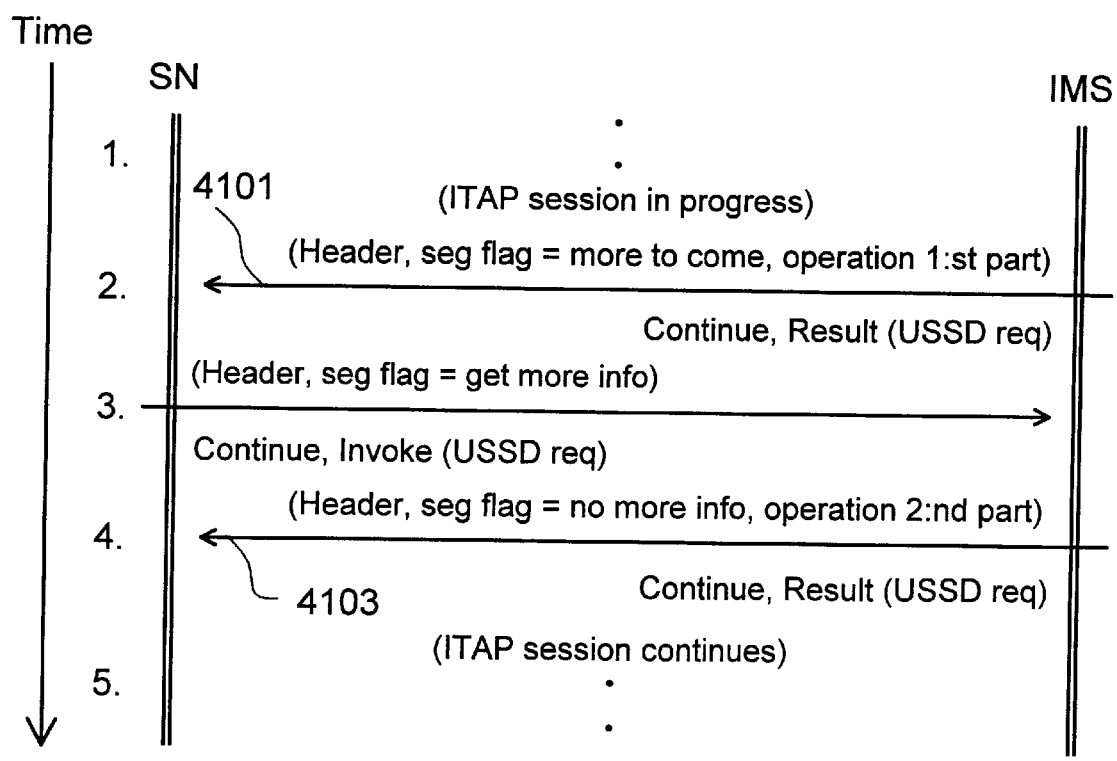

Turning now to FIG. 41, an IMS-invoked operation that does not fit into one USSD operation is shown. The solution is to split it into two operations 4101, 4103.

Figure 42:
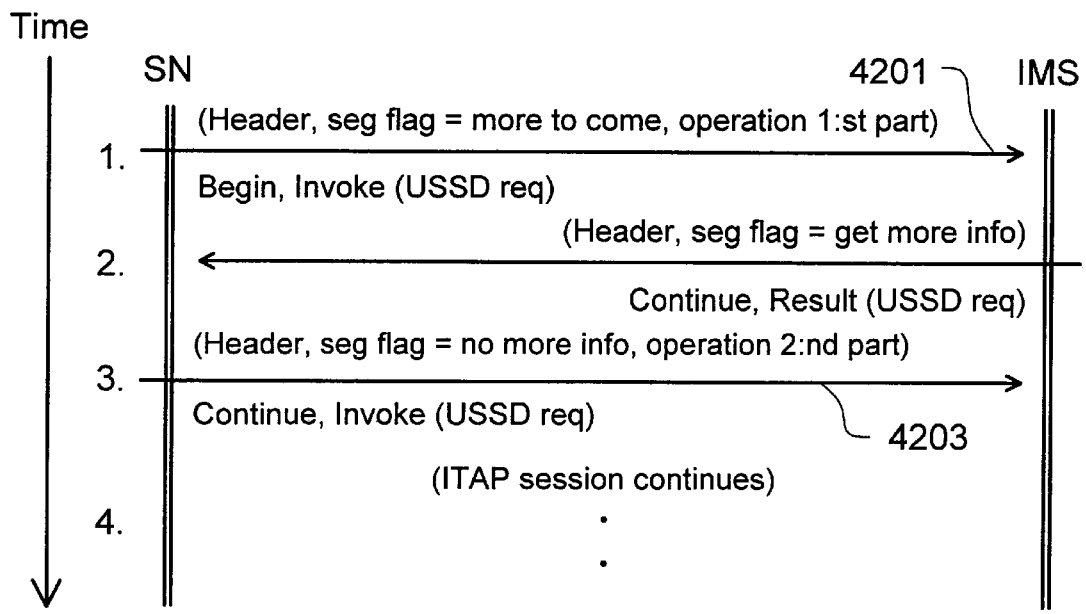

FIG. 42 illustrates a scenario in which the SN 1409 invokes an ITAP operation that does not fit into one USSD operation. The solution is to split the ITAP operation into two USSD operations 4201, 4203.

Figure 43:
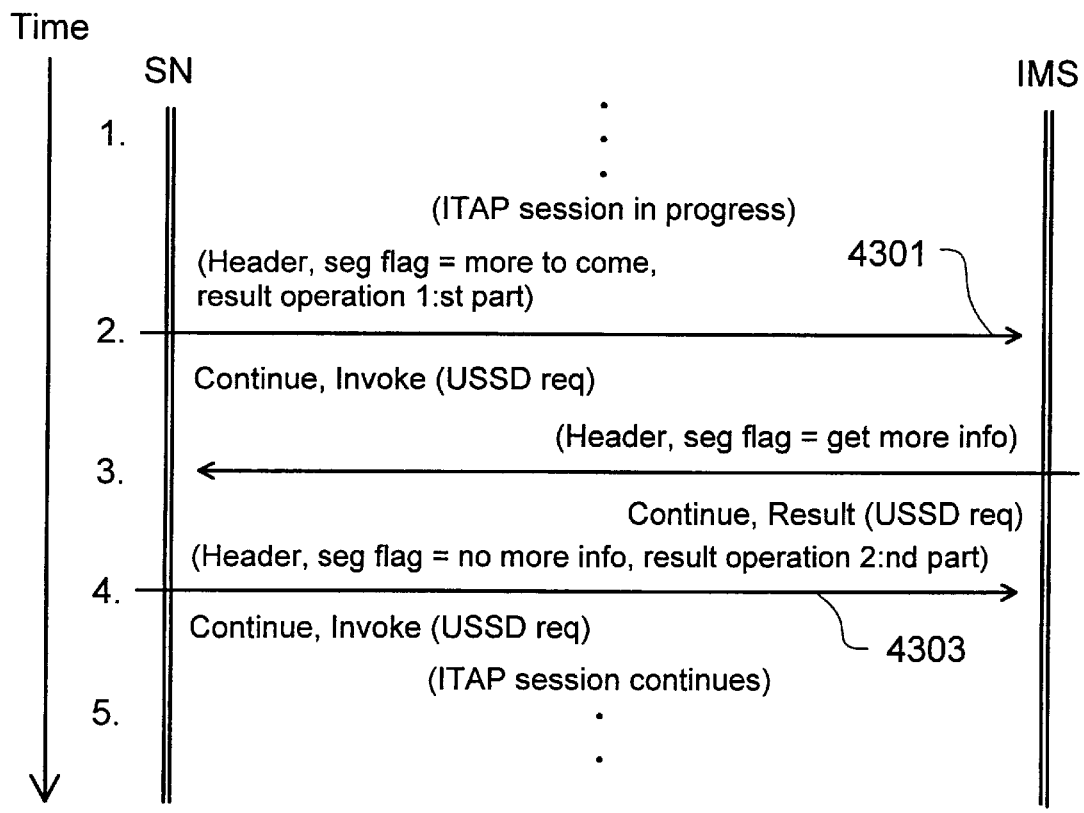

FIG. 43 shows a scenario in which an operation result sent by the SN 1409 does not fit into one USSD operation. The solution is to split the ITAP operation result into two USSD operations 4301, 4303.

Figure 44:
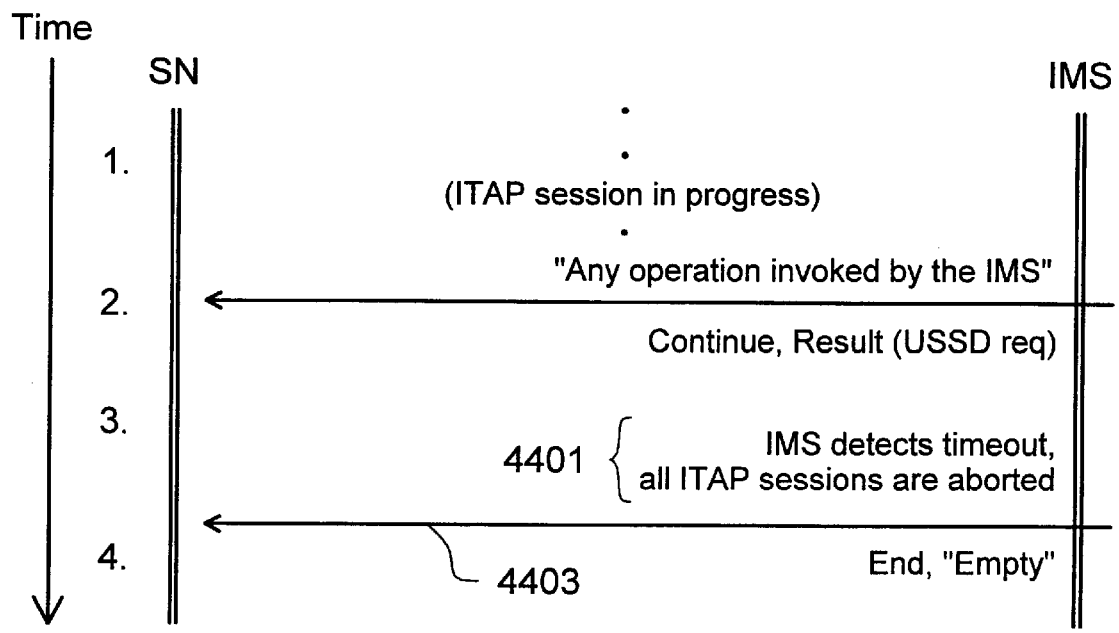

Timeout handling on the ITAP level will now be discussed with reference to FIGS. 44 through 49. Referring first to FIG. 44, this depicts a scenario in which the IMS 1401 detects a timeout (step 4401) after an operation has been invoked. In response, all ITAP sessions are aborted, and an End operation is sent to the SN 1409 (step 4403).

Figure 45:
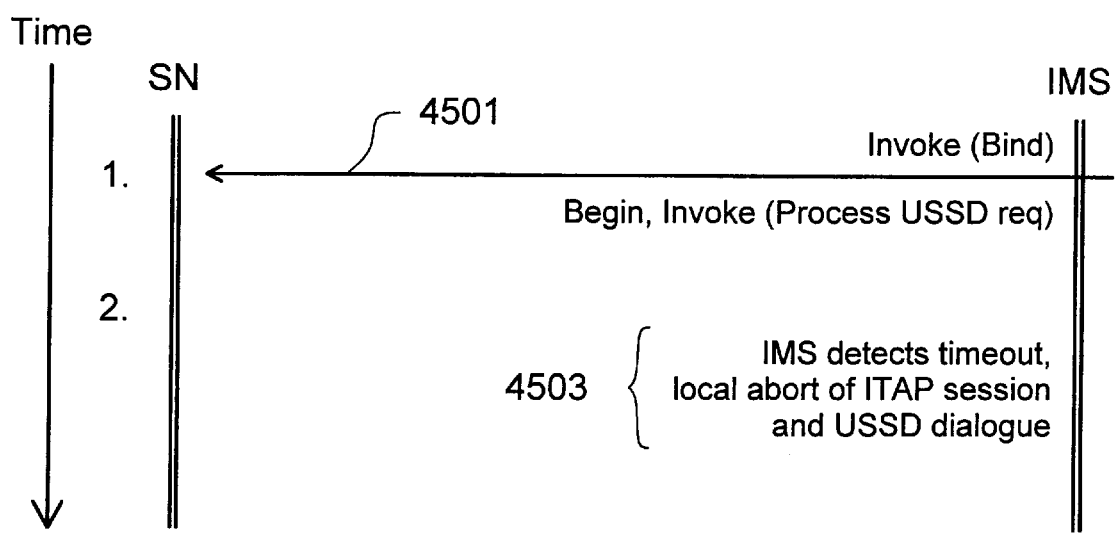

FIG. 45 illustrates a scenario in which the IMS 1401 detects a timeout after a Bind has been invoked as a first operation for this USSD dialogue (step 4501). The IMS 1401 responds by locally aborting the ITAP session and the USSD dialogue (step 4503).

Figure 46:
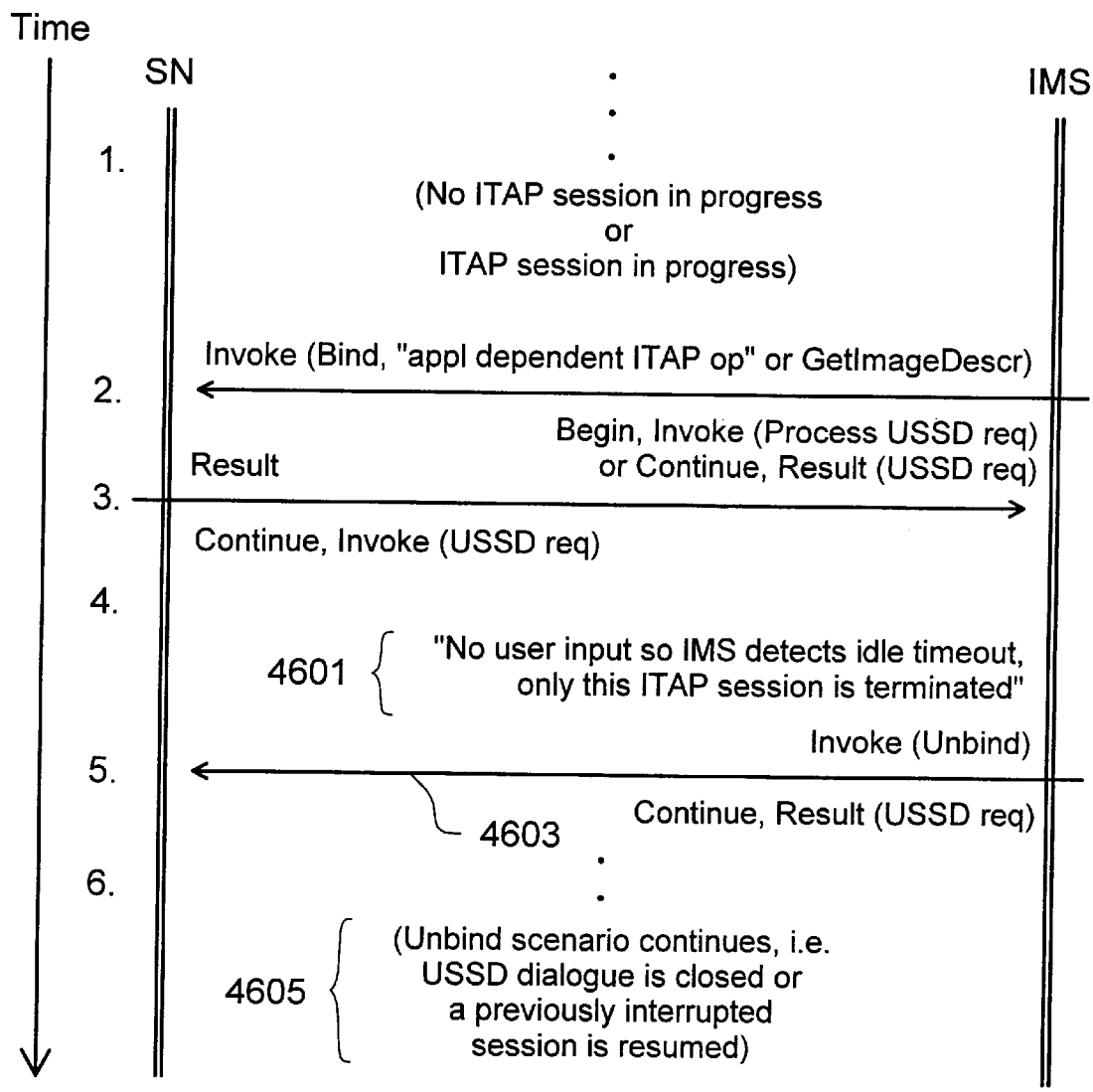

In FIG. 46, the IMS 1401 detects an "idle" timeout, that is, no response is received from the user (step 4601). The IMS 1401 responds by generating invoking an Unbind operation (step 4603). As a result, an Unbind scenario continues (step 4605), that is, a USSD dialogue is closed or a previously interrupted session is resumed.

Figure 47:
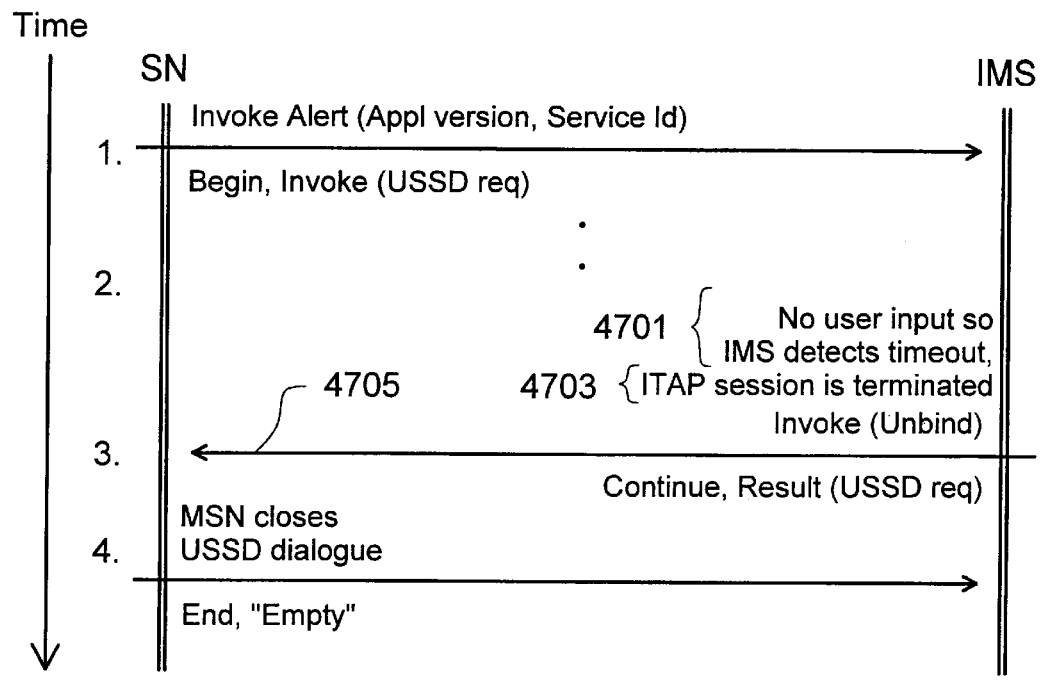

FIG. 47 depicts a scenario in which the IMS 1401 detects an "idle" timeout, that is, no response from the user, after an Alert has been received (step 4701). In response, the IMS 1401 terminates the ITAP session (step 4703), including invoking an Unbind operation (step 4705).

Figure 48:
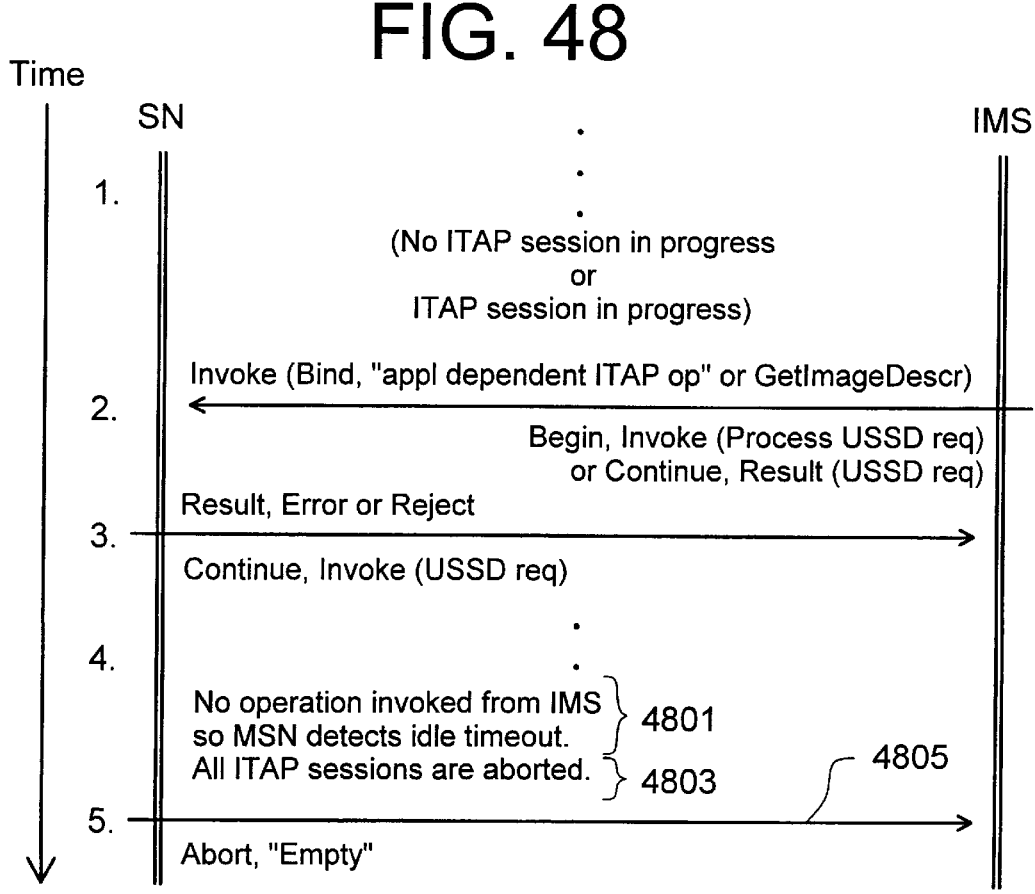

In FIG. 48, it is the SN 1409 that detects the "idle timeout" (step 4801). In response, the SN 1409 aborts all ITAP sessions (steps 4803), including sending an Abort operation to the IMS 1401.

Figure 49:
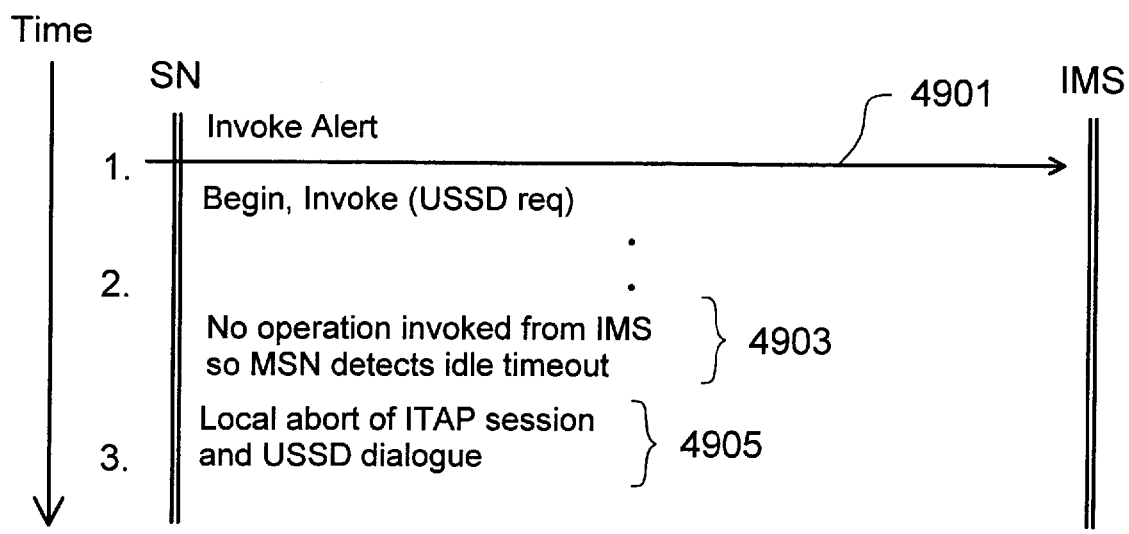

FIG. 49 illustrates a scenario in which the SN 1409 sends an Alert (step 4901), and subsequently detects an "idle" timeout (step 4903). In response, the SN 1409 performs a local abort of the ITAP session and the USSD dialogue.

Figure 50:
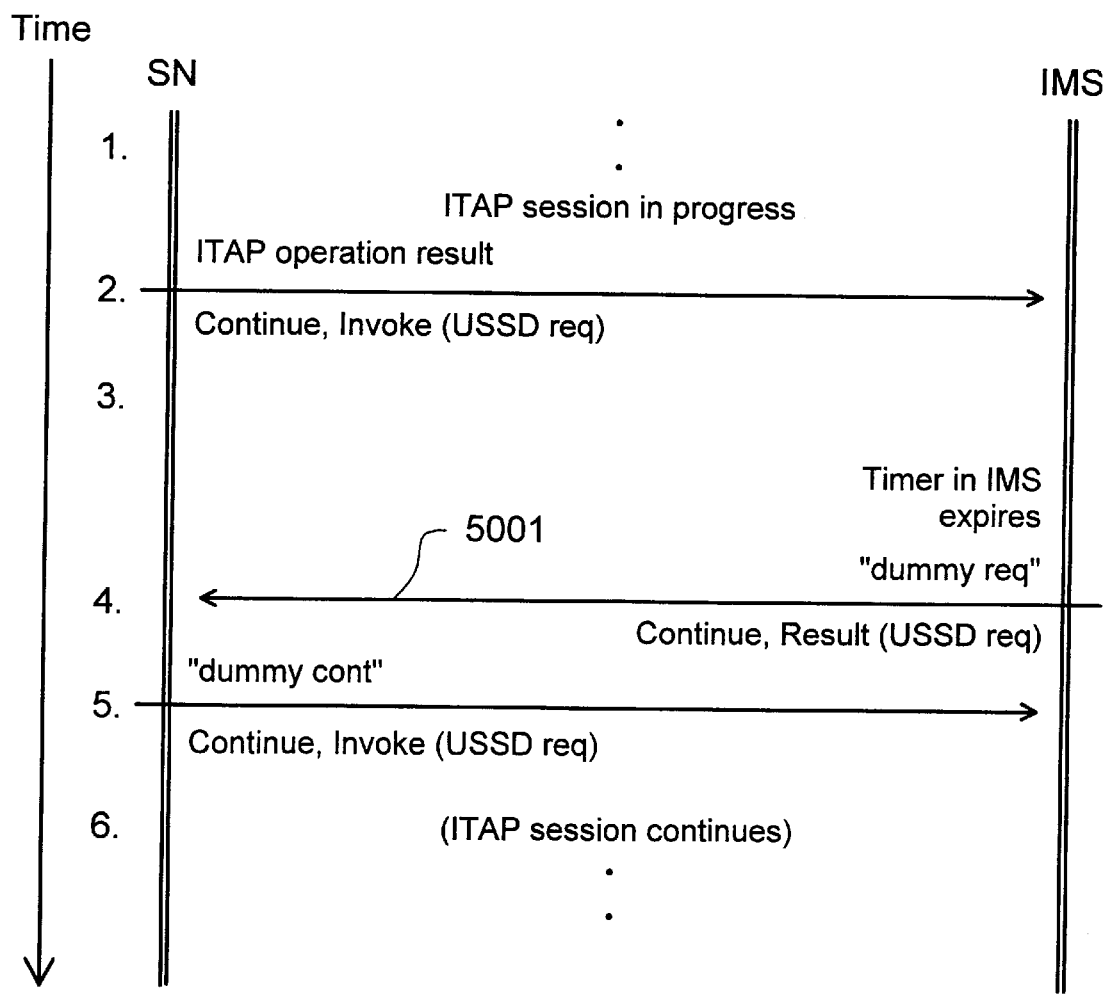
Figure 51:
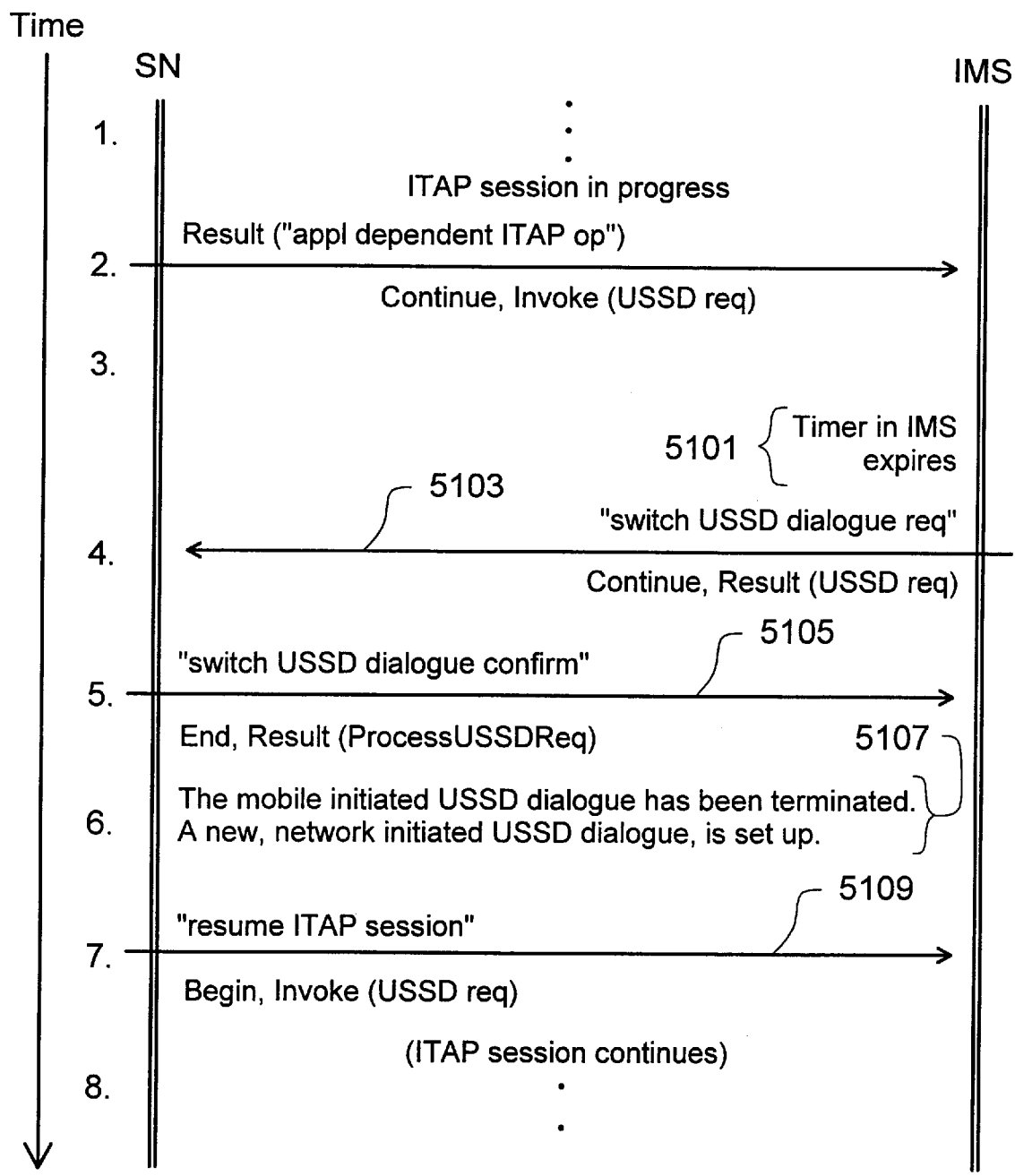

FIGS. 50 and 51 depict scenarios involving handling that may be performed in order to avoid a USSD timeout in the network. In FIG. 50, a dummy USSD operation (step 5001) is performed in order to avoid a USSDRequest timeout. In FIG. 51, expiration of a timer in the IMS 1401 (step 5101) causes a switch to be made from an IMS-initiated USSD dialogue to a network-initiated USSD dialogue (steps 5103 and 5105) in order to avoid a ProcessUSSDRequest timeout. The switch causes the mobile-initiated USSD dialogue to be terminated, and a new, network-initiated USSD dialogue to be set up (step 5107). After the switch, the SN 1409 may resume the ITAP session (step 5109).

The various ITAP operations in accorance with one embodiment of the invention will now be described in greater detail. ITAP uses the concept of remote operations for specification of interactive communication between the application entities. ITAP is specified using ROSE and ASN. 1 syntax as defined in CCITT Recommendation X.208: Abstract Syntax Notation (ASN. 1), and CCITT Recommendation X.229: Remote Operations: Protocol Specification, which were incorporated by reference above.

Remote Operation

The ITAP operations are defined with the four ROSE primitives:

Invoke (request)

Result (positive outcome)

Error (negative outcome)

Reject (protocol error)

Each ITAP operation will be classified according to the rules defined by ROSE:

Operation class 1, synchronous, reporting success or failure;

Operation class 2, asynchronous, reporting success or failure;

Operation class 3, asynchronous, reporting failure only;

Operation class 4, asynchronous, reporting success only; and

Operation class 5, outcome not reported.

Timer

The timer range value that is used complies to the range defined by MAP:

s=from 3 seconds to 10 seconds m=from 15 seconds to 30 seconds ml=from 1 minute to 10 minutes l=from 28 hours to 38 hours There are two types of timers: operation and idle timers. The operation timer is invoked when the requesting application entity is waiting for the outcome of a request. If no outcome is returned before the timer expires, the operation is cancelled. The ITAP operation timers are specified for each ITAP operation in the section below entitled "BASIC ITAP OPERATIONS".

The idle timer is invoked in the IMS 1401 when there is no outstanding request for service and invoked in the SN 1409 when no request is being executed. If there is no activity on the session, the idle timer will expire. The idle timer in the IMS 1401 and SN 1409 should be:

MS, ml

SN, ml

It should be noted that since the IMS 1401 will send an Unbind operation when the idle timer expires in the IMS 1401, the idle timer ought to be a little bit shorter in the IMS 1401 than in the SN 1409 so that the session can be terminated in a proper way.

Basic and Application Dependent ITAP Operations

The ITAP operations are divided into two main groups:

Basic ITAP operations: All these operations are basic, service independent, operations and are common for all applications using ITAP. These operations are specified in the following section.

Application dependent ITAP operations: Operations invoked by the IMS 1401 in order to remotely call a service application function in the SN 1409. Rules and restrictions for these functions are specified in a section below.

Basic ITAP Operations

The data types that are not specified in this document are specified in the sections below that describe Image Descriptions in greater detail.

-54-

```
         GENERAL
15       ITAP-Operations DEFINITIONS IMPLICIT TAGS ::=
         BEGIN
         IMPORTS
                   OPERATION, ERROR FROM Remote-Operations{joint-iso-ccitt
                   remote-operations(4) notation(0)}
20
                   ImageDescr FROM ITAP-Image-Description;
         EXPORTS
                   UnsignedByte, LongInt, ByteString, TextString, AddressInfo,
                   DateAndTime, Number, SMSString;
25
         OPERATIONS IN THE DIRECTION IMS --> SN
         Bind ::= OPERATION                           -- Timer m --
                   ARGUMENT
                        BindArg
30                 RESULT
                        BindResultArg
```

-55-

```
            ERRORS {
                    SystemFailure,
                    DataMissing,
                    UnexpectedDataValue,
5                   UnknownApplicationVersion,
                    BindReasonNotSupported,
                    SubscriptionViolation
                    }
    -- Binds the IMS to the SN
10  -- Class 1 operation Unbind ::= OPERATION
    -- Unbinds the IMS from the MSN
    -- Class 5 operation
15
    GetImageDescr ::= OPERATION             -- Timer m --
            ARGUMENT
                    GetImageDescrArg
            RESULT
20              GetImageDescrResultArg
            ERRORS {
                    SystemFailure,
                    DataMissing,
                    UnexpectedDataValue,
25                  AccessDenied,
                    UnknownImageDescr,
                    UnknownTerminalType
                    }
    -- Requests an image description from the MSN
30  -- Class 1 operation
```

-56-

OPERATIONS IN THE DIRECTION SN --> IMS

Alert ::= OPERATION
  ARGUMENT
   AlertArg
5  ERRORS {
   SystemFailure,
   DataMissing,
   UnexpectedDataValue
   }
10 -- Alerts the IMS about an event.
 -- Class 3 operation

ERRORS

AccessDenied ::= ERROR
15 -- This error code is returned when the SN cannot
 -- access the database BindReasonNotSupported ::= ERROR
 -- This error code is returned when a correct bind
20 -- reason is provided in the
 -- bind operation but the MSN does not provided
 -- any service for this specific bind reason.

DataMissing ::= ERROR
25 -- This error code is returned when data is
 -- missing, e.g. an optional parameter is missing.

SystemFailure ::= ERROR
 -- The task cannot be performed due to problem in
30 -- another entity.

-57-

```
UnexpectedDataValue::= ERROR
-- This error code is returned when the data value
-- is unexpected for an argument to an ITAP
-- operation.

UnknownApplicationVersion ::= ERROR
-- This error code is returned when the IMS binds
-- to an application version
-- that is not supported by the SN. This is only
-- applicable when the IMS does
-- not have support for ITAP image descriptions.
UnknownImageDescr ::= ERROR
-- This error code is returned when the requested
-- image description is undefined.

UnknownTerminalType ::= ERROR
-- This error code is returned when the terminal
-- type specified in the
-- getImageDescr operation is undefined.

SubscriptionViolation ::= ERROR
-- There is no valid subscription for the
-- subscriber.

PARAMETERS
                Argument Data Types
AlertArg ::= SEQUENCE {
          applicationVersion   [00] ApplicationVersion,
          selectedLanguage     [01] Language,
          serviceId            [02] ServiceId,
          alertTimer           [03] AlertTimer DEFAULT 30,
```

-58-

|  |  |  |  |
|---|---|---|---|
| aPartyInfo | [04] | AddressInfo | OPTIONAL, |
| bPartyInfo | [05] | AddressInfo | OPTIONAL, |
| textInfo | [06] | SMSString | OPTIONAL, |
| subService | [07] | SubService | OPTIONAL |

5 }

-- If the applicationVersion in the IMS is not equal to the
-- corresponding version in the Alert operation, then the
-- IMS replies with a Bind operation. The selectedLanguage
-- parameter indicates the language that is currently
10 -- selected for this subscriber. ServiceId defines the
-- alert reason. For terminals that have support for
-- image descriptions the serviceId is equal to the start
-- image that shall be displayed and evaluated. Alert timer
-- is invoked in the IMS upon reception of the Alert
15 -- operation. If the timer expires an Unbind operation is
-- sent to the service node. The timer is cleared when
-- the first ITAP operation is sent from the IMS.
-- APartyInfo and bPartyInfo can be used to transfer address
-- information about the a-party and b-party. TextInfo can
20 -- be used to send an arbitrary text string that can be
-- presented for the service user.
-- The subService is used to indicate which parts of the
-- application that is included in the subscription.

25 BindArg ::= SEQUENCE {
    applicationVersion  [00] ApplicationVersion,
    requestedLanguage  [01] Language,
    bindReason  [02] BindReason,
    supportOfImage  [03] supportOfImage DEFAULT TRUE
30 }

```
BindResultArg ::= SEQUENCE {
                applicationVersion      [00] ApplicationVersion,
                selectedLanguage        [01] Language,
                serviceId               [02] ServiceId,
5               clearImageCache         [03] ClearImageCache
                                             DEFAULT FALSE,
                imagesToClear           [04] SEQUENCE (SIZE(1..16)) OF
                                             ImageId OPTIONAL,
                aPartyInfo              [05] AddressInfo OPTIONAL,
10              bPartyInfo              [06] AddressInfo OPTIONAL,
                textInfo                [07] SMSString    OPTIONAL,
                subService              [08] SubService OPTIONAL,
                nameOfAppl              [09] SMSString    OPTIONAL,
                initSessionIncomingCall [10] BOOLEAN OPTIONAL,
15              initSessionCallWaiting  [11] BOOLEAN OPTIONAL
   }
   -- If MSN replies with a new applicationVersion, the IMS has
   -- to clear all or a part of the image descriptions stored
   -- in the cache. If clearImageCache is TRUE the image
20 -- descriptions defined by imagesToClear are cleared. If
   -- clearImageCache is TRUE and imagesToClear is not provided
   -- the entire cache shall be cleared. If the IMS does
   -- not support image descriptions and the application
   -- version for the IMS is not equal to the application
25 -- version in the service node, then the session is closed.
   -- IMS checks if it has image descriptions for the language
   -- that is supported (=selected) by the SN.
   -- Depending on the size of the IMS cache, it could be
   -- necessary to clear existing image descriptions in the IMS
30 -- in order to get space for the selected language image
   -- descriptions. The serviceId is equal to the start image
```

-60-

-- description that will be displayed and evaluated.

-- APartyInfo and bPartyInfo can be used to transfer address

-- information about the a-party and b-party.

-- TextInfo can be used to send an arbitrary text string

5  -- that can be presented for the service user.

-- nameOfAppl, initSessionIncomingCall or

-- initSessionCallWaiting is only returned when the bind

-- reason is "initSubsription" in the Bind invoke.

-- NameOfAppl is the name of the application. This text can

10  -- be used to present a menu on the local MMI for accessing

-- the application.

-- InitSessionIncomingCall/initSessionCallWaiting

-- indicates whether an ITAP session shall be established

-- when there is a new incoming call or call waiting

15  -- indication.

-- The subService is used to indicate which parts

-- of the application that is included in the subscription.

```
GetImageDescrArg ::= SEQUENCE {
20          imageId         [00]    ImageId,
            terminalType    [01]    TerminalType OPTIONAL
}

GetImageDescrResultArg ::= SEQUENCE {
25          imageDescr      [00]    ImageDescr
}
```

-- The requested image description is identified by the

-- image id and terminal type. If the terminal type is not

-- provided the service node selects an image description

30  -- from the default set.

-- If the service node supports different languages, then

-61-

-- the selected language during bind shall be used for

-- identifying the correct image description.

<u>Common Data Types</u>

```
Address ::= CHOICE{
            distributionList   [00]   DistributionListId,
            number             [01]   Number,
            x121address        [02]   Number,
            eMail              [03]   SMSString (SIZE(1..63)),
            restricted         [04]   NULL
}
```

-- Specifies possible address types. Restricted is used when

-- a-number presentation is restricted.

```
AddressInfo ::= SEQUENCE {
            address            Address,
            name               SMSString (SIZE(1..63)) OPTIONAL
}
```

-- Specifies the address and the name of the addressee.

```
AlertTimer ::= INTEGER (0..65535)
```

-- Specifies the IMS user idle time when an Alert has been

-- received.

```
ApplicationVersion ::= INTEGER (0..65535)
```

-- Version of the current application.

```
BindReason ::= ENUMERATED {
            incorrectApplicationVersion (0),
            incomingCall                 (1),
            callWaiting                  (2),
```

-62-

```
            userInitiatedSession    (3),
            initSubscription        (4)
}
```
-- Indicates the reason for Bind, e.g new incoming call,
-- wrong application version, user initiated session or
-- subscription management.

ByteString ::= OCTET STRING (SIZE(1..255))
-- Octet string

ClearImageCache ::= BOOLEAN
-- TRUE indicates that the whole or a part of the IMS image
-- cache should be cleared.

DateAndTime ::= OCTET STRING (SIZE(6))
-- YYMMDDHHSS, BCD coded
-- E.g. 1995-12-31, 12:15 is coded: 59 21 13 21 51 00

DistributionListId ::= INTEGER (0..15)
--Identity of distribution list.

ImageId ::= INTEGER (0..65535)
-- Unique identity of an IMS image associated with ITAP.

```
Language ::= ENUMERATED {
            german      (0),
            english     (1),
            italian     (2),
            french      (3),
            spanish     (4),
            dutch       (5),
```

-63-

|  | swedish | (6), |
|---|---|---|
|  | danish | (7), |
|  | portuguese | (8), |
|  | finnish | (9), |
|  | norwegian | (10), |
|  | greek | (11), |
|  | turkish | (12) |

}
-- Language selected for MS.

LongInt ::= INTEGER (-2147483647..2147483647)
-- Signed integer within the range -2147483647 to 2147483647

Number ::= TBCDString (SIZE (1..14))
-- A telephone number in BCD format.

ServiceId ::= INTEGER (0..65535)
-- Indicates the application that shall be started in the
-- IMS. If the IMS supports image descriptions, serviceId
-- defines the first image description that shall be
-- displayed and evaluated.

SMSString ::= OCTET STRING (SIZE(1..140))
-- A string coded according to the 7-bit SMS default
-- alphabet as specified in GSM 03.38.

SubService ::= OCTET STRING (SIZE(1..4))
-- A string indicating which service that are included in a
-- subscription. Bit 1 in the first octet indicates if the
-- first sub service is included, bit 2 in the first octet
-- indicates if the second sub service is included... It is

-64-

-- possible to have 32 different sub services.

-- The interpretation of the different bits is application -- specific and shall be defined together with the -- application specific operations.

SupportOfImage ::= BOOLEAN

--TRUE indicates that the IMS supports image descriptions

TBCDString ::= OCTET STRING (SIZE (1..64))
-- A packed digit string. Digits 0 to 9, *, #, a, b, c two -- digits per octet.
-- Each digit encoded as 0000 to 1001(0 to 9), 1010 (*),
-- 1011 (#) 1100 (a), 1101 (b) or 1110 (c). 1111 is used as
-- filler when there is an odd number of digits. First digit
-- is stored in bit 0 - 3 of the first octet.

TerminalType ::= SMSString (SIZE(1..31))
-- IMS terminal type, e.g "GH 338"

TextString ::= IA5String (SIZE(1..255))
-- Text string

UnsignedByte ::= INTEGER (0..255)
-- Unsigned integer within the range 0-255

OPERATION CODES

| | |
|---|---|
| bind Bind | ::= 1 |
| unbind Unbind | ::= 2 |
| getImageDescr GetImageDescr | ::= 3 |
| alert Alert | ::= 4 |

-65-

ERROR CODES

| | | |
|---|---|---|
| | accessDenied AccessDenied | ::= 1 |
| | bindReasonNotSupported BindReasonNotSupported | ::= 2 |
| | dataMissing DataMissing | ::= 3 |
| 5 | systemFailure SystemFailure | ::= 4 |
| | unexpectedDataValue UnexpectedDataValue | ::= 5 |
| | unknownApplicationVersion UnknownApplicationVersion | ::= 6 |
| | unknownImageDescr UnknownImageDescr | ::= 7 |
| | unknownTerminalType UnknownTerminalType | ::= 8 |
| 10 | subscriptionViolation SubscriptionViolation | ::= 9 |
| | END | |

RULES AND RESTRICTIONS FOR APPLICATION DEPENDENT ITAP OPERATIONS

15

1. These operations shall all be of ROSE class 1.
2. The structure of each operation specification is:

```
        MyOperation ::= OPERATION
20              ARGUMENT
                    MyArg RESULT
                    MyResultArg
25
                ERRORS {
                    MyError1
                    MyError2
                        .
30                      .
                        .
```

}

-- Description of MyOperation

3. The operation codes for the application dependent ITAP operations shall be within the range of 10 to 255 as operation codes 1 to 9 are reserved for the basic ITAP operations.

4. Each operation argument ("MyArg", "MyResultArg") shall always be specified as a SEQUENCE data type. This is also valid even if the argument contains only one element.

A limited number of data types shall be used for the elements in the operation arguments. The allowed data types are:

BOOLEAN,

UnsignedByte,

LongInt,

ByteString,

TextString,

AddressInfo,

DateAndTime,

Number,

SMSString

Each one of these data types could be used as a primitive data type or as a "SEQUENCE OF" data type.

It is not allowed to specify value range or sizes range of a specific element. If the value range or size range specified for the type of the element must be further decreased, this shall be indicated as a comment, not as ASN. 1 syntax. The reason for this is that if PER is used, the length field of a "sized element" contains the number of bits that is required for the maximum size. Also, the number of bits required for the value field of a certain "value element" depends on the maximum value specified. This makes the number of bits for the length field or the value field variable. Variable field lengths is difficult to handle by the PER encoder/decoder in the MS as it must be generic.

The tagging shall be:

Sequential (start with tag 0)

Context-specific

Implicit

Optional parameters shall be specified at the end of the operation argument.

DEFAULT is not allowed.

See the following example:

```
"
MyArg ::= SEQUENCE {
    par1 [00] BOOLEAN
    par2 [01] TextString
    par3 [02] SEQUENCE OF UnsignedByte OPTIONAL
}
-- Size of par2 is maximum 128.
-- par3 may have maximum 5 occurrences of
-- UnsignedByte
"
```

5. No parameters are allowed for the error types. The error codes shall be in the range of 20 to 255 as error codes 1–19 are reserved for the basic ITAP operations.

6. The application dependent ITAP operations shall be specified in a separate ASN.1 module. This module shall import the specification of the allowed data types from the basic ITAP ASN.1 module.

The focus of this description will now be on a more detailed description of image descriptions. The image descriptions mainly put requirements on suppliers of the IMS 1401, because from the point of view of the SN 1409, the image description is just a resource that needs to be loaded using the ITAP GetImageDescription operation.

The following specifications are made with ASN. 1 syntax. Data types that are not specified here were specified above in the sections discussing ITAP Operations.

SPECIFICATIONS

Image Descriptions, General Structure

-68-

```
        ITAP-Image-Description DEFINITIONS IMPLICIT TAGS ::=
        BEGIN
        IMPORTS
                        UnsignedByte, LongInt, ByteString, TextString,
25                      AddressInfo, DateAndTime, Number, SMSString FROM
                        ITAP-operations;
        EXPORTS
                        ImageDescr;
        ImageDescr ::= SEQUENCE {
30              --
                -- Image header string.
```

-69-

```
        header              [00]   SMSString  OPTIONAL,
        --
        -- Declaration of registers
        registerDeclarations [01]   SEQUENCE
                                        (SIZE(1..16)) OF
                                        RegisterDefinition
                                        OPTIONAL,
        --
        -- Actions that shall be executed when a logical
        -- function is invoked
        logicalFunctions    [02]   SEQUENCE (SIZE(1..7)) OF
                                        LogicalFunction
                                        OPTIONAL,
        --
        -- Action that shall be executed when the
        -- image description is entered.
        action              [03]   SEQUENCE (SIZE(1..32)) OF
                                        ActionItem OPTIONAL,
        --
        -- Build up rest image as a sequence of
        -- different MMI objects.
        imageObjects        [04]   SEQUENCE (SIZE(1..32)) OF
                                        ImageObject OPTIONAL
}
-- Main structure of an image description.
-- When an image description is activated, the IMS shall do
-- the following procedures:
-- 1.   Allocate memory for the declared registers.
-- 2.   Set up new definitions for the logical functions.
-- 3.   Execute the action. The action items are evaluated
--      in sequential order.  If a new image description
```

-70-

```
                    is activated in the action, the IMS shall fetch
                    the new image description and evaluate the new
                    image description, see step 1. An action can
                    never be interrupted. If the IMS receives events
 5                  during execution of an action, the event shall be
                    pending in an event queue. The action associated
                    with a pending event shall be executed when the
                    IMS is idle and fetching the next event from the
                    event queue.
10      -- 4.       Display the header.
        -- 5.       Display the image objects, including field and
                    list contents.
        -- 6.       Get next event. The IMS shall fetch next event
                    from the event queue. If there is no event, the
15                  IMS shall remain in idle mode and wait for the
                    next event. The events shall have the following
                    priority order, in decreasing priority order:
                            1. Indication and disconnect indication
                            2. Timeout
20                          3. User input.
        -- 7.       Upon reception of an event, execute the associated
                    action as described in step 3.

ImageObject ::= CHOICE {
25              list               [00]    SEQUENCE (SIZE(1..8)) OF ListEntry,
                textField          [01]    TextField,
                integerField       [02]    IntegerField,
                dateAndTimeField   [03]    DateAndTimeField,
                optionField        [04]    OptionField,
30              addressField       [05]    AddressField,
                numberField        [06]    NumberField,
```

-71-

```
            text        [08]    SMSString,
            newline     [09]    NULL,
            menu        [10]    SEQUENCE (SIZE(1..16)) OF
                                MenuOption,
5           icon        [11]    IconId
            }
```
-- An image object. There can only be one menu or list
-- objects within one image object.

10           REGISTER DATA TYPES

-- Registers are used to store data locally in the IMS. A
-- register is allocated when the image description that
-- defines the register becomes active, i.e. when
-- displayImage is executed locally in the IMS. Once the
15 -- register is allocated it remains allocated until the ITAP
-- session is ended or a new register is allocated with the
-- same identity. As long as the register is allocated it
-- shall be possible to refer to that register in other
-- image descriptions.
20

-- A register can be associated with a field or a list that
-- will display the contents of a register. Furthermore a
-- register can be associated with in- and outparameters to
-- local or remote functions. The register can either be a
25 -- vector register or register just containing one entry.
-- When the register is a vector it is possible to access an
-- entry in the vector by providing an vector index.

```
RegisterDeclaration ::= SEQUENCE {
30          identity    [00]    RegisterId,
            size        [01]    INTEGER (1..128) DEFAULT 1
```

-72-

```
          }
          -- The size parameter indicates whether the register is a
          -- vector or not. If the size is 1, the register shall be
          -- considered as a simple register.
5
          RegisterDefinition ::= CHOICE {
                          bool             [00]    RegisterDeclaration,
                          shortInt         [01]    RegisterDeclaration,
                          int              [02]    RegisterDeclaration,
10                        octetString      [03]    RegisterDeclaration,
                          text             [04]    RegisterDeclaration,
                          address          [05]    RegisterDeclaration,
                          dateAndTime      [06]    RegisterDeclaration,
                          number           [07]    RegisterDeclaration,
15                        smsString        [08]    RegisterDeclaration
          }
          -- The data type of the register is defined by the unique
          -- tag.

20        OneRegisterEntry ::= CHOICE {
                          simpleValue          [00]   RegisterId,
                          simpleValueInVector  [01]   OneRegisterEntryInVector
          }

25        -- Reference to a register entry. The reference can be a
          -- reference to register that is not a vector or a reference
          -- to an entry within a vector register. For a vector
          -- register the vector index must be provided as well.

30        OneRegisterEntryInVector ::= SEQUENCE {
                          registerId       [00]    RegisterId,
```

-73-

```
                    vectorIndex          VectorIndex
            }
            -- The OneRegisterEntryInVector is used to refer to an entry
            -- within a vector register.
 5
            RegisterId ::= INTEGER (0..255)
            -- Identity of a register.

VectorIndex ::= CHOICE {
10                  index              [00]       INTEGER (0..127),
                    selectedListRow    [01]       SelectedListRow,
                    simpleValue        [02]       RegisterId
            }
            -- A vector index can either be a fix value, selected list
15          -- row or integer value in a register. If the index is
            -- stored in a register the register must be of type LongInt -- or UnsignedByte. Note
            -- since vector index can be of selectedListRow, it is possible to design image
            -- descriptions where field contents is dependent of selected list row in a list object.
            -- Therefore the IMS must be able to update these fields when the service user is
20          -- scrolling a list object.

ACTION DATA TYPES
            -- Following terms are used for parameters:
            -- simpleValue, a value from a register that is not a vector. The value is identified by
25          -- just a register identity.
            -- Register id 1

-- simpleVector, values from a register that is a vector.
            --The entire vector will be passed as parameter. The vector is identified by a register
30          -- identity.
            -- Register id 1
```

-74-

-- simpleValueInVector, a value from a register entry within a register vector. The
-- value is identified by the register identity and a vector index.
-- Register id 1, vector index 3

```
5   ActionItem ::= CHOICE {
                  localFunction        [00]  LocalFunction,
                  remoteFunction       [01]  RemoteFunction,
                  displayImage         [02]  ImageId,
                  conditionalStatement [03]  ConditionalStatement,
10                labelStatement       [04]  Label,
                  endStatement         [05]  NULL
    }
```

-- Different items that can be combined to an action. "localFunction" defines a local
-- function that shall be executed in the IMS. "remoteFunction" defines a service node
15 -- functions that shall be executed.
-- The DisplayImage action item is used to display a new image description. When a
-- displayImage is executed, the evaluation of the current image discription shall be
-- interrupted and the new image description shall be displayed.
-- The conditionalStatement and labelStatement are related. The conditionalStatement
20 -- defines a logical expression that should be evaluated.
-- Depending on the result from the evaluation the conditionalStatement defines where
-- the execution shall continue by referring to one or two labelStatements. The
-- labelStatement is the actual point in the action where the execution shall continue.
-- The endStatement indicates that the execution of an action shall be stopped
25 -- immediately.

-75-

```
ConditionalStatement ::= SEQUENCE {
            expression              [00]    Expression,
            trueLabel               [01]    Label OPTIONAL,
            falseLabel              [02]    Label OPTIONAL
    }
```
-- Specifies a conditional statement. The expression defines that expression that shall
-- be evaluated. True and false label defines the identity of the label where the
-- execution shall continue. The refereed label must be defined within the same action.
-- At least one of the parameters trueLabel and falseLabel must be defined. If one of
-- the parameters is omitted, the execution will continue at the next actionItem for the
-- corresponding label.

```
Expression ::= SEQUENCE {
            parameter               [00]    SEQUENCE (SIZE(1..2)) OF
                                            ExpressionParameter,
            operator                [01]    Operator OPTIONAL
    }
```
-- Specifies a expression that shall be evaluated. The expression shall be evaluated
-- from left to right ("firstParameter" "operator" "secondParameter"). The first and
-- second parameter must always be of the same type with the following exceptions:
-- UnsignedByte can be evaluated with an INTEGER and a TextString can be
-- evaluated with a SMSString. The secondParameter and operator can be omitted if
-- the firstParameter is of type BOOLEAN.

```
     ExpressionParameter ::= CHOICE {
                 bool                  [00]    BOOLEAN,
                 shorInt               [01]    Unsignedbyte,
                 int                   [02]    LongInt,
5                octetString           [03]    ByteString,
                 text                  [04]    TextString,
                 address               [05]    AddressInfo,
                 dateAndTime           [06]    DateAndTime,
                 number                [07]    Number,
10               smsString             [08]    SMSString,
                 simpleValue           [09]    RegisterId,
                 simpleValueInVector   [10]    OneRegisterEntryInVector,
                 selectedListRow       [11]    SelectedListRow
     }
15   -- Specifies a parameter to an expression. The parameter could be:
     -- a fixed value
     -- a simple register value
     -- a simple value within a vector
     -- a selected list row
20
```

```
         InParameter ::= CHOICE {
                      bool                   [00]  BOOLEAN,
                      vectorOfBool           [01]  SEQUENCE OF BOOLEAN,
                      shorInt                [02]  UnsignedByte,
 5                    vectorOfShorInt        [03]  SEQUENCE OF UnsignedByte,
                      int                    [04]  LongInt,
                      vectorOfInt            [05]  SEQUENCE OF LongInt,
                      octetString            [06]  ByteString,
                      vectorOfOctetString    [07]  SEQUENCE OF ByteString,
10                    text                   [08]  TextString,
                      vectorOfText           [09]  SEQUENCE OF TextString,
                      address                [10]  AddressInfo,
                      vectorOfAddress        [11]  SEQUENCE OF AddressInfo,
                      dateAndTime            [12]  DateAndTime,
15                    vectorOfdateAndTime    [13]  SEQUENCE OF DateAndTime,
                      number                 [14]  Number,
                      vectorOfNumber         [15]  SEQUENCE OF Number,
                      smsString              [16]  SMSString,
                      vectorOfSMSString      [17]  SEQUENCE OF SMSString,
20                    simpleValue            [18]  RegisterId,
                      simpleVector           [19]  RegisterId,
                      simpleValueInVector    [20]  OneRegisterEntryInVector,
                      selectedListRow        [21]  SelectedListRow,
                      noValue                [22]  NULL
25       }
```

-78-

-- Specifies an inparameter to a function call. The inparameter could be:

-- a fixed value or a sequence of fixed values.

-- a simple register value

-- a register which is a vector

5  -- a simple value within a vector

-- a selected list row

-- a no value. Used for optional parameters.

Label ::= INTEGER (0..255)

10  -- Defines the identity of a label. The execution can only be transferred to a label -- within the same action.

```
LocalFunction ::= SEQUENCE {
                msFunctionId     [00]   MsFunctionId,
                inParameterList  [01]   SEQUENCE
                                        (SIZE(1.. maxNoOfParameters)) OF
                                        InParameter OPTIONAL,
                outParameterList [02]   SEQUENCE
                                        (SIZE(1.. maxNoOfParameters)) OF
                                        OutParameter OPTIONAL,
                errorCode        [03]   RegisterId OPTIONAL,
                errorLabel       [04]   Label OPTIONAL
}
```

-- Specifies a call to a local function from an image description.

25  -- If a fatal error occurs and the function could not be executed the execution will be -- transferred to the error label. If no error label is provided and a fatal error occurs, -- fatal error handling shall be that the ITAP session is terminated with the ITAP -- operation Unbind.

```
MsFunctionId ::= ENUMERATED {
            displayErrorMessage        (0),
            storeSessionInitiatedParam (1),
            setMenuEntryStatus         (2), addRegisterEntry           (3),
            insertRegisterEntry        (4),
            removeRegisterEntry        (5),
            searchRegister             (6),
            sortRegister               (7),
            mergeRegister              (8)
            clearRegister              (9),
            setRegister                (10),
            incrementRegister          (11),
            decrementRegister          (12),
            copyRegister               (13), executeOptionNo            (14),
            exitITAPControl            (15),
            startNewITAPSession        (16),
            startTimer                 (17),
            stopTimer                  (18), acceptIncomingCall         (19),
            disconnectCall             (20),
            setUpCall                  (21),
            callHold                   (22),
            callActive                 (23),
            multiParty                 (24),
            removeCallFromMultiParty   (25),
            callTransfer               (26),
```

-80-

```
            sendDTMF              (27),
            setDTMFMode           (28), enquirySM             (29),
            sendSM                (30),
            replySM               (31),
            getSM                 (32)
            deleteSM              (33),
            commandSM             (34), generateIndication    (35),
            stopIndication        (36),
            displayIndication     (37),
            removeDisplayIndication (38),
            setStatusLine         (39), enquiryByAddress      (40),
            addAddressBookEntry   (41)
            updateAddressBookEntry (42),
            removeAddressBookEntry (43)
}
```

-- Unique identity of a function in the IMS:

maxNoOfParameters INTEGER ::= 16
-- Max number of in and out parameters.

OperationCode ::= INTEGER (10..255)
-- Defines the function that shall be executed in the SN.

-81-

```
     Operator ::= ENUMERATED {
                lessThan           (0),
                greaterThan        (1),
                lessOrEqual        (2),
5               greaterOrEqual     (3),
                equal              (4),
                notEqual           (5),
                logicalAnd         (6),
                logicalOr          (7),
10              logicalExlusiveOr  (8)
     }
```

-- All possible operators. The operators are specified in decreasing
-- precedence, i.e. logicalOr has lower precedence than logicalAnd.

```
15   OutParameter ::= CHOICE {
                simpleValue         [00]   RegisterId,
                simpleVector        [01]   RegisterId,
                simpleValueInVector [02]   OneRegisterEntryInVector,
     }
20   -- Specifies an outparameter to a function call. The outparameter could be:
     -- a simple register value
     -- a register which is a vector
     -- a simple value within a vector
```

-82-

```
RemoteFunction ::= SEQUENCE {
            operationCode      [00]   OperationCode,
            inParameterList    [01]   SEQUENCE
                                      (SIZE(1.. maxNoOfParameters)) OF
                                      InParameter OPTIONAL,
            noOfOptionalInPar  [02]   INTEGER (0.. maxNoOfParameters)
                                      DEFAULT 0,
            outParameterList   [03]   SEQUENCE
                                      (SIZE(1.. maxNoOfParameters)) OF
                                      OutParameter OPTIONAL,
            noOfOptionalOutPar [04]   INTEGER (0.. maxNoOfParameters)
                                      DEFAULT 0,
            errorCode          [05]   RegisterId OPTIONAL,
            errorLabel         [06]   Label OPTIONAL,
            timeOut            [07]   TimeOut     DEFAULT 30
}
```

-- Specifies a call to a remote function from an image description.
-- Number of optional parameters must be specified so the IMS knows how the
-- remote operation shall be encoded/decode. Timeout specifies the number of
-- seconds before there shall be response on an outstanding request. If no response is
-- received within the specified time, the signalling connection will be closed. If a
-- fatal error occurs and the function could not be executed, the execution will be
-- transferred to the error label. If no error label is provided and a fatal error occurs,
-- fatal error handling shall be that the ITAP session is terminated with the ITAP
-- operation Unbind.

TimeOut ::= INTEGER (0..65535)
-- Defines the timeout time in number of seconds.

MENU DATA TYPES

IconId ::= INTEGER (0..65535)

-83-

-- Identity on graphical resource stored locally in the IMS. Icons can only be used on
-- graphical IMS. The resource associated with a certain IconId is defined by the
--terminal supplier.

```
5       MenuOption ::=      SEQUENCE {
                optionText          [00]    SEQUENCE (SIZE(1..4)) OF OptionTextItem,
                action              [01]    SEQUENCE (SIZE(1..32)) OF ActionItem,
                icon                [02]    IconId      OPTIONAL,
                subServiceStatus    [03]    INTEGER (1..32) OPTIONAL
10      }
```
-- Specifies one row (option) in a menu, i.e what will be displayed and the functions
-- to call when the option is selected. It is up to the IMS to decide how the menu is
-- presented to the user. The "icon" parameter refers to a local icon stored in the
-- IMS. The icon parameter is only applicable for graphical terminals.
15  -- SubServiceStatus indicates if the menu option shall be displayed or not. If the
-- service is not included in the subscription, the menu option will always be disabled.

```
        OptionTextItem ::= CHOICE {
                plainText           [00]    SMSString,
20              textField           [01]    TextField,      -- Note: Only output field
                integerField        [02]    IntegerField,   -- Note: Only output field
                addressField        [03]    AddressField,   -- Note: Only output field
                dateAndTimeField    [04]    DateAndTimeField -- Note: Only output
                                                             -- field
25      }
```
-- The text of each option row could consists of a sequence of these items. It
-- is up to the IMS to decide how the option text is formatted on the display.

30              LIST DATA TYPES
```
        ListEntry ::= SEQUENCE {
```

-84-

|   | register | [00] | RegisterId, |   |
|---|---|---|---|---|
|   | selectedRegister | [01] | RegisterId, |   |
|   | possibleSelections | [02] | INTEGER DEFAULT 1, |   |
|   | length | [03] | INTEGER (1..64) DEFAULT 12, |   |
| 5 | conversionList | [04] | SEQUENCE (SIZE(1..16)) OF | |
|   |   |   | ConversionItem | OPTIONAL |

}

-- Specifies each entry in a list row. The referenced register contains the data to be
-- included in each row of the list. "length" defines the length of each entry and
10  -- conversion defines an alternative presentation, e.g. the INTEGER 1 shall be
-- presented as the text string "YES". For presentation of address information same
-- rules are valid as for address fields, see section entitled "INPUT/OUTPUT FIELD
-- DATA TYPES".
-- SelectedRegister contains the value of the rows that has been selected in the list. If
15  -- one row has been selected the selectedRegister will contain one entry. If two rows
-- has been selected the register will contain 2 entries. If no selection has been done,
-- the register will be empty. Number of possible selections are defined by
possibleSelections parameter.

20  ConversionItem ::= SEQUENCE {

|   | text | [00] | SMSString, |   |
|---|---|---|---|---|
|   | value |   | GenericITAPTypes, |   |
|   | icon | [02] | IconId | OPTIONAL |

}

25  -- Specifies a conversion from a value to a text string. An icon
-- can be associated with the conversion for graphical terminals.

-85-

```
        GenericITAPTypes ::= CHOICE {
                        bool                    [00]    BOOLEAN,
                        shorInt                 [01]    Unsignedbyte,
                        int                     [02]    LongInt,
 5                      octetString             [03]    ByteString,
                        text                    [04]    TextString,
                        address                 [05]    AddressInfo,
                        dateAndTime             [06]    DateAndTime,
                        number                  [07]    Number,
10                      smsString               [08]    SMSString,
        }
        -- ITAP basic data types.

SelectedListRow ::= NULL
15      -- This type specifies the selected list row. IMS calculates this value. First list row
        -- has number 0

INPUT/OUTPUT FIELD DATA TYPES
        AddressField ::= SEQUENCE {
20                      register                        OneRegisterEntry,
                        labelText               [01]    SMSString OPTIONAL,
                        length                  [02]    INTEGER (1..64) DEFAULT 16,
                        inputField              [03]    BOOLEAN DEFAULT TRUE,
                        typeOfAddress           [04]    TypeOfAddress DEFAULT number
25      }
```

-86-

-- Specifies an address output or input/output field. The register is of type
-- AddressInfo or Number. The following rules are defined for the presentation
-- of a register that is of type AddressInfo:
-- 1. If a-address is available, the IMS shall search for the address in the local
---    address book and display the name found in the address book.
-- 2. If name is provided by the network and the entry is not found in the local
--     address book, the name provided by the network shall be displayed.
-- 3. If name is not available but the address is available, the address shall be
--     displayed.
-- The subscriber shall have the possibility to toggle between the name and
-- the address.
-- Register of type Number shall always be displayed as a number.

```
IntegerField ::= SEQUENCE {
        register                OneRegisterEntry,
        labelText       [01]    SMSString OPTIONAL,
        min             [02]    LongInt      DEFAULT 0,
        max             [03]    LongInt      DEFAULT 65535,
        inputField      [04]    BOOLEAN DEFAULT TRUE
}
```

-- Specifies an integer output or input/output field. The register is of some
-- type of signed or unsigned integer type.

```
NumberField ::= SEQUENCE {
        register                OneRegisterEntry,
        labelText       [01]    SMSString OPTIONAL,
        length          [02]    INTEGER (1..28) DEFAULT 12,
        inputField      [03]    BOOLEAN DEFAULT TRUE
}
```

-87-

-- Specifies a Number output or input/output field. The register
-- is of type Number.

```
     OptionField ::= SEQUENCE {
5            register                        OptionRegister,
             selectionList          [01]     SEQUENCE (SIZE(1..16)) OF
                                             ConversionItem,
             labelText              [02]     SMSString OPTIONAL,
             moreThanOneAllowed     [03]     BOOLEAN DEFAULT FALSE
10   }
```

-- Specifies a general selection input/output field. The IMS can present this as
-- a menu, as check boxes, as radio buttons, as a selection field, as
-- softkeys etc. When a selection is done, the register contains the value
-- specified by the ConversionItem. If "moreThanOneAllowed" is FALSE the
15 -- register will always contain one value, i.e. the service user must make one
-- selection. If "moreThanOneAllowed" is true, the first selected item value is
-- stored in index 0 of the register, the second selected item value is stored in
-- index 1 etc. If there is no selections the register will be empty.

```
20   OptionRegister ::= CHOICE {
             simpleValue            [00]     RegisterId,
             simpleValueInVector    [01]     OneRegisterEntryInVector,
             simpleVector           [02]     RegisterId
     }
```
25 -- Specifies a register associated with a option field. The register can be:
-- a simple register
-- an element within a register vector
-- an register vector

-88-

```
       TextField ::= SEQUENCE {
                   register            OneRegisterEntry,
                   labelText     [01]  SMSString OPTIONAL,
                   lengthPerLine [02]  INTEGER (1..128) DEFAULT 12,
5                  noOfLines     [03]  INTEGER (1..32)   DEFAULT 1,
                   inputField    [04]  BOOLEAN DEFAULT TRUE,
                   passwdField   [05]  BOOLEAN DEFAULT FALSE
       }
       -- Specifies a text output or input/output field. The register is of type
10     -- textString.

DateAndTimeField ::= SEQUENCE {
                   register            OneRegisterEntry,
                   labelText     [01]  SMSString OPTIONAL,
15                 inputField    [02]  BOOLEAN DEFAULT TRUE
       }
       -- Specifies date and time output or input/output field. The register is of type
       -- DateAndTime. It is up to the IMS to present the time stamp in a suitable
       -- way.
20
                   LOGICAL FUNCTION TYPES
       LogicalFunction ::= CHOICE {
                   accept        [00]  LogicalFunctionDefinition,
                   select        [01]  LogicalFunctionDefinition,
25                 send          [02]  LogicalFunctionDefinition,
                   indication    [03]  LogicalFunctionDefinition,
                   end           [04]  LogicalFunctionDefinition,
                   disconnect    [05]  LogicalFunctionDefinition
                   timeout       [06]  LogicalFunctionDefinition
30     }
```

-89-

```
-- Logical functions 0 - 4 is specified by GSM 2.30.  Disconnect specifies the
-- action that shall be executed when the connection is disconnected.  Timeout
-- specifies an action that shall be executed if the timer expires which is
-- started with the IMS function startTimer.  The logical functions overrides the
-- standard functionality in the IMS.  If there is no action associated with a
-- logical function, standard functionality shall be provided by the IMS.

LogicalFunctionDefinition ::= SEQUENCE {
            temporaryDefinition  [00]      BOOLEAN DEFAULT TRUE,
            action               [01]      SEQUENCE (SIZE(1..32)) OF
                                           ActionItem
}
-- Specifies which functions to call when a standard GSM logical function
-- is executed.  The definition can be temporary and just valid when the
-- current image description is active or valid during the entire ITAP session.

COMMON DATA TYPES
TypeOfAddress ::= ENUMERATED {
            distributionList      (0),
            number                (1),
            X.121Address          (2),
            e-mail                (3)
}
-- Type of addresses

END
```

Specification of Local IMS Functions

General

In an image description a call to a local IMS function is specified by the data type "LocalFunction". Included in this data type is an optional "errorLabel". It is, through this "errorLabel", possible to specify actions that are executed when a fatal error occurs. However, if no "errorLabel" is included in the function call, then a default error handling takes place. For all IMS functions default fatal error handling will be that the ITAP session is terminated with the ITAP operation Unbind.

Functions for Manipulating Image Descriptions and Image Description Objects displayErrorMessage Displays an error message on the screen.

| Inparameters: | | |
|---|---|---|
| Name | Type | Description |
| errorMessage | TextString (SIZE(1. .40)) | Error message |

Outparameters:
—

Errors:
— storeSessionInitiatedParam

Stores the text information, a-party and b-party address information received from SN with Alert request or Bind result in a sequence of registers. The function should be called from the image description that has the same number as the serviceId in the Alert or Bind response operation.

| Inparameters: | | |
|---|---|---|
| Name | Type | Description |
| textInfo | UnsignedByte | A register identity where the text information of the Alert request or Bind result parameters is stored. |
| APartyInfo | UnsignedByte | A register identity where the a-party information of the Alert request or Bind result parameters is stored. |
| BPartyInfo | UnsignedByte | A register identity where the b-party information of the Alert request or Bind result parameters is stored. |

Outparameters:
—

| Errors: | |
|---|---|
| Description | Code |
| The function is called from an image that is not associated with Alert or Bind response. | 1 |
| A referenced register is not defined or there is a type mismatch between the Alert or Bind response parameter and the register. | 2 | setMenuEntryStatus

Sets the status of a menu entry. The menu entry status can be "enabled" or "disabled". If the status is disabled, the menu entry shall not be presented for the service user. The default status is enabled.

| Inparameters: | | |
|---|---|---|
| Name | Type | Description |
| menuEntry | UnsignedByte | The number of the menu entry. The entry can be in the range of 1–16. |
| EnabledEntry | BOOLEAN | If TRUE the entry will be enabled. If FALSE the entry will be disabled. |

Outparameters:
—

| Errors: | |
|---|---|
| Description | Code |
| Menu entry is out of range. | 1 | addRegisterEntry

Adds an item to a vector register. It is possible to add the item in start of vector, end of vector or in sort order. The function returns the index where the item was inserted. The entries with higher index than the inserted index, are moved to one index higher. If the vector is filled with entries and insert mode is start of vector or in sort order, the last entry shall be removed and the new item shall be inserted. If the vector is filled and insert mode is end of vector, an error shall be returned indicating that the maximum number of entries has been exceeded. Note: insert mode "in sort order" is only possible to use for sorted vectors.

| Inparameters: | | |
|---|---|---|
| Name | Type | Description |
| registerId | UnsignedByte | Register identity. |
| newItem | GenericITAPTypes | Item that shall be inserted. |
| insertMode | UnsignedByte | 0 = Start of vector<br>1 = End of vector<br>2 = In sort order of vector |

Outparameters:

Name Type Description index UnsignedByte Index where the item was inserted.

| Errors: | |
|---|---|
| Description | Code |
| A referenced register is not defined or is not a vector. | 1 |
| The value to set is of another type than the register | 2 |
| Undefined insert mode | 3 |
| Max number of entries exceeded | 4 | insertRegisterEntry

Inserts an entry in a vector register. The entries with higher index than the inserted index, are moved to one index higher. If the vector is filled with entries, the last entry shall be removed and the new entry shall be inserted.

Inparameters:

| Name | Type | Description |
|---|---|---|
| registerId | UnsignedByte | Register identity. |
| newItem | GenericITAPTypes | Item that shall be inserted. |
| index | UnsignedByte | Index where the item shall be inserted. |

Outparameters:

—

Errors:

| Description | Code |
|---|---|
| A referenced register is not defined or is not a vector. | 1 |
| The value to set is of another type than the register | 2 |
| Index out of range | 3 | removeRegisterEntry

Removes an entry in a sequence of vector registers. The entries with higher index than the removed index, are moved to one index lower, in order to fill out the gap.

Inparameters:

| Name | Type | Description |
|---|---|---|
| registerList | SEQUENCE (SIZE(1..8)) OF UnsignedByte | A list of vector register identities. |
| index | UnsignedByte | Index of entry to be removed. |

Outparameters:

—

Errors:

| Description | Code |
|---|---|
| A referenced register is not defined or is not a vector. | 1 |
| Index out of range. | 2 | searchRegister

Searches an item in a vector register. Returns the index of the first entry that matches the search item. The register may not be sorted so the function must search the entire register for a matching item.

Inparameters:

| Name | Type | Description |
|---|---|---|
| registerId | UnsignedByte | Vector register identity. |
| searchItem | GenericITAPTypes | Item to search for. |
| startIndex | UnsignedByte | Index in vector where to start searching. |

Outparameters:

| Name | Type | Description |
|---|---|---|
| index | UnsignedByte | Index to item if it is found. |

-continued

Errors:

| Description | Code |
|---|---|
| A referenced register is not defined or is not a vector. | 1 |
| Item was not found in register. | 2 | sortRegister

Sorts a vector register and an additional list of vector registers. Input to the function is the registers that shall be sorted.

Inparameters:

| Name | Type | Description |
|---|---|---|
| sortRegister | SEQUENCE (SIZE(1..8)) OF UnsignedByte | A list of vector register which should be sorted. The first register in the sequence will be used to define the sort order. |
| ascending | BOOLEAN | TRUE if registers should be sorted in ascending order. |

Outparameters:

—

Errors:

| Description | Code |
|---|---|
| A referenced register is not defined or is not a vector. | 1 | mergeRegister

Merges two vector registers. Both registers must be of the same type. The result register will get the same id as registerId1.

Inparameters:

| Name | Type | Description |
|---|---|---|
| registerId1 | UnsignedByte | Identity of first vector register and identity of result register. |
| registerId2 | UnsignedByte | Identity of second vector register. |

Outparameters:

—

Errors:

| Description | Code |
|---|---|
| A referenced register is not defined or is not a vector. | 1 |
| The registers are of different types. | 2 | clearRegister

Clears a sequence of vector registers or simple registers.

Inparameters:

| Name | Type | Description |
|---|---|---|
| registerList | SEQUENCE (SIZE(1..8)) OF UnsignedByte | A list of registers to be cleared. |

-continued

Outparameters:

—

Errors:

| Description | Code |
|---|---|
| A referenced register is not defined. The status of the registers are undefined. | 1 | setRegister

Sets a value in a simple register or a range of entries in a vector register. The value to set must be of the same type as the register.

Inparameters:

| Name | Type | Description |
|---|---|---|
| registerId | UnsignedByte | Identity of register. |
| Value | GenericITAPTypes | Value to set. |
| start index | UnsignedByte | Start index of range that should be set. If the register is a not vector start and end index are not used. |
| end index | UnsignedByte | End index of range that should be set. |

Outparameters:

—

Errors:

| Description | Code |
|---|---|
| A referenced register is not defined or is not a vector. | 1 |
| The value to set is of another type than the register. | 2 | incrementRegister

Increments the value of a register entry. The register must be of type LongInt or UnsignedByte.

Inparameters:

| Name | Type | Description |
|---|---|---|
| registerId | UnsignedByte | Identity of register. |
| value | LongInt | Value that the register shall be incremented with. |
| index | UnsignedByte | Index in vector register. Only used if the register is a vector. |

Outparameters:

—

Errors:

| Description | Code |
|---|---|
| A referenced register is not defined or is not a vector. | 1 |
| The wrong type of register | 2 | decrementRegister

Decrements the value of a register entry. The register must be of type LongInt or UnsignedByte.

Inparameters:

| Name | Type | Description |
|---|---|---|
| registerId | UnsignedByte | Identity of register. |
| value | LongInt | Value that the register shall be decremented with. |
| index | UnsignedByte | Index in vector register. Only used if the register is a vector. |

Outparameters:

—

Errors:

| Description | Code |
|---|---|
| A referenced register is not defined or is not a vector. | 1 |
| The wrong type of register | 2 | copyRegister

Copies the contents of one register to another register. Both registers must be of the same type and can be simple registers or vector registers. If the registers are vectors, then the whole vector is copied.

Inparameters:

| Name | Type | Description |
|---|---|---|
| originating RegisterId | UnsignedByte | Identity of the register to copy from. |
| destination RegisterId | UnsignedByte | Identity of the destination register. |

Outparameters:

—

Errors:

| Description | Code |
|---|---|
| A referenced register is not defined. | 1 |
| The two registers are of different types or one is vector and the other not. | 2 | executeOptionNo

Executes the actions, specified for the selected menu option in a menu that is presented in this image.

Inparameters:

| Name | Type | Description |
|---|---|---|
| optionNo | UnsignedByte | Selected option |

Outparameters:

—

Errors:

| Description | Code |
|---|---|
| The image description where this function call is performed, don't have any menu object. | 1 |
| The selected menu option number is illegal. | 2 | exitItapControl

Returns control to the basic part of the IMS. Unbind is sent to SN.

|                          Inparameters:                          |
| :--- |
| — |
| Outparameters: |
| — |
| Errors: |
| — | startNewITAPSession

Starts a new ITAP session. Bind, with a new session id, will be sent to the SN. The capabilities of the bearer determines if the already running ITAP session will be temporarily interrupted, or if it will continue to run in parallel with the new ITAP session.

| Inparameters: | | |
| :--- | :--- | :--- |
| Name | Type | Description |
| bindReason | UnsignedByte | Reason for establishing a new session. |
| Outparameters: | | |
| — | | |
| Errors: | | |
| Description | | Code |
| No response on the Bind request is received from the SN. | | 1 | startTimer

Starts a timer. If the timer expires the action defined for the logical function timeout will be executed. The timer can be cleared with the stopTimer function. It is only possible to start one timer.

| Inparameters: | | |
| :--- | :--- | :--- |
| Name | Type | Description |
| time | LongInt | Timeout in seconds |
| Outparameters: | | |
| — | | |
| Errors: | | |
| Description | | Code |
| Timer already activated. | | 1 | stopTimer

Stops a timer. Clears the timer that has been started with startTimer.

| Inparameters: |
| :--- |
| — |
| Outparameters: |
| — |

-continued

| Errors: | |
| :--- | :--- |
| Description | Code |
| Timer is not activated | 1 |

Call Related Functions acceptIncomingCall

Accepts a call that has been indicated in the IMS or sets the IMS in a mode so the next incoming call will be accepted.

There are no error responses from this function. The function will return immediately with a call id. The call identity is always greater than or equal to 1.

| Inparameters: | | |
| :--- | :--- | :--- |
| — | | |
| Outparameters: | | |
| Name | Type | Description |
| callId | UnsignedByte | Identity of call |
| Errors: | | |
| Description | | Code |
| Call not accepted due to system failure. | | 1 | disconnectCall

Disconnects a call or multi party.

| Inparameters: | | |
| :--- | :--- | :--- |
| Name | Type | Description |
| callId | UnsignedByte | Identity of call or multi party. |
| Outparameters: | | |
| — | | |
| Errors: | | |
| Description | | Code |
| Illegal call identity | | 1 | setUpCall

Sets up call to another party. Function immediately returns with call identity.

| Name | Type | Description |
| :--- | :--- | :--- |
| Inparameters: | | |
| bNumber | AddressInfo | Called party number. |
| Outparameters: | | |
| callId | UnsignedByte | Identity of call |

Functions for Accessing GSM Supplementary Services callHold

Puts an active call or multi party on hold. If there is already a call on hold, that call becomes active and the identity of that call is returned. If there is no call on hold, callId 0 is returned.

Inparameters:
—

Outparameters:

| Name | Type | Description |
|---|---|---|
| callId | UnsignedByte | Identity of call that was on hold and becomes active. |
| ActiveCall | BOOLEAN | TRUE if the call on hold change state to active. If there is no call on hold that can change state to active, FALSE is returned. |

Errors:

| Description | Code |
|---|---|
| Call not put on hold due to system failure. | 1 | callActive

Makes a held call or multi party active.

Inparameters:
—

Outparameters:

| Name | Type | Description |
|---|---|---|
| callId | UnsignedByte | Identity of call that was on hold and becomes active. |

Errors:

| Description | Code |
|---|---|
| No call on hold. | 1 | multiParty

Sets up a conference call. The active call and the call on hold are joined in a multi party and the served mobile subscriber and the remote parties can all communicate with each other. The function returns the id of the multi party.

Inparameters:
—

Outparameters:

| Name | Type | Description |
|---|---|---|
| multiPartId | UnsignedByte | Identity of the multi party |

Errors:

| Description | Code |
|---|---|
| Illegal bNumber. | 1 |

Errors:

| Description | Code |
|---|---|
| No active call | 1 |
| No call on hold | 2 | removeCallFromMultiParty

Removes a call from a multi party. The removed call becomes active and the multi party call is put on hold.

Inparameters:

| Name | Type | Description |
|---|---|---|
| multiPartId | UnsignedByte | identity of the multi party |
| callId | UnsignedByte | Identity of call that shall be removed from the multi party |

Outparameters:
—

Errors:

| Description | Code |
|---|---|
| Illegal multi party identity | 1 |
| Illegal call identity | 2 | callTransfer

Transfers a call to another party.

Inparameters:

| Name | Type | Description |
|---|---|---|
| callId | UnsignedByte | Identity of call |
| newDest | AddressInfo | New destination for call. |

Outparameters:
—

Errors:

| Description | Code |
|---|---|
| Illegal call identity | 1 |
| Illegal new destination. | 2 |

Functions for Handling DTMF sendDTMF

Sends a string of DTMF digits on the active call connection.

Inparameters:

| Name | Type | Description |
|---|---|---|
| DTMFString | Number | String of DTMF digits | setDTMFMode

Sets DTMF mode to on or off.

Inparameters:

| Name | Type | Description |
|---|---|---|
| DTMFOn | BOOLEAN | TRUE means DTMF is on. |

Outparameters:

—

Errors:

—

Functions for Handling SMS enquirySM

Enquiry regarding short messages stored in the MS-TE or SIM.

Inparameters:

| Name | Type | Description |
|---|---|---|
| selectedMedia | UnsignedByte | Selected media: |
| | | 0 = TE |
| | | 1 = SIM |
| | | 2 = all |
| selectedStatus | UnsignedByte | Selected status: |
| | | 0 = New |
| | | 1 = Old |
| | | 2 = Saved |
| | | 3 = all |

Outparameters:

| Name | Type | Description |
|---|---|---|
| timeStamp | SEQUENCE OF DateAndTime | States time stamp of the short message. |
| medias | SEQUENCE OF | Media: |
| | UnsignedByte | 0 = TE |
| | | 1 = SIM |
| status | SEQUENCE OF | Status: |
| | UnsignedByte | 0 = New |
| | | 1 = Old |
| | | 2 = Saved |
| messageId | SEQUENCE OF LongInt | Identity of the message. |
| originator | SEQUENCE OF AddressInfo | Address and name of the originator of the message. |

Errors:

| Description | Code |
|---|---|
| Access denied | 10 | sendSM

Sends a short message. The function uses the default values stored in the IMS for other parameters take can be provided for mobile originated SM, e.g. replay path, protocol identifier or service centre address.

Inparameters:

| Name | Type | Description |
|---|---|---|
| textString | SMSString | A text string to be sent. |
| Recipient | AddressInfo | Address and name of the receiver of the message. |
| protocol-Identifier | UnsignedByte | Protocol identifier that refers to higher layer protocol or indicates interworking with a certain type of telematic device. The value is specified in GSM 03.40 (TP-PID). |

Outparameters:

| Name | Type | Description |
|---|---|---|
| messageReference | UnsignedByte | Message reference gives a reference number of the submitted message, see GSM 03.40 (TP-MR) |

Errors:

| Description | Code |
|---|---|
| Illegal receiver destination. | 1 |
| Illegal protocol identifier | 2 | replySM

Reply to a received short message. This function checks whether the reply path is requested in the original short message. If reply path is requested the service centre address in the original short message shall be used in the reply message. If reply path is not request the default service centre address shall be used. The recipient address is always fetched from the original message.

Inparameters:

| Name | Type | Description |
|---|---|---|
| textString | SMSString | A text string to be sent. |
| MessageId | LongInt | Identity of the replied message. |

Outparameters:

| Name | Type | Description |
|---|---|---|
| messageReference | UnsignedByte | Message reference gives a reference number of the submitted message, see GSM 03.40 (TP-MR) |

-continued

Errors:

| Description | Code |
|---|---|
| Illegal message identity | 1 |
| Illegal protocol identifier | 2 | getSM

Gets a short message.

Inparameters:

| Name | Type | Description |
|---|---|---|
| messageId | LongInt | Identity of the message. |

Outparameters:

| Name | Type | Description |
|---|---|---|
| textString | SMSString | Received text string. |

Errors:

| Description | Code |
|---|---|
| Access denied | 1 |
| Illegal messageId. | 2 | deleteSM

Deletes a short message.

Inparameters:

| Name | Type | Description |
|---|---|---|
| messageId | LongInt | Identity of the message. |

Outparameters:

—

Errors:

| Description | Code |
|---|---|
| Access denied | 1 |
| Illegal messageId. | 2 | commandSM

Send a command to the SMS-C. The following commands are defined: enquiry the status of a submitted message (delivered, not delivered, replaced), cancel a request for status report or delete a submitted message.

Inparameters:

| Name | Type | Description |
|---|---|---|
| messageReference | UnsignedByte | Reference of the submitted message, see GSM 03.40 (TP-MR) |
| command | UnsignedByte | Type of command, see GSM 03.40 (TP-CT). |

Outparameters:

—

-continued

Errors:

| Description | Code |
|---|---|
| Unknown message reference | 1 |
| Illegal command | 2 |

Functions Accessing Local Hardware and Software Objects in the IMS generateIndication Generates an indication, e.g. a ring tone, in the IMS.

Inparameters:

| Name | Type | Description |
|---|---|---|
| typeOfIndication | UnsignedByte | Type of indication:<br>0 = incoming speech call<br>1 = incoming data call<br>2 = incoming fax call<br>3 = incoming auxiliary speech call<br>4 = call waiting<br>5 = received SM<br>6 = voice mail notification<br>7 = fax notification<br>8 = E-mail notification<br>9–15 = extra notifications |

Outparameters:

—

Errors:

| Description | Code |
|---|---|
| Illegal type of notification. | 1 | stopIndication

Stops an indication, e.g a ring tone, in the IMS.

Inparameters:

| Name | Type | Description |
|---|---|---|
| typeOfIndication | UnsignedByte | Type of indication:<br>0 = incoming speech call<br>1 = incoming data call<br>2 = incoming fax call<br>3 = incoming auxiliary speech call<br>4 = call waiting<br>5 = received SM<br>6 = voice mail notification<br>7 = fax notification<br>8 = E-mail notification<br>9–15 = extra notifications |

Outparameters:

—

Errors:

| Description | Code |
|---|---|
| Illegal type of notification. | 1 | displayIndication
    Displays an indication on the IMS display.

Inparameters:

| Name | Type | Description |
|---|---|---|
| typeOfIndication | UnsignedByte | Type of indication:<br>0 = incoming speech call<br>1 = incoming data call<br>2 = incoming fax call<br>3 = incoming auxiliary speech call<br>4 = call waiting<br>5 = received SM<br>6 = voice mail notification<br>7 = fax notification<br>8 = E-mail notification<br>9–15 = extra notifications |
| number | UnsignedByte | Number of new SM, voice mails etc. Only required for message notifications. |

Outparameters:

—

Errors:

| Description | Code |
|---|---|
| Illegal type of notification. | 1 | removeDisplayIndication
    Removes a display indication at the IMS.

Inparameters:

| Name | Type | Description |
|---|---|---|
| typeOfIndication | UnsignedByte | Type of indication:<br>0 = incoming speech call<br>1 = incoming data call<br>2 = incoming fax call<br>3 = incoming auxiliary speech call<br>4 = call waiting<br>5 = received SM<br>6 = voice mail notification<br>7 = fax notification<br>8 = E-mail notification<br>9–15 = extra notifications |

Outparameters:

—

Errors:

| Description | Code |
|---|---|
| Illegal type of notification. | 1 | setStatusLine
    Sets a status line on the IMS display.

Inparameters:

| Name | Type | Description |
|---|---|---|
| textString | Textstring (SIZE(1..80)) | A text string which comprises the status line. |

Outparameters:

—

Errors:

— enquiryByAddress
    Enquiries the address book about the address information for one or more subscribers, specified by the address. The function returns all entries that match the search key.

Inparameters:

| Name | Type | Description |
|---|---|---|
| address | AddressInfo | Address to subscriber. If the address is of length 0 all entries in the address book will be returned by the function. |

Outparameters:

| Name | Type | Description |
|---|---|---|
| addressList | SEQUENCE OF AddressInfo | List of addresses. |
| IndexList | SEQUENCE OF LongInt | List if unique indexes, identifying the entries in the address book. |

Errors:

| Description | Code |
|---|---|
| Access denied to address book | 1 |
| No entries matching the search key | 2 | addAddressBookEntry
    Adds an entry in the address book.

Inparameters:

| Name | Type | Description |
|---|---|---|
| address | AddressInfo | Address to subscriber |

Outparameters:

| Name | Type | Description |
|---|---|---|
| index | LongInt | Unique index identifying the entry in the address book. |

Errors:

| Description | Code |
|---|---|
| Access denied to address book | 1 |
| Address already in address book | 2 | updateAddressBookEntry
    Updates an entry in the address book.

Inparameters:

| Name | Type | Description |
|---|---|---|
| index | LongInt | Unique index identifying the entry in the address book. |
| address | AddressInfo | Address to subscriber. |

-continued

Outparameters:

—

Errors:

| Description | Code |
|---|---|
| Access denied to address book | 1 |
| No entry matching the index | 2 | removeAddressBookEntry
Removes an entry in the address book.

Inparameters:

| Name | Type | Description |
|---|---|---|
| index | LongInt | Unique index identifying the entry in the address book. |
| address | AddressInfo | Address to subscriber. |

Outparameters:

—

Errors:

| Description | Code |
|---|---|
| Access denied to address book | 1 |
| No entry matching the index | 2 |

The focus of this description will now be on a detailed description of application dependent ITAP operations for a personal access service. The abstract syntax of the application dependent operations follows the rules and restrictions defined above in the section entitled ITAP-OPERATIONS, utilizing ASN.1 syntax.

Service Identities

General

The ITAP operations Alert and Bind have the possibility of indicating the reason for initiating an ITAP session, (e.g. incoming call or new message). The reason is indicated by the service identity parameter. Together with the operation it is also possible to provide parameters that are associated with the service identity, i.e. text information and address information.

This section defines the different service identities that are defined for a Personal Access (PA) application and how the corresponding parameters are utilized for transferring application dependent parameters in the initiating ITAP operations for the different service identities.

Messaging and Profile Management

This will be the service identity used when the service user is accessing the personal access application in the service node without authentication. The service user shall be offered services for enquiring the mailboxes or managing the personal profile. No parameters are associated with the service identity.

Incoming Call

An ITAP session for incoming calls can be established in two ways: network initiated and mobile initiated. A networked initiated ITAP session occurs when the caller is screened before the speech connection is established to the IMS 1401. An ITAP session is mobile initiated when the establishment of the speech connection triggers the IMS 1401 to start a new ITAP session. The A-number and A-name will be sent if the information is available or if there is no caller line restriction. The A-name and A-number are mapped on the aPartyInfo parameter in the Alert invoke or Bind result.

New Message Notification

An ITAP session for message notification is always initiated from the network. The service node initiates an ITAP session with the ITAP operation Alert for indicating that a new message has been stored in the subscriber's mailbox. The notification information (e.g., time stamp and originator) is fetched from the SN 1409 with the application dependant operation RetrieveNewMessageInformation. No parameters are transferred.

Screening Expired Notification

An ITAP session for indicating that the screening has expired is always established from the network. The screening reason that has expired shall be sent as a text string. The screening reason is mapped on the textInfo parameter in the Alert operation. The service user shall be able to set a new expiration time.

General Notification

An ITAP session for notification is always established from the network. The notification reason shall be sent as a text string. The notification text is mapped on the textInfo parameter in the Alert operation.

Set status line

An ITAP session for setting the status line is always initiated from the network. The service node initiates an ITAP session with the ITAP operation Alert for indicating that the status text displayed in idle mode shall be changed, such as when the current screening state is changed. The status text is mapped on the textInfo parameter in the Alert operation.

Authentication

This will be the service identity used when the service user is accessing the personal access application in the service node with authentication. The service user will be requested to enter the personal identification number (PIN)-Code. If the correct PIN-Code is entered, the service user shall be offered services for enquiring the mailboxes or managing the personal profile. No parameters are associated with the service identity.

Service Identities

| | |
|---|---|
| messagingAndProfileManagement ServiceId | :: = 1 |
| incomingcall ServiceId | :: = 2 |
| newMessageNotification ServiceId | :: = 3 |
| screeningExpiredNotification ServiceId | :: = 4 |
| generalNotification ServiceId | :: = 5 |
| setStatusLine ServiceId | :: = 6 |
| authentication ServiceId | :: = 7 |

The PA application provides an operating environment comprised of individual related services, some of which are mandatory and some which are optional.

It is possible to create a PA service application package comprised of the mandatory PA services plus the operator specific selection from the available optional PA services.

The following PA services are mandatory:

Voice mail

Personal number

POTS PA service

Notification

Operator Determined Barring

The following PA services in the UIF are optional:
Fax detection
Callers choice
Caller presentation
Call screening
Incoming call selection
Call logs
Fax mail
E-mail
Conversion An identification of which optional services are included in the service users subscription is indicated with the sub-Service parameter in Bind result or Alert invoke. The services are mapped in the following way:

Fax detection, bit 1 octet 1
Callers choice, bit 2 octet 1
Caller presentation, bit 3 octet 1
Call screening, bit 4 octet 1
Incoming call selection, bit 5 octet 1
Call logs, bit 6 octet 1
Fax mail, bit 7 octet 1
E-mail, bit 8 octet 1
Conversion, bit 1 octet 2

If the bit is 1, then the corresponding service is included in the subscription.

PA Specific ITAP Operations

The data types that are not specified below are specified in the above sections under the heading "ITAP-OPERATIONS".

-131-

```
              CALL RELATED OPERATIONS
      PA-ITAP-Operations DEFINTION IMPLICIT TAGS ::=
      BEGIN
      IMPORTS
15            OPERATION, ERROR FROM Remote-Operations-Notation
              {joint-iso-ccitt remote-operations(4) notation(0)}
              UnsignedByte, LongInt, ByteString, TextString, AddressInfo,
              DateAndTime, Number, SMSString FROM ITAP-operations;

20    AcceptCall ::= OPERATION                                    -- Timer m --
              ERRORS {
                     SystemFailure,
                     CallAnswered,
                     FaxDetected,
25                   HookOn
                     }
      -- Accepts the incoming call and the parties will be immediately connected.
      -- Class 1 operation 30    CallBack ::= OPERATION                                      -- Timer m --
              ERRORS {
```

-132-

```
                CallAnswered,
                FaxDetected,
                AccessDeniedToResource,
                HookOn
5           }
        -- A predefined message will be played to the calling party and the caller
        -- number will be stored in the call back log.
        -- Class 1 operation 10      EnquiryCallSetUpStatus ::= OPERATION                           -- Timer m -
                ERRORS {
                SystemFailure,
                NoAnswer,
                Busy,
15              NotReachable
                }
        -- Used to enquiry the call set-up status from the SN. The operation can be
        -- used after successful result from SetUpCall, PlayMessage, RecordGreeting
        -- or PlayGreeting.
20      -- Class 1 operation HoldCall ::= OPERATION                                         -- Timer m --
                ERRORS {
                CallAnswered,
25              FaxDetected,
                HookOn
                }
        -- A message will be generated to the calling party that the incoming call will
        -- be answered as soon as possible.
30      -- Class 1 operation
```

-133-

```
RejectCall ::= OPERATION                                      -- Timer m --
            ERRORS {
                    CallAnswered,
                    FaxDetected,
5                   HookOn
                    }
```
-- The incoming call is rejected and the caller is routed to the no answer
-- destination.
-- Class 1 operation 10
```
SetUpCall ::= OPERATION                                       -- Timer m --
            ARGUMENT
                    SetUpCallArg
            ERRORS {
15                  Busy,
                    SystemFailure
                    }
```
-- Requests the Service Node to set up a call leg to a specified destination
-- and to the IMS. The SN shall return the result when the call leg to the
20 -- IMS has been allocated, i.e. when the SN receives the "Alerting" indicator
-- from the network.
-- Class 1 operation

```
TransferCall ::= OPERATION                                    -- Timer m --
25          ARGUMENT
                    TransferCallArg
            ERRORS {
                    SystemFailure,
                    CallAnswered,
30                  FaxDetected,
                    HookOn
```

-134-

}

-- The call will be transferred to a new destination. The destination can be a

-- predefined number defined by the operator or an explicit number.

-- Class 1 operation

```
        MESSAGING RELATED OPERATIONS
CancelMessageDelivery ::= OPERATION                      -- Timer m --
        ARGUMENT
                CancelMessageDeliveryArg
        ERRORS {
                AccessDeniedToResource,
                UnknownMedia,
                UnknownMessage
        }
-- Cancels a requested message delivery.
-- Class 1 operation DeleteMessage ::= OPERATION                              -- Timer m --
        ARGUMENT
                DeleteMessageArg
        ERRORS {
                AccessDeniedToResource,
                UnknownMedia,
                UnknownMessage
        }
-- Deletes one or more messages.
-- Class 1 operation EnquiryDeliveryLog ::= OPERATION                         -- Timer m --
        ARGUMENT
                EnquiryDeliveryLogArg
```

-135-

```
                RESULT
                        EnquiryDeliveryLogResultArg
                ERRORS {
                        Access Denied,
5                       UnknownMedia,
                        UnknownStatus
                        }
        -- Enquiry the delivery log
        -- Class 1 operation
10
        EnquiryMailbox ::= OPERATION                                    -- Timer m --
                ARGUMENT
                        EnquiryMailboxArg
                RESULT
15                      EnquiryMailboxResultArg
                ERRORS {
                        Access Denied,
                        UnknownMedia,
                        UnknownStatus
20                      }
        -- Status enquiry regarding messages in a subscriber's mailbox, e.g.
        -- timestamp, originator, media and identity. The result indicates whether
        -- there are more status entries available in the SN or not. The remaining
        -- part is retrieved by additional status enquires with the selected status
25      -- assigned to more information.
        -- Class 1 operation FastForwarding ::= OPERATION                                    -- Timer m --
                ERRORS {
30                      IllegalOperation
                        }
```

-136-

-- Issues fast forwarding on a voice message that is being played. The
-- operation can only be issued when a voice message is being played. The
-- SN shall return the result immediately.
-- Class 1 operation

```
GetDetailedMessageInfo ::= OPERATION                              -- Timer m --
        ARGUMENT
                GetDetailedMessageInfoArg
        RESULT
                GetDetailedMessageInfoResultArg
        ERRORS {
                Access Denied,
                UnknownMedia,
                UnknownMessage
        }
```
-- Get detailed information about a message, e.g. message header, length,
-- priority and message body.
-- Class 1 operation

```
MailboxStatus ::= OPERATION                                       -- Timer m --
        ARGUMENT
                MailboxStatusArg
        RESULT
                MailboxStatusResultArg
        ERRORS {
                Access Denied,
                UnknownMedia
        }
```
-- Status enquiry regarding number of messages stored in a subscriber's
-- mailbox.
-- Class 1 operation

-137-

```
Pause ::= OPERATION                                              -- Timer m --
        ERRORS {
                IllegalOperation
                }
```
5    -- Issues pause on a voice message that is being played. The operation can
     -- only be issued when a voice message is being played. An additional pause
     -- operation resumes the playing of a voice message that has been paused.
     -- The SN shall return the result immediately.
     -- Class 1 operation
10

```
PlayGreeting ::= OPERATION                                       -- Timer m --
        ERRORS {
                AccessDeniedToResource,
                SystemFailure
15              }
```
     -- Requests the service node to play the current greeting. If there is no
     -- speech connection established to the IMS, the SN shall establish a
     -- speech connection. The result shall be returned when the speech
     -- connection is allocated i.e. when the SN receives the "Alerting" indicator
20   -- from the network. The IMS shall accept the call when the result is returned.
     -- The playing of the greeting is started when the answer message (ANM) is
     -- detected by the SN. If there is a speech connection already established
     -- the SN shall start the playing of the greeting immediately and return the
     -- result immediately.
25   -- Class 1 operation

```
PlayMessage ::= OPERATION                                        -- Timer m --
        ARGUMENT
                PlayMessageArg
30      ERRORS {
                AccessDeniedToResource,
```

-138-

```
                SystemFailure,
                NoMoreMessages,
                UnknownMessage
                }
```

5   -- Requests the SN to play the voice message(s) in the subscribers voice
    -- mailbox. If there is no speech connection established to the IMS, the SN
    -- shall establish a speech connection. The result shall be returned when the
    -- speech connection is allocated i.e. when the SN receives the "Alerting"
    -- indicator from the network. The IMS shall accept the call when the result is
10  -- returned. The playing of the message(s) is started when the answer
    -- message (ANM) is detected by the SN. If there is a speech connection
    -- already established, the SN shall start the playing of the message(s)
    -- immediately and return the result immediately.
    -- Class 1 operation
15

```
        RecordGreeting ::= OPERATION                    -- Timer m --
                ERRORS {
                        AccessDeniedToResource,
                        SystemFailure
20                      }
```

-- Requests the service node to record a new current greeting. If there is no
    -- speech connection established to the IMS, the SN shall establish a
    -- speech connection. The result shall be returned when the speech
    -- connection is allocated i.e. when the SN receives the "Alerting" indicator
25  -- from the network. The IMS shall accept the call when the result is returned.
    -- The recording of the greeting is started when the answer message (ANM)
    -- is detected by the SN. If there is a speech connection already established
    -- the SN shall start the recording of the greeting immediately and return the
    -- result immediately.
30  -- Class 1 operation

-139-

```
    ReleaseResource ::= OPERATION                                -- Timer m --
                ARGUMENT
                        ReleaseResourceArg
                ERRORS {
5                       UnknownResource
                }
    -- Requests the service node to release all resources that have been
    -- allocated due to message retrieval or record greeting, e.g. call legs and
    -- signalling dialogues to IP's.
10  -- Class 1 operation RetrieveNewMessageInfo ::= OPERATION                         -- Timer m --
                RESULT
                        RetrieveNewMessageInfoResultArg
15              ERRORS {
                        AccessDeniedToResource
                }
    -- Retrieve the information about a new message. This operation is used
    -- when the ITAP session is established with the service identity "New
20  -- Message Notification". The operation returns the new message notification
    -- parameters.
    -- Class 1 operation Rewind ::= OPERATION                                         -- Timer m --
25              ERRORS {
                        IllegalOperation
                }
    -- Issues rewind on a voice message that is being played. The operation can
    -- only be issued when a voice message is being played. The SN shall
30  -- return the result immediately.
    -- Class 1 operation
```

-140-

```
SaveMessage ::= OPERATION                                          -- Timer m --
            ARGUMENT
                SaveMessageArg
            ERRORS {
5               AccessDeniedToResource,
                UnknownMedia,
                UnknownMessage
            }
-- Saves a specified message.
10 -- Class 1 operation SendMessage ::= OPERATION                                          -- Timer m --
            ARGUMENT
                SendMessageArg
15          ERRORS {
                AccessDeniedToResource,
                UnknownMedia,
                UnknownMessage,
                IllegalAddress
20          }
-- Send a message to a specified destination. The selected message that
-- shall be forwarded is identified by the message identity together with the
-- type of media.
-- Class 1 operation
25
Stop ::= OPERATION                                                 -- Timer m --
            ERRORS {
                IllegalOperation
            }
30 -- Stops the playing a voice message. The SN shall return the result
-- immediately.
```

-141-

-- Class 1 operation

PROFILE RELATED OPERATIONS

AddEntryToScreeningList ::= OPERATION       -- Timer m --
5         ARGUMENT
            AddEntryToScreeningListArg
        RESULT
            AddEntryToScreeningListResultArg
        ERRORS {
10            AccessDeniedToResource
        }

-- Adds a new number to the white or black screening list
-- Class 1 operation

15 DeleteCallLogEntry ::= OPERATION       -- Timer m --
        ARGUMENT
            DeleteCallLogEntryArg
        ERRORS {
            AccessDeniedToResource,
20            UnknownCallLog
        }

-- Deletes an entry in the call log.
-- Class 1 operation

25 DeleteEntryInScreeningList ::= OPERATION       -- Timer m --
        ARGUMENT
            DeleteEntryInScreeningListArg
        ERRORS {
            AccessDeniedToResource
30         }

-- Deletes a number from a screening list

-142-

-- Class 1 operation

EnquiryCallLog ::= OPERATION  -- Timer m --
    ARGUMENT
5        EnquiryCallLogArg
    RESULT
        EnquiryCallLogResultArg
    ERRORS {
        AccessDeniedToResource,
10       UnknownCallLog
    }

-- Status enquiry regarding entries in the call log, e.g. timestamp and identity
-- of caller. The result indicates whether there are more status entries
-- available in the SN or not. The remaining part is retrieved by additional
15 -- status enquires with the type of log assigned to more information.
-- Class 1 operation EnquiryScreeningList ::= OPERATION  -- Timer m --
    ARGUMENT
20       EnquiryScreeningListArg
    RESULT
        EnquiryScreeningListResultArg
    ERRORS {
        AccessDeniedToResource
25    }

-- Status enquiry regarding entries in the screening list, e.g. numbers that
-- shall be through connected.
-- Class 1 operation 30  RetrieveActiveRoutingTable ::= OPERATION  -- Timer m -
    RESULT

-143-

```
                RetrieveActiveRoutingTableResultArg
            ERRORS {
                AccessDeniedToResource,
                UnknownRoutingTable
5           }
     -- Retrieve the identity and name of the predefined routing table that is
     -- currently active.
     -- Class 1 operation 10   RetrieveBusyAndNoAnswerDest ::= OPERATION                    -- Timer m --
            RESULT
                RetrieveBusyAndNoAnswerDestResultArg
            ERRORS {
                AccessDeniedToResource
15          }
     -- Retrieves the busy and no answer destinations.
     -- Class 1 operation RetrieveImmediateDelivery ::= OPERATION                      -- Timer m --
20          ARGUMENT
                RetrieveImmediateDeliveryArg
            RESULT
                RetrieveImmediateDeliveryResultArg
            ERRORS {
25              AccessDeniedToResource
            }
     -- Retrieves the profile for immediate delivery of messages.
     -- Class 1 operation 30   RetrieveLanguage ::= OPERATION                               -- Timer m --
            RESULT
```

-144-

```
                    RetrieveLanguageResultArg
            ERRORS {
                    AccessDeniedToResource
                    }
5   -- Retrieves the language used for "plain old telephone service" (POTS) access.
    -- Class 1 operation RetrieveNameOfRoutingTables ::= OPERATION                   -- Timer m -
            RESULT
10                  RetrieveNameOfRoutingTablesResultArg
            ERRORS {
                    AccessDeniedToResource
                    }
    -- Retrieve a list of names and identities of available routing tables
15  -- Class 1 operation RetrieveNotificationType ::= OPERATION                      -- Timer m -
            RESULT
                    RetrieveNotificationTypeResultArg
20          ERRORS {
                    AccessDeniedToResource
                    }
    -- Retrieves the preferred notification type.
    -- Class 1 operation
25
    RetrieveRoutingList ::= OPERATION                           -- Timer m -
            ARGUMENT
                    RetrieveRoutingListArg
            RESULT
30                  RetrieveRoutingListResultArg
            ERRORS {
```

-145-

```
                AccessDeniedToResource,
                UnknownRoutingList
                }
     -- Retrieves the routing list
5    -- Class 1 operation RetrieveRoutingTable ::= OPERATION                    -- Timer m --
                ARGUMENT
                        RetrieveRoutingTableArg
10              RESULT
                        RetrieveRoutingTableResultArg
                ERRORS {
                        AccessDeniedToResource,
                        UnknownRoutingTable
15              }
     -- Retrieves a routing table from the service node
     -- Class 1 operation RetrieveScreeningProfile ::= OPERATION                -- Timer m --
20              RESULT
                        RetrieveScreeningProfileResultArg
                ERRORS {
                        AccessDeniedToResource
                }
25   -- Retrieves the screening profile
     -- Class 1 operation RetrieveScreeningResons ::= OPERATION                 -- Timer m --
                RESULT
30                      RetrieveScreeningResonsResultArg
                ERRORS {
```

-146-

```
                AccessDeniedToResource
            }
    -- Retrieves the list of screening reasons.
    -- Class 1 operation
5

RetrieveSearchTimes ::= OPERATION                              -- Timer m --
            ARGUMENT
                RetrieveSearchTimesArg
            RESULT
10              RetrieveSearchTimesResultArg
            ERRORS {
                AccessDeniedToResource,
                UnknownRoutingTable
            }
15  -- Retrieves the search times for a specific routing table.
    -- Class 1 operation SetActiveRoutingTable ::= OPERATION                            -- Timer m --
            ARGUMENT
20              SetActiveRoutingTableArg
            ERRORS {
                AccessDeniedToResource,
                UnknownRoutingTable
            }
25  -- Change the active routing table to the predefined routing table specified
    -- by the routing table id inparameter.
    -- Class 1 operation UpdateBusyAndNoAnswerDest ::= OPERATION                        -- Timer m --
30          Argument
                UpdateBusyAndNoAnswerDestArg
```

-147-

```
                ERRORS {
                        AccessDeniedToResource
                        }
        -- Updates the busy and no answer destinations.
5       -- Class 1 operation UpdateEntryInScreeningList ::= OPERATION                -- Timer m --
                ARGUMENT
                        UpdateEntryInScreeningListArg
10              ERRORS {
                        AccessDeniedToResource
                        }
        -- Updates a entry in the screening list
        -- Class 1 operation
15
        UpdateImmediateDelivery::= OPERATION                    -- Timer m –
                ARGUMENT
                        UpdateImmediateDeliveryArg
                ERRORS {
20                      AccessDeniedToResource
                        }
        -- Updates the profile for immediate delivery of messages.
        -- Class 1 operation 25      UpdateLanguage ::= OPERATION                            -- Timer m –
                ARGUMENT
                        UpdateLanguageArg
                ERRORS {
                        AccessDeniedToResource
30                      }
        -- Update type of language used for POTS access.
```

-148-

-- Class 1 operation

UpdateNameOfRoutingTable ::= OPERATION  -- Timer m --
  ARGUMENT
5    UpdateNameOfRoutingTableArg
  ERRORS {
    AccessDeniedToResource,
    UnknownRoutingTable
  }
10 -- Updates the name of a predefined routing table.
-- Class 1 operation UpdateNotificationType ::= OPERATION  -- Timer m --
  ARGUMENT
15    UpdateNotificationTypeArg
  ERRORS {
    AccessDeniedToResource
  }
-- Updates the preferred notification type.
20 -- Class 1 operation UpdateRoutingTable ::= OPERATION  -- Timer m --
  ARGUMENT
    UpdateRoutingTableArg
25  ERRORS {
    AccessDeniedToResource,
    UnknownRoutingTable
  }
-- Updates a routing table in the service node
30 -- Class 1 operation

-149-

```
    UpdateScreeningProfile ::= OPERATION                    -- Timer m --
            ARGUMENT
                    UpdateScreeningProfileArg
            ERRORS {
5                   AccessDeniedToResource
            }
    -- Updates the screening profile
    -- Class 1 operation 10  UpdateSearchTimes ::= OPERATION                         -- Timer m --
            ARGUMENT
                    UpdateSearchTimesArg
            ERRORS {
                    AccessDeniedToResource,
15                  UnknownRoutingTable
            }

-- Updates the search times for each alternative in a routing table
    -- Class 1 operation
20
                    AUTHENTICATION OPERATIONS
    Authenticate ::= OPERATION                              -- Timer m --
            ARGUMENT
                    AuthenticateArg
25          ERRORS {
                    AuthenticationFailed,
                    PINCodeBlocked
            }
    -- Checks the entered PIN-Code
30  -- Class 1 operation
```

-150-

```
    RetrieveAuthenticationStatus ::= OPERATION                    -- Timer m --
            RESULT
                    RetrieveAuthenticationStatusResultArg
            ERRORS {
5                   AccessDeniedToResource
            }
    -- Retrieves the authentication status from the service node
    -- Class 1 operation 10  UpdateAuthenticationStatus ::= OPERATION                      -- Timer m --
            ARGUMENT
                    UpdateAuthenticationStatusResultArg
            ERRORS {
                    AccessDeniedToResource
15          }
    -- Updates the authentication status in the service node
    -- Class 1 operation UpdatePINCode ::= OPERATION                                   -- Timer m --
20          ARGUMENT
                    UpdatePINCodeArg
            ERRORS {
                    AccessDeniedToResource,
                    PINCodeFailure
25          }
    -- Update PIN-Code used to verify the identity of the service user.
    -- Class 1 operation ERRORS
30  FaxDetetced ::= ERROR
    -- Fax detection has been successfully executed. The call has been routed to
```

-151-

-- the destination for fax calls and incoming call selection is terminated.

HookOn ::= ERROR
-- A-part has performed hook on.

CallAnswered ::= ERROR
-- The call has already been answered at another destination that has been
-- alerted in parallel.

SystemFailure ::= ERROR
-- Call leg to was not through connected, e.g. due to congestion or
-- resource limitation.

UnknownMessage ::= ERROR
-- Undefined message

AccessDeniedToResource ::= ERROR
-- Access denied to a resource, e.g. voice mailbox or call log.

UnknownMedia ::= ERROR
-- Undefined media

UnknownStatus ::= ERROR
-- Undefined status

UnknownResource ::= ERROR
-- Undefined resource

IllegalAddress ::= ERROR
-- Address invalid

-152-

```
      NoMoreMessages ::= ERROR
      -- No more messages in the mailbox.

UnknownRoutingTable ::= ERROR
 5    -- Undefined routing table

UnknownCallLog ::= ERROR
      -- Undefined call log

10    UnknownRoutingList ::= ERROR
      -- Undefined routing list

IllegalOperation ::= ERROR
      -- Illegal operation.
15
      AuthenticationFailed ::= ERROR
      -- Illegal PIN-Code has been entered.

PINCodeBlocked ::= ERROR
20    -- PIN-Code blocked, too many retries.

NoAnswer ::= ERROR
      -- No answer

25    Busy ::= ERROR
      -- Called party is busy

NotReachable ::= ERROR
      -- Called party is not reachable
30
```

-153-

ARGUMENTS DATA TYPES

```
    AddEntryToScreeningListArg ::= SEQUENCE {
                typeOfList              [00]    UnsignedByte,
                screeningAddress        [01]    AddressInfo
5   }
    -- Type of list: 0 = White list, 1 = Black List
    -- The PIN-Code or identity of caller that shall be added to the screening list.

AddEntryToScreeningListResultArg ::= SEQUENCE {
10              index                   [00]    UnsignedByte
    }
    -- Index in the list where the new screening entry is stored.

AuthenticateArg ::= SEQUENCE {
15              pINCode                 [00]    Number
    }
    -- Entered PIN-Code.

CancelMessageDeliveryArg::= SEQUENCE {
20              messageID               [00]    LongInt,
                media                   [01]    UnsignedByte
    }
    -- Media: 1 = Fax mail, 2 = E-mail, 3 = SMS.

25  DeleteCallLogEntryArg ::= SEQUENCE {
                typeOfLog               [00]    UnsignedByte,
                callLogEntry            [01]    UnsignedByte
    }
    -- Type of call log: 0 = Incoming call log, 1 = Missed call log, 2 = Call back log
30  -- Call log entry is index in the call log. The index can be in the range of 1 to
    -- 10.
```

-154-

```
    DeleteMessageArg::= SEQUENCE {
                messageID       [00]    SEQUENCE OF LongInt OPTIONAL,
                media           [01]    SEQUENCE OF UnsignedByte
    OPTIONAL
5   }
    -- Media: 0 = Voice mail, 1 = Fax mail, 2 = E-mail, 3 = SMS. The size of the
    -- "SEQUENCE OF" parameters is in the range of SIZE(1..10). The message id
    -- and media can be omitted if the operation is invoked during the playing of
    -- voice message. Message id and media shall then be fetched by the SN from
10  -- the current message.

DeleteEntryInScreeningListArg ::= SEQUENCE {
                typeOfList              [00]    UnsignedByte,
                index                   [01]    UnsignedByte
15  }
    -- Type of list: 0 = White list, 1 = Black List
    -- Index: index of the entry in the screening list that shall be removed.

EnquiryCallLogArg ::= SEQUENCE {
20              typeOfLog               [00]    UnsignedByte
    }
    -- Type of log: 0 = Incoming call log, 1 = Missed call log, 2 = Call back log, 3 =
    -- get more information.

25  EnquiryCallLogResultArg ::= SEQUENCE {
                moreToCome   [00]   BOOLEAN,
                timeStamp    [01]   SEQUENCE OF DateAndTime OPTIONAL,
                caller       [02]   SEQUENCE OF AddressInfo OPTIONAL,
                answered     [03]   SEQUENCE OF AddressInfo OPTIONAL
30  }
    -- The size of the "SEQUENCE OF" parameters is in the range of SIZE(1..10)
```

-155-

```
    EnquiryDeliveryLogArg ::= SEQUENCE {
                selectedMedia         [00]   UnsignedByte
    }
    -- Selected media: 1 = Fax mail, 2 = E-mail, 3 = SMS, 4 = all
5

EnquiryDeliveryLogResultArg ::= SEQUENCE {
                timeStamp     [00]   SEQUENCE OF DateAndTime OPTIONAL,
                status        [01]   SEQUENCE OF UnsignedByte OPTIONAL,
                messageID     [02]   SEQUENCE OF LongInt OPTIONAL,
10              destination   [03]   SEQUENCE OF AddressInfo OPTIONAL,
                media         [04]   SEQUENCE OF UnsignedByte OPTIONAL
    }
    -- The size of the "SEQUENCE OF" parameters is in the range of
    -- SIZE(1..10). The media parameter is only included if the selected media is
15  -- equal to "all".

EnquiryMailboxArg ::= SEQUENCE {
                selectedMedia      [00]   UnsignedByte,
                selectedStatus     [01]   UnsignedByte
20  }
    -- Selected media: 0 = Voice mail, 1 = Fax mail, 2 = E-mail, 3 = SMS, 4 = all
    -- Selected status: 0 = New, 1 = Old, 2 = Saved, 3 = All, 4 = More information EnquiryMailboxResultArg ::= SEQUENCE {
25              moreInfoAvailable  [00]   BOOLEAN,
                timeStamp          [01]   SEQUENCE OF DateAndTime
                                          OPTIONAL,
                messageID          [02]   SEQUENCE OF LongInt OPTIONAL,
                originator         [03]   SEQUENCE OF AddressInfo OPTIONAL,
30              media              [04]   SEQUENCE OF UnsignedByte
                                          OPTIONAL,
```

-156-

```
                status          [05]    SEQUENCE OF UnsignedByte
                                        OPTIONAL,
                messageHeader   [06]    SEQUENCE OF SMSString OPTIONAL
        }
-- The size of the "SEQUENCE OF" parameters is in the range of
-- SIZE(1..5). The media parameter is only included if the selected media is
-- equal to "all". The status parameter is only included of the selected status
-- parameter is equal to "all".

EnquiryScreeningListArg ::= SEQUENCE {
                typeOfList      [00]    UnsignedByte
        }
-- Type of list: 0 = White list, 1 = Black List EnquiryScreeningListResultArg ::= SEQUENCE {
                index           [00]    SEQUENCE OF UnsignedByte OPTIONAL,
                screeningList   [01]    SEQUENCE OF AddressInfo OPTIONAL
        }
-- The size of the "SEQUENCE OF" parameters is in the range of SIZE(1..25)
-- Index is in the range of (1..25)

GetDetailedMessageInfoArg ::= SEQUENCE {
                selectedMedia   [00]    UnsignedByte,
                messageID       [01]    LongInt
        }
-- Selected media: 0 = Voice mail, 1 = Fax mail, 2 = E-mail, 3 = SMS, 4 = all GetDetailedMessageInfoResultArg ::= SEQUENCE {
                priority        [00]    UnsignedByte,
                length          [01]    LongInt,
                messageHeader   [02]    SMSString OPTIONAL,
```

-157-

```
                body              [03]   SMSString OPTIONAL,
                nameOfAttachments [04]   SEQUENCE OF SMSString OPTIONAL
        }
```
-- Priority: 0 = low, 1 = normal, 2 = high
-- The length of the message depends on media: Voice messages (in
-- seconds), Fax messages (no of pages), E-mail (no of bytes), SMS (no of
-- characters). The message body parameter is only applicable for E-mail. If
-- the message is longer than the size of SMSString, the message is
-- truncated. The size of the "SEQUENCE OF" parameters is in the range
-- of SIZE(1..5).

```
MailboxStatusArg ::= SEQUENCE {
                typeOfMedia       [00]   UnsignedByte
}
```
-- Type of media: 0 = Voice mail, 1 = Fax mail, 2 = E-mail, 3 = SMS, 4 = all

```
MailboxStatusResultArg ::= SEQUENCE {
                numberOfVoiceMail [00]   SEQUENCE OF UnsignedByte
                                         OPTIONAL,
                numberOfFaxMail   [01]   SEQUENCE OF UnsignedByte
                                         OPTIONAL,
                numberOfEmail     [02]   SEQUENCE OF UnsignedByte
                                         OPTIONAL,
                numberOfSMS       [03]   SEQUENCE OF UnsignedByte
                                         OPTIONAL
}
```
-- Number of messages in the subscribers mailbox for the selected media.
-- If type of media is all in the request, all parameters are returned. If type of media
-- is a specific media, the parameter for the requested media is returned, e.g. if type
-- of media is voice mail, number of voice mail will only be returned.
-- The size of the SEQUENCE OF is always 4. The SEQUENCE OF contains

-158-

```
-- the following information:
--              Index 1 = Total no of messages,
--              Index 2 = No of new messages,
--              Index 3 = No of old messages,
--              Index 4 = No of saved messages,
-- If number of messages is 255, this indicates that there is at least 255
-- messages.

PlayMessageArg::= SEQUENCE {
            typeOfPlay          [00]    UnsignedByte,
            messageID           [01]    LongInt OPTIONAL
}
-- TypeOfPlay: 0 = All, 1 = Specific, 2 = Repeat, 3 = Next
-- The SN shall start playing the voice message identified by the
-- message identity. If type of play is all, all messages shall be played in
-- sequential order. If type of play is specific, the specified message shall
-- be played. If type of play is repeat, the current message shall be repeated.
-- If type of play is next, the next message shall be played. Repeat and next
-- can only be used when at least one message has been played. Message id
-- is not used for repeat and next.

ReleaseResourceArg::= SEQUENCE {
            typeOfResource      [00]    UnsignedByte
}
-- Type of resource: 0 = Voice mail, 1 = Fax mail, 2 = E-mail, 3 = SMS, 4 = all RetrieveActiveRoutingTableResultArg ::= SEQUENCE {
            routingTableID      [00]    UnsignedByte,
            routingTableName    [01]    SMSString
}
-- Active routing table routing table identifier can be in the range (1..5).
```

-159-

```
RetrieveAuthenticationStatusResultArg ::= SEQUENCE {
            authenticationActive     [00]    BOOLEAN
}
-- Authentication status active (On/Off)
```

```
RetrieveBusyAndNoAnswerDestResultArg ::= SEQUENCE {
            busyDestination          [00]    AddressInfo,
            noAnswerDestination      [01]    AddressInfo
}
```
-- Name and number shall be included in the address information, if the
-- information is available. If number shall not be presented for the service
-- user, e.g. if the busy destination is an operator defined destinations, the
-- name shall be included in the address information and the index in the
-- routing table shall be sent as address, e.g. #4. If the name is not available,
-- only the number shall be included.

```
RetrieveImmediateDeliveryArg::= SEQUENCE {
            sourceMedia              [00]    UnsignedByte
}
```
-- Source media: 0 = Voice mail, 1 = Fax mail, 2 = E-mail, 3 = SMS

```
RetrieveImmediateDeliveryResultArg::= SEQUENCE {
            immediateDeliveryActive  [00]    BOOLEAN,
            autoCopyActive           [01]    BOOLEAN,
            immediateMedia           [02]    UnsignedByte OPTIONAL,
            immediateAddress         [03]    AddressInfo OPTIONAL,
            autoCopyMedia            [04]    UnsignedByte OPTIONAL,
            autoCopyAddress          [05]    AddressInfo OPTIONAL
}
```
-- Name and number shall be included in the address information, if the
-- information is available. If number shall not be presented for the service

-160-

-- user, e.g. if the destination is an operator defined destinations, the
-- name shall be included in the address information and the index in the
-- routing table shall be sent as address, e.g. #4. If the name is not available,
-- only the number shall be included.
-- Immediate and auto copy media: 0 = Voice, 1 = Fax group3, 2 = Fax group4,
-- 3 = SMS, 4 = E-mail, 5 = Ermes, 6 = teletex, 7 = telex.

```
RetrieveLanguageResultArg ::= SEQUENCE {
        language            [00]    UnsignedByte
}
```
-- The value for the different languages complies to the values specified for
-- the data type Language in the above sections under the heading "ITAP -
OPERATIONS".

```
RetrieveNameOfRoutingTablesResultArg ::= SEQUENCE {
        routingTableID      [00]    SEQUENCE OF UnsignedByte,
        routingTableName    [01]    SEQUENCE OF SMSString
}
```
-- List of name and identities of routing tables. The size of the "SEQUENCE
-- OF" parameters is in the range of SIZE(1..5). The routing table identifier
-- can be in the range (1..5).

```
RetrieveNewMessageInfoResultArg::= SEQUENCE {
        numberOfNew         [00]    LongInt,
        numberOfOld         [01]    LongInt,
        numberOfSaved       [02]    LongInt,
        media               [03]    UnsignedByte,
        originator          [04]    AddressInfo,
        timeStamp           [05]    DateAndTime
}
```
-- Media: 0 = Voice mail, 1 = Fax mail, 2 = E-mail, 3 = SMS

-161-

```
RetrieveNotificationTypeResultArg::= SEQUENCE {
            notificationStatus      [00]    BOOLEAN,
            typeOfNotification      [01]    UnsignedByte,
            notificationAddress     [02]    AddressInfo OPTIONAL
}
-- Type of notification: 0 = Dial out, 1 = Pager, 2 = SMS, 3 = Fax, 4 = E-mail
-- 5 = USSD, 6 = ITAP RetrieveRoutingListArg ::= SEQUENCE {
            typeOfList              [00]    UnsignedByte
}
-- Type of list:
-- 0 = Routing table management, subscriber and operator defined
-- destinations are returned.
-- 1 = Incoming Call selection Transfer Call, subscriber and operator defined
-- destinations are returned together with the latest transfer destinations.
-- 2 = Fax management, subscriber and operator defined destinations are returned.
-- 3 = E-mail management, default destinations for E-mails are returned.

RetrieveRoutingListResultArg ::= SEQUENCE {
            destinations            [00]    SEQUENCE OF AddressInfo OPTIONAL,
            latestDestinations      [01]    SEQUENCE OF AddressInfo OPTIONAL
}
-- The size of the "SEQUENCE OF" destination parameter is in the range of
-- SIZE(1..10) and the latestDestinations is in the range of SIZE(1..2).  Name
-- and number shall be included in the address information, if the information
-- is available.  If number shall not be presented for the service user, e.g. if the
-- destination is an operator defined destinations, the name parameter in the
-- address information data type shall contain the name of the destination and
-- the number parameter shall contain the a hash mark followed by the index
-- in the routing list, e.g. #4.
```

-162-

-- When the service user selects an entry from the routing list, the address
-- information from the routing list shall be sent to the SN. If it is an operator
-- defined destination, the SN shall use the routing list index in the number
-- parameter the to find the actual address. If the name is not available, only
-- the number shall be included.

```
RetrieveRoutingTableArg ::= SEQUENCE {
            routingTableID      [00]    UnsignedByte
}
```
-- The routing table identifier can be in the range (1..5).

```
RetrieveRoutingTableResultArg ::= SEQUENCE {
            callFirst           [00]    SEQUENCE OF AddressInfo OPTIONAL,
            callSecond          [01]    SEQUENCE OF AddressInfo OPTIONAL,
            callThird           [02]    SEQUENCE OF AddressInfo OPTIONAL
}
```
-- The size of the "SEQUENCE OF" parameters is in the range of SIZE(1..2).
-- Name and number shall be included in the address information, if the
-- information is available. If number shall not be presented for the service
-- user, e.g. if the destination is an operator defined destinations, the
-- name shall be included in the address information and the index in the
-- routing table shall be sent as address, e.g. #4. If the name is not available,
-- only the number shall be included.

```
RetrieveScreeningProfileResultArg ::= SEQUENCE {
            situationScreeningActive    [00]    BOOLEAN,
            callerIdScreeningActive     [01]    BOOLEAN,
            screeningReason             [02]    UnsignedByte,
            timeStamp                   [03]    DateAndTime OPTIONAL,
            screeningDestination        [04]    AddressInfo OPTIONAL
}
```

-163-

-- If screening is active the screening reason indicates the current screening
-- reason, e.g. meeting, vacation. If the screening is not active this parameter
-- indicates the last expired screening reason. Screening reason can be in the
-- range 1 - 10.

RetrieveScreeningReasonsResultArg ::= SEQUENCE {
    screeningReason    [00]    SEQUENCE OF SMSString OPTIONAL
}
-- Text associated with the screening reason, e.g. meeting, vacation. The size
-- of the "SEQUENCE OF" parameter is in the range of 1 - 10.

RetrieveSearchTimesArg ::= SEQUENCE {
    routingTableID    [00]    UnsignedByte
}
-- The routing table identifier can be in the range (1..5).

RetrieveSearchTimesResultArg ::= SEQUENCE {
    searchTimeCallFirst    [00]    UnsignedByte,
    searchTimeCallSecond    [01]    UnsignedByte,
    searchTimeCallThird    [02]    UnsignedByte
}
-- The search time can be in the range of 1 - 60 seconds.

SaveMessageArg::= SEQUENCE {
    messageID    [00]    LongInt OPTIONAL,
    media    [01]    UnsignedByte OPTIONAL,
    tag    [02]    SMSString OPTIONAL
}
-- Media: 0 = Voice mail, 1 = Fax mail, 2 = E-mail, 3 = SMS
-- The tag will be stored together with the message. The message id
-- and media can be omitted if the operation is invoked during the playing of

-164-

-- voice message. Message id and media shall then be fetched by the SN from
-- the current message.

```
SendMessageArg::= SEQUENCE {
            messageID           [00]    LongInt,
            media               [01]    UnsignedByte,
            recipientMedia      [02]    UnsignedByte,
            recipientAddress    [03]    AddressInfo
}
```
-- Media: 0 = Voice mail, 1 = Fax mail, 2 = E-mail, 3 = SMS
-- Recipient media: 0 = Voice, 1 = Fax group3, 2 = Fax group4, 3 = SMS,
-- 4 = E-mail, 5 = Ermes, 6 = teletex, 7 = telex.

```
SetActiveRoutingTableArg ::= SEQUENCE {
            routingTableID      [00]    UnsignedByte
}
```
-- Sets active routing Table. The routing table identifier can be in the range
-- (1..5).

```
SetUpCallArg::= SEQUENCE {
            bNumber             [00]    AddressInfo OPTIONAL
}
```
-- Number that the call shall be established to. The bnumber can be omitted if
-- the operation is invoked during the playing of voice messages. The SN shall
-- then fetch the number from the current message.

```
TransferCallArg ::= SEQUENCE {
            transferToNumber    [00]    AddressInfo
}
```
-- Number to which the call will be transferred. If the transfer destination is a
-- entry from the routing list, the complete address information from the

-165-

-- routing list shall be sent. If the transfer destination is from the local address
-- book or a manually entered number, only the number shall be sent to the SN.

```
    UpdateAuthenticationStatusArg ::= SEQUENCE {
5           authenticationActive    [00]    BOOLEAN
    }
```
-- Authentication status active (On/Off)

```
    UpdateBusyAndNoAnswerDestArg ::= SEQUENCE {
10          busyDestination         [00]    AddressInfo,
            noAnswerDestination     [01]    AddressInfo
    }
```
-- If the address information are entries from the routing list, the complete
-- address information from the routing list shall be sent. If the address
15 -- information are from the local address book or manually entered numbers,
-- only the numbers shall be sent to the SN.

```
    UpdateEntryInScreeningListArg ::= SEQUENCE {
            typeOfList              [00]    UnsignedByte,
20          index                   [01]    UnsignedByte,
            screeningAddress        [02]    AddressInfo
    }
```
-- Type of list: 0 = White list, 1 = Black List
-- Index: Index of the entry in the screening list that shall be updated.
25 -- New PIN-Code or Identity of caller that shall be updated in the screening list.

```
    UpdateImmediateDeliveryArg::= SEQUENCE {
            sourceMedia             [00]    UnsignedByte,
            immediateDeliveryActive [01]    BOOLEAN,
30          autoCopyActive          [02]    BOOLEAN,
            immediateMedia          [03]    UnsignedByte OPTIONAL,
```

-166-

```
            immediateAddress        [04]    AddressInfo OPTIONAL,
            autoCopyMedia           [05]    UnsignedByte OPTIONAL,
            autoCopyAddress         [06]    AddressInfo OPTIONAL
}
```
-- If the address information are entries from the routing list, the complete
-- address information from the routing list shall be sent. If the address
-- information are from the local address book or manually entered numbers,
-- only the numbers shall be sent to the SN.
-- Source media: 0 = Voice mail, 1 = Fax mail, 2 = E-mail, 3 = SMS
-- Immediate and auto copy media: 0 = Voice, 1 = Fax group3, 2 = Fax
-- group4, 3 = SMS, 4 = E-mail, 5 = Ermes, 6 = teletex, 7 = telex.

```
UpdateLanguageArg ::= SEQUENCE {
            language                [00]    UnsignedByte
}
```
-- The value for the different languages complies to the values specified for
-- the data type Language in the above sections under the heading "ITAP -
OPERATIONS".

```
UpdateNameOfRoutingTableArg::= SEQUENCE {
            routingTableID          [00]    UnsignedByte,
            routingTableName        [01]    SMSString
}
```
-- Updates the name of a routing table. The routing table identifier can be in
-- the range (1..5).

```
UpdateNotificationTypeArg::= SEQUENCE {
            notificationStatus      [00]    BOOLEAN,
            typeOfNotification      [01]    UnsignedByte,
            notificationAddress     [02]    AddressInfo OPTIONAL
}
```

-167-

-- Type of notification: 0 = Dial out, 1 = Pager, 2 = SMS, 3 = Fax, 4 = E-mail
-- 5 = USSD, 6 = ITAP

```
     UpdatePINCodeArg ::= SEQUENCE {
5            oldPINCode        [00]   Number,
             newPINCode        [01]   Number
     }
```
-- The old PIN code is compared with the PIN code stored in the profile
-- before the PIN code is updated.

```
10
     UpdateRoutingTableArg ::= SEQUENCE {
             routingTableID    [00]   UnsignedByte,
             callFirst         [01]   SEQUENCE OF AddressInfo OPTIONAL,
             callSecond        [02]   SEQUENCE OF AddressInfo OPTIONAL,
15           callThird         [03]   SEQUENCE OF AddressInfo OPTIONAL
     }
```
-- The routing table identifier can be in the range (1..5). The size of the
-- "SEQUENCE OF" parameters is in the range of SIZE(1..2).
-- If the address information are entries from the routing list, the complete
20 -- address information from the routing list shall be sent. If the address
-- information are from the local address book or manually entered numbers,
-- only the numbers shall be sent to the SN.

```
     UpdateScreeningProfileArg ::= SEQUENCE {
25           situationScreeningActive   [00]   BOOLEAN,
             callerIdScreeningActive    [01]   BOOLEAN,
             screeningReason            [02]   UnsignedByte,
             timeStamp                  [03]   DateAndTime OPTIONAL,
             screeningDestination       [04]   AddressInfo OPTIONAL
30   }
```
-- The screening reason indicates the current screening reason, e.g. meeting,

-168-

-- vacation. Screening reason can be in the range 1 - 10.

```
UpdateSearchTimesArg ::= SEQUENCE {
            routingTableID          [00]    UnsignedByte,
            searchTimeCallFirst     [01]    UnsignedByte,
            searchTimeCallSecond    [02]    UnsignedByte,
            searchTimeCallThird     [03]    UnsignedByte
}
```
-- The routing table identifier can be in the range (1..5). Search times can be
-- in the range of 1 - 60 seconds.

OPERATION CODES

Call related operations

| | |
|---|---|
| acceptCall AcceptCall | ::= 10 |
| callBack CallBack | ::= 11 |
| holdCall HoldCall | ::= 12 |
| rejectCall RejectCall | ::= 13 |
| setUpCall SetUpCall | ::= 14 |
| transferCall TransferCall | ::= 15 |
| enquiryCallSetUpStatus EnquiryCallSetUpStatus | ::= 16 |

Message related operations

| | |
|---|---|
| cancelMessageDelivery CancelMessageDelivery | ::= 32 |
| deleteMessage DeleteMessage | ::= 33 |
| enquiryDeliveryLog EnquiryDeliveryLog | ::= 34 |
| enquiryMailbox EnquiryMailbox | ::= 35 |
| fastForwarding FastForwarding | ::= 36 |
| getDetailedMessageInfo GetDetailedMessageInfo | ::= 37 |
| mailboxStatus MailboxStatus | ::= 38 |
| pause Pause | ::= 39 |
| playGreeting PlayGreeting | ::= 40 |

-169-

|   |   |   |
|---|---|---|
| | playMessage PlayMessage | ::= 41 |
| | recordGreeting RecordGreeting | ::= 42 |
| | releaseResource ReleaseResource | ::= 43 |
| | retrieveNewMessageInfo RetrieveNewMessageInfo | ::= 44 |
| 5 | rewind Rewind | ::= 45 |
| | saveMessage SaveMessage | ::= 46 |
| | sendMessage SendMessage | ::= 47 |
| | stop Stop | ::= 48 |
| 10 | Profile related operations | |
| | addEntryToScreeningList AddEntryToScreeningList | ::= 64 |
| | deleteCallLogEntry DeleteCallLogEntry | ::= 65 |
| | deleteEntryInScreeningList DeleteEntryInScreeningList | ::= 66 |
| | enquiryCallLog EnquiryCallLog | ::= 67 |
| 15 | enquiryScreeningList EnquiryScreeningList | ::= 68 |
| | retrieveActiveRoutingTable RetrieveActiveRoutingTable | ::= 69 |
| | retrieveBusyAndNoAnswerDest RetrieveBusyAndNoAnswerDest | ::= 70 |
| | retrieveImmediateDelivery RetrieveImmediateDelivery | ::= 71 |
| | retrieveLanguage RetrieveLanguage | ::= 72 |
| 20 | retrieveNameOfRoutingTables RetrieveNameOfRoutingTables | ::= 73 |
| | retrieveNotificationType RetrieveNotificationType | ::= 74 |
| | retrieveRoutingList RetrieveRoutingList | ::= 75 |
| | retrieveRoutingTable RetrieveRoutingTable | ::= 76 |
| | retrieveScreeningProfile RetrieveScreeningProfile | ::= 77 |
| 25 | retrieveScreeningResons RetrieveScreeningResons | ::= 78 |
| | retrieveSearchTimes RetrieveSearchTimes | ::= 79 |
| | setActiveRoutingTable SetActiveRoutingTable | ::= 80 |
| | updateBusyAndNoAnswerDest UpdateBusyAndNoAnswerDest | ::= 81 |
| | updateEntryInScreeningList UpdateEntryInScreeningList | ::= 82 |
| 30 | updateImmediateDelivery UpdateImmediateDelivery | ::= 83 |
| | updateLanguage UpdateLanguage | ::= 84 |

-170-

|    |                                                              |          |
|----|--------------------------------------------------------------|----------|
|    | updateNameOfRoutingTable UpdateNameOfRoutingTable            | ::= 85   |
|    | updateNotificationType UpdateNotificationType                | ::= 86   |
|    | updateRoutingTable UpdateRoutingTable                        | ::= 87   |
|    | updateScreeningProfile UpdateScreeningProfile                | ::= 88   |
| 5  | updateSearchTimes UpdateSearchTimes                          | ::= 89   |

Authentication operations

|    |                                                              |          |
|----|--------------------------------------------------------------|----------|
|    | authenticate Authenticate                                    | ::= 120  |
|    | retrieveAuthenticationStatus RetrieveAuthenticationStatus    | ::= 121  |
| 10 | updateAuthenticationStatus UpdateAuthenticationStatus        | ::= 122  |
|    | updatePINCode UpdatePINCode                                  | ::= 123  |

ERROR CODES

|    |                                                              |          |
|----|--------------------------------------------------------------|----------|
|    | faxdetected FaxDetetced                                      | ::= 20   |
| 15 | hookOn HookOn                                                | ::= 21   |
|    | callAnswered CallAnswered                                    | ::= 22   |
|    | systemFailure SystemFailure                                  | ::= 23   |
|    | unknownMessage UnknownMessage                                | ::= 24   |
|    | accessDeniedToResource AccessDeniedToResource                | ::= 25   |
| 20 | unknownMedia UnknownMedia                                    | ::= 26   |
|    | unknownStatus UnknownStatus                                  | ::= 27   |
|    | unknownResource UnknownResource                              | ::= 28   |
|    | illegalAddress IllegalAddress                                | ::= 29   |
|    | noMoreMessages NoMoreMessages                                | ::= 30   |
| 25 | unknownRoutingTable UnknownRoutingTable                      | ::= 31   |
|    | unknownCallLog UnknownCallLog                                | ::= 32   |
|    | unknownRoutingList UnknownRoutingList                        | ::= 33   |
|    | IllegalOperation IllegalOperation                            | ::= 34   |
|    | authenticationFailed AuthenticationFailed                    | ::= 35   |
| 30 | pINCodeBlocked PINCodeBlocked                                | ::= 36   |
|    | noAnswer NoAnswer                                            | ::= 37   |

-171-

| | |
|---|---|
| busy Busy | ::= 38 |
| notReachable NotReachable | ::= 39 |
| END | |

A number of exemplary ITAP scenarios will now be described with reference to FIGS. 52 through 64.

Figure 52:
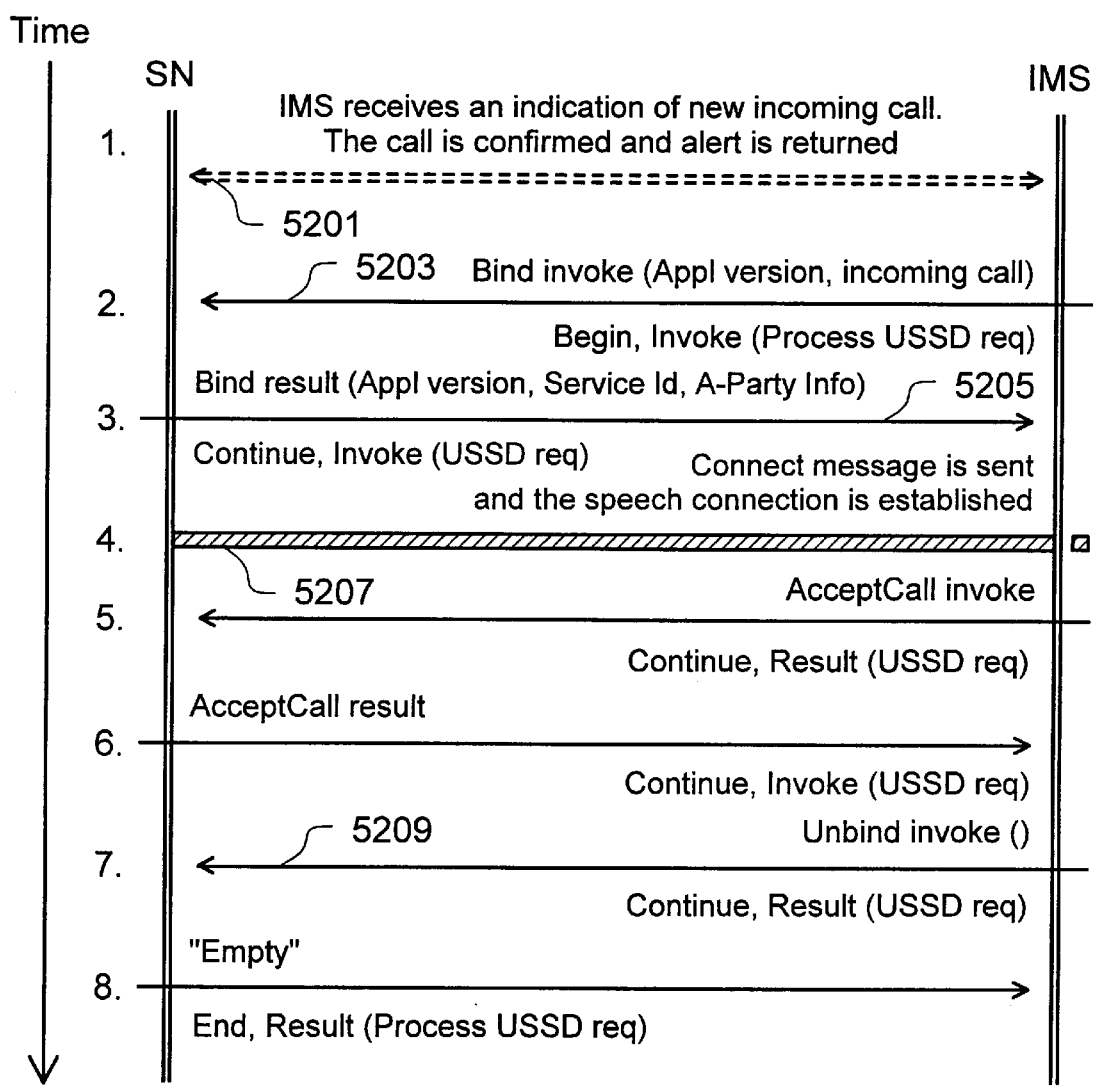
FIGS. 52 through 57 illustrate scenarios relating to incoming call selection.

Referring first to FIGS. 52 through 57, these figures illustrate scenarios relating to incoming call selection. FIG. 52 shows an incoming call selection with the call being accepted. The IMS 1401 starts a new session upon reception of a new call indication (step 5201) in the IMS with the Bind operation (step 5203). The SN 1409 responds with the caller name and number (step 5205). In this example, the IMS application version is equal to the application version in the SN 1409 and the start image description is available in the cache memory. Since the traffic channel is already allocated, the speech connection will be established immediately when the call is accepted locally in the IMS 1401 (step 5207). The new session is closed by sending an Unbind operation (step 5209).

Figure 53:
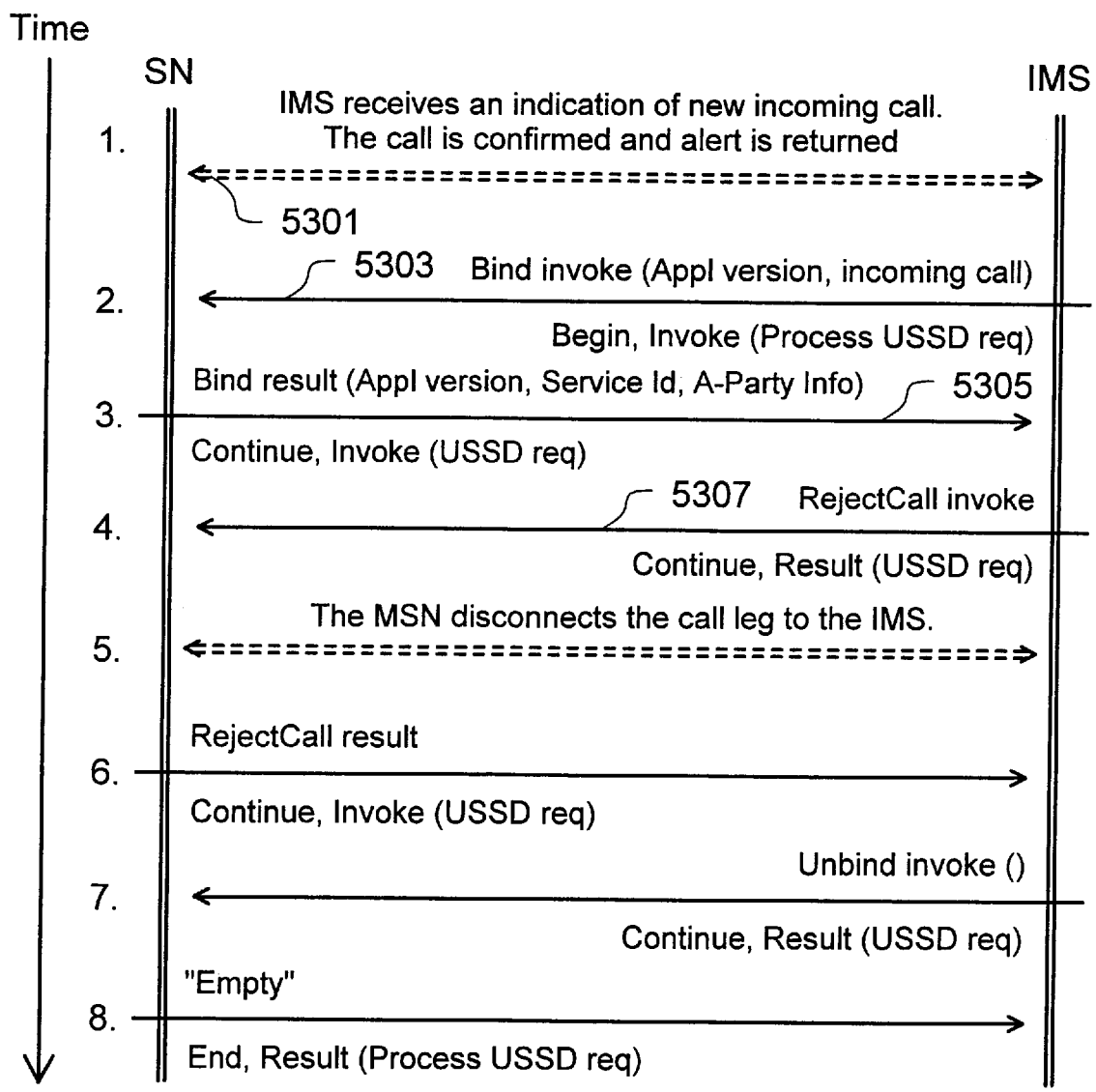

FIG. 53 shows a scenario relating to incoming call selection with the call being rejected. The IMS 1401 starts a new session upon reception of a new call indication in the IMS 1401 (step 5301) with the Bind operation (step 5303). The SN 1409 responds with the caller name and number (step 5305). In this case, the IMS application version is equal to the application version in the service node and the start image description is available in the cache memory. The call is rejected and the signalling resource is released (step 5307).

Figure 54:
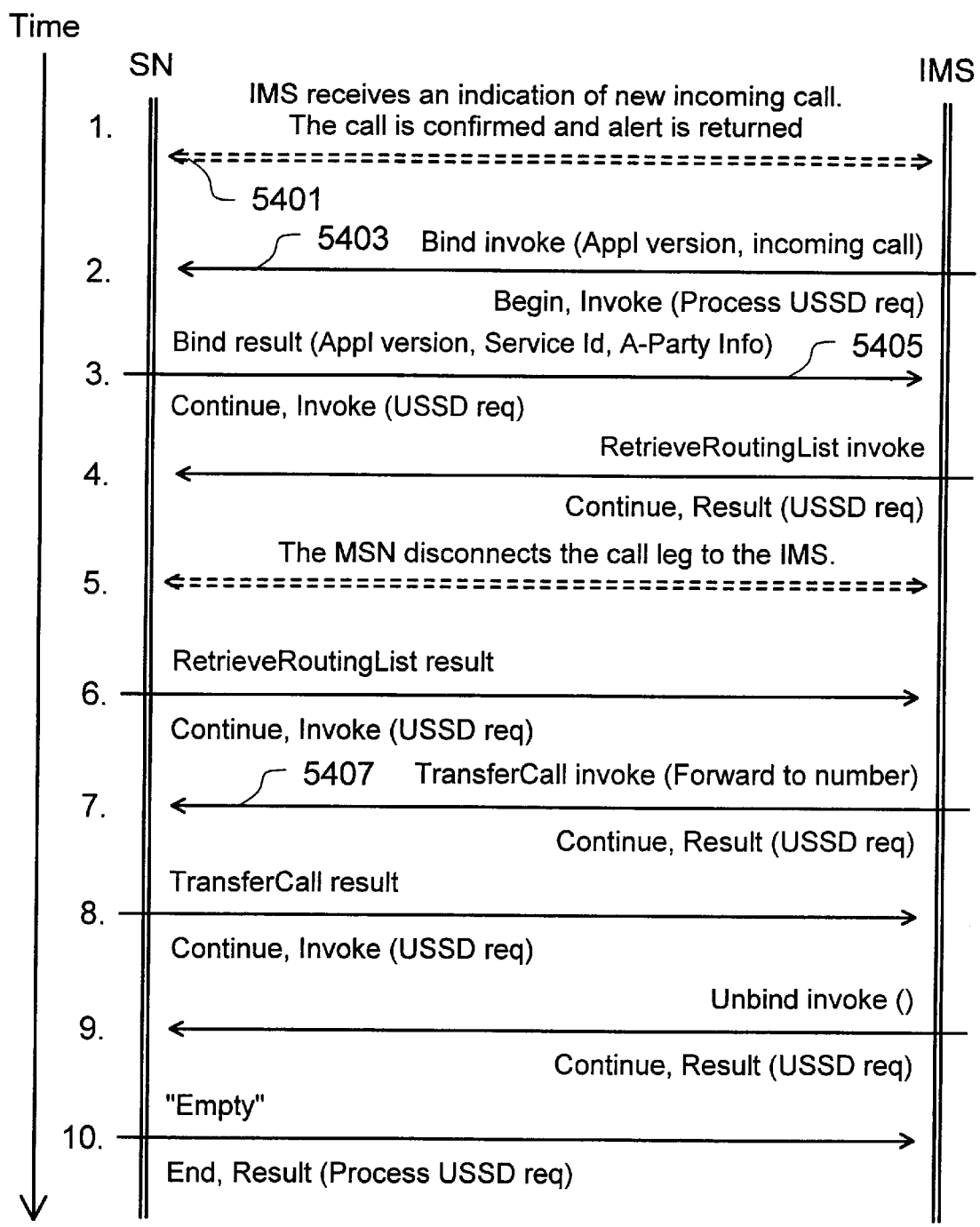

FIG. 54 depicts a scenario relating to incoming call selection with the call being transferred. The IMS 1401 starts a new session upon reception of a new call indication in the IMS 1401 (step 5401) with the Bind operation (step 5403). The service node 1409 responds with the caller name and number (step 5405). In this case, the IMS application version is equal to the application version in the service node 1409 and the start image description is available in the cache memory. The call is transferred (step 5407) and the predefined destinations related to call transfer are updated.

A number of exemplary ITAP scenarios will now be described with reference to FIGS. 52 through 64.

Referring first to FIGS. 52 through 57, these figures illustrate scenarios relating to incoming call selection. FIG. 52 shows an incoming call selection with the call being accepted. The IMS 1401 starts a new session upon reception of a new call indication (step 5201) in the IMS with the Bind operation (step 5203). The SN 1409 responds with the caller name and number (step 5205). In this example, the IMS application version is equal to the application version in the SN 1409 and the start image description is available in the cache memory. Since the traffic channel is already allocated, the speech connection will be established immediately when the call is accepted locally in the IMS 1401 (step 5207). The new session is closed by sending an Unbind operation (step 5209).

FIG. 53 shows a scenario relating to incoming call selection with the call being rejected. The IMS 1401 starts a new session upon reception of a new call indication in the IMS 1401 (step 5301) with the Bind operation (step 5303). The SN 1409 responds with the caller name and number (step 5305). In this case, the IMS application version is equal to the application version in the service node and the start image description is available in the cache memory. The call is rejected and the signalling resource is released (step 5307).

FIG. 54 depicts a scenario relating to incoming call selection with the call being transferred. The IMS 1401 starts a new session upon reception of a new call indication in the IMS 1401 (step 5401) with the Bind operation (step 5403). The service node 1409 responds with the caller name and number (step 5405). In this case, the IMS application version is equal to the application version in the service node 1409 and the start image description is available in the cache memory. The call is transferred (step 5407) and the predefined destinations related to call transfer are updated.

Figure 55:
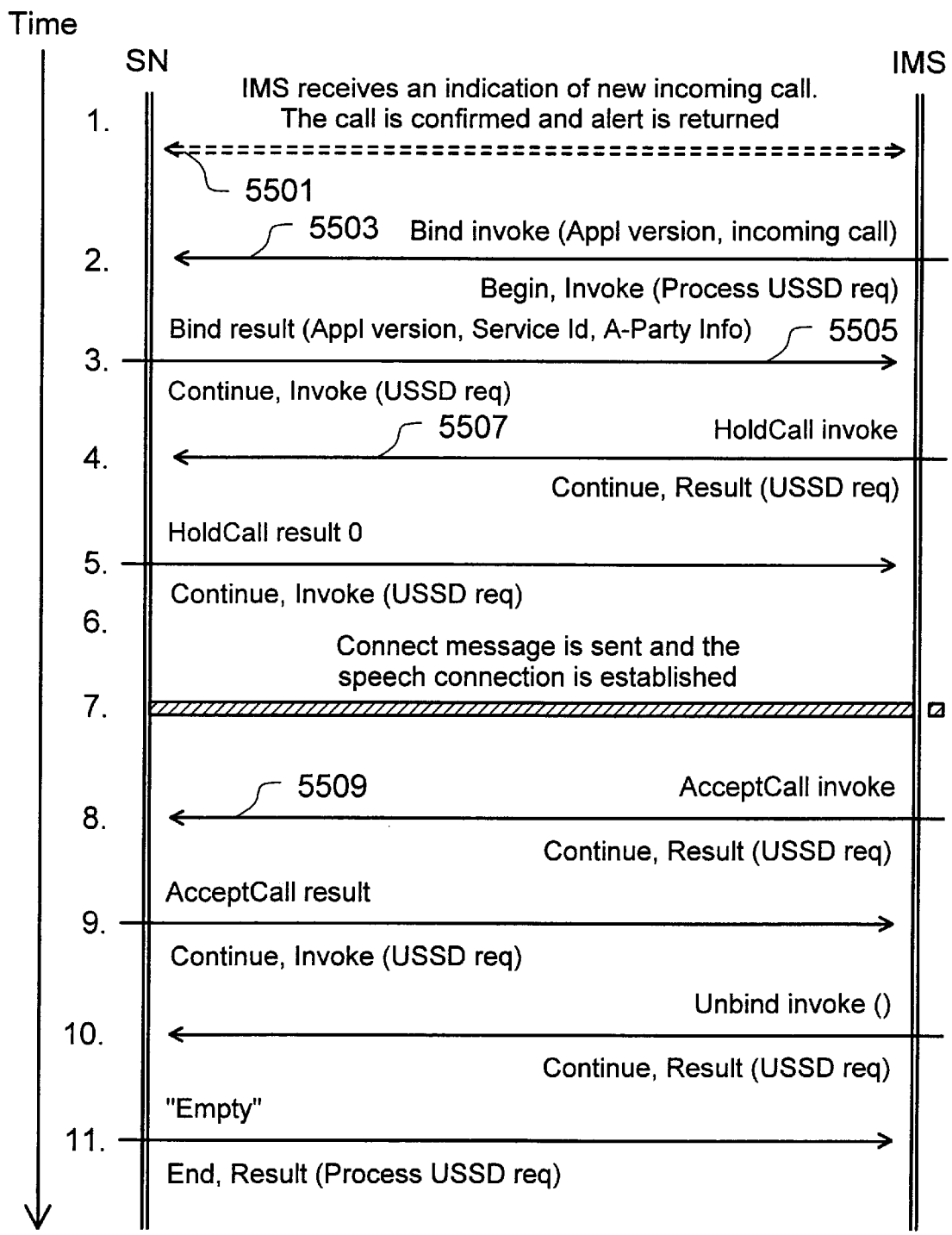

FIG. 55 shows a scenario relating to incoming call selection with a call hold being invoked. The IMS 1401 starts a new session upon reception of a new call indication in the IMS (step 5501) with the Bind operation (step 5503). The service node 1409 responds with the caller name and number (step 5505). In this case, the IMS application version is equal to the application version in the service node 1409 and the start image description is available in the cache memory. The service user requests the caller to hold the line (step 5507) and the call is accepted after a while 5509).

Figure 56:
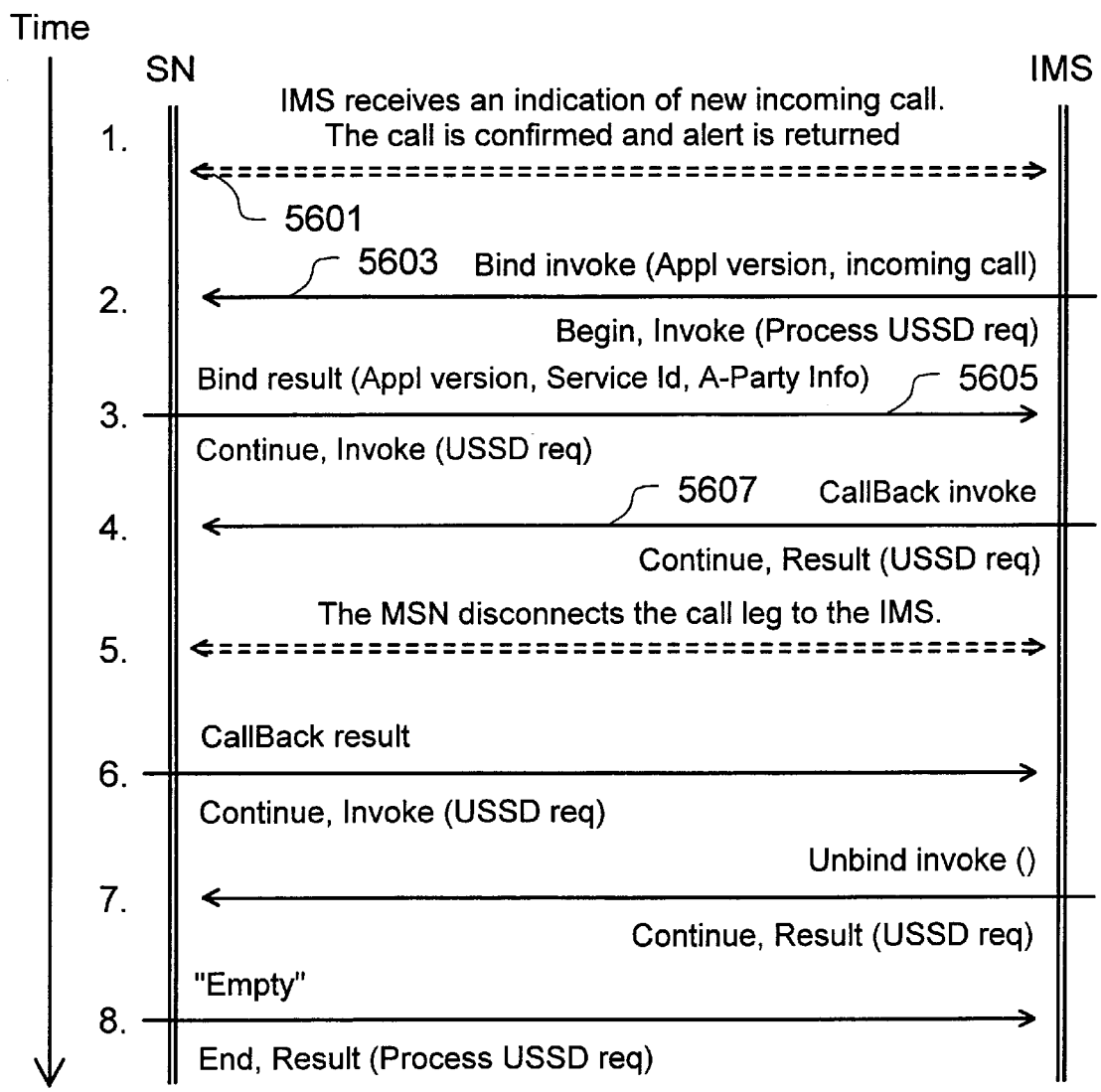

FIG. 56 shows a scenario relating to incoming call selection with a call back being invoked. The IMS 1401 starts a new session upon reception of a new call indication in the IMS 1401 (step 5601) with the Bind operation (step 5603). The service node 1409 responds with the caller name and number (step 5605). In this case, the IMS 1401 application version is equal to the application version in the service node 1409 and the start image description is available in the cache memory. The service user requests the personal access application to play a predefined message to the caller (step 5607).

Figure 57:
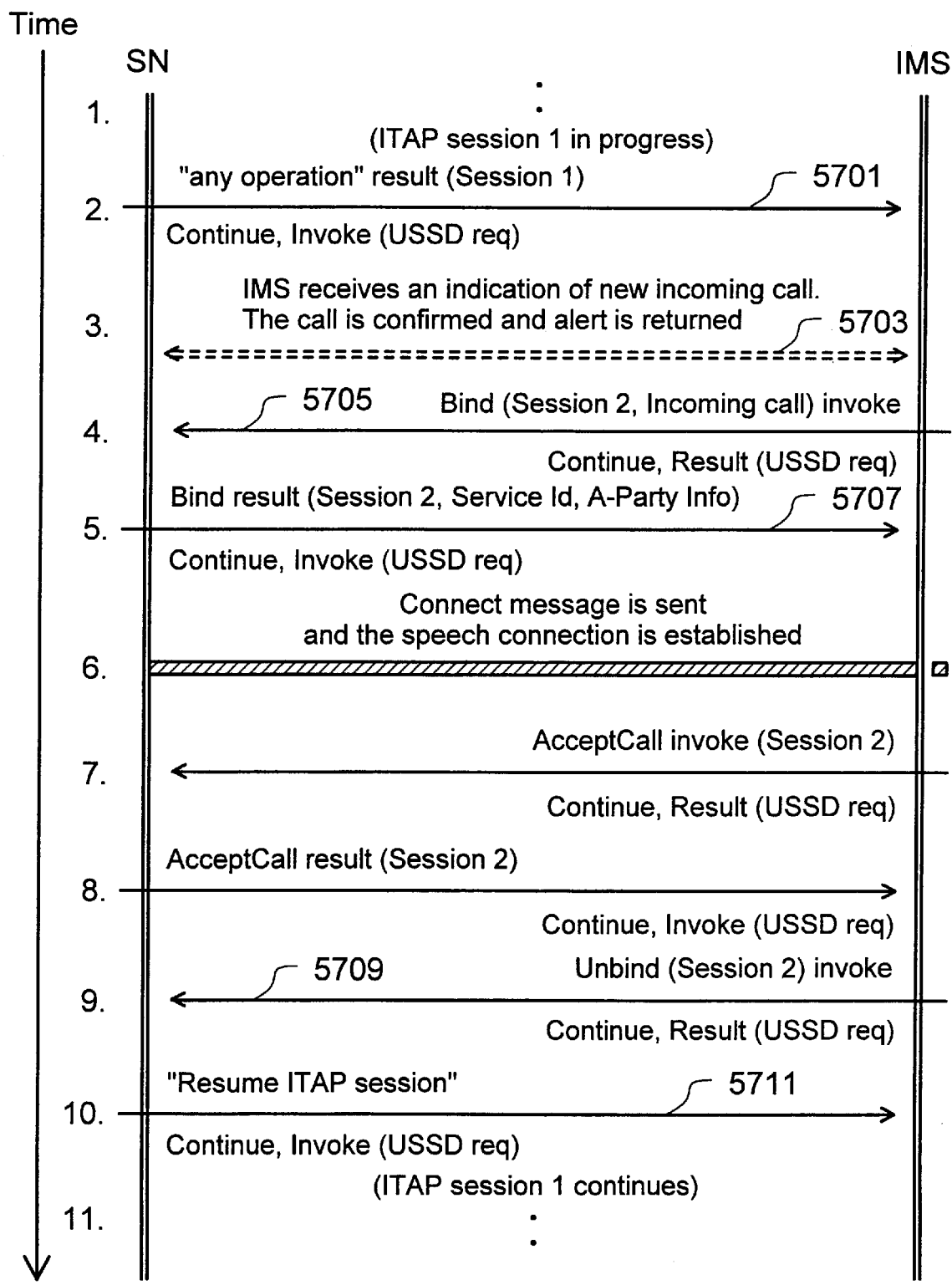

The scenario shown in FIG. 57 relates to incoming call selection when an ITAP session is already in progress. An ITAP session between the service node and the IMS 1401 is already in progress (5701). The IMS 1401 starts a new session upon reception of a new call indication in the IMS 1401 (step 5703) with the Bind operation (step 5705). The service node 1409 responds with the caller name and number (step 5707). Since the call leg is already established to the IMS 1401, accept call is only executed in the IMS 1401. The service node 1409 detects that the call is accepted by monitoring the answer event. The new session is closed by sending an Unbind operation (step 5709). The service node 1409 resumes the old session by sending an empty USSD request operation to the IMS 1401 (step 5711).

Figure 58:
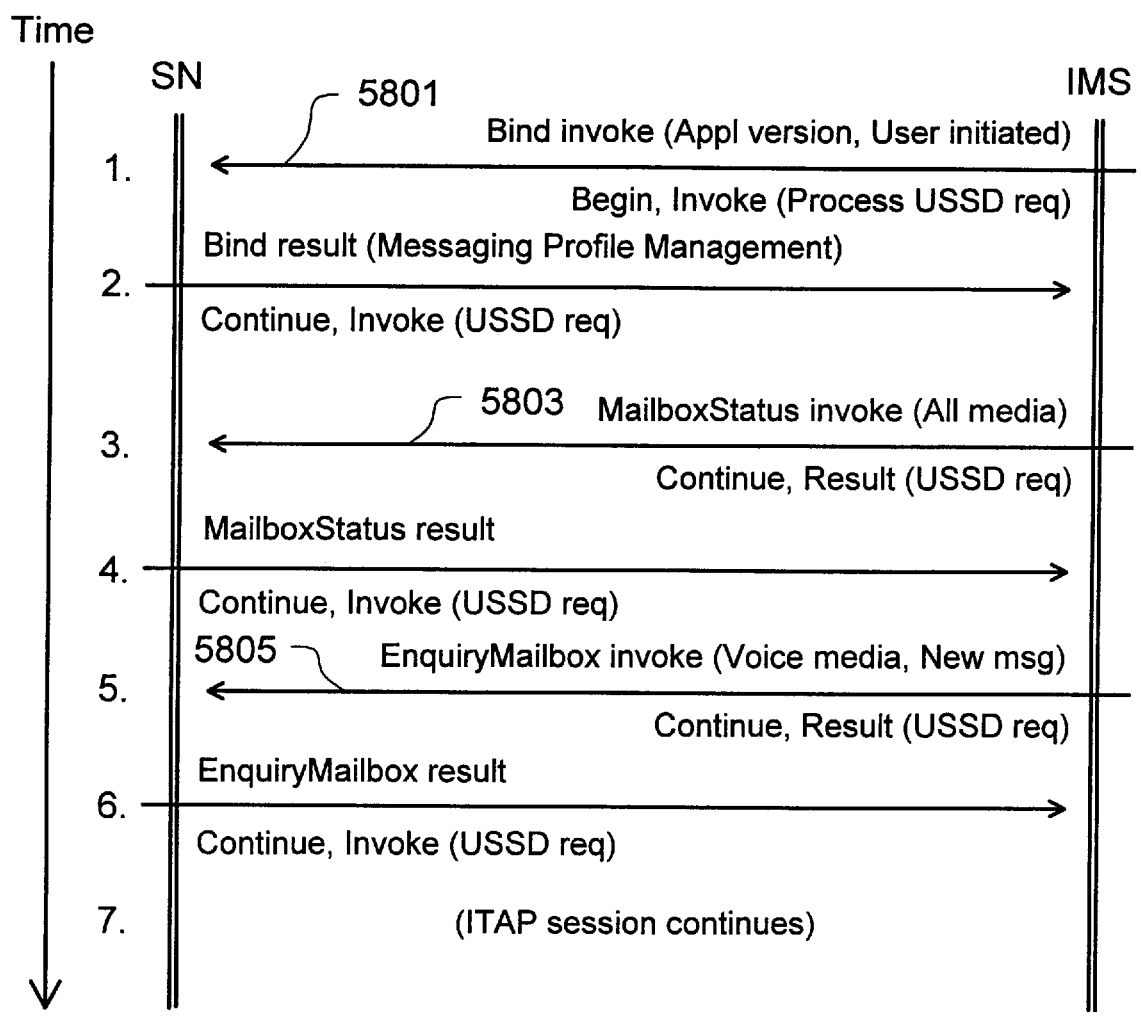
FIGS. 58 through 61 illustrate scenarios involving mailbox-related services, in accordance with one embodiment of the invention.

Mailbox-related services will now be described with reference to FIGS. 58 through 61. In FIG. 58, the service user initiates an ITAP session (step 5801). After issuing a MailboxStatus invoke (step 5803), the service user selects to enquiry the voice mailbox about new messages (step 5805).

Figure 59:
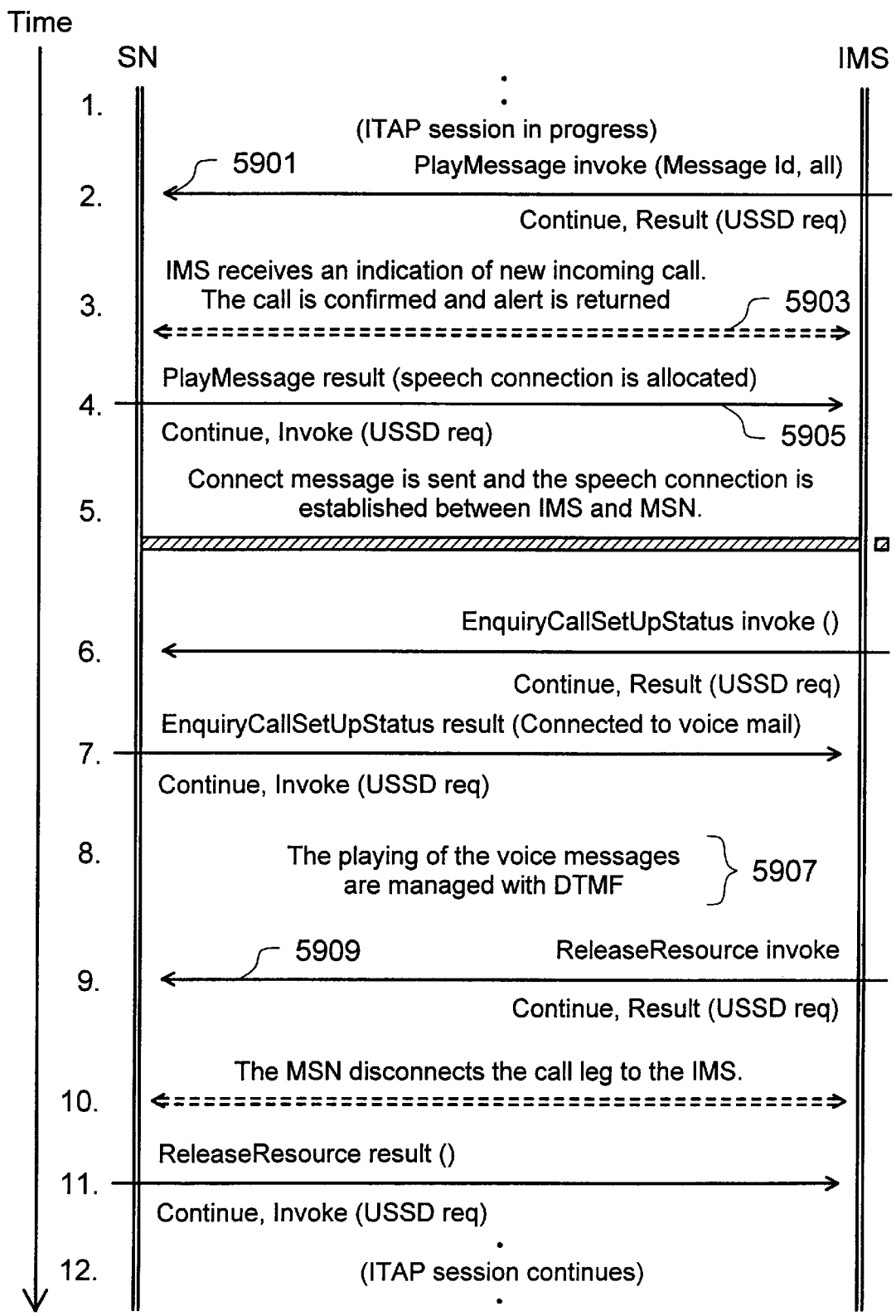

Referring now to FIG. 59, the service user has established an ITAP session and enquired the voice mailbox. The service user selects to play the voice messages (step 5901). Once the speech connection is allocated to the IMS 1401 (step 5903), the result is returned to the IMS 1401 (step 5905). The playing of the voice messages is controlled by DTMF signalling (step 5907). When the service user selects to end the voice mail session, a ReleaseResource operation is sent to the SN 1409 (step 5909).

Figure 60:
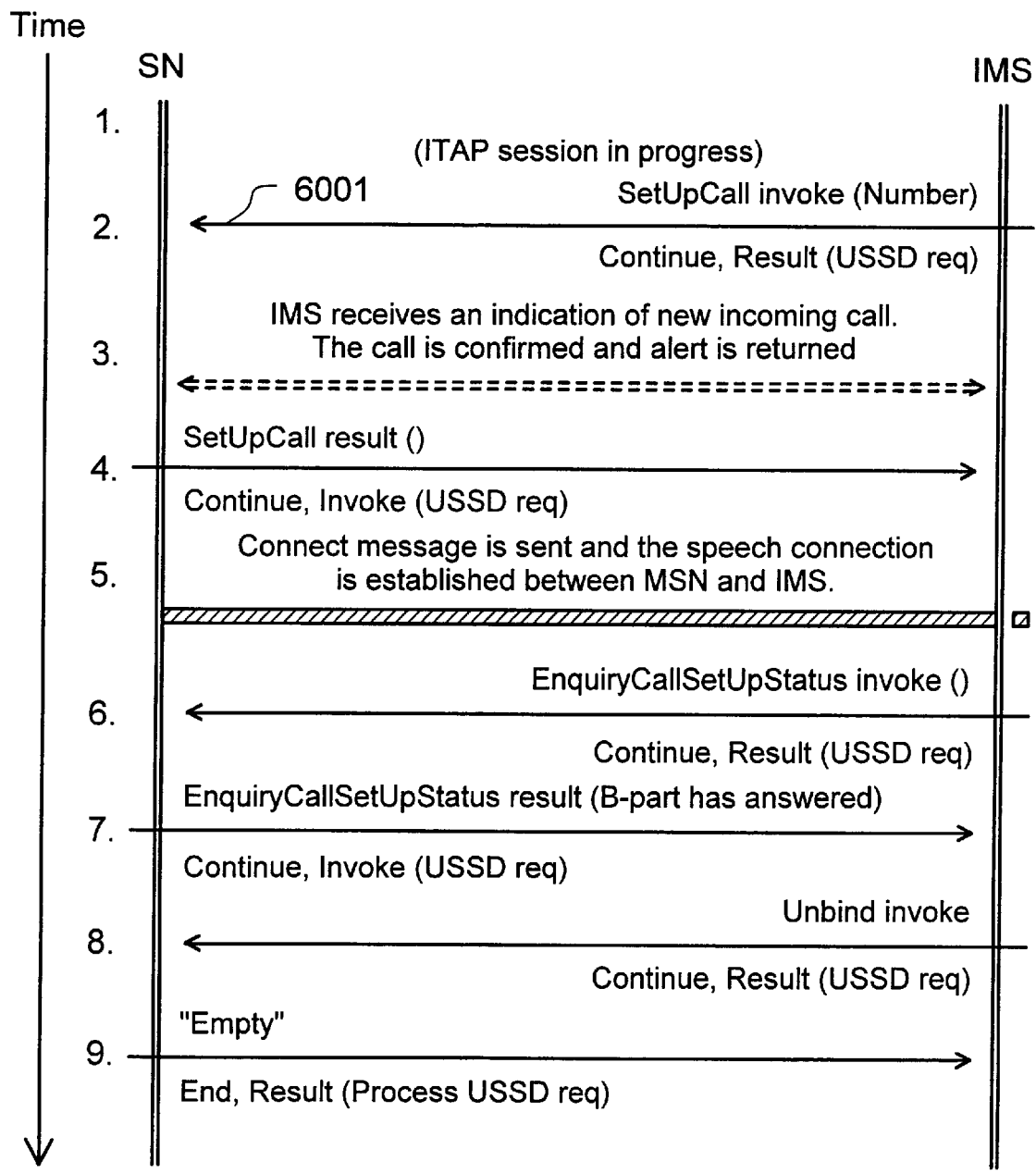

Turning now to FIG. 60, the service user has established an ITAP session and enquired the voice mailbox or any of the call logs. The service user selects to call the originator of the voice message or the number stated in the call log (step 6001). Call setup proceeds as previously described in this document.

Figure 61:
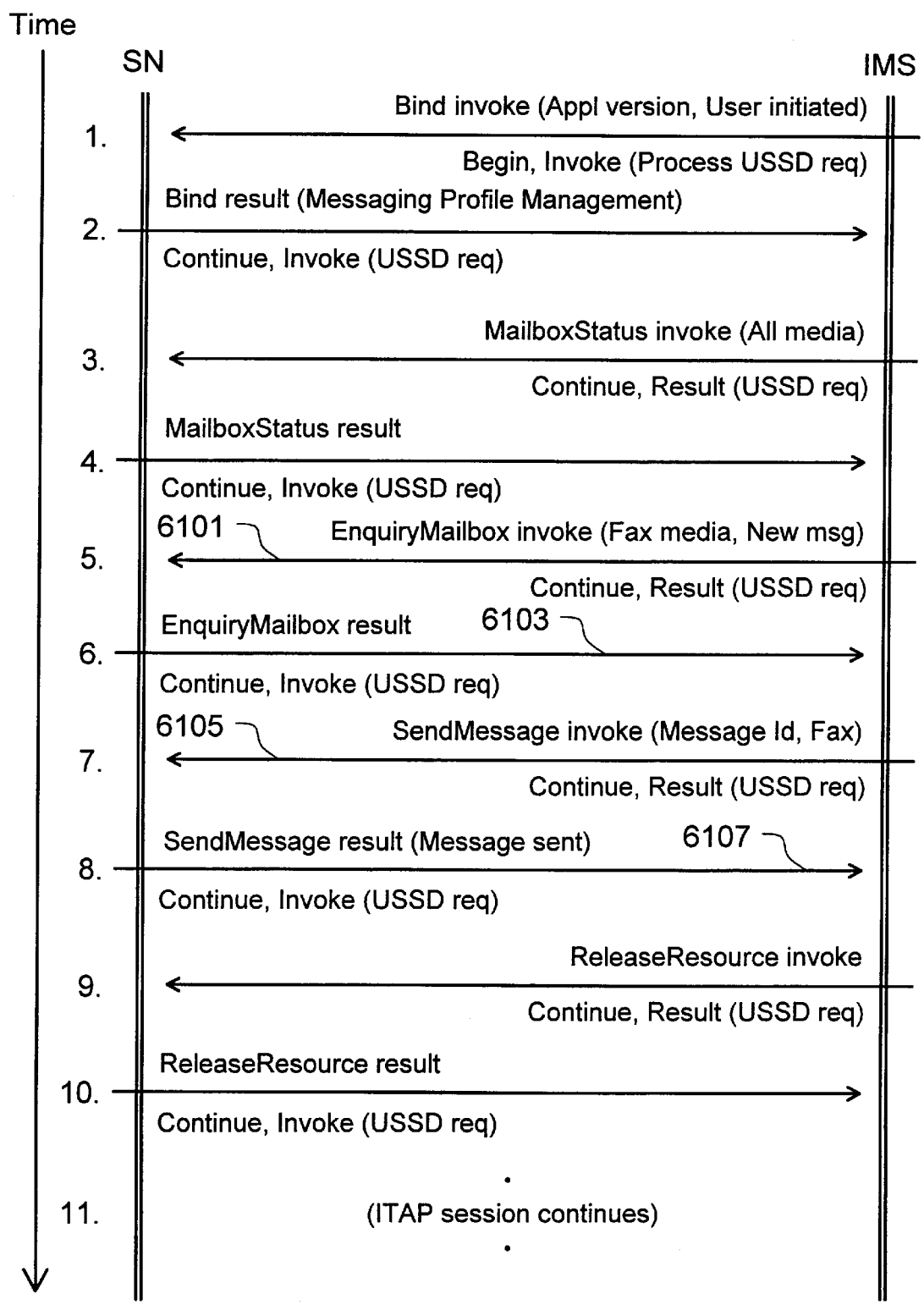

Referring now to FIG. 61, the IMS 1401 initiates an ITAP session and application version is equal in the service node 1409 and in the IMS 1401. The image descriptions are available in the cache. After issuing an EnquiryMailbox invoke (step 6101) and receiving the result (step 6103), the IMS 1401 issues a SendMessage invokd (step 6105) to receive a fax. In response, one new fax message is forwarded (step 6107).

Figure 62:
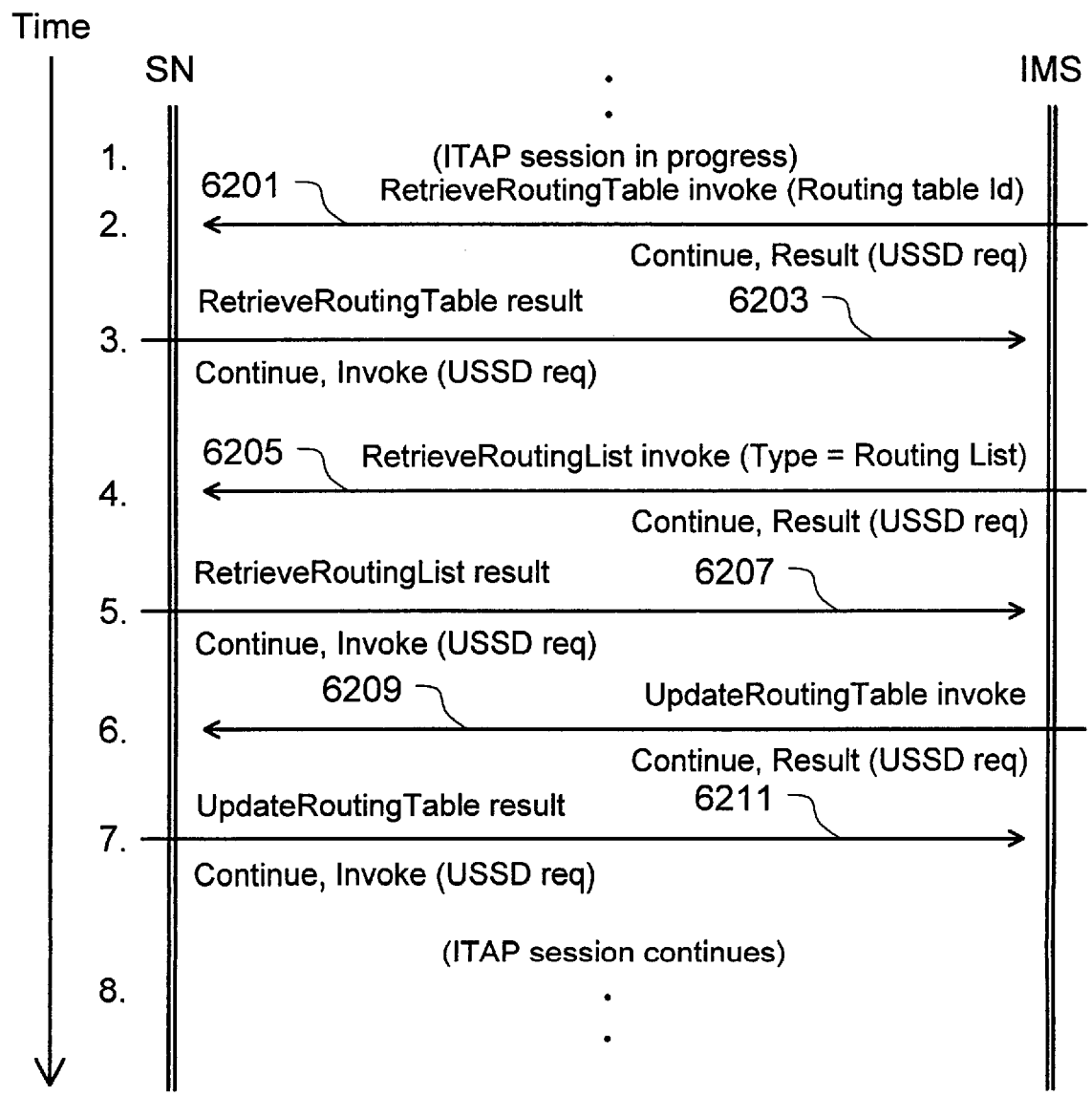
FIGS. 62 and 63 illustrate scenarios involving the updating of a routing table in accordance with one embodiment of the invention.

Updating of the routing table will now be described with reference to FIGS. 62 and 63. Referring first to FIG. 62, one of the routing tables is retrieved from the service node 1409 and displayed for the service user on the IMS 1401 (steps 6201, 6203, 6205 and 6207). The service user modifies the routing table and the tables is saved in the service node (steps 6209 and 6211).

Figure 63:
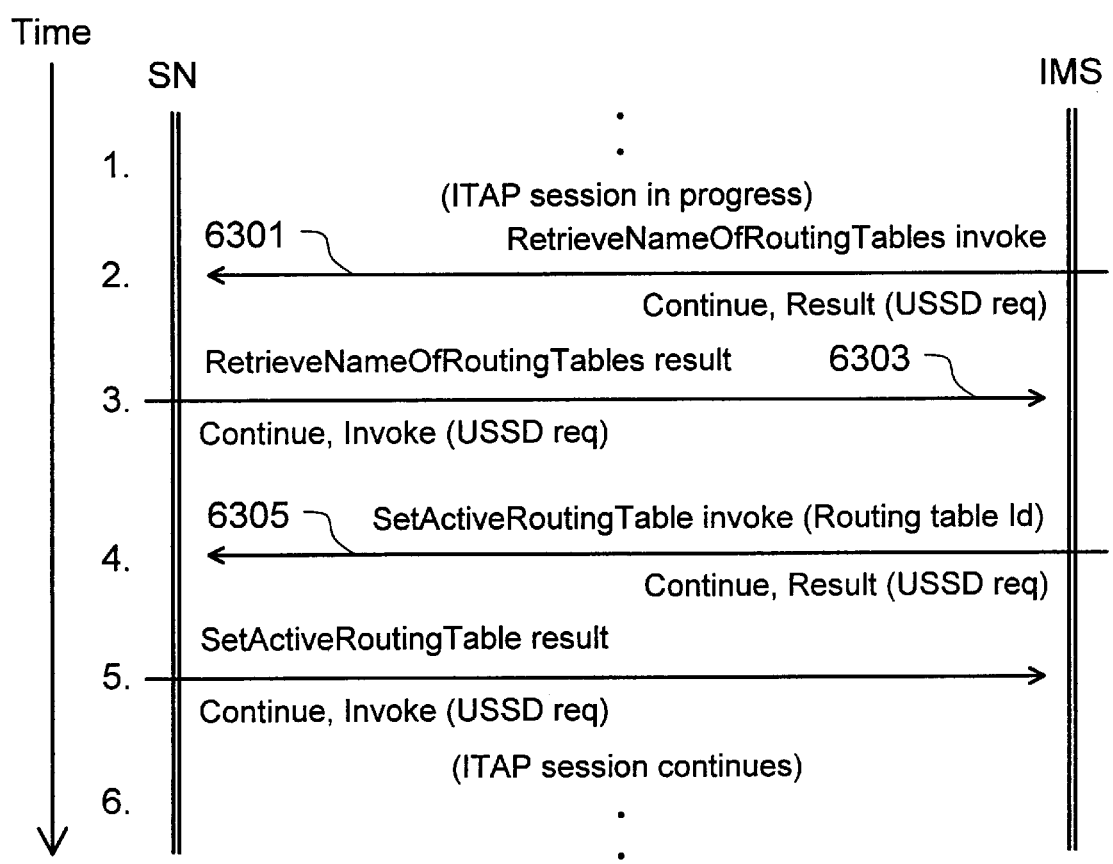

Referring now to FIG. 63, the service node 1409 is enquired about available routing tables (steps 6301 and 6303). The service user selects one routing table and that routing table becomes active by means of the IMS 1401 issuing a SetActive RoutingTable invoke (step 6305).

Figure 64:
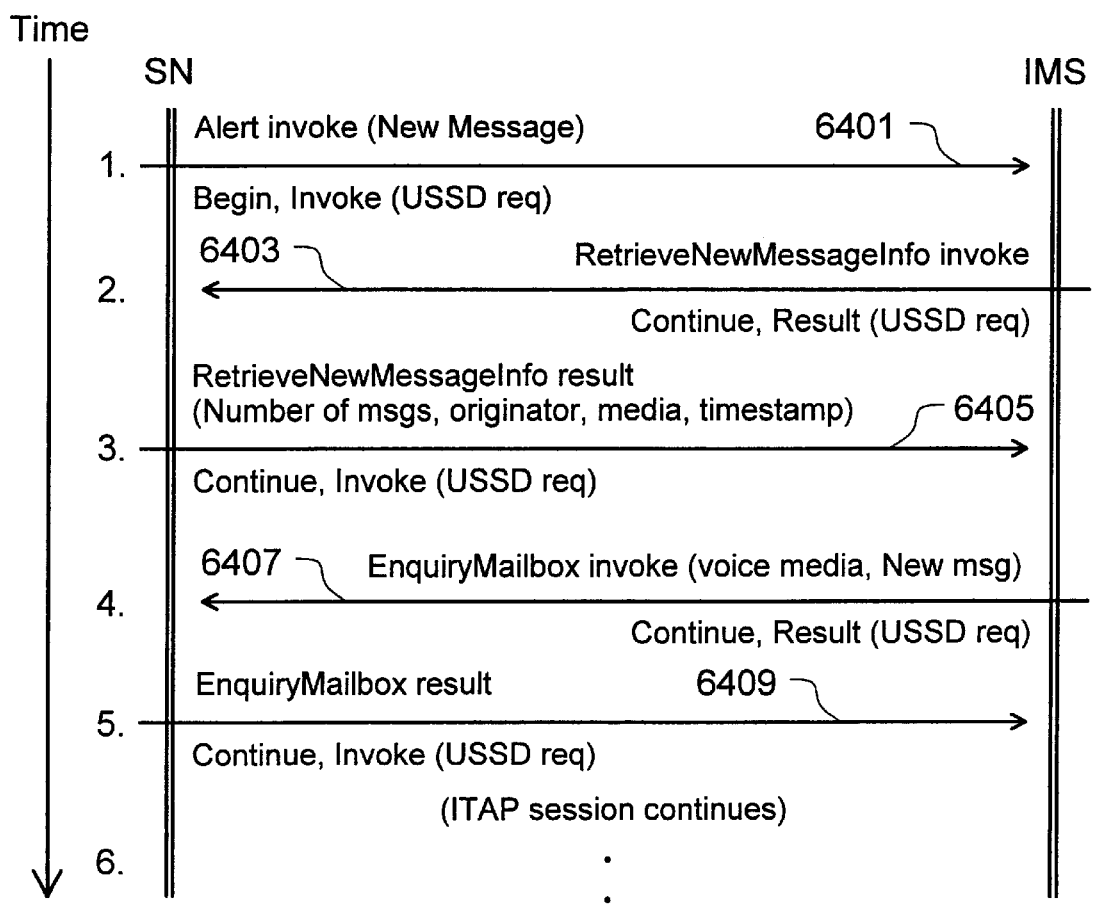
FIG. 64 illustrates a scenario relating to new message notification using ITAP, in accordance with one embodiment of the invention.

New message notification using ITAP will now be described with reference to FIG. 64. Normally SMS is used as the notification medium. However by using ITAP/USSD as a notification medium for new messages, the service user can immediately enquire the mailbox in the already established ITAP session. The SN 1409 alerts the IMS 1401 about a new message (step 6401). In this case, the IMS application version is equal to the application version in the service node 1409 and the start image description is available in the cache memory. The information about the new message is fetched from the SN (steps 6403 and 6405). The service user proceeds by enquiring the mailbox (steps 6407 and 6409). The session continues as described in FIGS. 58 through 61 and the accompanying text.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and A equivalents which fall within the range of the claims are intended to be embraced therein.

What is claimed is:

1. In a communications system that includes a service node connected to an intelligent terminal by means of a limited bandwidth communications means, a method of providing a service to a user of the intelligent terminal, the method comprising the steps of:
   in the service node, analyzing an event to determine a primitive;
   using the limited bandwidth communications means to send a message to the intelligent terminal, wherein the message instructs the intelligent terminal to execute a routine corresponding to the primitive; and
   in the intelligent terminal, responding to the message by executing the routine corresponding to the primitive,
   wherein the step of sending the message to the intelligent terminal is performed independently of whether a speech connection is established on the limited bandwidth communications means.

2. The method of claim 1, wherein:
   the message further includes parameters; and
   the step of executing the routine corresponding to the primitive includes using the received parameters.

3. The method of claim 1, wherein the step of executing the routine includes the step of presenting information to the user of the intelligent terminal.

4. The method of claim 1, wherein the step of executing the routine includes the step of changing a state of the intelligent terminal.

5. The method of claim 1, wherein the event is receipt of a message from the intelligent terminal, the message indicating that the user has activated a man-machine interface of the intelligent terminal.

6. The method of claim 1, wherein the event is detection by the service node of an occurrence of something that affects the intelligent terminal.

7. The method of claim 6, wherein the occurrence is an incoming call directed at the intelligent terminal.

8. The method of claim 1, wherein the step of, in the intelligent terminal, responding to the message by executing the routine corresponding to the primitive comprises the steps of:
   in the intelligent terminal, determining that execution of the routine requires the presence of a state table that is not presently stored in the intelligent terminal;
   using the limited bandwidth communications means to send a message from the intelligent terminal to the service node, wherein the message requests the state table;
   using the limited bandwidth communications means to send the requested state table from the service node to the intelligent terminal; and
   in the intelligent terminal, using the received state table to execute the routine.

9. The method of claim 1, further comprising the step of, in the intelligent terminal, performing menu-handling input and output functions between the intelligent terminal and the user without communicating with the service node.

10. The method of claim 1, further comprising the step of controlling intelligent terminal user input and output functions in accordance with a man-machine interface paradigm that is independent of the service being provided.

11. In a communications system that includes a service node connected to an intelligent terminal by means of a limited bandwidth communications means, a method of providing a service to a user of the intelligent terminal, the method comprising the steps of:
   in the intelligent terminal, analyzing an event to determine an action to be taken;
   using the limited bandwidth communications means to send an operation to the service node, wherein the operation corresponds to the action to be taken and instructs the service node to execute a routine corresponding to the operation;
   in the service node, performing the action corresponding to the operation, and returning a result of the operation to the intelligent terminal via the limited bandwidth communications means; and
   sending an image description from the service node to the intelligent terminal, wherein the image description defines a service application that is run in the intelligent terminal,
   wherein the step of sending the operation to the service node is performed independently of whether a speech connection is established on the limited bandwidth communications means.

12. The method of claim 11, further comprising the step of:
   in the intelligent terminal, initiating a first session with the service node via the limited bandwidth communications means.

13. The method of claim 12, wherein the step of, in the intelligent terminal, initiating a first session with the service node via the limited bandwidth communications means is performed in response to detection of an incoming call at the intelligent terminal.

14. The method of claim 12, wherein the step of, in the intelligent terminal, initiating a first session with the service node via the limited bandwidth communications means is performed in response to a detection that the user has activated a man-machine interface of the intelligent terminal.

15. The method of claim 11, further comprising the step of:
   in the service node, initiating a first session with the intelligent terminal via the limited bandwidth communications means.

16. The method of claim 15, wherein the step of, in the service node, initiating a first session with the intelligent terminal via the limited bandwidth communications means is performed in response to detection of an event directed at the intelligent terminal.

17. The method of claim 12, wherein the step of initiating the first session with the service node comprises the step of negotiating between the intelligent terminal and the service node to ensure that resources that are to be used by the intelligent terminal and the service node are consistent with respect to one another.

18. The method of claim 12, wherein the step of initiating the first session with the service node includes the step of indicating a type of coding that is to be used in communications between the intelligent terminal and the service node.

19. The method of claim 18, wherein the type of coding is Basic Encoding Rules.

20. The method of claim 18, wherein the type of coding is Packed Encoding Rules.

21. The method of claim 12, further comprising the step of initiating a second session between the intelligent terminal and the service node while maintaining the first session.

22. The method of claim 11, wherein the image description defines operations that are to be performed by the intelligent terminal.

23. The method of claim 11, wherein the image description defines information to be supplied to the user of the intelligent terminal.

24. The method of claim 11, wherein the image description defines one or more steps to be performed by the intelligent terminal in response to detection of an event in the intelligent terminal.

25. The method of claim 24, wherein the image description further defines information to be supplied to the user of the intelligent terminal.

26. The method of claim 11, wherein the image description defines one or more local terminal functions to be performed by the intelligent terminal in response to detection of an event in the intelligent terminal.

27. The method of claim 11, wherein the step of using the limited bandwidth communications means to send an operation to the service node comprises mapping the operation onto an "Unstructured Supplementary Services Data" protocol data unit.

28. The method of claim 11, wherein the step of using the limited bandwidth communications means to send an operation to the service node comprises mapping the operation onto two or more "Unstructured Supplementary Services Data" protocol data units.

29. The method of claim 11, wherein the step of using the limited bandwidth communications means to send an operation to the service node comprises mapping the operation onto a Short Message Service protocol data unit.

30. The method of claim 11, wherein the step of using the limited bandwidth communications means to send an operation to the service node comprises mapping the operation onto a protocol data unit of a lower layer protocol.

31. The method of claim 30, further comprising the step of sending an operation from the intelligent terminal to the service node in order to avoid an occurrence of a timeout associated with a service provider of the lower layer protocol.

32. The method of claim 30, wherein the operation is associated with an application protocol service provider, and further comprising the steps of terminating and reestablishing a session of the application protocol service in order to avoid an occurrence of a timeout associated with a service provider of the lower layer protocol.

33. The method of claim 11, wherein the step of using the limited bandwidth communications means to send an operation to the service node comprises mapping the operation onto two or more protocol data units of a lower layer protocol.

34. The method of claim 11, further comprising the steps of:
performing a local service function in the intelligent terminal without requesting assistance from the service node.

35. The method of claim 11, wherein the step of, in the service node, returning the result of the operation to the intelligent terminal via the limited bandwidth communications means comprises mapping the result onto two or more protocol data units of a lower layer protocol.

36. An apparatus for providing a service to a user, comprising:
an intelligent terminal;
a service node; and
a communications means for transporting information between the intelligent terminal and the service node, wherein the intelligent terminal comprises:
a terminal bearer service provider, coupled to the communications means, for exchanging protocol data units with a service node bearer service provider located in the service node;
a terminal application protocol service provider that uses the terminal bearer service provider to establish a first session with a service node application protocol service provider located in the service node and for exchanging operations with the service node application protocol service provider without requiring that the terminal bearer service provider establish a speech connection on the communications means; and
a terminal service application for providing a local service to the user, and for using the terminal application protocol service provider to invoke a remote user service that is to be performed by a service node service application,
and wherein the service node comprises:
the service node bearer service provider, coupled to the communications means, for exchanging protocol data units with the terminal bearer service provider located in the intelligent terminal;
the service node application protocol service provider that uses the service node bearer service provider to establish the first session with the terminal application protocol service provider located in the intelligent terminal and for exchanging operations with the terminal application protocol service provider without requiring that the service node bearer service provider establish a speech connection on the communications means; and
the service node service application for performing the remote service, and for using the service node application protocol service provider to supply results of the remote service to the terminal service application.

37. The apparatus of claim 36, wherein the terminal service application is an image description interpreter.

38. The apparatus of claim 37, wherein the service node application protocol service provider comprises means for sending an image description to the terminal application protocol service provider,
and wherein the terminal application protocol service provider comprises means for receiving the image description and for supplying the image description to the image description interpreter.

39. The apparatus of claim 38, wherein the image description defines operations that are to be performed by the intelligent terminal.

40. The apparatus of claim 38, wherein the image description defines information to be supplied to the user of the intelligent terminal.

41. The apparatus of claim 38, wherein the image description defines one or more steps to be performed by the intelligent terminal in response to detection of an event in the intelligent terminal.

42. The apparatus of claim 41, wherein the image description further defines information to be supplied to the user of the intelligent terminal.

43. The apparatus of claim 38, wherein the image description defines one or more local terminal functions to be performed by the intelligent terminal in response to detection of an event in the intelligent terminal.

44. The apparatus of claim 36, wherein the terminal application protocol service provider establishes the first session in response to detection of an incoming call at the intelligent terminal.

45. The apparatus of claim 36, wherein the terminal application protocol service provider establishes the first session in response to a detection that the user has activated a man-machine interface of the intelligent terminal.

46. The apparatus of claim 36, wherein the service node application protocol service provider establishes the first session with the terminal application protocol service provider in response to detection of an event directed at the intelligent terminal.

47. The apparatus of claim 36, wherein the terminal application protocol service provider comprises means for negotiating with the service node application protocol service provider to ensure that resources that are to be used by the intelligent terminal and the service node are consistent with respect to one another.

48. The apparatus of claim 36, wherein the terminal application protocol service provider includes means for indicating to the service node application protocol service provider a type of coding that is to be used in communications between the intelligent terminal and the service node.

49. The apparatus of claim 48, wherein the type of coding is Basic Encoding Rules.

50. The apparatus of claim 48, wherein the type of coding is Packed Encoding Rules.

51. The apparatus of claim 36, wherein the terminal application protocol service provider further includes means for establishing a second session with the service node application protocol service provider while maintaining the first session.

52. The apparatus of claim 36, wherein the terminal application protocol service provider uses the terminal bearer service provider by mapping an operation onto two or more protocol data units.

53. The apparatus of claim 52, wherein the terminal application protocol service provider includes means for sending an operation from the intelligent terminal to the service node in order to avoid an occurrence of a timeout associated with the terminal and service node bearer service providers.

54. The apparatus of claim 52, wherein the terminal application protocol service provider includes means for terminating and reestablishing the first session in order to avoid an occurrence of a timeout associated with the terminal and service node bearer service providers.

55. The apparatus of claim 36, wherein the service node application protocol service provider uses the service node bearer service provider by mapping a response onto two or more protocol data units.

56. An intelligent terminal, comprising:
   coupling means for coupling the intelligent terminal to a communications means for transporting information between the intelligent terminal and a service node;
   a terminal bearer service provider, connected to the coupling means, for exchanging protocol data units with a service node bearer service provider located in the service node;
   a terminal application protocol service provider that uses the terminal bearer service provider to establish a first session with a service node application protocol service provider located in the service node and for exchanging operations with the service node application protocol service provider without requiring that the terminal bearer service provider establish a speech connection on the communications means; and
   a terminal service application for providing a local service to the user, and for using the terminal application protocol service provider to invoke a remote user service that is to be performed by a service node service application.

57. The intelligent terminal of claim 56, wherein the terminal service application is an image description interpreter.

58. The intelligent terminal of claim 57, wherein the terminal application protocol service provider comprises means for receiving an image description from the service node application protocol service provider and for supplying the image description to the image description interpreter.

59. The intelligent terminal of claim 58, wherein the image description defines operations that are to be performed by the intelligent terminal.

60. The intelligent terminal of claim 58, wherein the image description defines information to be supplied to a user of the intelligent terminal.

61. The intelligent terminal of claim 58, wherein the image description defines one or more steps to be performed by the intelligent terminal in response to detection of an event in the intelligent terminal.

62. The intelligent terminal of claim 61, wherein the image description further defines information to be supplied to a user of the intelligent terminal.

63. The intelligent terminal of claim 58, wherein the image description defines one or more local terminal functions to be performed by the intelligent terminal in response to detection of an event in the intelligent terminal.

64. The intelligent terminal of claim 56, wherein the terminal application protocol service provider establishes the first session in response to detection of an incoming call at the intelligent terminal.

65. The intelligent terminal of claim 56, wherein the terminal application protocol service provider establishes the first session in response to a detection that the user has activated a man-machine interface of the intelligent terminal.

66. The intelligent terminal of claim 56, wherein the terminal application protocol service provider comprises means for negotiating with the service node application protocol service provider to ensure that resources that are to be used by the intelligent terminal and the service node are consistent with respect to one another.

67. The intelligent terminal of claim 56, wherein the terminal application protocol service provider includes means for indicating to the service node application protocol service provider a type of coding that is to be used in communications between the intelligent terminal and the service node.

68. The intelligent terminal of claim 67, wherein the type of coding is Basic Encoding Rules.

69. The intelligent terminal of claim 67, wherein the type of coding is Packed Encoding Rules.

70. The intelligent terminal of claim 56, wherein the terminal application protocol service provider further includes means for establishing a second session with the service node application protocol service provider while maintaining the first session.

71. The intelligent terminal of claim 56, wherein the terminal application protocol service provider uses the terminal bearer service provider by mapping an operation onto two or more protocol data units.

72. The intelligent terminal of claim 71, wherein the terminal application protocol service provider includes means for sending an operation from the intelligent terminal to the service node in order to avoid an occurrence of a timeout associated with the terminal and service node bearer service providers.

73. The intelligent terminal of claim 71, wherein the terminal application protocol service provider includes means for terminating and reestablishing the first session in order to avoid an occurrence of a timeout associated with the terminal and service node bearer service providers.

* * * * *